US009557956B2

(12) United States Patent
Kobayashi

(10) Patent No.: US 9,557,956 B2
(45) **Date of Patent: *Jan. 31, 2017**

(54) INFORMATION PROCESSING APPARATUS, INFORMATION PROCESSING METHOD, AND PROGRAM

(71) Applicant: Sony Corporation, Tokyo (JP)

(72) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 26 days.

This patent is subject to a terminal disclaimer.

(21) Appl. No.: 14/242,538

(22) Filed: Apr. 1, 2014

(65) Prior Publication Data

US 2014/0297012 A1 Oct. 2, 2014

Related U.S. Application Data

(63) Continuation of application No. 12/631,681, filed on Dec. 4, 2009, now Pat. No. 8,706,274.

(30) Foreign Application Priority Data

Dec. 5, 2008 (JP) ................................ 2008-311514

(51) Int. Cl.
*G06F 17/00* (2006.01)
*G06F 3/16* (2006.01)
(Continued)

(52) U.S. Cl.
CPC ............... *G06F 3/165* (2013.01); *A63F 13/00* (2013.01); *G06T 13/205* (2013.01); *G06T 13/40* (2013.01);
(Continued)

(58) Field of Classification Search
CPC .................. A63F 2300/8047; A63F 2300/105; A63F 2300/6063; A63F 13/00; G10H 2220/135; G10H 2220/141; G10H 2220/145; G10H 1/00; G10H 1/368; G10H 2210/091; G10H 2240/175; G10H 2250/435
See application file for complete search history.

(56) References Cited

U.S. PATENT DOCUMENTS

| | | | |
|---|---|---|---|
| 6,347,998 | B1 | 2/2002 | Yoshitomi et al. |
| 6,390,923 | B1 | 5/2002 | Yoshitomi et al. |

(Continued)

FOREIGN PATENT DOCUMENTS

| | | |
|---|---|---|
| EP | 1031945 | 8/2000 |
| JP | 62-137670 A | 6/1987 |

(Continued)

OTHER PUBLICATIONS

Oxford English Dictionary definition of metadata, retrieved Aug. 22, 2013.

(Continued)

*Primary Examiner* — Andrew C Flanders
(74) *Attorney, Agent, or Firm* — Chip Law Group

(57) ABSTRACT

An information processing apparatus is provided which includes a metadata extraction unit for analyzing an audio signal in which a plurality of instrument sounds are present in a mixed manner and for extracting, as a feature quantity of the audio signal, metadata changing along with passing of a playing time, and a player parameter determination unit for determining, based on the metadata extracted by the metadata extraction unit, a player parameter for controlling a movement of a player object corresponding to each instrument sound.

23 Claims, 128 Drawing Sheets

(51) Int. Cl.

| | |
|---|---|
| ***A63F 13/00*** | (2014.01) |
| ***G06T 13/20*** | (2011.01) |
| ***G10H 1/00*** | (2006.01) |
| ***G10H 1/36*** | (2006.01) |
| ***G06T 13/40*** | (2011.01) |
| *G10L 21/10* | (2013.01) |

(52) U.S. Cl.

CPC ............ *G10H 1/0008* (2013.01); *G10H 1/368* (2013.01); *A63F 2300/8047* (2013.01); *G10H 2210/051* (2013.01); *G10H 2210/066* (2013.01); *G10H 2210/076* (2013.01); *G10H 2220/005* (2013.01); *G10H 2220/135* (2013.01); *G10H 2220/141* (2013.01); *G10L 2021/105* (2013.01)

(56) References Cited

U.S. PATENT DOCUMENTS

| | | | |
|---|---|---|---|
| 6,898,759 | B1 | 5/2005 | Terada et al. |
| 2005/0255914 | A1 | 11/2005 | McHale et al. |
| 2006/0101985 | A1 | 5/2006 | Decuir |
| 2007/0059676 | A1 | 3/2007 | Jeong |
| 2007/0265097 | A1 | 11/2007 | Havukainen |
| 2008/0078282 | A1 | 4/2008 | Saijo |
| 2009/0104956 | A1 | 4/2009 | Kay et al. |
| 2009/0165632 | A1 | 7/2009 | Rigopulos et al. |

FOREIGN PATENT DOCUMENTS

| | | |
|---|---|---|
| JP | 2004-29862 | 1/2004 |
| JP | 2007-018388 | 1/2007 |
| JP | 2007-156434 | 6/2007 |
| JP | 2008-123011 | 5/2008 |
| JP | 2008-293401 A | 12/2008 |

OTHER PUBLICATIONS

Dillon, et al. "Virtual Orchestra: An Immersive Computer Game for Fun and Education," Proceedings of the 2006 International Conference on Game Research and Development, 2006, Murdoch University, Australia, pp. 215-218, 4 pages.

Schertenleib, et al. "Conducting a Virtual Orchestra," MultiMedia, IEEE, vol. 11, Issue 3, Jul.-Sep. 2004, Lausanne, Switzerland, pp. 40-49, 10 pages.

Seif El-Nasr, et al. "Automating Lighting Design for Interactive Entertainment," ACM Computers in Entertainment, vol. 2, No. 2, Apr. 2004, Article 5, 19 pages.

Office Action dated Apr. 30, 2012 in U.S. Appl. No. 12/631,681.

Office Action dated Sep. 5, 2012 in U.S. Appl. No. 12/631,681.

Office Action dated Aug. 23, 2013 in U.S. Appl. No. 12/631,681.

CONFIGURATION EXAMPLE OF SOUND SOURCE SEPARATION UNIT 106 (CENTRE EXTRACTION METHOD)

FIG.4

TABLE 1: EXAMPLE OF SOUND SOURCE SEPARATION

| COMPONENT TO BE SEPARATED | BAND TO PASS THROUGH BAND PASS FILTER 146 |
|---|---|
| LEFT | PHASE DIFFERENCE BETWEEN LEFT AND RIGHT: SMALL<br>LEFT VOLUME > RIGHT VOLUME |
| CENTRE | PHASE DIFFERENCE BETWEEN LEFT AND RIGHT: SMALL<br>SMALL VOLUME DIFFERENCE BETWEEN LEFT AND RIGHT |
| RIGHT | PHASE DIFFERENCE BETWEEN LEFT AND RIGHT: SMALL<br>LEFT VOLUME < RIGHT VOLUME |
| BACKGROUND SOUND | PHASE DIFFERENCE BETWEEN LEFT AND RIGHT: LARGE |

Replacement Sheet
FIG.6
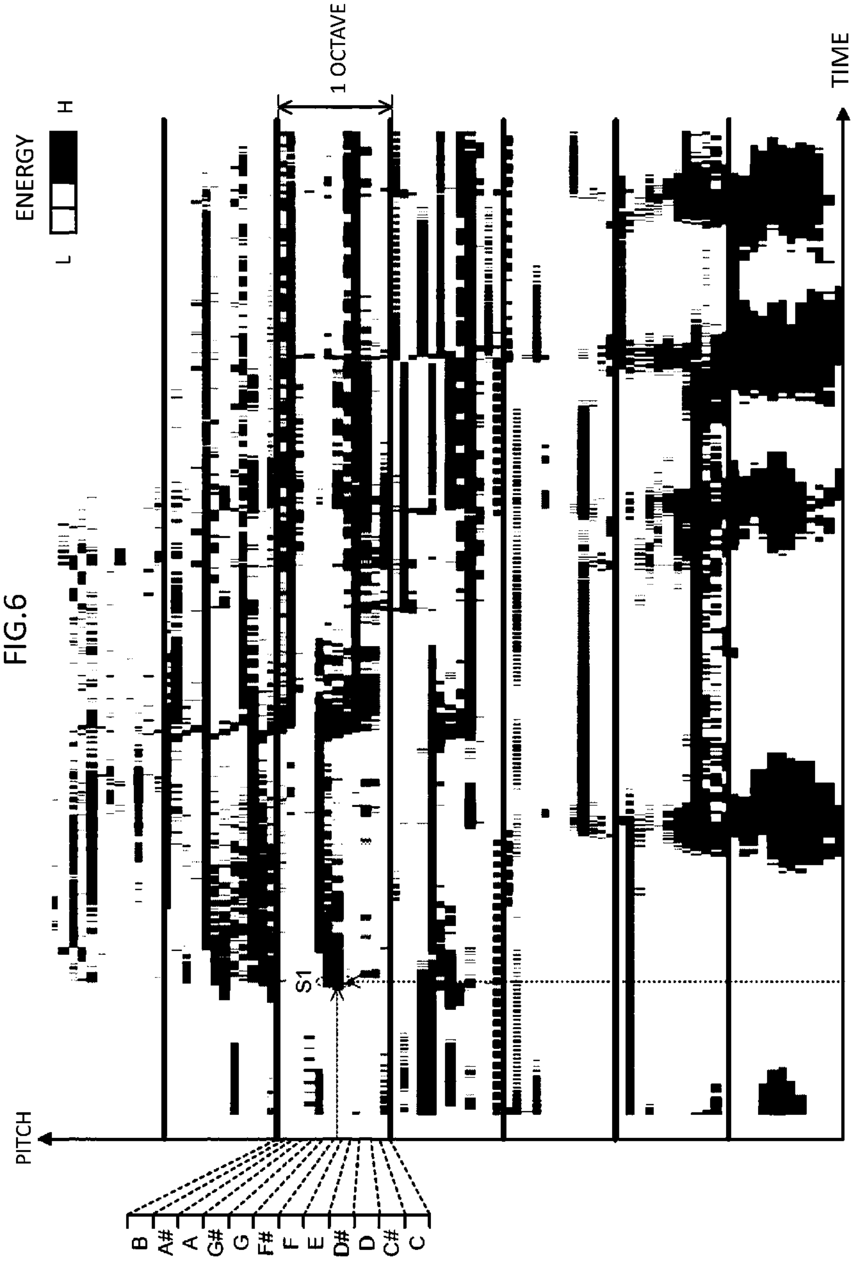

NUMBER OF SUPPLEMENTARY BEATS $B_{fill} = Round\left(\frac{F_{h+1} - F_h}{d_h}\right) - 1$

• INPUT DATA:
LOG SPECTRA OF A PLURALITY OF MUSIC PIECES

• TEACHER DATA:
TEMPO DECIDED TO BE CORRECT BY HUMAN BEING LISTENING TO EACH MUSIC PIECE

• LEARNING RESULT:
ESTIMATED TEMPO DISCRIMINATION FORMULA

AVERAGE BEAT PROBABILITY $BP_{AVG}(r) = \frac{\sum_{F(h) \in F(r)} BP(h)}{m(r)}$ F(r): GROUP OF BEAT POSITIONS AFTER REVISION ACCORDING TO BASIC MULTIPLIER r
m(r): NUMBER OF BEAT POSITIONS INCLUDED IN F(r)

FIG.31

TABLE 2: EXAMPLE OF BEAT DETECTION RESULT

| TIME [ms] | BAR NUMBER: BEAT POSITION | CHORD / KEY |
|---|---|---|
| 4694 | 4:01 | Fm / Cm |
| 5193 | 4:02 | Fm / Cm |
| 5693 | 4:03 | Fm / Cm |
| 6192 | 4:04 | Fm / Cm |
| 6691 | 5:01 | G / Cm |
| 7190 | 5:02 | G / Cm |

FIG.39

TABLE 3: EXAMPLE OF MUSIC STRUCTURE ANALYSIS RESULT

| STRUCTURE | TIME [ms] |
|---|---|
| Intro | 0 |
| Verse A | 4694 |
| Verse B | 20671 |
| Verse C | 52624 |
| Chorus | 72595 |
| Interlude | 100555 |
| Verse B | 134505 |
| Verse C | 166459 |
| *Chorus | 186430 |
| Verse A | 258326 |
| Ending | 286285 |

| CHORD TYPE | | Maj | m | 7 | m7 | ... |
|---|---|---|---|---|---|---|
| ROOT | B | 0.01 | 0.00 | 0.00 | 0.00 | ... |
| | : | : | : | : | : | : |
| | : | : | : | : | : | : |
| | C# | 0.00 | 0.00 | 0.00 | 0.00 | ... |
| | C | 0.88 | 0.08 | 0.01 | 0.02 | ... |

CHORD PROBABILITY

FIG.52
BEAT SECTION
KEY TYPE
ROOT
Maj
m
B
0.00
0.00
C#
0.00
0.00
C
0.90
0.03
KEY PROBABILITY

FIG.53

53A KEY PROBABILITY $KP_C \sim KP_{Bm}$

| KEY TYPE | | Maj | m |
|---|---|---|---|
| ROOT | B | 0.00 | 0.00 |
| | A# | 0.00 | 0.00 |
| | A | 0.02 | 0.05 |
| | : | : | : |
| | : | : | : |
| | C# | 0.00 | 0.00 |
| | C | 0.90 | 0.03 |

53B SIMPLE KEY PROBABILITY $SKP_C \sim SKP_B$

| | |
|---|---|
| 0.00 | B |
| 0.00 | A# |
| 0.00 | A |
| : | : |
| : | : |
| 0.00 | C# |
| 0.95 | C |

ADD UP KEY PROBABILITIES OF KEYS IN RELATIVE KEY RELATIONSHIP

FIG.55

KEY TRANSITION PROBABILITY (Maj → Maj) Pr (Δk)

| KEY TYPE | MODULATION AMOUNT | PROBABILITY VALUE | KEY TYPE | MODULATION AMOUNT | PROBABILITY VALUE |
|---|---|---|---|---|---|
| Maj → Maj | +5 (-7) | 0.0001 | Maj → Maj | +11 (-1) | 0.0000 |
| Maj → Maj | +4 (-8) | 0.0001 | Maj → Maj | +10 (-2) | 0.0001 |
| Maj → Maj | +3 (-9) | 0.0001 | Maj → Maj | +9 (-3) | 0.0001 |
| Maj → Maj | +2 (-10) | 0.0001 | Maj → Maj | +8 (-4) | 0.0001 |
| Maj → Maj | +1 (-11) | 0.0002 | Maj → Maj | +7 (-5) | 0.0001 |
| Maj → Maj | 0 | 0.9987 | Maj → Maj | +6 (-6) | 0.0000 |

KEY TRANSITION PROBABILITY (Maj → m)

:

KEY TRANSITION PROBABILITY (m → Maj)

:

KEY TRANSITION PROBABILITY (m → m)

| | AFTER CHANGE | | | |
|---|---|---|---|---|
| BEFORE CHANGE | SINGLE METRE | DUPLE METRE | TRIPLE METRE | QUADRUPLE METRE |
| SINGLE METRE | 0.50 | 0.10 | 0.20 | 0.20 |
| DUPLE METRE | 0.50 | 0.10 | 0.20 | 0.20 |
| TRIPLE METRE | 0.05 | 0.03 | 0.90 | 0.02 |
| QUADRUPLE METRE | 0.05 | 0.03 | 0.02 | 0.90 |

FIG.67

| 1 | 2 | 3 | 4 | 5 | 6 | 7 | 8 |
|---|---|---|---|---|---|---|---|
| 1/4-1 | 1/4-1 | 1/4-1 | 1/4-1 | 1/4-1 | 1/4-1 | 1/4-1 | 1/4-1 |
| : | : | : | : | : | : | : | : |
| 4/4-1 | 4/4-1 | 4/4-1 | 4/4-1 | 4/4-1 | 4/4-1 | 4/4-1 | 4/4-1 |
| 4/4-2 | 4/4-2 | 4/4-2 | 4/4-2 | 4/4-2 | 4/4-2 | 4/4-2 | 4/4-2 |
| 4/4-3 | 4/4-3 | 4/4-3 | 4/4-3 | 4/4-3 | 4/4-3 | 4/4-3 | 4/4-3 |
| 4/4-4 | 4/4-4 | 4/4-4 | 4/4-4 | 4/4-4 | 4/4-4 | 4/4-4 | 4/4-4 |

BEAT

FIG.71

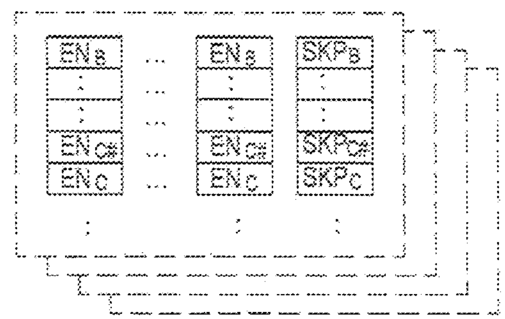

- INDEPENDENT VARIABLE:
  EXTENDED ROOT FQ FOR
  RESPECTIVE BEAT SECTIONS WHOSE
  CORRECT CHORDS ARE KNOWN

- DUMMY DATA (TEACHER DATA):
  WHEN LEARNING FOR MAJOR CHORD ··· 1 WHEN MAJOR CHORD, OTHERWISE 0
  WHEN LEARNING FOR MINOR CHORD ··· 1 WHEN MINOR CHORD, OTHERWISE 0
  WHEN LEARNING FOR 7th CHORD ··· 1 WHEN 7th CHORD, OTHERWISE 0
  WHEN LEARNING FOR 9th CHORD ··· 1 WHEN 9th CHORD, OTHERWISE 0

LOGISTIC REGRESSION ANALYSIS

- EXTENDED CHORD PROBABILITY FORMULA

MAJOR CHORD → CP' major (x1, x2, ...) = ...
MINOR CHORD → CP' minor (x1, x2, ...) = ...
7th CHORD → CP' seven (x1, x2, ...) = ...
9th CHORD → CP' nine (x1, x2, ...) = ...

FIG.76

TABLE 4: EXAMPLE OF MUSIC CATEGORY

| CATEGORY | FEATURE |
|---|---|
| OLD PIECE | POOR SOUND QUALITY.<br>PROPORTION OF VOLUME IN BACKGROUND IS SMALL. |
| MALE VOCAL<br>LOUD BACKGROUND | MALE VOCAL.<br>NOISY BACKGROUND PERFORMANCE. |
| MALE VOCAL<br>SOFT BACKGROUND | MALE VOCAL.<br>VOICE STANDING OUT FROM BACKGROUND PERFORMANCE. |
| FEMALE VOCAL<br>LOUD BACKGROUND | FEMALE VOCAL.<br>NOISY BACKGROUND PERFORMANCE. |
| ... | ... |

PRESENCE PROBABILITY OF EACH INSTRUMENT SOUND
(TIME SERIES DISTRIBUTION)

TYPES OF VISUALIZATION PARAMETERS

FIG.91

EXAMPLE OF LIGHTING PARAMETER

| TYPES OF LIGHTS | PARAMETER |
|---|---|
| BACKGROUND COLOUR | COLOUR, BRIGHTNESS |
| STAGE LIGHTS 1 | COLOUR, BRIGHTNESS, ANGLE |
| .... | .... |
| STAGE LIGHTS n | COLOUR, BRIGHTNESS, ANGLE |
| SPOTLIGHT 1 | COLOUR, BRIGHTNESS |
| .... | .... |
| SPOTLIGHT m | COLOUR, BRIGHTNESS |

FIG.92

EXAMPLE OF LIGHTING PARAMETER (BACKGROUND COLOUR)

| CURRENT TIME | BACKGROUND COLOUR |
|---|---|
| DAYTIME | BLUE, BRIGHTNESS 100% |
| EVENING | ORANGE, BRIGHTNESS 10% |
| NIGHTTIME | BLACK, BRIGHTNESS 0% |

FIG.93

EXAMPLE OF LIGHTING PARAMETER (STAGE LIGHTS, SPOTLIGHT)

| GENRE | LIGHTING CHANGE PATTERN |
|---|---|
| ROCK | COLOUR OF STAGE LIGHTS IS CHANGED WITH EVERY BAR.<br>PATTERN OF STAGE LIGHTS IS SWITCHED WITH EVERY QUARTER NOTE.<br>ANGLE OF STAGE LIGHTS IS SET TO 30°.<br>COLOUR OF SPOTLIGHT IS SET TO WHITE. |
| JAZZ | COLOUR OF STAGE LIGHTS IS SET TO WARM COLOUR.<br>NO COLOUR CHANGE PER BEAT.<br>ANGLE OF STAGE LIGHTS IS SET TO 0°.<br>COLOUR OF SPOTLIGHT IS SET TO BLUE. |
| CLASSICS | COLOUR OF STAGE LIGHTS IS SET TO WHITE.<br>NO COLOUR CHANGE PER BEAT.<br>ANGLE OF STAGE LIGHTS IS SET TO 45°.<br>COLOUR OF SPOTLIGHT IS SET TO WHITE. |

FIG.94

EXAMPLE OF LIGHTING PARAMETER (STAGE LIGHTS)

| PATTERN NO. | COLOUR COMBINATION |
|---|---|
| 1 | RED, GREEN |
| 2 | PURPLE, WHITE |
| 3 | LIGHT BLUE, GREEN |
| 4 | YELLOW, WHITE |

FIG.97

EXAMPLE OF AUDIENCE PARAMETER

| TONE OF MUSIC | AUDIENCE PARAMETER CHANGE PATTERN |
|---|---|
| LIVELY | STAY STILL AT INTRO, JUMP ALONG WITH BEAT AT REFRAIN, AND MOVE ONLY HEAD UP AND DOWN AT OTHER PORTIONS. |
| QUIET | STAY STILL AT INTRO, SWAY RAISED ARMS LEFT AND RIGHT WITH EACH BAR AT REFRAIN, AND MOVE ONLY HEAD UP AND DOWN AT OTHER PORTIONS. |
| CLASSICAL | STILL |

FIG.104

EXAMPLE OF PLAYER PARAMETER (GUITAR SOLO)

| MELODY | HAND POSITION |
|---|---|
| E2~G#2 | FIRST STRING, NEAREST TO HEADSTOCK WHEN E2 AND GETS NEARER TO BODY AS NOTE GETS CLOSER TO G#2 |
| A2~C#3 | SECOND STRING, NEAREST TO HEADSTOCK WHEN A2 AND GETS NEARER TO BODY AS NOTE GETS CLOSER TO C#3 |
| D3~F#3 | THIRD STRING, NEAREST TO HEADSTOCK WHEN D3 AND GETS NEARER TO BODY AS NOTE GETS CLOSER TO F#3 |
| G3~A#3 | FOURTH STRING, NEAREST TO HEADSTOCK WHEN G3 AND GETS NEARER TO BODY AS NOTE GETS CLOSER TO A#3 |
| B3~D#4 | FIFTH STRING, NEAREST TO HEADSTOCK WHEN B3 AND GETS NEARER TO BODY AS NOTE GETS CLOSER TO D#4 |
| E4~ | SIXTH STRING, NEAREST TO HEADSTOCK WHEN E4 AND GETS NEARER TO BODY AS NOTE GETS HIGHER |

FIG.105

EXAMPLE OF PLAYER PARAMETER (GUITAR: NOT SOLO)

| CHORD ROOT | HAND POSITION |
|---|---|
| E, F, F#, G, G# | NEAREST TO HEADSTOCK WHEN E AND GETS NEARER TO BODY AS NOTE GETS CLOSER TO G# |
| A, A#, B, C, C#, D, D# | NEAREST TO HEADSTOCK WHEN A AND GETS NEARER TO BODY AS NOTE GETS CLOSER TO D# |

FIG.111

EXAMPLE OF PLAYER PARAMETER (BASS)

| BASS LINE | HAND POSITION |
|---|---|
| E1~G#1 | FIRST STRING, NEAREST TO HEADSTOCK WHEN E1 AND GETS NEARER TO BODY AS NOTE GETS CLOSER TO G#1 |
| A1~C#2 | SECOND STRING, NEAREST TO HEADSTOCK WHEN A1 AND GETS NEARER TO BODY AS NOTE GETS CLOSER TO C#2 |
| D2~F#2 | THIRD STRING, NEAREST TO HEADSTOCK WHEN D2 AND GETS NEARER TO BODY AS NOTE GETS CLOSER TO F#2 |
| G2~ | FOURTH STRING, NEAREST TO HEADSTOCK WHEN G2 AND GETS NEARER TO BODY AS NOTE GETS HIGHER |

TYPES OF PLAYER PARAMETERS (KEYBOARD, DRUMS)

TYPES OF PLAYER PARAMETERS (STRINGS)

FIG.121

EXAMPLE OF PLAYER PARAMETER (STRINGS)

| MELODY | HAND POSITION |
| --- | --- |
| G2~C#2 | FIRST STRING, NEAREST TO HEADSTOCK WHEN G2 AND GETS NEARER TO BODY AS NOTE GETS CLOSER TO C#2 |
| D3~G#3 | SECOND STRING, NEAREST TO HEADSTOCK WHEN D3 AND GETS NEARER TO BODY AS NOTE GETS CLOSER TO G#3 |
| A3~D#4 | THIRD STRING, NEAREST TO HEADSTOCK WHEN A3 AND GETS NEARER TO BODY AS NOTE GETS CLOSER TO D#4 |
| E4~ | FOURTH STRING, NEAREST TO HEADSTOCK WHEN E4 AND GETS NEARER TO BODY AS NOTE GETS HIGHER |

TYPES OF PLAYER PARAMETERS (BRASS)

INFORMATION PROCESSING APPARATUS, INFORMATION PROCESSING METHOD, AND PROGRAM

RELATED APPLICATION

This application is a continuation of U.S. patent application Ser. No. 12/631,681, filed Dec. 4, 2009, which claims priority to Japanese Patent Application 2008-311514, filed Dec. 5, 2008. The contents of these applications are incorporated herein in their entirety.

BACKGROUND OF THE INVENTION

Field of the Invention

The present invention relates to an information processing apparatus, an information processing method, and a program.

Description of the Related Art

As a method for visualizing music, a method of making a robot dance to music data, a method of moving an image generated by computer graphics (hereinafter, a CD image) in sync with music data, or the like, can be conceived. However, currently, although there exists a robot which moves in a predetermined motion pattern according to performance information of music data when the performance information is input, a robot which uses a signal waveform of music data and moves in a motion pattern in sync with the music data is not known to exist. Also, with respect to a method of visualizing music by a CG image, only a method of displaying music by applying a predetermined effect to an audio waveform or spectrum image of the music data is known as a method which uses a signal waveform of music data. With respect to visualization of music, a technology is disclosed in JP-A-2007-18388 which associates the movement of a control target with rhythm and determines the movement of the control target based on the correlation between the rhythm and rhythm estimated by a frequency analysis of music data. Also, a technology is disclosed in JP-A-2004-29862 which analyses a sound pressure distribution in each frequency band included in music data and expresses feelings of visual contents based on the analysis result.

SUMMARY OF THE INVENTION

However, the above-described documents do not disclose technologies for automatically detecting feature quantity (FQ) of music data changing in time series and visualizing, based on the feature quantity, the music data in such a way that makes it seem like an object is playing the music. Thus, in light of the foregoing, it is desirable to provide novel and improved information processing apparatus, information processing method, and program that are capable of automatically detecting feature quantity of music data changing in time series and visualizing the music data, based on the feature quantity, in such a way that makes it seem like an object corresponding to each instrument sound is playing the music.

According to an embodiment of the present invention, there is provided an information processing apparatus including a metadata extraction unit for analyzing an audio signal in which a plurality of instrument sounds are present in a mixed manner and for extracting, as a feature quantity of the audio signal, metadata changing along with passing of a playing time, and a player parameter determination unit for determining, based on the metadata extracted by the metadata extraction unit, a player parameter for controlling a movement of a player object corresponding to each instrument sound.

The metadata extraction unit may extract, as the metadata, one or more pieces of data selected from among a group formed from a beat of the audio signal, a chord progression, a music structure, a melody line, a bass line, a presence probability of each instrument sound, a solo probability of each instrument sound and a voice feature of vocals.

The metadata extraction unit may extract, as the metadata, one or more pieces of data selected from among a group formed from a genre of music to which the audio signal belongs, age of the music to which the audio signal belongs, information of the audio signal relating to a player, types of the instrument sounds included in the audio signal and tone of music of the audio signal.

The player parameter determination unit may determine, in case information on height and weight of a player is extracted as the information relating to the player, a player parameter indicating a size of the player object based on the information on height and weight. In this case, the information processing apparatus determines, in case information on a sex of the player is extracted as the information relating to the player, a player parameter indicating a hairstyle and clothing of the player object based on the information on a sex.

The information processing apparatus further includes a lighting parameter determination unit for determining, based on the metadata extracted by the metadata extraction unit, a lighting parameter for controlling lighting on a stage on which the player object is placed. In this case, the lighting parameter determination unit determines the lighting parameter so that the lighting changes in sync with the beat detected by the metadata extraction unit.

The lighting parameter determination unit may determine, based on the presence probability of each instrument sound extracted by the metadata extraction unit, a lighting parameter indicating a brightness of a spotlight shining on the player object corresponding to the each instrument sound.

The lighting parameter determination unit may refer to the music structure extracted by the metadata extraction unit, and may determine the lighting parameter so that the lighting changes according to a type of a structure of music being played.

The lighting parameter determination unit may determine the lighting parameter so that a colour of the lighting changes based on the age of the music extracted by the metadata extraction unit.

The information processing apparatus further includes an audience parameter determination unit for determining, based on the metadata extracted by the metadata extraction unit, an audience parameter for controlling a movement of audience objects placed in audience seats provided in a location different from the stage. In this case, the audience parameter determination unit determines the audience parameter so that the movement of the audience objects changes in sync with the beat detected by the metadata extraction unit.

The audience parameter determination unit may refer to the music structure extracted by the metadata extraction unit, and may determine the audience parameter so that the movement of the audience objects changes according to a type of a structure of music being played.

The player parameter determination unit may determine, based on the solo probability of each instrument sound extracted by the metadata extraction unit, a player parameter indicating a posture and an expression of the player object corresponding to the each instrument sound.

The player parameter determination unit may determine, based on the presence probability of each instrument sound extracted by the metadata extraction unit, a player parameter indicating a moving extent of a playing hand of the player object corresponding to the each instrument sound.

The player parameter determination unit may determine, based on the presence probability of vocals extracted by the metadata extraction unit, a player parameter indicating a size of an open mouth of the player object corresponding to the vocals or a distance between a hand holding a microphone and the mouth.

The player parameter determination unit may determine, based on a difference between an average pitch of the melody line extracted by the metadata and a pitch of the melody line for each frame or based on the voice feature of vocals extracted by the metadata extraction unit, a player parameter indicating a movement of an expression of the player object corresponding to the vocals.

The player parameter determination unit may determine, based on the melody line extracted by the metadata extraction unit, a player parameter indicating a movement of a hand not holding a microphone, the hand being of the player object corresponding to the vocals.

The player parameter determination unit may determine, based on the chord progression extracted by the metadata extraction unit, a player parameter indicating a position of a hand of the player object, the player parameter corresponding to one or more sections selected from among a group formed from a guitar, a keyboard and strings.

The player parameter determination unit may determine, based on the bass line extracted by the metadata extraction unit, a position of a hand holding a neck, the hand being of the player object corresponding to a bass.

When the player object is an externally connected robot or a player image realized by computer graphics, the information processing apparatus further includes an object control unit for controlling a movement of the externally connected robot by using the player parameter determined by the player parameter determination unit or for controlling a movement of the player image by using the player parameter determined by the player parameter determination unit.

According to another embodiment of the present invention, there is provided an information processing method including the steps of analyzing an audio signal in which a plurality of instrument sounds are present in a mixed manner and extracting, as a feature quantity of the audio signal, metadata changing along with passing of a playing time, and determining, based on the metadata extracted by the step of analyzing and extracting, a player parameter for controlling a movement of a player object corresponding to each instrument sound.

According to another embodiment of the present invention, there is provided a program for causing a computer to realize a metadata extraction function for analyzing an audio signal in which a plurality of instrument sounds are present in a mixed manner and for extracting, as a feature quantity of the audio signal, metadata changing along with passing of a playing time, and a player parameter determination function for determining, based on the metadata extracted by the metadata extraction function, a player parameter for controlling a movement of a player object corresponding to each instrument sound.

According to another embodiment of the present invention, there may be provided a recording medium which stores the program and which can be read by a computer.

According to the embodiments of the present invention described above, it becomes possible to automatically detect feature quantity of music data changing in time series and to visualize the music data, based on the feature quantity, in such a way that makes it seem like an object corresponding to each instrument sound is playing the music.

BRIEF DESCRIPTION OF THE DRAWINGS

FIG. 4 is an explanatory diagram showing types of sound sources according to the present embodiment;

FIG. 6 is an explanatory diagram showing a log spectrum generated by the log spectrum generation method according to the present embodiment;

FIG. 31 is an explanatory diagram showing an example of a beat detection result by the beat detection method according to the present embodiment;

FIG. 39 is an explanatory diagram showing an example of the structure analysis method according to the present embodiment;

FIG. 53 is an explanatory diagram showing an example of the key detection method according to the present embodiment;

FIG. 55 is an explanatory diagram showing an example of the key detection method according to the present embodiment;

FIG. 66 is an explanatory diagram showing an example of the bar detection method according to the present embodiment;

FIG. 67 is an explanatory diagram showing an example of the bar detection method according to the present embodiment;

FIG. 71 is an explanatory diagram showing an example of the chord progression detection method according to the present embodiment;

FIG. 76 is an explanatory diagram showing an example of a melody line detection method according to the present embodiment;

FIG. 91 is an explanatory diagram showing an example of the visualization parameter determination method according to the present embodiment;

FIG. 92 is an explanatory diagram showing an example of the visualization parameter determination method according to the present embodiment;

FIG. 93 is an explanatory diagram showing an example of the visualization parameter determination method according to the present embodiment;

FIG. 94 is an explanatory diagram showing an example of the visualization parameter determination method according to the present embodiment;

FIG. 97 is an explanatory diagram showing an example of the visualization parameter determination method according to the present embodiment;

FIG. 104 is an explanatory diagram showing an example of the visualization parameter determination method according to the present embodiment;

FIG. 105 is an explanatory diagram showing an example of the visualization parameter determination method according to the present embodiment;

FIG. 111 is an explanatory diagram showing an example of the visualization parameter determination method according to the present embodiment;

FIG. 120 is an explanatory diagram showing an example of the visualization parameter determination method according to the present embodiment;

FIG. 121 is an explanatory diagram showing an example of the visualization parameter determination method according to the present embodiment;

FIG. 122 is an explanatory diagram showing an example of the visualization parameter determination method according to the present embodiment;

FIG. 123 is an explanatory diagram showing an example of the visualization parameter determination method according to the present embodiment;

FIG. 124 is an explanatory diagram showing an example of the visualization parameter determination method according to the present embodiment;

FIG. 125 is an explanatory diagram showing an example of the visualization parameter determination method according to the present embodiment;

FIG. 126 is an explanatory diagram showing an example of the visualization parameter determination method according to the present embodiment;

FIG. 127 is an explanatory diagram showing an example of the visualization parameter determination method according to the present embodiment; and FIG. 128 is an explanatory diagram showing a hardware configuration example of the information processing apparatus according to the present embodiment.

DETAILED DESCRIPTION OF THE EMBODIMENT(S)

Figure 1:
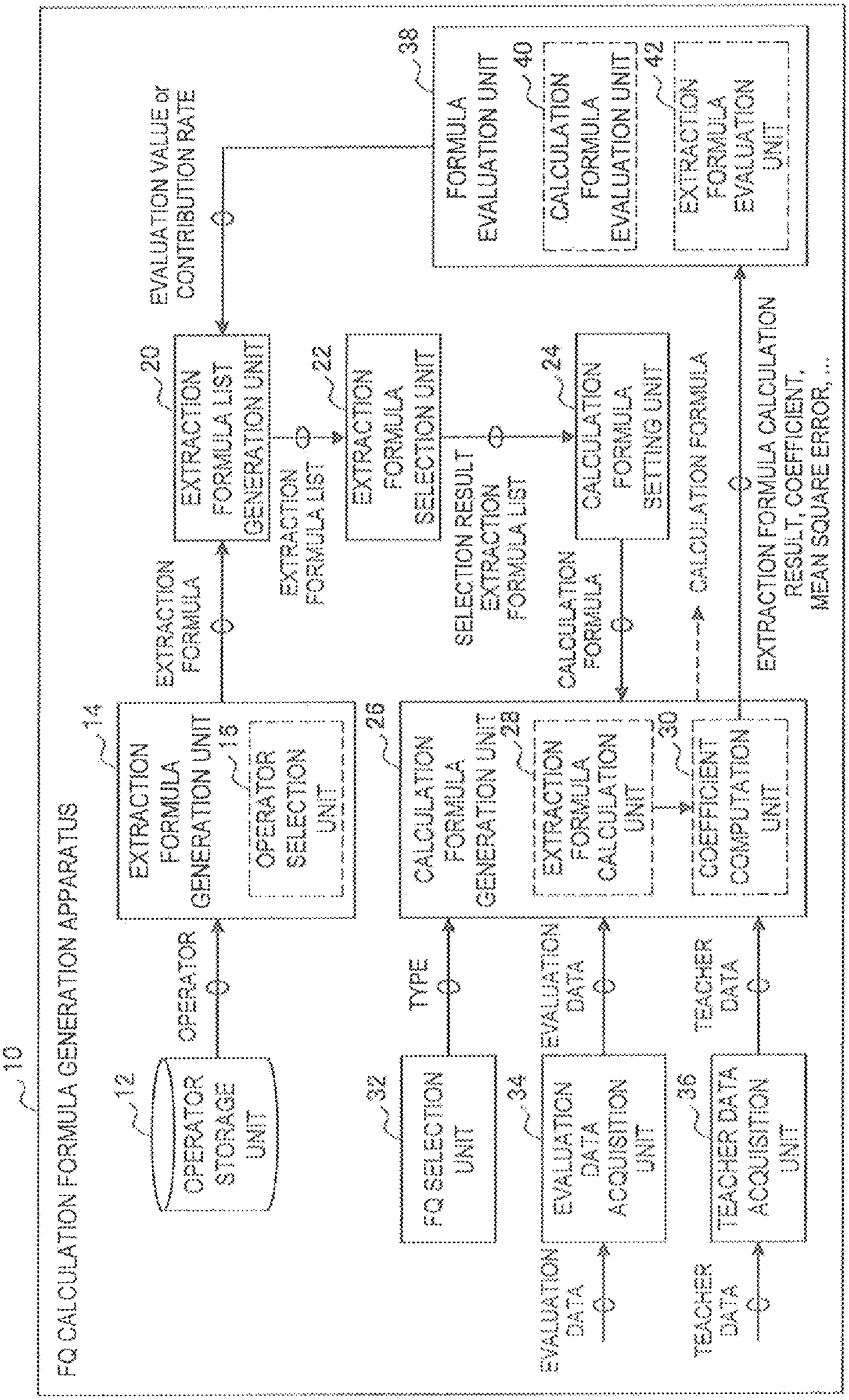
FIG. 1 is an explanatory diagram showing a configuration example of a feature quantity calculation formula generation apparatus for automatically generating an algorithm for calculating feature quantity.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification, explanation will be made in the order shown below.

(Explanation Items)

1. Infrastructure Technology 1-1. Configuration of Feature Quantity Calculation Formula Generation Apparatus 10

2. Embodiment 2-1. Overall Configuration of Information Processing Apparatus 100

Explanation of Music Analysis Method ###

2-2. Configuration of Sound Source Separation Unit 106

2-3. Configuration of Log Spectrum Analysis Unit 108

2-4. Configuration of Music Analysis Unit 110

2-4-1. Configuration of Beat Detection Unit 132

2-4-2. Configuration of Structure. Analysis Unit 134

2-4-3. Configuration of Chord Probability Detection Unit 136

2-4-4. Configuration of Key Detection Unit 138

2-4-5. Configuration of Bar Detection Unit 140

2-4-6. Configuration of Chord Progression Detection Unit 142

2-4-7. Configuration of Melody Detection Unit 144

2-4-8. Configuration of Bass Detection Unit 146

2-4-9. Configuration of Metadata Detection Unit 148

Explanation of Music Visualization Method ###

2-5. Configuration of Visualization Parameter Determination Unit 114

2-5-1. Outline of Visualization Parameter Determination Method 2-5-2. Details of Visualization Parameter Determination Method 2-6. Hardware Configuration Example of Information Processing Apparatus 100

2-7. Conclusion

<1>. Infrastructure Technology

First, before describing a technology according to an embodiment of the present invention, an infrastructure technology used for realizing the technological configuration of the present embodiment will be briefly described. The infrastructure technology described here relates to an automatic generation method of an algorithm for quantifying in the form of feature quantity the feature of arbitrary input data. Various types of data such as a signal waveform of an audio signal or brightness data of each colour included in an image may be used as the input data, for example. Furthermore, when taking a music piece for an example, by applying the infrastructure technology, an algorithm for computing feature quantity indicating the cheerfulness of the music piece or the tempo is automatically generated from the waveform of the music data. Moreover, a learning algorithm disclosed in JP-A-2008-123011 can also be used instead of the configuration example of a feature quantity calculation formula generation apparatus 10 described below.

(1-1. Configuration of Feature Quantity Calculation Formula Generation Apparatus 10)

First, referring to FIG. 1, a functional configuration of the feature quantity calculation formula generation apparatus 10 according to the above-described infrastructure technology will be described. FIG. 1 is an explanatory diagram showing a configuration example of the feature quantity calculation formula generation apparatus 10 according to the above-described infrastructure technology. The feature quantity calculation formula generation apparatus 10 described here is an example of means (learning algorithm) for automatically generating an algorithm (hereinafter, a calculation formula) for quantifying in the form of feature quantity, by using arbitrary input data, the feature of the input data.

As shown in FIG. 1, the feature quantity calculation formula generation apparatus 10 mainly has an operator storage unit 12, an extraction formula generation unit 14, an extraction formula list generation unit 20, an extraction formula selection unit 22, and a calculation formula setting unit 24. Furthermore, the feature quantity calculation formula generation apparatus 10 includes a calculation formula generation unit 26, a feature quantity selection unit 32, an evaluation data acquisition unit 34, a teacher data acquisition unit 36, and a formula evaluation unit 38. Moreover, the extraction formula generation unit 14 includes an operator selection unit 16. Also, the calculation formula generation unit 26 includes an extraction formula calculation unit 28 and a coefficient computation unit 30. Furthermore, the formula evaluation unit 38 includes a calculation formula evaluation unit 40 and an extraction formula evaluation unit 42.

First, the extraction formula generation unit 14 generates a feature quantity extraction formula (hereinafter, an extraction formula), which serves a base for a calculation formula, by combining a plurality of operators stored in the operator storage unit 12. The "operator" here is an operator used for executing specific operation processing on the data value of the input data. The types of operations executed by the operator include a differential computation, a maximum value extraction, a low-pass filtering, an unbiased variance computation, a fast Fourier transform, a standard deviation computation, an average value computation, or the like. Of course, it is not limited to these types of operations exemplified above, and any type of operation executable on the data value of the input data may be included.

Furthermore, a type of operation, an operation target axis, and parameters used for the operation are set for each operator. The operation target axis means an axis which is a target of an operation processing among axes defining each data value of the input data. For example, when taking music data as an example, the music data is given as a waveform for volume in a space formed from a time axis and a pitch axis (frequency axis). When performing a differential operation on the music data, whether to perform the differential operation along the time axis direction or to perform the differential operation along the frequency axis direction has to be determined. Thus, each parameter includes information relating to an axis which is to be the target of the operation processing among axes forming a space defining the input data.

Furthermore, a parameter becomes necessary depending on the type of an operation. For example, in case of the low-pass filtering, a threshold value defining the range of data values to be passed has to be fixed as a parameter. Due to these reasons, in addition to the type of an operation, an operation target axis and a necessary parameter are included in each operator. For example, operators are expressed as F#Differential, F#MaxIndex, T#LPF_1;0.861, T#UVariance, . . . F and the like added at the beginning of the operators indicate the operation target axis. For example, F means frequency axis, and T means time axis.

Differential and the like added, being divided by #, after the operation target axis indicate the types of the operations. For example, Differential means a differential computation operation, MaxIndex means a maximum value extraction operation, LPF means a low-pass filtering, and UVariance means an unbiased variance computation operation. The number following the type of the operation indicates a parameter. For example, LPF_1;0.861 indicates a low-pass filter having a range of 1 to 0.861 as a passband. These various operators are stored in the operator storage unit 12, and are read and used by the extraction formula generation unit 14. The extraction formula generation unit 14 first selects arbitrary operators by the operator selection unit 16, and generates an extraction formula by combining the selected operators.

For example, F#Differential, F#MaxIndex, T#LPF_1;0.861 and T#UVariance are selected by the operator selection unit 16, and an extraction formula f expressed as the following equation (1) is generated by the extraction formula generation unit 14. However, 12Tones added at the beginning indicates the type of input data which is a processing target. For example, when 12Tones is described, signal data (log spectrum described later) in a time-pitch space obtained by analyzing the waveform of input data is made to be the operation processing target. That is, the extraction formula expressed as the following equation (1) indicates that the log spectrum described later is the processing target, and that, with respect to the input data, the differential operation and the maximum value extraction are sequentially performed along the frequency axis (pitch axis direction) and the low-pass filtering and the unbiased variance operation are sequentially performed along the time axis.

[Equation 1]

$$f=\{12\text{Tones},F\#\text{Differential},F\#\text{MaxIndex},\ T\#\text{LPF\_1};\ 0.861,T\#U\text{Variance}\} \quad (1)$$

As described above, the extraction formula generation unit 14 generates an extraction formula as shown as the above-described equation (1) for various combinations of the operators. The generation method will be described in detail. First, the extraction formula generation unit 14 selects operators by using the operator selection unit 16. At this time, the operator selection unit 16 decides whether the result of the operation by the combination of the selected operators (extraction formula) on the input data is a scalar or a vector of a specific size or less (whether it will converge or not).

The above-described decision processing is performed based on the type of the operation target axis and the type of the operation included in each operator. When combinations of operators are selected by the operator selection unit 16, the decision processing is performed for each of the combinations. Then, when the operator selection unit 16 decides that an operation result converges, the extraction formula generation unit 14 generates an extraction formula by using the combination of the operators, according to which the operation result converges, selected by the operator selection unit 16. The generation processing for the extraction formula by the extraction formula generation unit 14 is performed until a specific number (hereinafter, number of selected extraction formulae) of extraction formulae are generated. The extraction formulae generated by the extraction formula generation unit 14 are input to the extraction formula list generation unit 20.

When the extraction formulae are input to the extraction formula list generation unit 20 from the extraction formula generation unit 14, a specific number of extraction formulae are selected from the input extraction formulae (hereinafter, number of extraction formulae in list≤ number of selected extraction formulae) and an extraction formula list is generated. At this time, the generation processing by the extraction formula list generation unit 20 is performed until a specific number of the extraction formula lists (hereinafter, number of lists) are generated. Then, the extraction formula lists generated by the extraction formula list generation unit 20 are input to the extraction formula selection unit 22.

A concrete example will be described in relation to the processing by the extraction formula generation unit 14 and the extraction formula list generation unit 20. First, the type of the input data is determined by the extraction formula generation unit 14 to be music data, for example. Next, operators $OP_1$, $OP_2$, $OP_3$ and $OP_4$ are randomly selected by the operator selection unit 16. Then, the decision processing is performed as to whether or not the operation result of the music data converges by the combination of the selected operators. When it is decided that the operation result of the music data converges, an extraction formula $f_1$ is generated with the combination of $OP_1$ to $OP_4$. The extraction formula $f_1$ generated by the extraction formula generation unit 14 is input to the extraction formula list generation unit 20.

Furthermore, the extraction formula generation unit 14 repeats the processing same as the generation processing for the extraction formula $f_1$ and generates extraction formulae $f_2$, $f_3$ and $f_4$, for example. The extraction formulae $f_2$, $f_3$ and $f_4$ generated in this manner are input to the extraction formula list generation unit 20. When the extraction formulae $f_1$, $f_2$, $f_3$ and $f_4$ are input, the extraction formula list generation unit 20 generates an extraction formula list $L_1=\{f_1, f_2, f_4\}$, and an extraction formula list $L_2=\{f_1, f_3, f_4\}$, for example. The extraction formula lists $L_1$ and $L_2$ generated by the extraction formula list generation unit 20 are input to the extraction formula selection unit 22.

As described above with a concrete example, extraction formulae are generated by the extraction formula generation unit 14, and extraction formula lists are generated by the extraction formula list generation unit 20 and are input to the extraction formula selection unit 22. However, although a case is described in the above-described example where the number of selected extraction formulae is 4, the number of extraction formulae in list is 3, and the number of lists is 2, it should be noted that, in reality, extremely large numbers of extraction formulae and extraction formula lists are generated.

Now, when the extraction formula lists are input from the extraction formula list generation unit 20, the extraction formula selection unit 22 selects, from the input extraction formula lists, extraction formulae to be inserted into the calculation formula described later. For example, when the extraction formulae $f_1$ and $f_4$ in the above-described extraction formula list $L_1$ are to be inserted into the calculation formula, the extraction formula selection unit 22 selects the extraction formulae $f_1$ and $f_4$ with regard to the extraction formula list $L_1$. The extraction formula selection unit 22 performs the above-described selection processing for each of the extraction formula lists. Then, when the selection processing is complete, the result of the selection processing by the extraction formula selection unit 22 and each of the extraction formula lists are input to the calculation formula setting unit 24.

When the selection result and each of the extraction formula lists are input from the extraction formula selection unit 22, the calculation formula setting unit 24 sets a calculation formula corresponding to each of the extraction formula, taking into consideration the selection result of the extraction formula selection unit 22. For example, as shown as the following equation (2), the calculation formula setting unit 24 sets a calculation formula $F_m$ by linearly coupling extraction formula $f_k$ included in each extraction formula list $L_m=\{f_1, \ldots, f_K\}$. Moreover, m=1, . . . , M (M is the number of lists), k=1, . . . , K (K is the number of extraction formulae in list), and $B_0, \ldots, B_K$ are coupling coefficients.

[Equation 2]

$$F_m=B_0+B_1f_1+\ldots+B_Kf_K \tag{2}$$

Moreover, the calculation formula $F_m$ can also be set to a non-linear function of the extraction formula $f_k$ (k=1 to K). However, the function form of the calculation formula $F_m$ set by the calculation formula setting unit 24 depends on a coupling coefficient estimation algorithm used by the calculation formula generation unit 26 described later. Accordingly, the calculation formula setting unit 24 is configured to set the function form of the calculation formula $F_m$ according to the estimation algorithm which can be used by the calculation formula generation unit 26. For example, the calculation formula setting unit 24 may be configured to change the function form according to the type of input data. However, in this specification, the linear coupling expressed as the above-described equation (2) will be used for the convenience of the explanation. The information of the calculation formula set by the calculation formula setting unit 24 is input to the calculation formula generation unit 26.

Furthermore, the type of feature quantity desired to be computed by the calculation formula is input to the calculation formula generation unit 26 from the feature quantity selection unit 32. The feature quantity selection unit 32 is means for selecting the type of feature quantity desired to be computed by the calculation formula. Furthermore, evaluation data corresponding to the type of the input data is input to the calculation formula generation unit 26 from the evaluation data acquisition unit 34. For example, in a case the type of the input data is music, a plurality of pieces of music data are input as the evaluation data. Also, teacher data corresponding to each evaluation data is input to the calculation formula generation unit 26 from the teacher data acquisition unit 36. The teacher data here is the feature quantity of each evaluation data. Particularly, the teacher data for the type selected by the feature quantity selection unit 32 is input to the calculation formula generation unit 26. For example, in a case where the input data is music data and the type of the feature quantity is tempo, correct tempo value of each evaluation data is input to the calculation formula generation unit 26 as the teacher data.

When the evaluation data, the teacher data, the type of the feature quantity, the calculation formula and the like are input, the calculation formula generation unit 26 first inputs each evaluation data to the extraction formulae $f_1, \ldots, f_K$ included in the calculation formula $F_m$ and obtains the calculation result by each of the extraction formulae (hereinafter, an extraction formula calculation result) by the extraction formula calculation unit 28. When the extraction formula calculation result of each extraction formula relating to each evaluation data is computed by the extraction formula calculation unit 28, each extraction formula calculation result is input from the extraction formula calculation unit 28 to the coefficient computation unit 30. The coefficient computation unit 30 uses the teacher data corresponding to each evaluation data and the extraction formula calculation result that is input, and computes the coupling coefficients expressed as $B_0, \ldots, B_K$ in the above-described equation (2). For example, the coefficients $B_0, \ldots, B_K$ can be determined by using a least-squares method. At this time, the coefficient computation unit 30 also computes evaluation values such as a mean square error.

The extraction formula calculation result, the coupling coefficient, the mean square error and the like are computed for each type of feature quantity and for the number of the lists. The extraction formula calculation result computed by the extraction formula calculation unit 28, and the coupling coefficients and the evaluation values such as the mean square error computed by the coefficient computation unit 30 are input to the formula evaluation unit 38. When these computation results are input, the formula evaluation unit 38 computes an evaluation value for deciding the validity of each of the calculation formulae by using the input computation results. As described above, a random selection processing is included in the process of determining the extraction formulae configuring each calculation formula and the operators configuring the extraction formulae. That is, there are uncertainties as to whether or not optimum extraction formulae and optimum operators are selected in the determination processing. Thus, evaluation is performed by the formula evaluation unit 38 to evaluate the computation result and to perform recalculation or correct the calculation result as appropriate.

The calculation formula evaluation unit 40 for computing the evaluation value for each calculation formula and the extraction formula evaluation unit 42 for computing a contribution degree of each extraction formula are provided in the formula evaluation unit 38 shown in FIG. 1. The calculation formula evaluation unit 40 uses an evaluation method called AIC or BIC, for example, to evaluate each calculation formula. The AIC here is an abbreviation for Akaike Information Criterion. On the other hand, the BIC is an abbreviation for Bayesian Information Criterion. When using the AIC, the evaluation value for each calculation formula is computed by using the mean square error and the number of pieces of the teacher data (hereinafter, the number of teachers) for each calculation formula. For example, the evaluation value is computed based on the value (AIC) expressed by the following equation (3).

[Equation 3]

$$\text{AIC}=\text{number of teachers}\times\{\log 2n+1+(\log \text{mean square error})\}+2(K+1) \tag{3}$$

According to the above-described equation (3), the accuracy of the calculation formula is higher as the AIC is smaller. Accordingly, the evaluation value for a case of using the AIC is set to become larger as the AIC is smaller. For example, the evaluation value is computed by the inverse number of the AIC expressed by the above-described equation (3). Moreover, the evaluation values are computed by the calculation formula evaluation unit 40 for the number of the types of the feature quantities. Thus, the calculation formula evaluation unit 40 performs averaging operation for the number of the types of the feature quantities for each calculation formula and computes the average evaluation value. That is, the average evaluation value of each calculation formula is computed at this stage. The average evaluation value computed by the calculation formula evaluation unit 40 is input to the extraction formula list generation unit 20 as the evaluation result of the calculation formula.

On the other hand, the extraction formula evaluation unit 42 computes, as an evaluation value, a contribution rate of each extraction formula in each calculation formula based on the extraction formula calculation result and the coupling coefficients. For example, the extraction formula evaluation unit 42 computes the contribution rate according to the following equation (4). The standard deviation for the extraction formula calculation result of the extraction formula $f_K$ is obtained from the extraction formula calculation result computed for each evaluation data. The contribution rate of each extraction formula computed for each calculation formula by the extraction formula evaluation unit 42 according to the following equation (4) is input to the extraction formula list generation unit 20 as the evaluation result of the extraction formula.

[Equation 4]

$$\text{Contribution rate of } f_k = \frac{B_k \times StDev(FQ \text{ of estimation target})}{StDev(\text{calculation result of } f_k) \times \text{Pearson}(\text{calculation result of } f_k, \text{ estimation target } FQ)} \tag{4}$$

Here, StDev( . . . ) indicates the standard deviation. Furthermore, the feature quantity of an estimation target is the tempo or the like of a music piece. For example, in a case where log spectra of 100 music pieces are given as the evaluation data and the tempo of each music piece is given as the teacher data, StDev (feature quantity of estimation target) indicates the standard deviation of the tempos of the 100 music pieces. Furthermore, Pearson( . . . ) included in the above-described equation (4) indicates a correlation function. For example, Pearson (calculation result of $f_K$, estimation target FQ) indicates a correlation function for computing the correlation coefficient between the calculation result of $f_K$ and the estimation target feature quantity. Moreover, although the tempo of a music piece is indicated as an example of the feature quantity, the estimation target feature quantity is not limited to such.

When the evaluation results are input from the formula evaluation unit 38 to the extraction formula list generation unit 20 in this manner, an extraction formula list to be used for the formulation of a new calculation formula is generated. First, the extraction formula list generation unit 20 selects a specific number of calculation formulae in descending order of the average evaluation values computed by the calculation formula evaluation unit 40, and sets the extraction formula lists corresponding to the selected calculation formulae as new extraction formula lists (selection). Furthermore, the extraction formula list generation unit 20 selects two calculation formulae by weighting in the descending order of the average evaluation values computed by the calculation formula evaluation unit 40, and generates a new extraction formula list by combining the extraction formulae in the extraction formula lists corresponding to the calculation formulae (crossing-over). Furthermore, the extraction formula list generation unit 20 selects one calculation formula by weighting in the descending order of the average evaluation values computed by the calculation formula evaluation unit 40, and generates a new extraction formula list by partly changing the extraction formulae in the extraction formula list corresponding to the calculation formula (mutation). Furthermore, the extraction formula list generation unit 20 generates a new extraction formula list by randomly selecting extraction formulae.

In the above-described crossing-over, the lower the contribution rate of an extraction formula, the better it is that the extraction formula is set unlikely to be selected. Also, in the above-described mutation, a setting is preferable where an extraction formula is apt to be changed as the contribution rate of the extraction formula is lower. The processing by the extraction formula selection unit 22, the calculation formula setting unit 24, the calculation formula generation unit 26 and the formula evaluation unit 38 is again performed by using the extraction formula lists newly generated or newly set in this manner. The series of processes is repeatedly performed until the degree of improvement in the evaluation result of the formula evaluation unit 38 converges to a certain degree. Then, when the degree of improvement in the evaluation result of the formula evaluation unit 38 converges to a certain degree, the calculation formula at the time is output as the computation result. By using the calculation formula that is output, the feature quantity representing a target feature of input data is computed with high accuracy from arbitrary input data different from the above-described evaluation data.

As described above, the processing by the feature quantity calculation formula generation apparatus 10 is based on a genetic algorithm for repeatedly performing the processing while proceeding from one generation to the next by taking into consideration elements such as the crossing-over or the mutation. A computation formula capable of estimating the feature quantity with high accuracy can be obtained by using the genetic algorithm. However, in the embodiment described later, a learning algorithm for computing the calculation formula by a method simpler than that of the genetic algorithm can also be used. For example, instead of performing the processing such as the selection, crossing-over and mutation described above by the extraction formula list generation unit 20, a method can be conceived for selecting a combination for which the evaluation value by the calculation formula evaluation unit 40 is the highest by changing the extraction formula to be used by the extraction formula selection unit 22. In this case, the configuration of the extraction formula evaluation unit 42 can be omitted. Furthermore, the configuration can be changed as appropriate according to the operational load and the desired estimation accuracy.

<2. Embodiment>

Hereunder, an embodiment of the present invention will be described. The present embodiment relates to a technology for automatically extracting, from an audio signal of a music piece, a feature quantity of the music piece with high accuracy, and for visualizing the music piece by using the feature quantity. Moreover, in the following, the audio signal of a music piece may be referred to as music data.

(2-1. Overall Configuration of Information Processing Apparatus 100)

Figure 2:
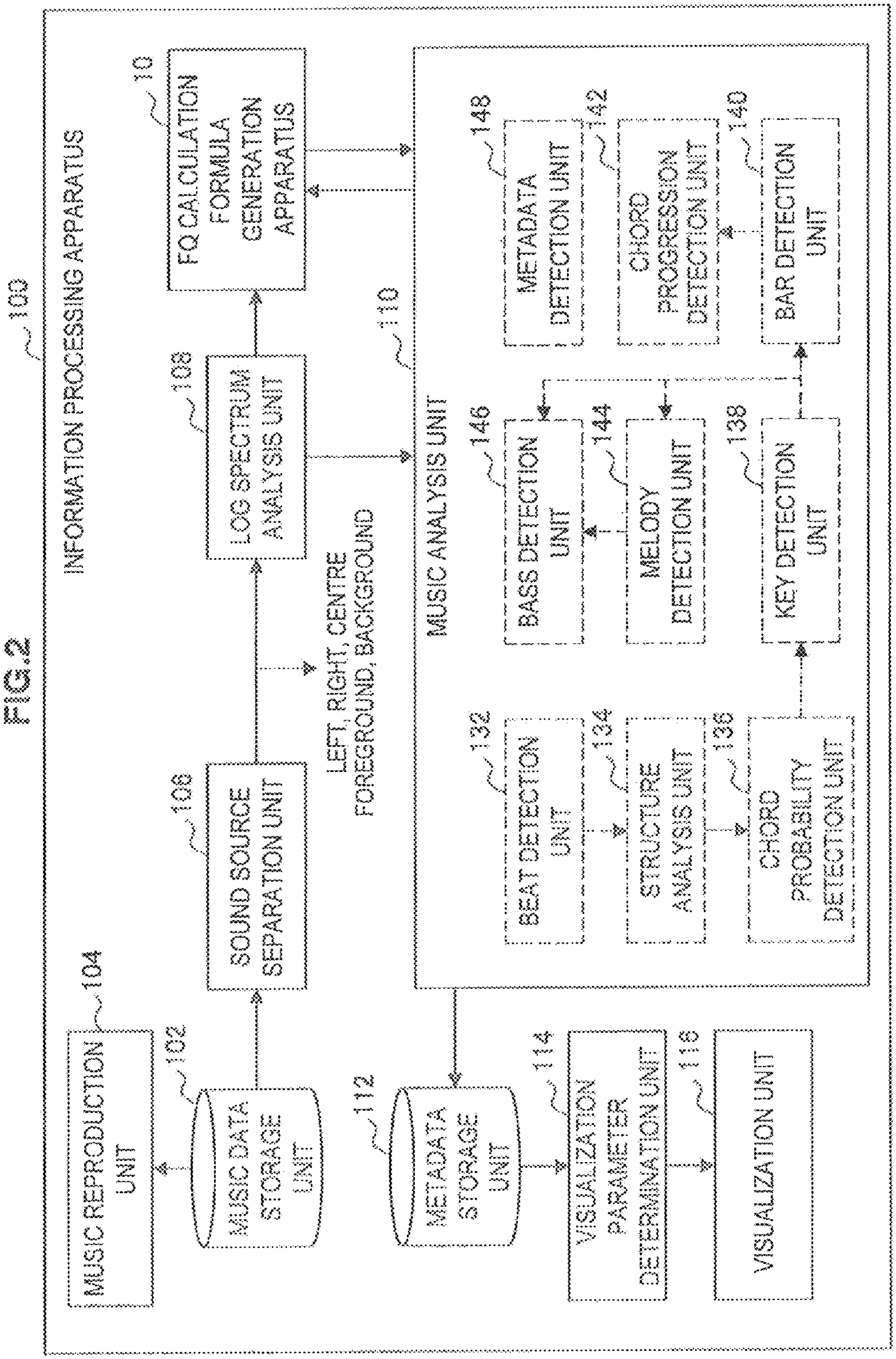
FIG. 2 is an explanatory diagram showing a functional configuration example of an information processing apparatus according to an embodiment of the present invention.

First, referring to FIG. 2, the functional configuration of an information processing apparatus 100 according to the present embodiment will be described. FIG. 2 is an explanatory diagram showing a functional configuration example of the information processing apparatus 100 according to the present embodiment. Moreover, the information processing apparatus 100 described here has its feature in a configuration of accurately detecting various types of feature quantities included in music data and realistically visualizing the music data by using the feature quantities. For example, beats of a music piece, a chord progression, presence probability of each instrument sound, or the like will be included in the feature quantity. In the following, after describing the overall configuration of the information processing apparatus 100, a detailed configuration of each structural element will be individually described.

As shown in FIG. 2, the information processing apparatus 100 mainly includes a music data storage unit 102, a music reproduction unit 104, a sound source separation unit 106, a log spectrum analysis unit 108, a music analysis unit 110, a metadata storage unit 112, a visualization parameter determination unit 114, and a visualization unit 116. Furthermore, the music analysis unit 110 includes a beat detection unit 132, a structure analysis unit 134, a chord probability detection unit 136, a key detection unit 138, a bar detection unit 140, and a chord progression detection unit 142. Furthermore, the music analysis unit 110 includes a melody detection unit 144, a bass detection unit 146 and a metadata detection unit 148.

Furthermore, a feature quantity calculation formula generation apparatus 10 is included in the information processing apparatus 100 illustrated in FIG. 2. However, the feature quantity calculation formula generation apparatus 10 may be provided within the information processing apparatus 100 or may be connected to the information processing apparatus 100 as an external device. In the following, for the sake of convenience, the feature quantity calculation formula generation apparatus 10 is assumed to be built in the information processing apparatus 100. Furthermore, instead of being provided with the feature quantity calculation formula generation apparatus 10, the information processing apparatus 100 can also use various learning algorithms capable of generating a calculation formula for feature quantity.

Overall flow of the processing is as described next. First, music data stored in the music data storage unit 102 is reproduced by the music reproduction unit 104. Furthermore, the music data stored in the music data storage unit 102 is input to the sound source separation unit 106. The music data is separated into a left-channel component (foreground component), a right-channel component (foreground component), a centre component (foreground component) and a background component by the sound source separation unit 106. The music data separated into each component is input to the log spectrum analysis unit 108. Each component of the music data is converted to a log spectrum described later by the log spectrum analysis unit 108. The log spectrum output from the log spectrum analysis unit 108 is input to the feature quantity calculation formula generation apparatus 10 or the like. Moreover, the log spectrum may be used by structural elements other than the feature quantity calculation formula generation apparatus 10. In that case, a desired log spectrum is provided as appropriate to each structural element directly or indirectly from the log spectrum analysis unit 108.

The music analysis unit 110 analyses a waveform of the music data, and extracts beat positions, music structure, key, chord progression, melody line, bass line, presence probability of each instrument sound or the like of the music data. Moreover, the beat positions are detected by the beat detection unit 132. The music structure is detected by the structure analysis unit 134. The key is detected by the key detection unit 138. The chord progression is detected by the chord progression detection unit 142. The melody line is detected by the melody detection unit 144. The bass line is detected by the bass detection unit 146. The presence probability of each instrument sound is extracted by the metadata detection unit 148. At this time, the music analysis unit 110 generates, by using the feature quantity calculation formula generation apparatus 10, a calculation formula for feature quantity for detecting the beat positions, the chord progression, the instrument sound or the like, and detects the beat positions, the chord progression, the instrument sound or the like from the feature quantity computed by using the calculation formula. The analysis processing by the music analysis unit 110 will be described later in detail.

Data such as the beat positions, the music structure, the key, the chord progression, the melody line, the bass line, the presence probability of each instrument sound or the like (hereinafter, metadata) is stored in the metadata storage unit 112. The metadata stored in the metadata storage unit 112 is read out by the visualization parameter determination unit 114. The visualization parameter determination unit 114 determines a parameter (hereinafter, a visualization parameter) for controlling the movement of an object resembling a player of each instrument (hereinafter, a player object) or the like based on the metadata stored in the metadata storage unit 112. Then, the visualization parameter determined by the visualization parameter determination unit 114 is input to the visualization unit 116. The visualization unit 116 controls the player object or the like based on the visualization parameter and visualizes the music data. With this configuration, visualization is possible which makes it look as though the player object is playing along the music data being reproduced. The flow of visualization of music data is roughly described as above. In the following, the configurations of the sound source separation unit 106, the log spectrum analysis unit 108 and the music analysis unit 110, which are the main structural elements of the information processing apparatus 100, will be described in detail.

(2-2. Configuration of Sound Source Separation Unit 106)

Figure 3:
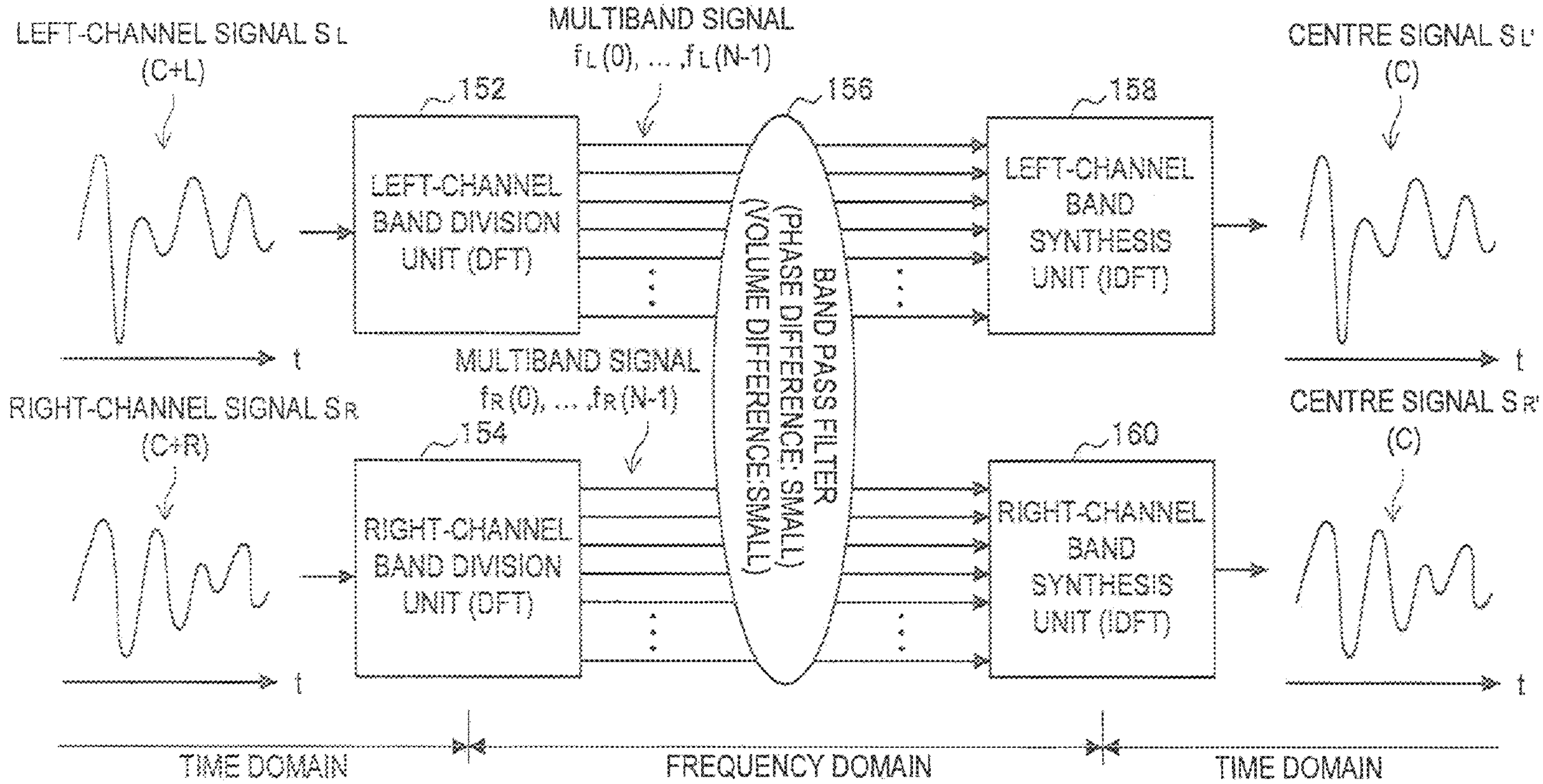
FIG. 3 is an explanatory diagram showing an example of a sound source separation method (centre extraction method) according to the present embodiment.

First, the sound source separation unit 106 will be described. The sound source separation unit 106 is means for separating sound source signals localized at the left, right and centre (hereunder, a left-channel signal, a right-channel signal, a centre signal), and a sound source signal for background sound. Here, referring to an extraction method of the sound source separation unit 106 for a centre signal, a sound source separation method of the sound source separation unit 106 will be described in detail. As shown in FIG. 3, the sound source separation unit 106 is configured, for example, from a left-channel band division unit 152, a right-channel band division unit 154, a band pass filter 156, a left-channel band synthesis unit 158 and a right-channel band synthesis unit 160. The conditions for passing the band pass filter 156 illustrated in FIG. 3 (phase difference: small, volume difference: small) are used in a case of extracting the centre signal. Here, a method for extracting the centre signal is described as an example.

First, a left-channel signal $s_L$ of the stereo signal input to the sound source separation unit 106 is input to the left-channel band division unit 152. A non-centre signal L and a centre signal C of the left channel are present in a mixed manner in the left-channel signal $s_L$. Furthermore, the left-channel signal $s_L$ is a volume level signal changing over time. Thus, the left-channel band division unit 152 performs a DFT processing on the left-channel signal $s_L$ that is input and converts the same from a signal in a time domain to a signal in a frequency domain (hereinafter, a multi-band signal $f_L(0), \ldots, f_L(N-1)$). Here, $f_L(K)$ is a sub-band signal corresponding to the k-th (k=0, . . . , N−1) frequency band. Moreover, the above-described DFT is an abbreviation for Discrete Fourier Transform. The left-channel multi-band signal output from the left-channel band division unit 152 is input to the hand pass filter 156.

In a similar manner, a right-channel signal $s_R$ of the stereo signal input to the sound source separation unit 106 is input to the right-channel band division unit 154. A non-centre signal R and a centre signal C of the right channel are present in a mixed manner in the right-channel signal $s_R$. Furthermore, the right-channel signal $s_R$ is a volume level signal changing over time. Thus, the right-channel band division unit 154 performs the DFT processing on the right-channel signal $s_R$ that is input and converts the same from a signal in a time domain to a signal in a frequency domain (hereinafter, a multi-band signal $f_R(0), \ldots, f_R(N-1)$). Here, $f_R(k')$ is a sub-band signal corresponding to the k'-th (k'=0, . . . , N−1) frequency band. The right-channel multi-band signal output from the right-channel band division unit 154 is input to the band pass filter 156. Moreover, the number of bands into which the multi-band signals of each channel are divided is N (for example, N=8192).

As described above, the multi-band signals $f_L(k)$ (k=0, . . . , N−1) and $f_R(k')$ (k'=0, . . . , N−1) of respective channels are input to the band pass filter 156. In the following, frequency is labeled in the ascending order such as k=0, . . . , N−1, or k'=0, . . . , N−1. Furthermore, each of the signal components $f_L(k)$ and $f_R(k')$ are referred to as a sub-channel signal. First, in the band pass filter 156, the sub-channel signals $f_L(k)$ and $f_R(k')$ (k'=k) in the same frequency band are selected from the multi-band signals of both channels, and a similarity a(k) between the sub-channel signals is computed. The similarity a(k) is computed according to the following equations (5) and (6), for example. Here, an amplitude component and a phase component are included in the sub-channel signal. Thus, the similarity for the amplitude component is expressed as ap(k), and the similarity for the phase component is expressed as ai(k).

[Equation 5]

$$ai(k) = \cos\theta = \frac{\mathrm{Re}[f_R(k) f_L(k)^*]}{|f_R(k)||f_L(k)|} \tag{5}$$

$$ap(k) = \begin{cases} \dfrac{|f_R(k)|}{|f_L(k)|}, & |f_R(k)| \le |f_L(k)| \\ \dfrac{|f_L(k)|}{|f_R(k)|}, & |f_R(k)| > |f_L(k)| \end{cases} \tag{6}$$

Here, | . . . | indicates the norm of " . . . ". θ indicates the phase difference (0≤|θ|≤π) between $f_L(k)$ and $f_R(k)$. The superscript * indicates a complex conjugate. Re[ . . . ] indicates the real part of " . . . ". As is clear from the above-described equation (6), the similarity ap(k) for the amplitude component is 1 in case the norms of the sub-channel signals $f_L(k)$ and $f_R(k)$ agree. On the contrary, in case the norms of the sub-channel signals $f_L(k)$ and $f_R(k)$ do not agree, the similarity ap(k) takes a value less than 1. On the other hand, regarding the similarity ai(k) for the phase component, when the phase difference θ is 0, the similarity ai(k) is 1; when the phase difference θ is π/2, the similarity ai(k) is 0; and when the phase difference θ is π, the similarity ai(k) is −1. That is, the similarity ai(k) for the phase component is 1 in case the phases of the sub-channel signals $f_L(k)$ and $f_R(k)$ agree, and takes a value less than 1 in case the phases of the sub-channel signals $f_L(k)$ and $f_R(k)$ do not agree.

When a similarity a(k) for each frequency band k (k=0, . . . , N−1) is computed by the above-described method, a frequency band q corresponding to the similarities ap(q) and ai(q) (o≤q≤N−1) less than a specific threshold value is extracted by the band pass filter 156. Then, only the sub-channel signal in the frequency band q extracted by the band pass filter 156 is input to the left-channel band synthesis unit 158 or the right-channel hand synthesis unit 160. For example, the sub-channel signal $f_L(q)$ ($q=q_0, \ldots, q_{n-1}$) is input to the left-channel band synthesis unit 158. Thus, the left-channel band synthesis unit 158 performs an IDFT processing on the sub-channel signal $f_L(q)$ ($q=q_0, \ldots, q_{n-1}$) input from the band pass filter 156, and converts the same from the frequency domain to the time domain. Moreover, the above-described IDFT is an abbreviation for Inverse Discrete Fourier Transform.

In a similar manner, the sub-channel signal $f_R(q)$ ($q=q_0, \ldots, q_{n-1}$) is input to the right-channel band synthesis unit 160. Thus, the right-channel band synthesis unit 160 performs the IDFT processing on the sub-channel signal $f_R(q)$ ($q=q_0, \ldots, q_{n-1}$) input from the band pass filter 156, and converts the same from the frequency domain to the time domain. A centre signal component $s_{L'}$ included in the left-channel signal $s_L$ is output from the left-channel band synthesis unit 158. On the other hand, a centre signal component $s_{R'}$ included in the right-channel signal $s_R$ is output from the right-channel band synthesis unit 160. The sound source separation unit 106 can extract the centre signal from the stereo signal by the above-described method.

Furthermore, the left-channel signal, the right-channel signal and the signal for background sound can be separated in the same manner as for the centre signal by changing the conditions for passing the band pass filter 156 as shown in FIG. 4. As shown in FIG. 4, in case of extracting the left-channel signal, a band according to which the phase difference between the left and the right is small and the left volume is higher than the right volume is set as the passband of the band pass filter 156. The volume here corresponds to the amplitude component described above. Similarly, in case of extracting the right-channel signal, a band in which the phase difference between the left and the right is small and the right volume is higher than the left volume is set as the passband of the band pass filter 156.

The left-channel signal, the right-channel signal and the centre signal are foreground signals. Thus, either of the signals is in a band according to which the phase difference between the left and the right is small. On the other hand, the signal for background sound is a signal in a band according to which the phase difference between the left and the right is large. Thus, in case of extracting the signal for background sound, the passband of the band pass filter 156 is set to a band according to which the phase difference between the left and the right is large. The left-channel signal, the right-channel signal, the centre signal and the signal for background sound separated by the sound source separation unit 106 in this manner are input to the log spectrum analysis unit 108.

(2-3. Configuration of Log Spectrum Analysis Unit 108)

Next, the log spectrum analysis unit 108 will be described. The log spectrum analysis unit 108 is means for converting the input audio signal to an intensity distribution of each pitch. Twelve pitches (C, C#, D, D#, E, F, F#, G, G#, A, A#, B) are included in the audio signal per octave. Furthermore, a centre frequency of each pitch is logarithmically distributed. For example, when taking a centre frequency $f_{A3}$ of a pitch A3 as the standard, a centre frequency of A#3 is expressed as $f_{A\#3}=f_{A3}*2^{1/12}$. Similarly, a centre frequency $f_{B3}$ of a pitch B3 is expressed as $f_{B3}=f_{A\#3}*2^{1/12}$. In this manner, the ratio of the centre frequencies of the adjacent pitches is $1:2^{1/12}$. However, when handling an audio signal, taking the audio signal as a signal intensity distribution in a time-frequency space will cause the frequency axis to be a logarithmic axis, thereby complicating the processing on the audio signal. Thus, the log spectrum analysis unit 108 analyses the audio signal, and converts the same from a signal in the time-frequency space to a signal in a time-pitch space (hereinafter, a log spectrum).

Figure 5:
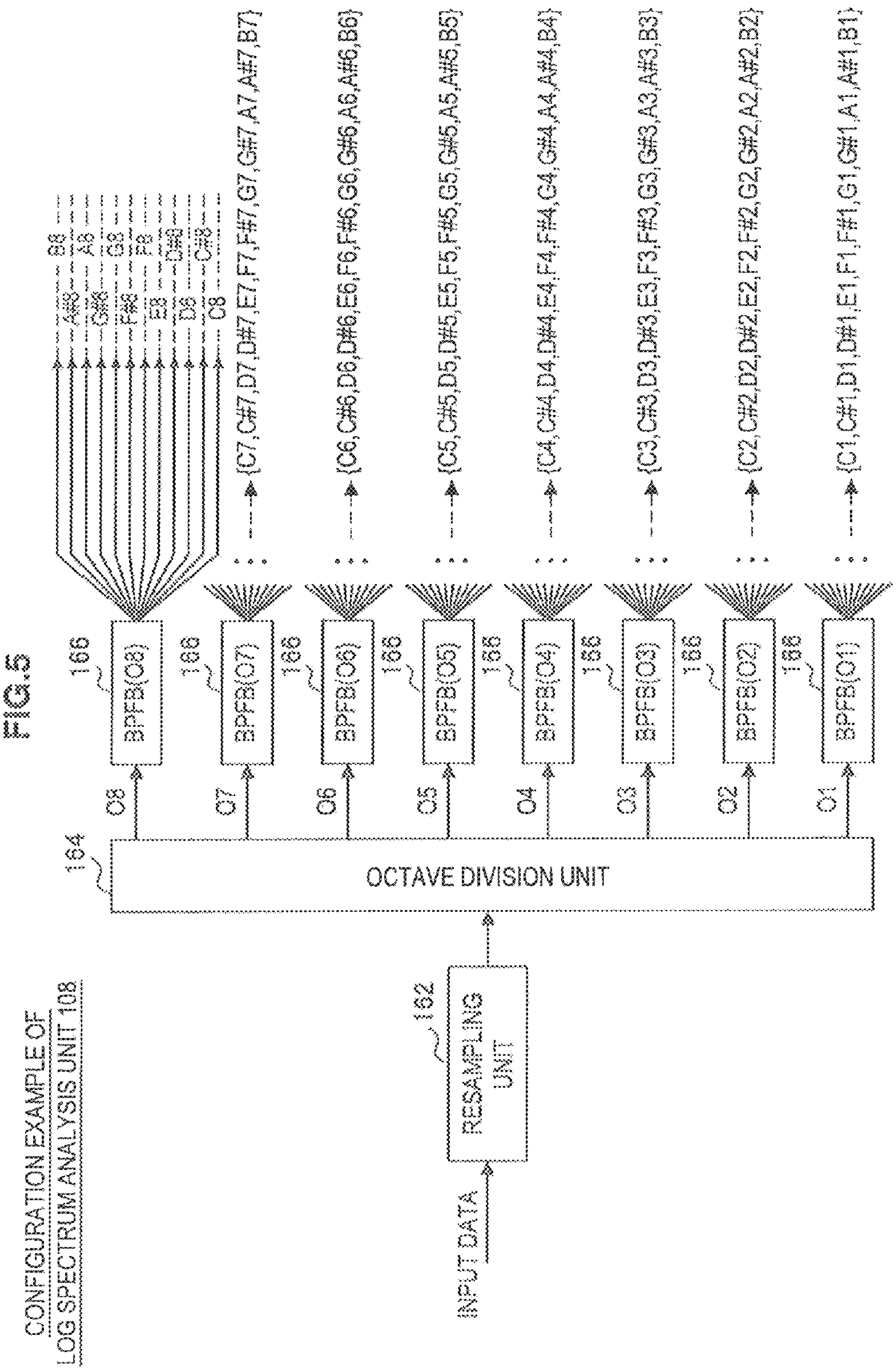
FIG. 5 is an explanatory diagram showing an example of a log spectrum generation method according to the present embodiment.

Referring to FIG. 5, the configuration of the log spectrum analysis unit 108 will be described in detail. As shown in FIG. 5, the log spectrum analysis unit 108 can be configured from a resampling unit 162, an octave division unit 164, and a plurality of band pass filter banks (BPFB) 166.

First, the audio signal is input to the resampling unit 162. Then, the resampling unit 162 converts a sampling frequency (for example, 44.1 kHz) of the input audio signal to a specific sampling frequency. A frequency obtained by taking a frequency at the boundary between octaves (hereinafter, a boundary frequency) as the standard and multiplying the boundary frequency by a power of two is taken as the specific sampling frequency. For example, the sampling frequency of the audio signal takes a boundary frequency 1016.7 Hz between an octave 4 and an octave 5 as the standard and is converted to a sampling frequency $2^5$ times the standard (32534.7 Hz). By converting the sampling frequency in this manner, the highest and lowest frequencies obtained as a result of a band division processing and a down sampling processing that are subsequently performed by the resampling unit 162 will agree with the highest and lowest frequencies of a certain octave. As a result, a process for extracting a signal for each pitch from the audio signal can be simplified.

The audio signal for which the sampling frequency is converted by the resampling unit 162 is input to the octave division unit 164. Then, the octave division unit 164 divides the input audio signal into signals for respective octaves by repeatedly performing the band division processing and the down sampling processing. Each of the signals obtained by the division by the octave division unit 164 is input to a band pass filter bank 166 (BPFB (O1), . . . , BPFB (O8)) provided for each of the octaves (O1, . . . , O8). Each band pass filter bank 166 is configured from 12 band pass filters each having a passband for one of 12 pitches so as to extract a signal for each pitch from the input audio signal for each octave. For example, by passing through the band pass filter bank 166 (BPFB (O8)) of octave 8, signals for 12 pitches (C8, C#8, D8, D#8, E8, F8, F#8, G8, G#8, A8, A#8, B) are extracted from the audio signal for the octave 8.

A log spectrum showing signal intensities (hereinafter, energies) of 12 pitches in each octave can be obtained by the signals output from each band pass filter bank 166. FIG. 6 is an explanatory diagram showing an example of the log spectrum output from the log spectrum analysis unit 108.

Referring to the vertical axis (pitch) of FIG. 6, the input audio signal is divided into 7 octaves, and each octave is further divided into 12 pitches: "C," "C#," "D," "D#," "E," "F," "F#," "G," "G#," "A," "A#," and "B." On the other hand, the horizontal axis (time) of FIG. 6 shows frame numbers at times of sampling the audio signal along the time axis. For example, when the audio signal is resampled at a sampling frequency 127.0888 (Hz) by the resampling unit 162, 1 frame will be a time period corresponding to 1 (sec)/127.0888=7.8686 (msec). Furthermore, the intensity of colours of the log spectrum shown in FIG. 6 indicates the intensity of the energy of each pitch at each frame. For example, a position S1 is shown with a dark colour, and thus it can be understood that note at the pitch (pitch F) corresponding to the position S1 is produced strongly at the time corresponding to the position S1. Moreover, FIG. 6 is an example of the log spectrum obtained when a certain audio signal is taken as the input signal. Accordingly, if the input signal is different, a different log spectrum is obtained. The log spectrum obtained in this manner is input to the feature quantity calculation formula generation apparatus 10 or the like, and is used for music analysis processing performed by the music analysis unit 110.

(2-4. Configuration of Music Analysis Unit 110)

Next, the configuration of the music analysis unit 110 will be described. The music analysis unit 110 is means for analyzing music data by using a learning algorithm and for extracting a feature quantity included in the music data. Particularly, the music analysis unit 110 extracts the beat positions, the music structure, the key, the chord progression, the melody line, the bass line, the presence probability of each instrument sound, or the like of the music data. Accordingly, as shown in FIG. 2, the music analysis unit 110 includes the beat detection unit 132, the structure analysis unit 134, the chord probability detection unit 136, the key detection unit 138, the bar detection unit 140, the chord progression detection unit 142, the melody detection unit 144, the bass detection unit 146, and the metadata detection unit 148.

Figure 7:
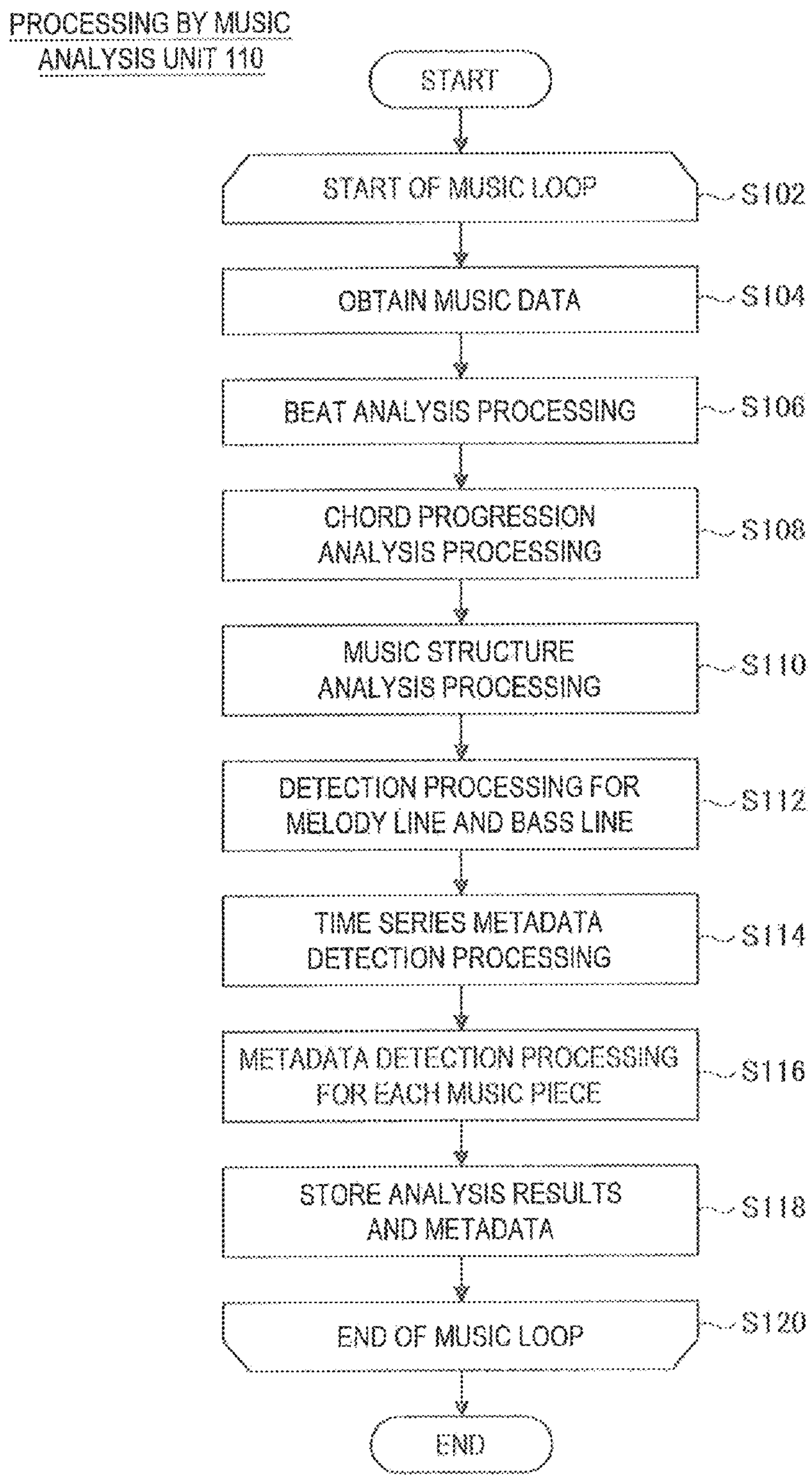
FIG. 7 is an explanatory diagram showing a flow of a series of processes according to a music analysis method according to the present embodiment.

The main flow of processes by the music analysis unit 110 is as shown in FIG. 7. However, it should be noted that the flow chart of FIG. 7 includes processing performed by other structural elements of the information processing apparatus 100. As shown in FIG. 7, the information processing apparatus 100 performs the processing within a music loop (S102 to S120) while sequentially reading out music data stored in the music data storage unit 102. First, when the music loop is started (S102), a log spectrum of the music data stored in the music data storage unit 102 is acquired by the music analysis unit 110 (S104). Next, the music analysis unit 110 performs beat analysis processing by the beat detection unit 132 and detects beats in the music data (S106). Then, the music analysis unit 110 performs chord progression analysis processing by the chord progression detection unit 142 and detects chord progression of the music data (S108).

Then, the music analysis unit 110 analyses music structure by the structure analysis unit 134 and detects the music structure from the music data (S110). Next, the music analysis unit 110 detects a melody line and a bass line from the music data by the melody detection unit 144 and the bass detection unit 146 (S112). Next, the music analysis unit 110 detects time-series metadata by the metadata detection unit 148 (S114). The time-series metadata here means a feature quantity of music data which changes as the reproduction of the music proceeds. Then, the music analysis unit 110 detects by the metadata detection unit 148 metadata which is to be detected for each music piece (hereinafter, metadata per music piece). Moreover, the metadata per music piece is metadata obtained by analysis processing where all the frames of music data are made to be the analysis range.

Next, the music analysis unit 110 stores in the metadata storage unit 112 the analysis results and the metadata obtained in steps S106 to S116 (S118). When the processing of steps S104 to S118 is over (S120), the music loop is performed for other music data, and a series of processes is completed when the processing within the music loop is over for all the music data that are the subjects of the processing. Moreover, the processing within the music loop is performed for each of the combinations of the sound sources separated by the sound source separation unit 106. All the four sound sources (left-channel sound, right-channel sound, centre sound and background sound) are used as the sound sources to be combined. The combination may be, for example, (1) all the four sound sources, (2) only the foreground sounds (left-channel sound, right-channel sound and centre sound), (3) left-channel sound right-channel sound+background sound, or (4) centre sound+background sound. Furthermore, other combination may be, for example, (5) left-channel sound+right-channel sound, (6) only the background sound, (6) only the left-channel sound, (8) only the right-channel sound, or (9) only the centre sound.

Heretofore, the main flow of the processing by the music analysis unit 110 has been described. Next, the function of each structural element included in the music analysis unit 110 will be described in detail.

(2-4-1. Configuration of Beat Detection Unit 132)

Figure 8:
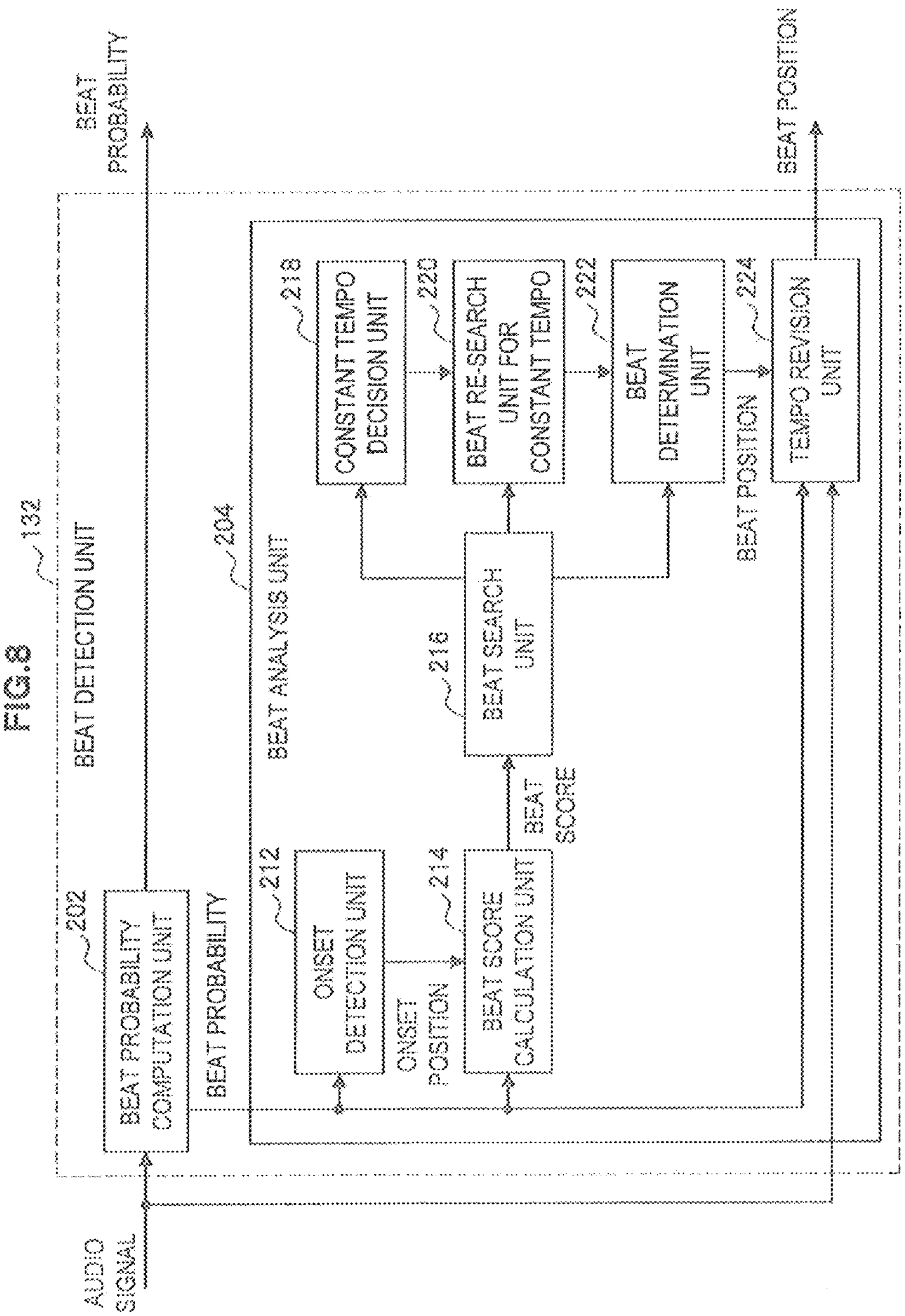
FIG. 8 is an explanatory diagram showing a configuration example of a beat detection unit according to the present embodiment.

First, the configuration of the beat detection unit 132 will be described. As shown in FIG. 8, the beat detection unit 132 is configured from a beat probability computation unit 202 and a beat analysis unit 204. The beat probability computation unit 202 is means for computing the probability of each frame being a beat position, based on the log spectrum of music data. Also, the beat analysis unit 204 is means for detecting the beat positions based on the beat probability of each frame computed by the beat probability computation unit 202. In the following, the functions of these structural elements will be described in detail.

Figure 9:
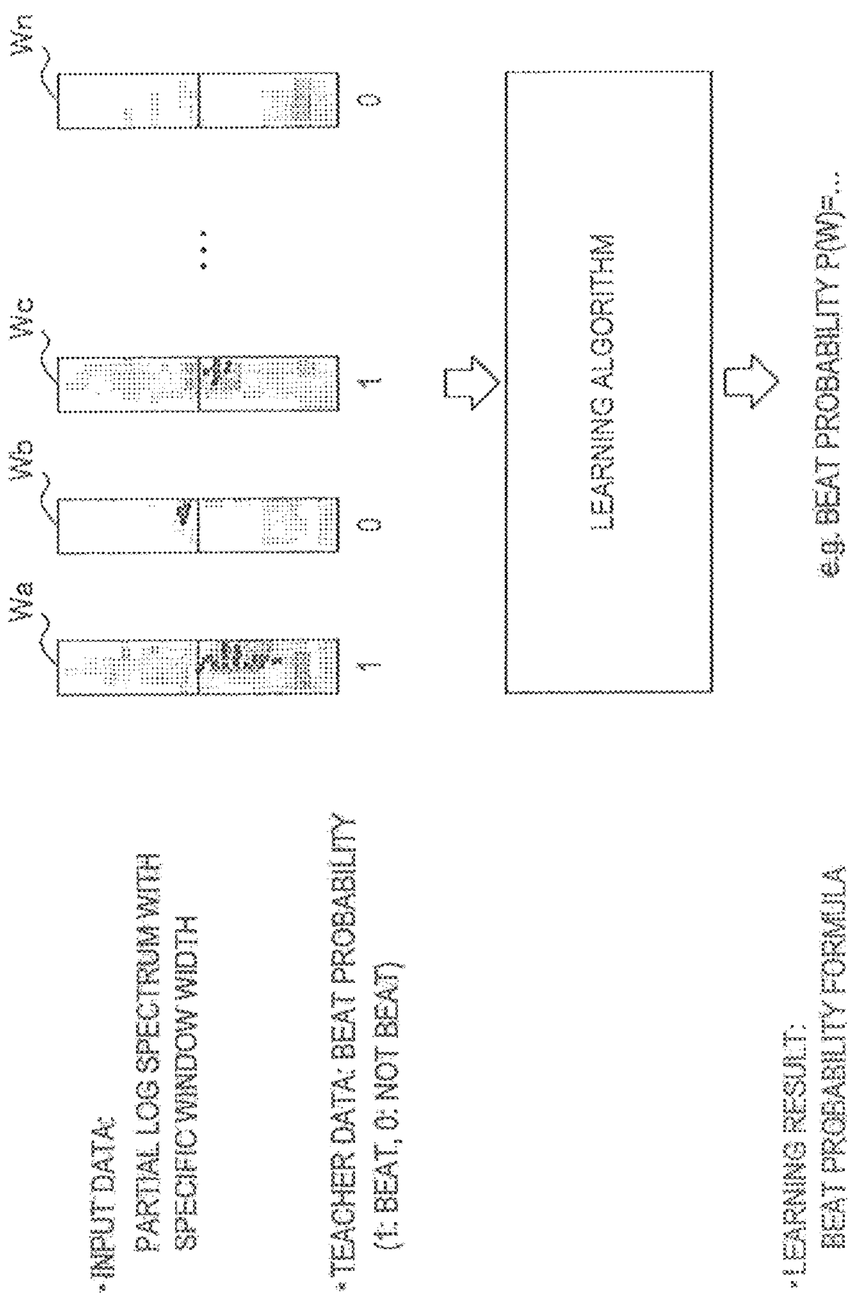
FIG. 9 is an explanatory diagram showing an example of a beat detection method according to the present embodiment.

First, the beat probability computation unit 202 will be described. The beat probability computation unit 202 computes, for each of specific time units (for example, 1 frame) of the log spectrum input from the log spectrum analysis unit 108, the probability of a beat being included in the time unit (hereinafter referred to as "beat probability"). Moreover, when the specific time unit is 1 frame, the beat probability may be considered to be the probability of each frame coinciding with a beat position (position of a beat on the time axis). A formula to be used by the beat probability computation unit 202 to compute the beat probability is generated by using the learning algorithm by the feature quantity calculation formula generation apparatus 10. Also, data such as those shown in FIG. 9 are given to the feature quantity calculation formula generation apparatus 10 as the teacher data and evaluation data for learning. In FIG. 9, the time unit used for the computation of the beat probability is 1 frame.

As shown in FIG. 9, fragments of log spectra (hereinafter referred to as "partial log spectrum") which has been converted from an audio signal of a music piece whose beat positions are known and beat probability for each of the partial log spectra are supplied to the feature quantity calculation formula generation apparatus 10. That is, the partial log spectrum is supplied to the feature quantity calculation formula generation apparatus 10 as the evaluation data, and the beat probability as the teacher data. Here, the window width of the partial log spectrum is determined taking into consideration the trade-off between the accuracy of the computation of the beat probability and the processing cost. For example, the window width of the partial log spectrum may include 7 frames preceding and following the frame for which the beat probability is to be calculated (i.e. 15 frames in total).

Furthermore, the beat probability supplied as the teacher data indicates, for example, whether a heat is included in the centre frame of each partial log spectrum, based on the known beat positions and by using a true value (1) or a false value (0). The positions of bars are not taken into consideration here, and when the centre frame corresponds to the beat position, the beat probability is 1; and when the centre frame does not correspond to the beat position, the beat probability is 0. In the example shown in FIG. 9, the beat probabilities of partial log spectra Wa, Wb, Wc, . . . , Wn are given respectively as 1, 0, 1, . . . , 0. A beat probability formula (P(W)) for computing the beat probability from the partial log spectrum is generated by the feature quantity calculation formula generation apparatus 10 based on a plurality of sets of evaluation data and teacher data. When the beat probability formula P(W) is generated in this manner, the beat probability computation unit 202 cuts out from a log spectrum of analysis target music (hereinafter, treated music) a partial log spectrum for each frame, and sequentially computes the beat probabilities by applying the beat probability formula P(W) to respective partial log spectra.

Figure 10:
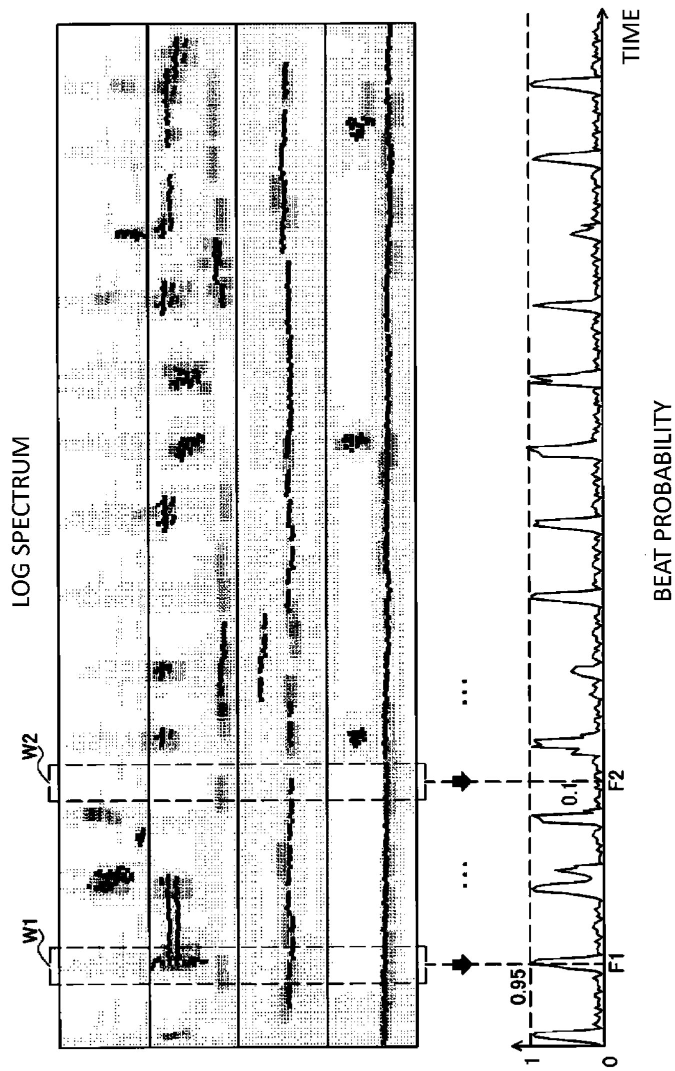
FIG. 10 is an explanatory diagram showing an example of the beat detection method according to the present embodiment.

FIG. 10 is an explanatory diagram showing an example of the beat probability computed by the beat probability computation unit 202. An example of the log spectrum to be input to the beat probability computation unit 202 from the log spectrum analysis unit 108 is shown in FIG. 10(A). On the other hand, in FIG. 10(B), the beat probability computed by the beat probability computation unit 202 based on the log spectrum (A) is shown with a polygonal line on the time axis. For example, referring to a frame position F1, it can be seen that a partial log spectrum W1 corresponds to the frame position F1. That is, beat probability P(W1)=0.95 of the frame F1 is computed from the partial log spectrum W1. Similarly, beat probability P(W2) of a frame position F2 is calculated to be 0.1 based on a partial log spectrum W2 cut out from the log spectrum. The beat probability P(W1) of the frame position F1 is high and the beat probability P(W2) of the frame position F2 is low, and thus it can be said that the possibility of the frame position F1 corresponding to a beat position is high, and the possibility of the frame position F2 corresponding to a beat position is low.

Moreover, the beat probability formula used by the beat probability computation unit 202 may be generated by another learning algorithm. However, it should be noted that, generally, the log spectrum includes a variety of parameters, such as a spectrum of drums, an occurrence of a spectrum due to utterance, and a change in a spectrum due to change of chord. In case of a spectrum of drums, it is highly probable that the time point of beating the drum is the beat position. On the other hand, in case of a spectrum of voice, it is highly probable that the beginning time point of utterance is the beat position. To compute the beat probability with high accuracy by collectively using the variety of parameters, it is suitable to use the feature quantity calculation formula generation apparatus 10 or the learning algorithm disclosed in JP-A-2008-123011. The beat probability computed by the beat probability computation unit 202 in the above-described manner is input to the beat analysis unit 204.

The beat analysis unit 204 determines the heat position based on the beat probability of each frame input from the beat probability computation unit 202. As shown in FIG. 8, the beat analysis unit 204 includes an onset detection unit 212, a beat score calculation unit 214, a beat search unit 216, a constant tempo decision unit 218, a beat re-search unit 220 for constant tempo, a beat determination unit 222, and a tempo revision unit 224. The beat probability of each frame is input from the beat probability computation unit 202 to the onset detection unit 212, the beat score calculation unit 214 and the tempo revision unit 224.

Figure 11:
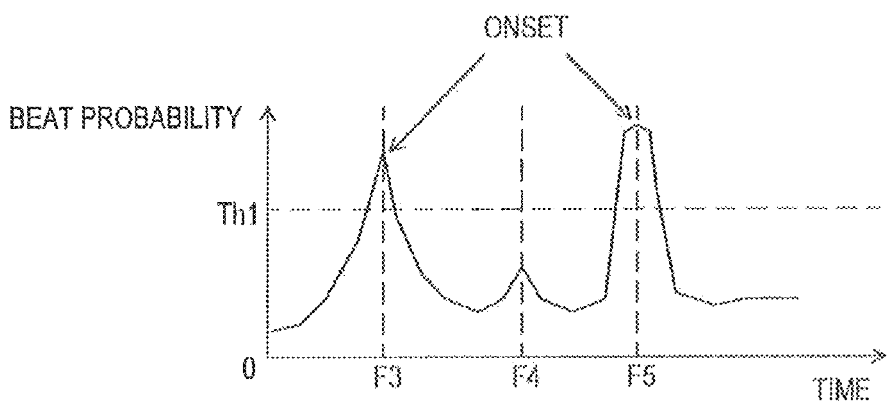
FIG. 11 is an explanatory diagram showing an example of the beat detection method according to the present embodiment.

The onset detection unit 212 detects onsets included in the audio signal based on the heat probability input from the beat probability computation unit 202. The onset here means a time point in an audio signal at which a sound is produced. More specifically, a point at which the beat probability is above a specific threshold value and takes a maximal value is referred to as the onset. For example, in FIG. 11, an example of the onsets detected based on the beat probability computed for an audio signal is shown. In FIG. 11, as with FIG. 10(B), the beat probability computed by the beat probability computation unit 202 is shown with a polygonal line on the time axis. In case of the graph for the heat probability illustrated in FIG. 11, the points taking a maximal value are three points, i.e. frames F3, F4 and F5. Among these, regarding the frames F3 and F5, the beat probabilities at the time points are above a specific threshold value Th1 given in advance. On the other hand, the beat probability at the time point of the frame F4 is below the threshold value Th1. In this case, two points, i.e. the frames F3 and F5, are detected as the onsets.

Figure 12:
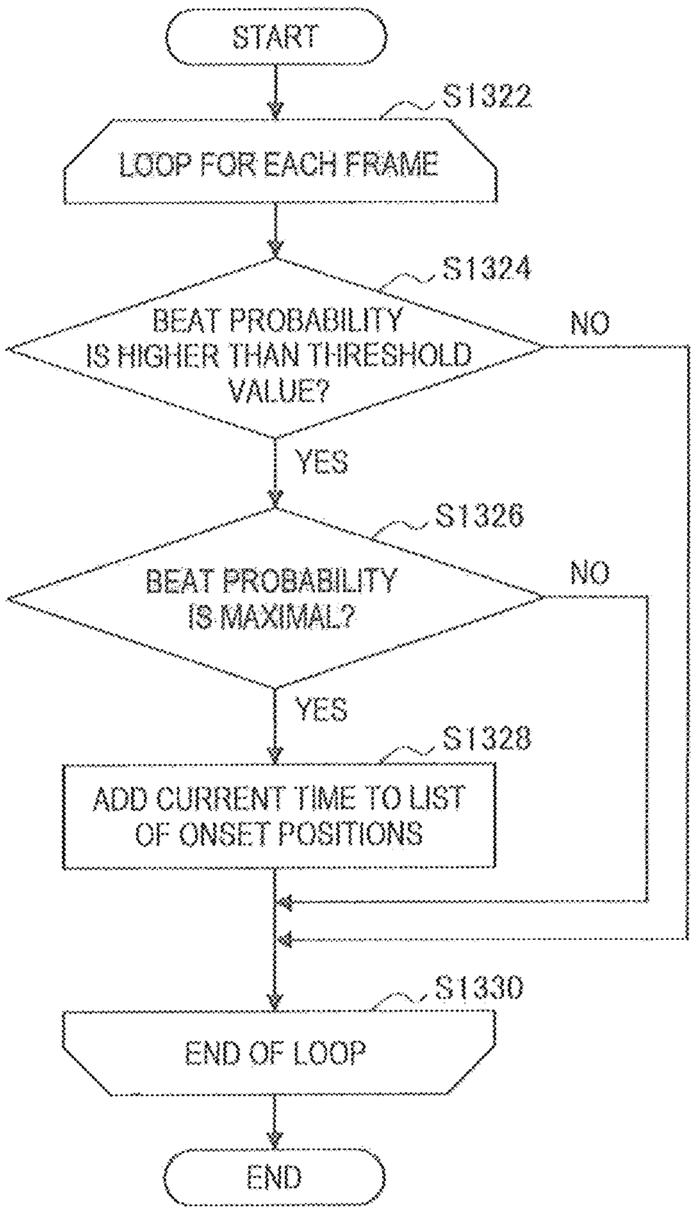
FIG. 12 is an explanatory diagram showing an example of the beat detection method according to the present embodiment.

Here, referring to FIG. 12, an onset detection process flow of the onset detection unit 212 will be briefly described. As shown in FIG. 12, first, the onset detection unit 212 sequentially executes a loop for the frames, starting from the first frame, with regard to the beat probability computed for each frame (S1322). Then, the onset detection unit 212 decides, with respect to each frame, whether the beat probability is above the specific threshold value (S1324), and whether the beat probability indicates a maximal value (S1326). Here, when the beat probability is above the specific threshold value and the beat probability is maximal, the onset detection unit 212 proceeds to the process of step S1328. On the other hand, when the beat probability is below the specific threshold value, or the beat probability is not maximal, the process of step S1328 is skipped. At step S1328, current times (or frame numbers) are added to a list of the onset positions (S1328). Then, when the processing regarding all the frames is over, the loop of the onset detection process is ended (S1330).

Figure 13:
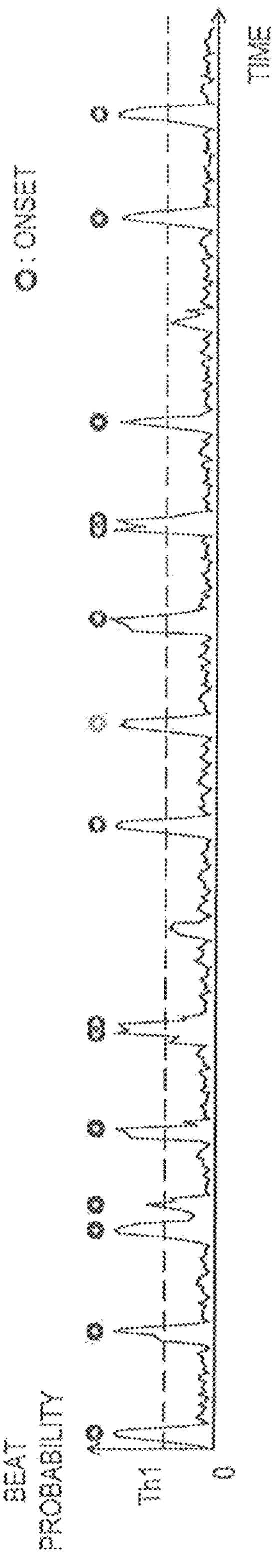
FIG. 13 is an explanatory diagram showing an example of the beat detection method according to the present embodiment.

With the onset detection process by the onset detection unit 212 as described above, a list of the positions of the onsets included in the audio signal (a list of times or frame numbers of respective onsets) is generated. Also, with the above-described onset detection process, positions of onsets as shown in FIG. 13 are detected, for example. FIG. 13 shows the positions of the onsets detected by the onset detection unit 212 in relation to the beat probability. In FIG. 13, the positions of the onsets detected by the onset detection unit 212 are shown with circles above the polygonal line showing the beat probability. In the example of FIG. 13, maximal values with the beat probabilities above the threshold value Th1 are detected as 15 onsets. The list of the positions of the onsets detected by the onset detection unit 212 in this manner is output to the beat score calculation unit 214.

The beat score calculation unit 214 calculates, for each onset detected by the onset detection unit 212, a beat score indicating the degree of correspondence to a beat among beats forming a series of beats with a constant tempo (or a constant beat interval).

Figure 14:
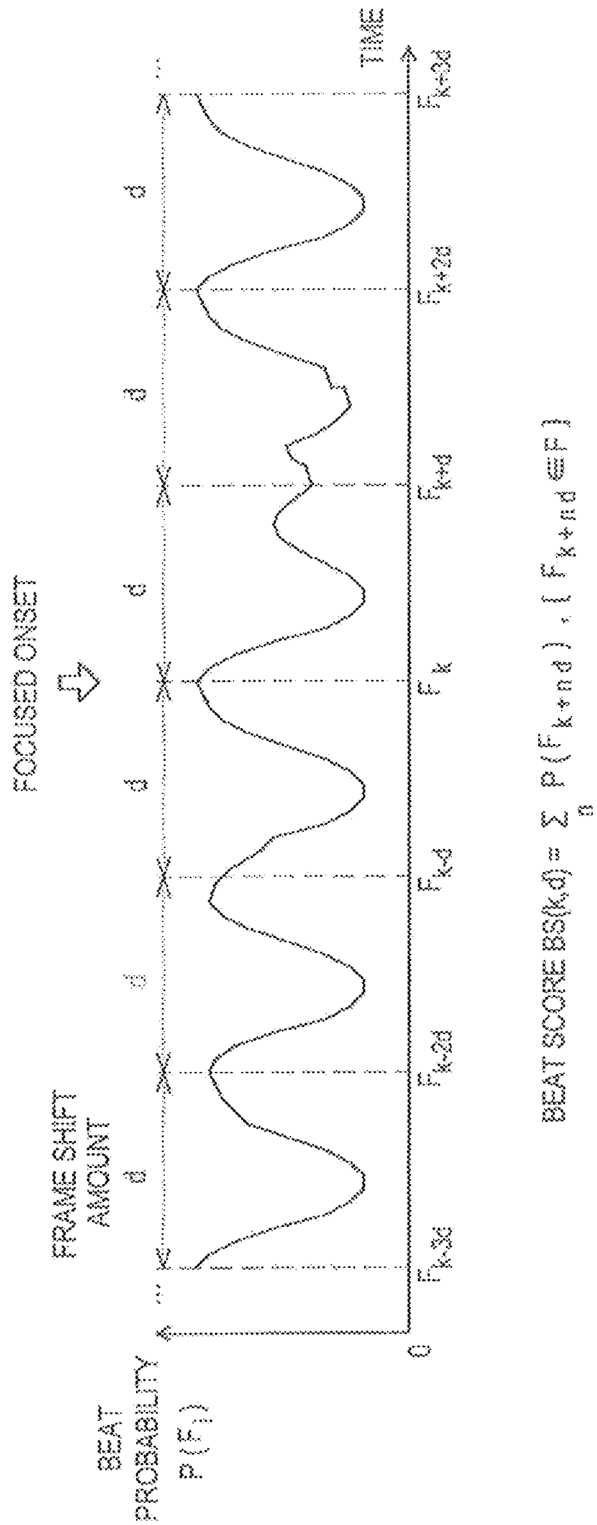
FIG. 14 is an explanatory diagram showing an example of the beat detection method according to the present embodiment.

First, the beat score calculation unit 214 sets a focused onset as shown in FIG. 14. In the example of FIG. 14, among the onsets detected by the onset detection unit 212, the onset at a frame position $F_k$ (frame number k) is set as a focused onset. Furthermore, a series of frame positions $F_{k-3}$, $F_{k-2}$, $F_{k-1}$, $F_k$, $F_{k+1}$, $F_{k+2}$, and $F_{k+3}$ distanced from the frame position $F_k$ at integer multiples of a specific distance d is being referred. In the following, the specific distance d is referred to as a shift amount, and a frame position distanced at an integer multiple of the shift amount d is referred to as a shift position. The beat score calculation unit 214 takes the sum of the beat probabilities at all the shift positions ( . . . $F_{k-3}$, $F_{k-2}$, $F_{k-1}$, $F_k$, $F_{k+1}$, $F_{k+2}$, and $F_{k+3}$ . . . ) included in a group F of frames for which the beat probability has been calculated as the beat score of the focused onset. For example, when the beat probability at a frame position $F_i$ is $P(F_i)$, a beat score BS(k,d) in relation to the frame number k and the shift amount d for the focused onset is expressed by the following equation (7). The beat score BS(k,d) expressed by the following equation (7) can be said to be the score indicating the possibility of an onset at the k-th frame of the audio signal being in sync with a constant tempo having the shift amount d as the beat interval.

[Equation 6]

$$BS(k, d) = \sum_{n} P(F_{k+nd}) \tag{7}$$

Figure 15:
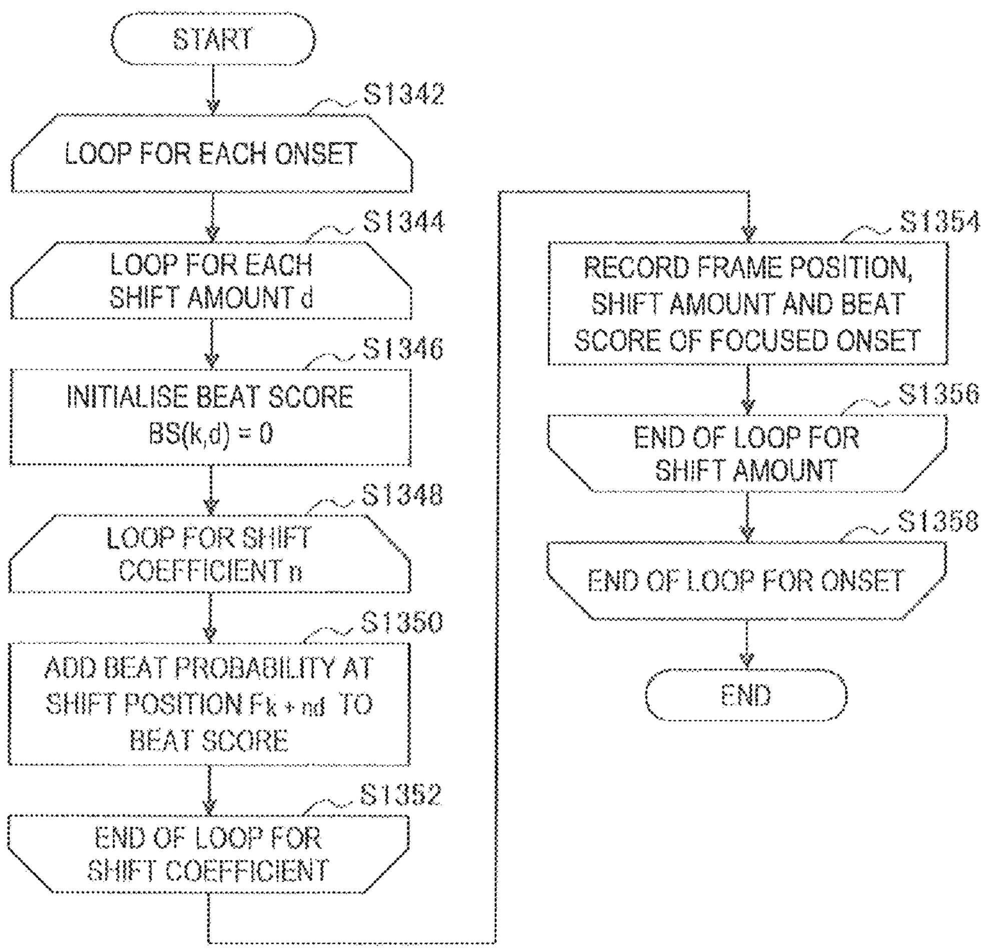
FIG. 15 is an explanatory diagram showing an example of the beat detection method according to the present embodiment.

Here, referring to FIG. 15, a beat score calculation processing flow of the beat score calculation unit 214 will be briefly described.

As shown in FIG. 15, first, the beat score calculation unit 214 sequentially executes a loop for the onsets, starting from the first onset, with regard to the onsets detected by the onset detection unit 212 (S1322). Furthermore, the beat score calculation unit 214 executes a loop for each of all the shift amounts d with regard to the focused onset (S1344). The shift amounts d, which are the subjects of the loop, are the values of the intervals at all the beats which may be used in a music performance. The beat score calculation unit 214 then initialises the beat score BS(k,d) (that is, zero is substituted into the beat score BS(K,d)) (S1346). Next, the beat score calculation unit 214 executes a loop for a shift coefficient n for shifting a frame position $F_d$ of the focused onset (S1348). Then, the beat score calculation unit 214 sequentially adds the beat probability $P(F_{k+nd})$ at each of the shift positions to the beat score BS(k,d) (S1350). Then, when the loop for all the shift coefficients n is over (S1352), the beat score calculation unit 214 records the frame position (frame number k), the shift amount d and the beat score BS(k,d) of the focused onset (S1354). The beat score calculation unit 214 repeats this computation of the beat score BS(k,d) for every shift amount of all the onsets (S1356, S1358).

Figure 16:
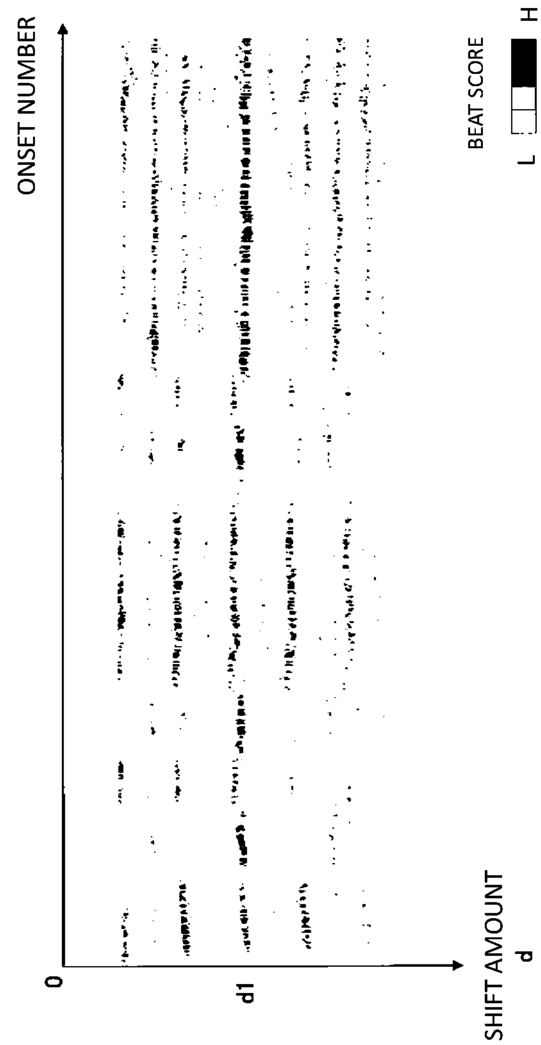
FIG. 16 is an explanatory diagram showing an example of the beat detection method according to the present embodiment.

With the beat score calculation process by the beat score calculation unit 214 as described above, the beat score BS(k,d) across a plurality of the shift amounts d is output for every onset detected by the onset detection unit 212. A beat score distribution chart as shown in FIG. 16 is obtained by the above-described beat score calculation process. The beat score distribution chart visualizes the beat scores output from the beat score calculation unit 214. In FIG. 16, the onsets detected by the onset detection unit 212 are shown in time series along the horizontal axis. The vertical axis in FIG. 16 indicates the shift amount for which the beat score for each onset has been computed. Furthermore, the intensity of the colour of each dot in the figure indicates the level of the beat score calculated for the onset at the shift amount. In the example of FIG. 16, in the vicinity of a shift amount d1, the beat scores are high for all the onsets. When assuming that the music piece is played at a tempo at the shift amount d1, it is highly possible that many of the detected onsets correspond to the beats. The beat scores calculated by the beat score calculation unit 214 are input to the beat search unit 216.

Figure 17:
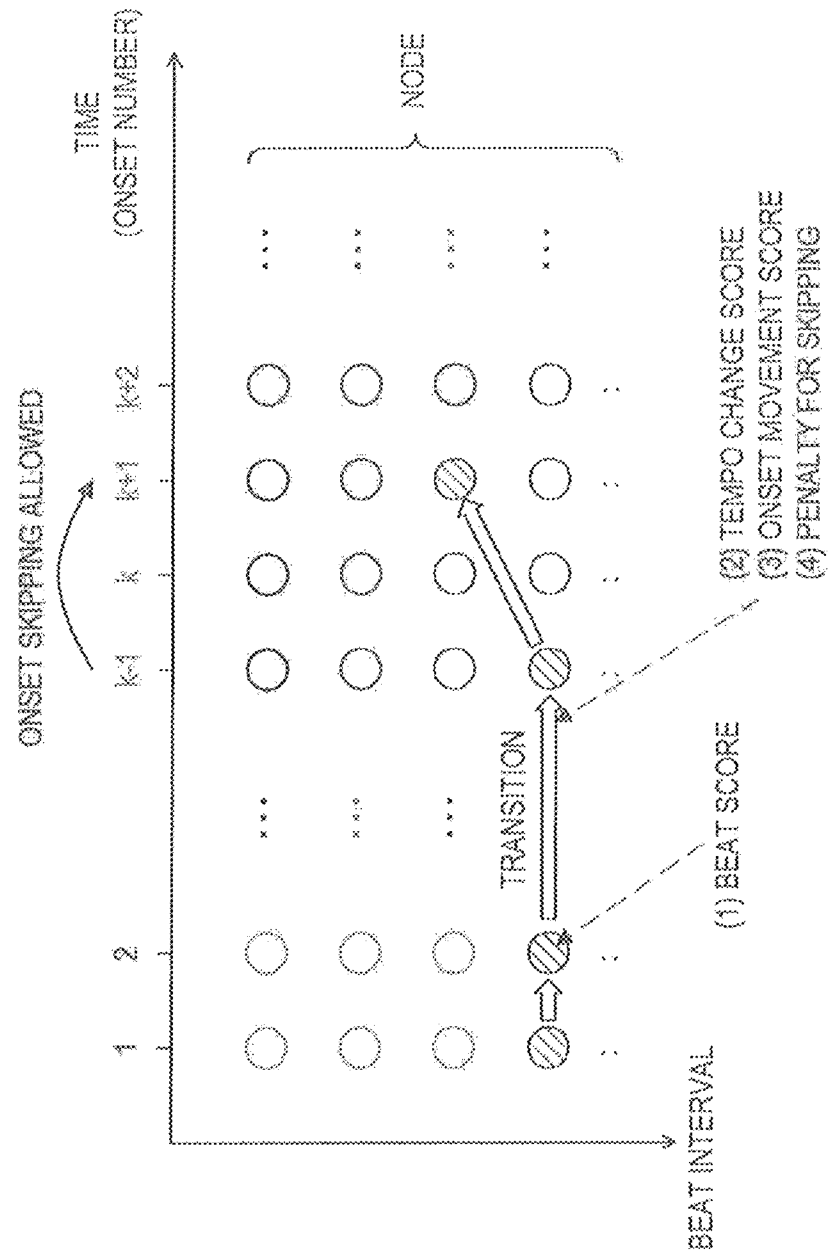
FIG. 17 is an explanatory diagram showing an example of the beat detection method according to the present embodiment.

The beat search unit 216 searches for a path of onset positions showing a likely tempo fluctuation, based on the beat scores computed by the beat score calculation unit 214. A Viterbi search algorithm based on hidden Markov model may be used as the path search method by the beat search unit 216, for example. For the Viterbi search by the beat search unit 216, the onset number is set as the unit for the time axis (horizontal axis) and the shift amount used at the time of beat score computation is set as the observation sequence (vertical axis) as schematically shown in FIG. 17, for example. The beat search unit 216 searches for a Viterbi path connecting nodes respectively defined by values of the time axis and the observation sequence. In other words, the beat search unit 216 takes as the target node for the path search each of all the combinations of the onset and the shift amount used at the time of calculating the beat score by the beat score calculation unit 214. Moreover, the shift amount of each node is equivalent to the beat interval assumed for the node. Thus, in the following, the shift amount of each node may be referred to as the beat interval.

With regard to the node as described, the beat search unit 216 sequentially selects, along the time axis, any of the nodes, and evaluates a path formed from a series of the selected nodes. At this time, in the node selection, the beat search unit 216 is allowed to skip onsets. For example, in the example of FIG. 17, after the k−1st onset, the k-th onset is skipped and the k+1 st onset is selected. This is because normally onsets that are beats and onsets that are not beats are mixed in the onsets, and a likely path has to be searched from among paths including paths not going through onsets that are not beats.

For example, for the evaluation of a path, four evaluation values may be used, namely (1) beat score, (2) tempo change score, (3) onset movement score, and (4) penalty for skipping. Among these, (1) beat score is the beat score calculated by the beat score calculation unit 214 for each node. On the other hand, (2) tempo change score, (3) onset movement score and (4) penalty for skipping are given to a transition between nodes. Among the evaluation values to be given to a transition between nodes, (2) tempo change score is an evaluation value given based on the empirical knowledge that, normally, a tempo fluctuates gradually in a music piece. Thus, a value given to the tempo change score is higher as the difference between the beat interval at a node before transition and the beat interval at a node after the transition is smaller.

Figure 18:
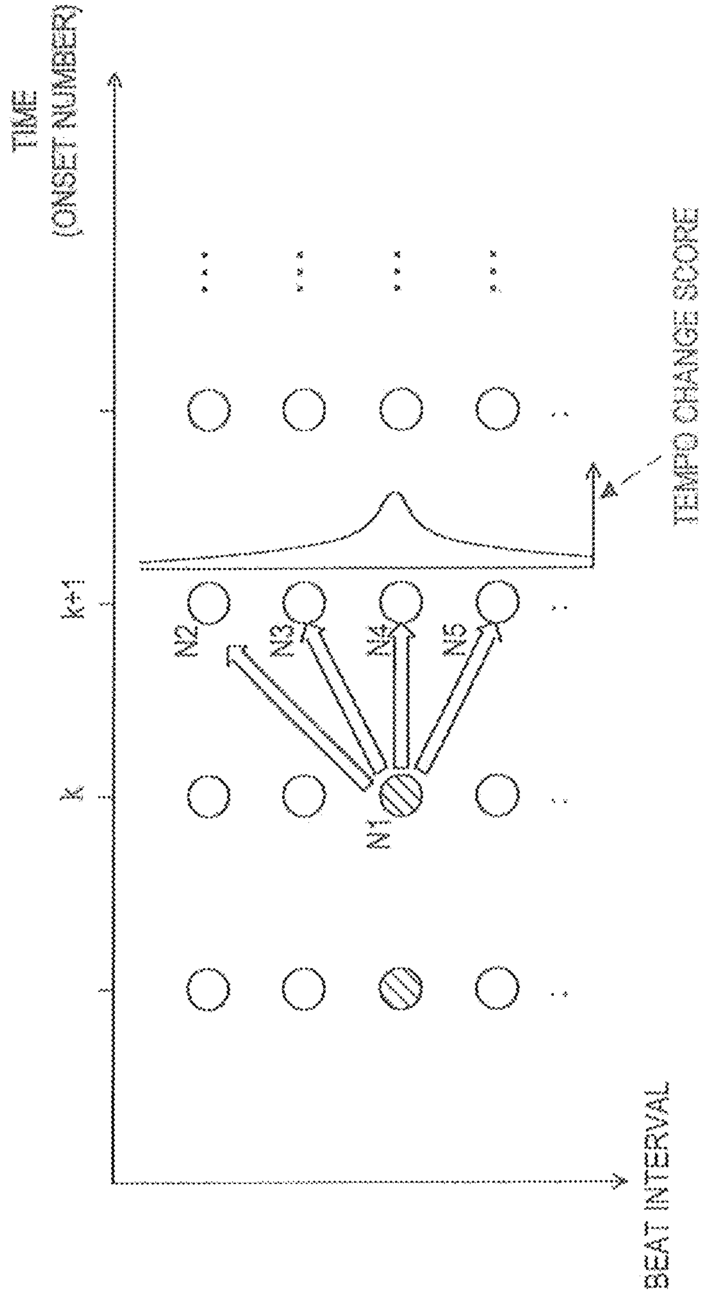
FIG. 18 is an explanatory diagram showing an example of the beat detection method according to the present embodiment.

Here, referring to FIG. 18, (2) tempo change score will be described in detail. In the example of FIG. 18, a node N1 is currently selected. The beat search unit 216 possibly selects any of nodes N2 to N5 as the next node. Although nodes other than N2 to N5 might also be selected, for the sake of convenience of description, four nodes, i.e. nodes N2 to N5, will be described. Here, when the beat search unit 216 selects the node N4, since there is no difference between the beat intervals at the node N1 and the node N4, the highest value will be given as the tempo change score. On the other hand, when the beat search unit 216 selects the node N3 or N5, there is a difference between the beat intervals at the node N1 and the node N3 or N5, and thus, a lower tempo change score compared to when the node N4 is selected is given. Furthermore, when the heat search unit 216 selects the node N2, the difference between the beat intervals at the node N1 and the node N2 is larger than when the node N3 or N5 is selected. Thus, an even lower tempo score is given.

Figure 19:
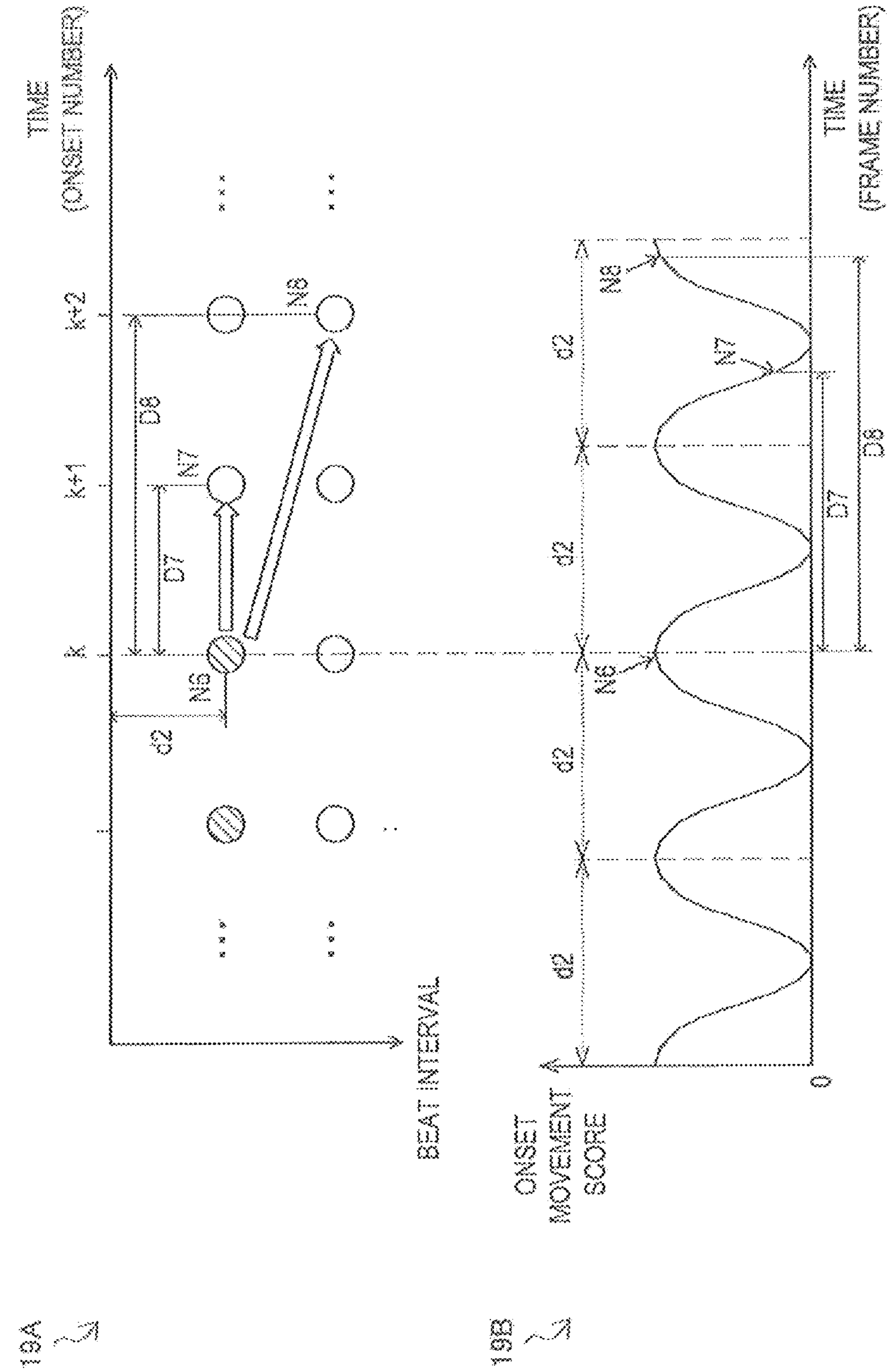
FIG. 19 is an explanatory diagram showing an example of the beat detection method according to the present embodiment.

Next, referring to FIG. 19, (3) onset movement score will be described in detail. The onset movement score is an evaluation value given in accordance with whether the interval between the onset positions of the nodes before and after the transition matches the beat interval at the node before the transition. In FIG. 19(A), a node N6 with a beat interval d2 for the k-th onset is currently selected. Also, two nodes, N7 and N8 are shown as the nodes which may be selected next by the beat search unit 216. Among these, the node N7 is a node of the k+1st onset, and the interval between the k-th onset and the k+1st onset (for example, difference between the frame numbers) is D7. On the other hand, the node N8 is a node of the k+2nd onset, and the interval between the k-th onset and the k+2nd onset is D8.

Here, when assuming an ideal path where all the nodes on the path correspond, without fail, to the beat positions in a constant tempo, the interval between the onset positions of adjacent nodes is an integer multiple (same interval when there is no rest) of the beat interval at each node. Thus, as shown in FIG. 19(B), a higher onset movement score is given as the interval between the onset positions is closer to the integer multiple of the beat interval d2 at the node Nd, in relation to the current node N6. In the example of FIG. 19(B), since the interval D8 between the nodes Nd and N8 is closer to the integer multiple of the heat interval d2 at the node N6 than the interval D7 between the nodes N6 and N7, a higher onset movement score is given to the transition from the node N6 to the node N8.

Figure 20:
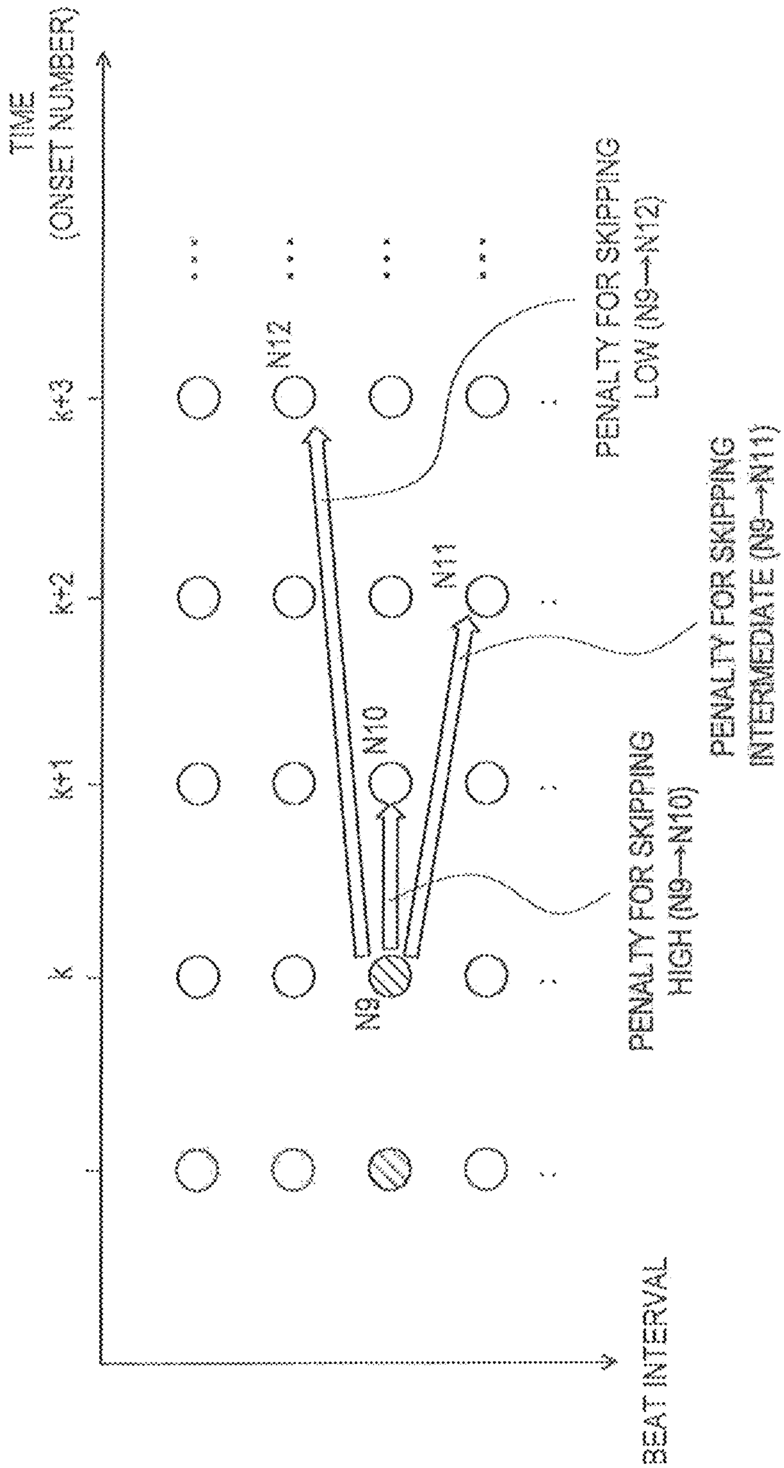
FIG. 20 is an explanatory diagram showing an example of the beat detection method according to the present embodiment.

Next, referring to FIG. 20, (4) penalty for skipping is described in detail. The penalty for skipping is an evaluation value for restricting an excessive skipping of onsets in a transition between nodes. Accordingly, the score is lower as more onsets are skipped in one transition, and the score is higher as fewer onsets are skipped in one transition. Here, lower score means higher penalty. In the example of FIG. 20, a node N9 of the k-th onset is selected as the current node. Also, in the example of FIG. 20, three nodes, N10, N11 and N12 are shown as the nodes which may be selected next by the beat search unit 216. The node N10 is the node of the k+1st onset, the node N11 is the node of the k+2nd onset, and the node N12 is the node of the k+3rd onset.

Accordingly, in case of transition from the node N9 to the node N10, no onset is skipped. On the other hand, in case of transition from the node N9 to the node N11, the k+1st onset is skipped. Also, in case of transition from the node N9 to the node N12, the k+1 st and k+2nd onsets are skipped. Thus, the penalty for skipping takes a relatively high value in case of transition from the node N9 to the node N10, an intermediate value in case of transition from the node N9 to the node N11, and a low value in case of transition from the node N9 to the node N12. As a result, at the time of the path search, a phenomenon that an excessively large number of onsets are skipped to thereby make the interval between the nodes constant can be prevented.

Figure 21:
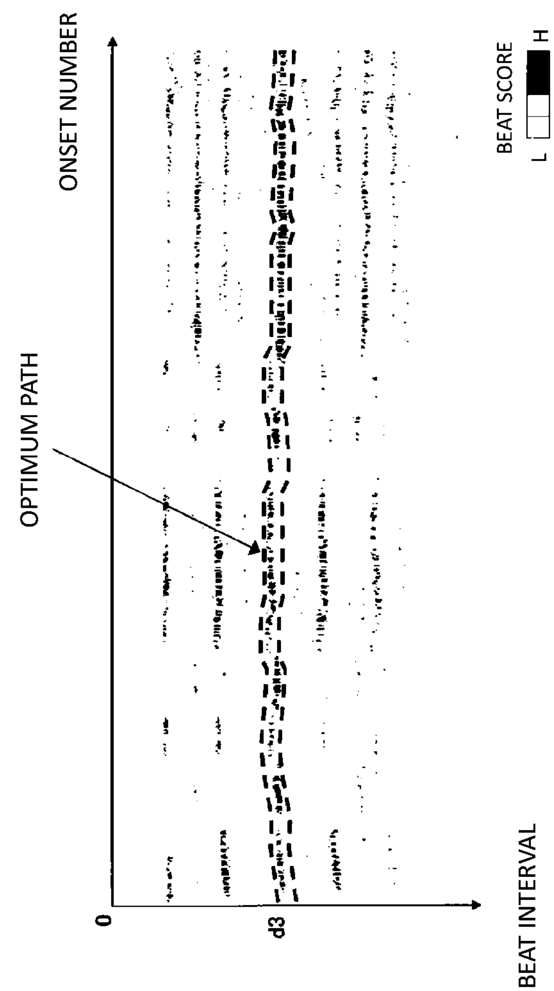
FIG. 21 is an explanatory diagram showing an example of the beat detection method according to the present embodiment.

Heretofore, the four evaluation values used for the evaluation of paths searched out by the beat search unit 216 have been described. The evaluation of paths described by using FIG. 17 is performed, with respect to a selected path, by sequentially multiplying by each other the evaluation values of the above-described (1) to (4) given to each node or for the transition between nodes included in the path. The beat search unit 216 determines, as the optimum path, the path whose product of the evaluation values is the largest among all the conceivable paths. The path determined in this manner is as shown in FIG. 21, for example. FIG. 21 shows an example of a Viterbi path determined as the optimum path by the beat search unit 216. In the example of FIG. 21, the optimum path determined by the beat search unit 216 is outlined by dotted-lines on the beat score distribution chart shown in FIG. 16. In the example of 21, it can be seen that the tempo of the music piece for which search is conducted by the beat search unit 216 fluctuates, centring on a beat interval d3. Moreover, the optimum path (a list of nodes included in the optimum path) determined by the beat search unit 216 is input to the constant tempo decision unit 218, the beat re-search unit 220 for constant tempo, and the beat determination unit 222.

Figure 22:
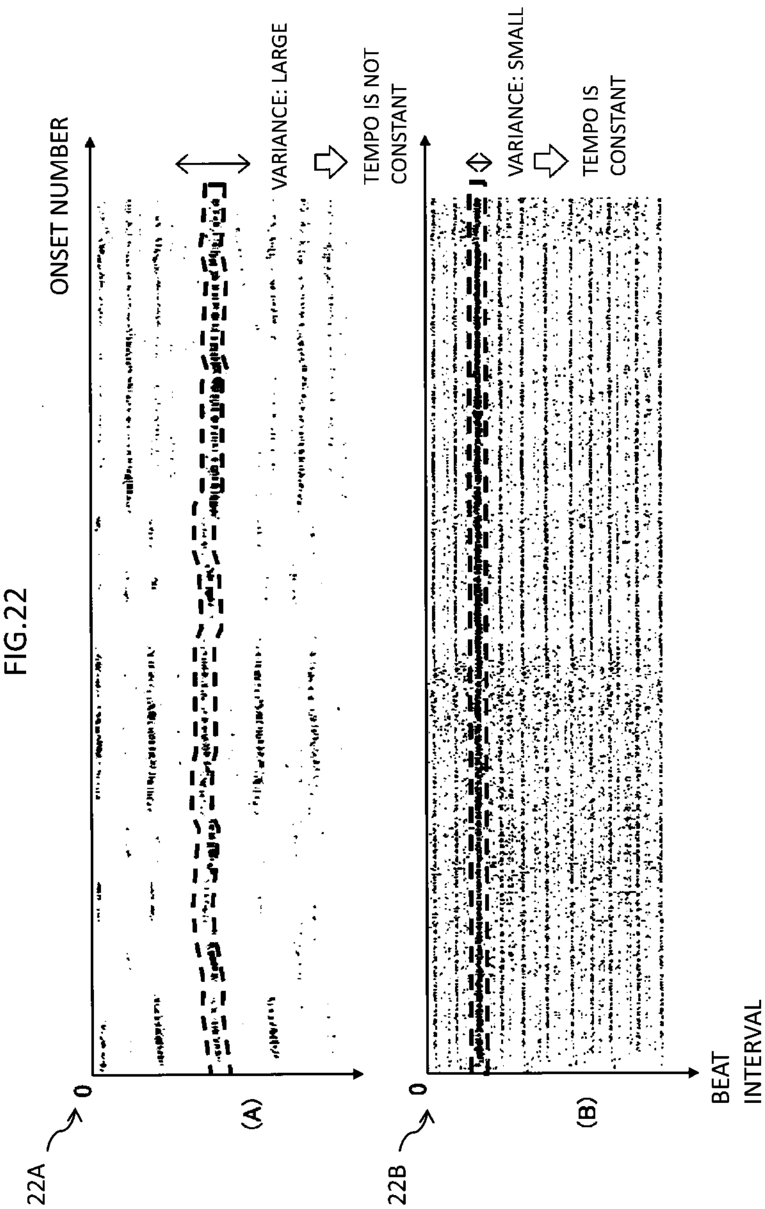
FIG. 22 is an explanatory diagram showing an example of the beat detection method according to the present embodiment.

The constant tempo decision unit 218 decides whether the optimum path determined by the beat search unit 216 indicates a constant tempo with low variance of heat intervals that are assumed for respective nodes. First, the constant tempo decision unit 218 calculates the variance for a group of beat intervals at nodes included in the optimum path input from the beat search unit 216. Then, when the computed variance is less than a specific threshold value given in advance, the constant tempo decision unit 218 decides that the tempo is constant; and when the computed variance is more than the specific threshold value, the constant tempo decision unit 218 decides that the tempo is not constant. For example, the tempo is decided by the constant tempo decision unit 218 as shown in FIG. 22.

For example, in the example shown in FIG. 22(A), the beat interval for the onset positions in the optimum path outlined by the dotted-lines varies according to time. With such a path, the tempo may be decided as not constant as a result of a decision relating to a threshold value by the constant tempo decision unit 218. On the other hand, in the example shown in FIG. 22(B), the beat interval for the onset positions in the optimum path outlined by the dotted-lines is nearly constant through out the music piece. Such a path may be decided as constant as a result of the decision relating to a threshold value by the constant tempo decision unit 218. The result of the decision relating to a threshold value by the constant tempo decision unit 218 obtained in this manner is input to the beat re-search unit 220 for constant tempo.

When the optimum path extracted by the beat search unit 216 is decided by the constant tempo decision unit 218 to indicate a constant tempo, the beat re-search unit 220 for constant tempo re-executes the path search, limiting the nodes which are the subjects of the search to those only around the most frequently appearing beat intervals. For example, the beat re-search unit 220 for constant tempo executes a re-search process for a path by a method illustrated in FIG. 23. Moreover, as with FIG. 17, the beat re-search unit 220 for constant tempo executes the re-search process for a path for a group of nodes along a time axis (onset number) with the beat interval as the observation sequence.

Figure 23:
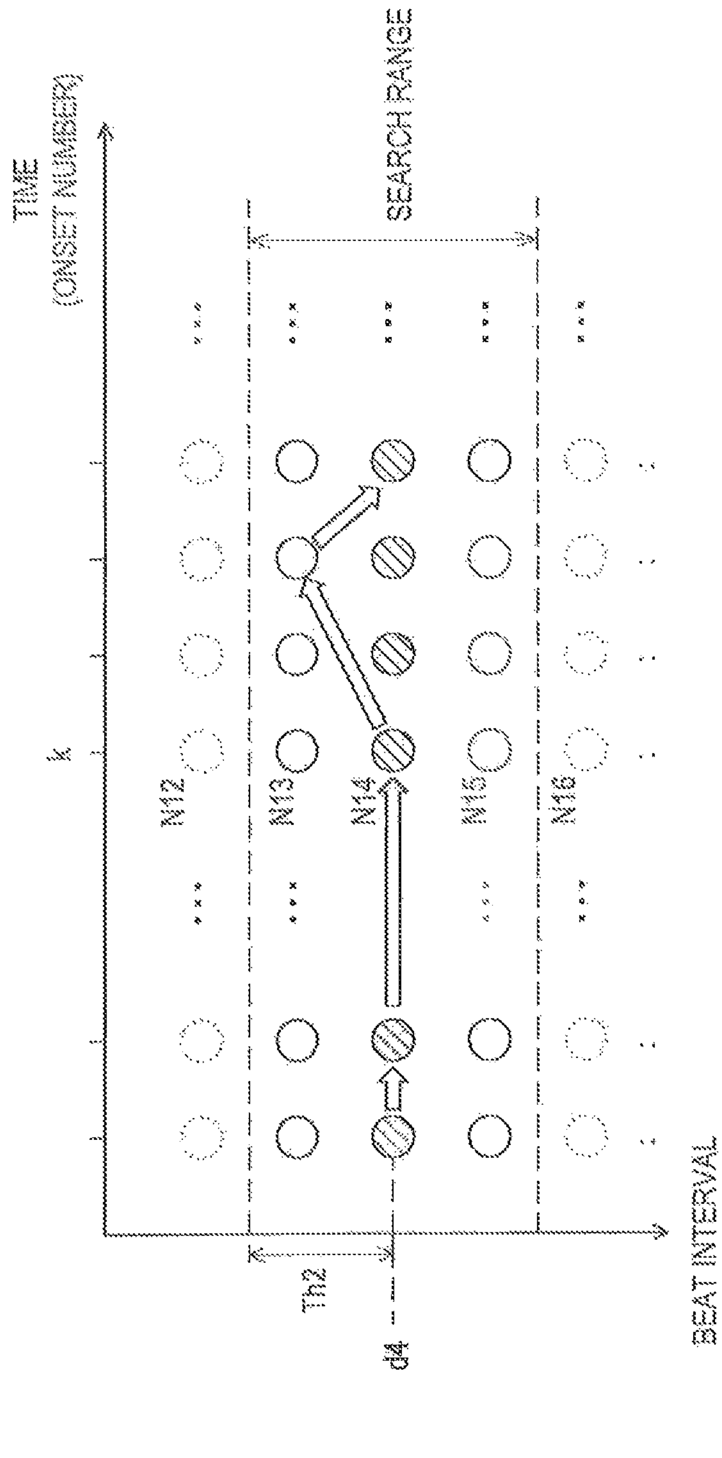
FIG. 23 is an explanatory diagram showing an example of the heat detection method according to the present embodiment.

For example, it is assumed that the mode of the beat intervals at the nodes included in the path determined to be the optimum path by the beat search unit 216 is d4, and that the tempo for the path is decided to be constant by the constant tempo decision unit 218. In this case, the beat re-search unit 220 for constant tempo searches again for a path with only the nodes for which the beat interval d satisfies $d4-Th2 \le d \le d4+Th2$ (Th2 is a specific threshold value) as the subjects of the search. In the example of FIG. 23, five nodes N12 to N16 are shown for the k-th onset. Among these, the heat intervals at N13 to N15 are included within the search range ($d4-Th2 \le d \le d4+Th2$) with regard to the beat re-search unit 220 for constant tempo. In contrast, the beat intervals at N12 and N16 are not included in the above-described search range. Thus, with regard to the k-th onset, only the three nodes, N13 to N15, are made to be the subjects of the re-execution of the path search by the beat re-search unit 220 for constant tempo.

Moreover, the flow of the re-search process for a path by the beat re-search unit 220 for constant tempo is similar to the path search process by the beat search unit 216 except for the range of the nodes which are to be the subjects of the search. According to the path re-search process by the beat re-search unit 220 for constant tempo as described above, errors relating to the beat positions which might partially occur in a result of the path search can be reduced with respect to a music piece with a constant tempo. The optimum path redetermined by the beat re-search unit 220 for constant tempo is input to the beat determination unit 222.

Figure 24:
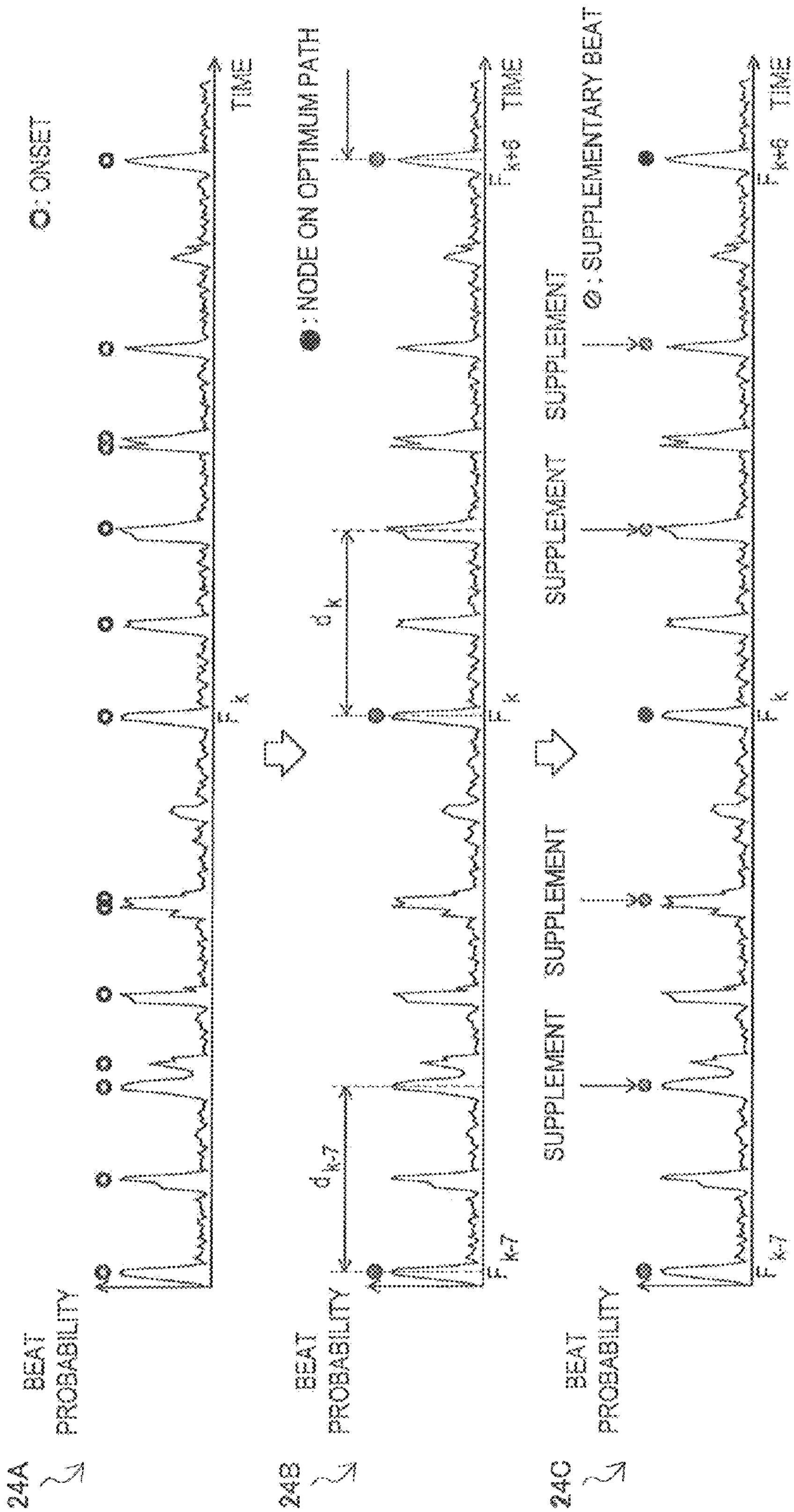
FIG. 24 is an explanatory diagram showing an example of the beat detection method according to the present embodiment.

The beat determination unit 222 determines the beat positions included in the audio signal, based on the optimum path determined by the beat search unit 216 or the optimum path redetermined by the beat re-search unit 220 for constant tempo as well as on the beat interval at each node included in the path. For example, the beat determination unit 222 determines the beat position by a method as shown in FIG. 24. In FIG. 24(A), an example of the onset detection result obtained by the onset detection unit 212 is shown. In this example, 14 onsets in the vicinity of the k-th onset that are detected by the onset detection unit 212 are shown. In contrast, FIG. 24(B) shows the onsets included in the optimum path determined by the beat search unit 216 or the beat re-search unit 220 for constant tempo. In the example of (B), the k−7th onset, the k-th onset and the k+6th onset (frame numbers $F_{k-7}$, $F_k$, $F_{k+6}$), among the 14 onsets shown in (A), are included in the optimum path. Furthermore, the beat interval at the k−7th onset (equivalent to the beat interval at the corresponding node) is $d_{k-7}$, and the beat interval at the k-th onset is $d_k$.

Figure 25:
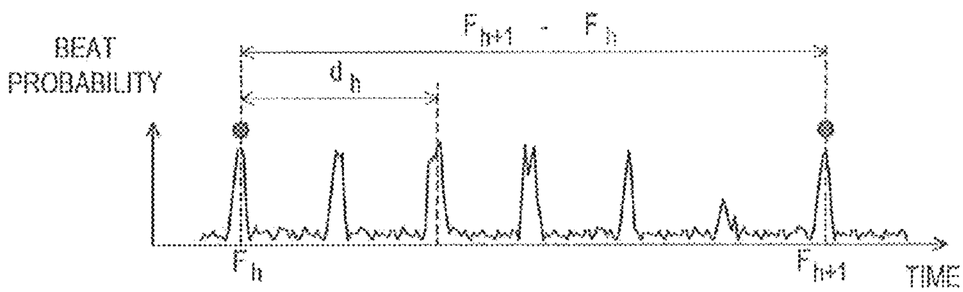
FIG. 25 is an explanatory diagram showing an example of the beat detection method according to the present embodiment.

With respect to such onsets, first, the beat determination unit 222 takes the positions of the onsets included in the optimum path as the beat positions of the music piece. Then, the beat determination unit 222 furnishes supplementary beats between adjacent onsets included in the optimum path according to the beat interval at each onset. At this time, the beat determination unit 222 first determines the number of supplementary beats to furnish the beats between onsets adjacent to each other on the optimum path. For example, as shown in FIG. 25, the beat determination unit 222 takes the positions of two adjacent onsets as $F_h$ and $F_{h+1}$, and the beat interval at the onset position $F_h$ as $d_h$. In this case, the number of supplementary beats $B_{fill}$ to be furnished between $F_h$ and $F_{h+1}$ is given by the following equation (8).

[Equation 7]

$$B_{fill} = \text{Round}\left(\frac{F_{h+1} - F_h}{d_h}\right) - 1 \tag{8}$$

Here, Round ( . . . ) indicates that " . . . " is rounded off to the nearest whole number. According to the above equation (8), the number of supplementary beats to be furnished by the beat determination unit 222 will be a number obtained by rounding off, to the nearest whole number, the value obtained by dividing the interval between adjacent onsets by the beat interval, and then subtracting 1 from the obtained whole number in consideration of the fencepost problem.

Next, the beat determination unit 222 furnishes the supplementary beats, by the determined number of beats, between onsets adjacent to each other on the optimum path so that the beats are arranged at an equal interval. In FIG. 24(C), onsets after the furnishing of supplementary beats are shown. In the example of (C), two supplementary beats are furnished between the k−7th onset and the k-th onset, and two supplementary beats are furnished between the k-th onset and the k+6th onset. It should be noted that the positions of supplementary beats provided by the beat determination unit 222 does not necessarily correspond with the positions of onsets detected by the onset detection unit 212. With this configuration, the position of a beat can be determined without being affected by a sound produced locally off the beat position. Furthermore, the beat position can be appropriately grasped even in case there is a rest at the beat position and no sound is produced. A list of the beat positions determined by the beat determination unit 222 (including the onsets on the optimum path and supplementary beats furnished by the beat determination unit 222) in this manner is input to the tempo revision unit 224.

Figure 26:
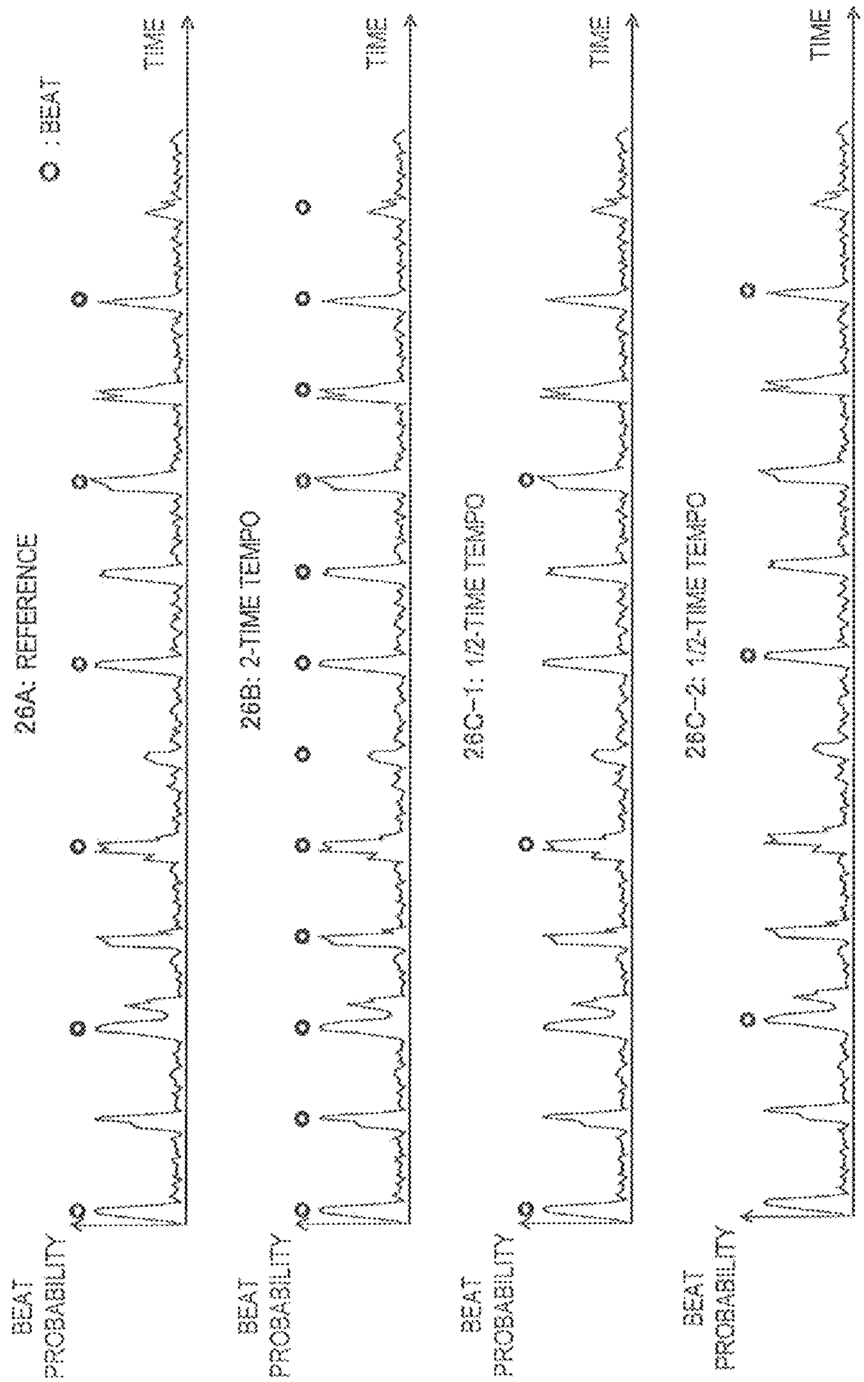
FIG. 26 is an explanatory diagram showing an example of the beat detection method according to the present embodiment.

The tempo revision unit 224 revises the tempo indicated by the beat positions determined by the beat determination unit 222. The tempo before revision is possibly a constant multiple of the original tempo of the music piece, such as 2 times, 1/2 times, 3/2 times, 2/3 times or the like (refer to FIG. 26). Accordingly, the tempo revision unit 224 revises the tempo which is erroneously grasped to be a constant multiple and reproduces the original tempo of the music piece. Here, reference is made to the example of FIG. 26 showing patterns of beat positions determined by the beat determination unit 222. In the example of FIG. 26, 6 beats are included for pattern (A) in the time range shown in the figure. In contrast, for pattern (B), 12 beats are included in the same time range. That is, the beat positions of pattern (B) indicate a 2-time tempo with the beat positions of pattern (A) as the reference.

On the other hand, with pattern (C-1), 3 beats are included in the same time range. That is, the heat positions of pattern (C-1) indicate a 1/2-time tempo with the beat positions of pattern (A) as the reference. Also, with pattern (C-2), as with pattern (C-1), 3 beats are included in the same time range, and thus a 1/2-time tempo is indicated with the beat positions of pattern (A) as the reference. However, pattern (C-1) and pattern (C-2) differ from each other by the beat positions which will be left to remain at the time of changing the tempo from the reference tempo. The revision of tempo by the tempo revision unit 224 is performed by the following procedures (S1) to (S3), for example.

(S1) Determination of Estimated Tempo estimated based on Waveform (S2) Determination of Optimum Basic Multiplier among a Plurality of Multipliers (S3) Repetition of (S2) until Basic Multiplier is 1

Figure 27:
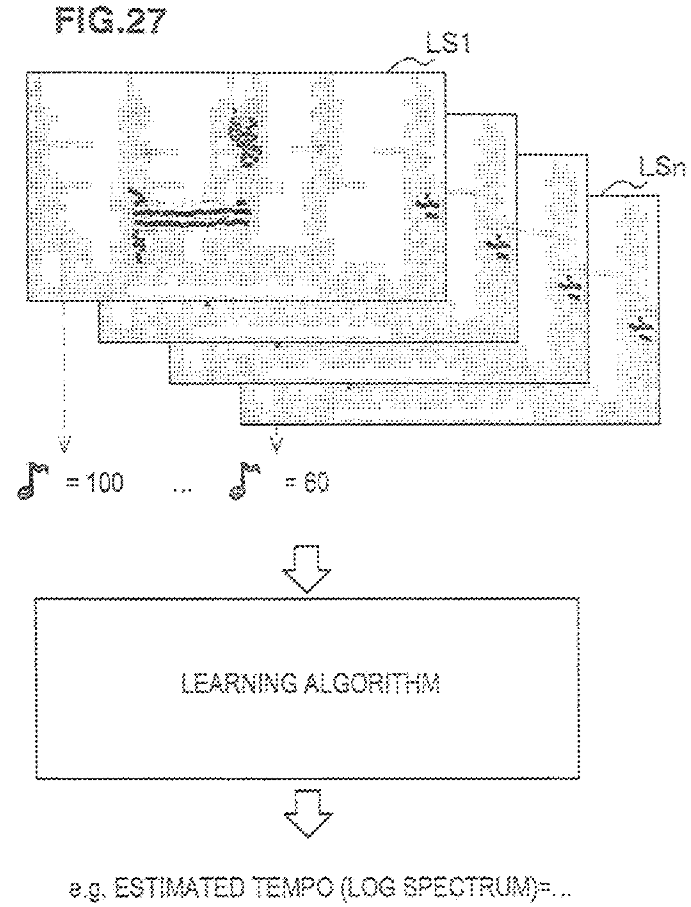
FIG. 27 is an explanatory diagram showing an example of the beat detection method according to the present embodiment.

First, explanation will be made on (S1) Determination of Estimated Tempo estimated based on waveform. The tempo revision unit 224 determines an estimated tempo which is estimated to be adequate from the sound features appearing in the waveform of the audio signal. For example, the feature quantity calculation formula generation apparatus 10 or a calculation formula for estimated tempo discrimination (an estimated tempo discrimination formula) generated by the learning algorithm disclosed is JP-A-2008-123011 are used for the determination of the estimated tempo. For example, as shown in FIG. 27, log spectra of a plurality of music pieces are supplied as evaluation data to the feature quantity calculation formula generation apparatus 10. In the example of FIG. 27, log spectra LS1 to LSn are supplied. Furthermore, tempos decided to be correct by a human being listening to the music pieces are supplied as teacher data. In the example of FIG. 27, a correct tempo (LS1:100, . . . , LSn:60) of each log spectrum is supplied as the teacher data. The estimated tempo discrimination formula is generated based on a plurality of sets of such evaluation data and teacher data. The tempo revision unit 224 computes the estimated tempo of a treated piece by using the generated estimated tempo discrimination formula.

Next, explanation will be made on (2) Determination of Optimum Basic Multiplier among a Plurality of Multiplier. The tempo revision unit 224 determines a basic multiplier, among a plurality of basic multipliers, according to which a revised tempo is closest to the original tempo of a music piece. Here, the basic multiplier is a multiplier which is a basic unit of a constant ratio used for the revision of tempo. For example, any of seven types of multipliers, i.e. 1/3, 1/2, 2/3, 1, 3/2, 2 and 3 is used as the basic multiplier. However, the application range of the present embodiment is not limited to these examples, and the basic multiplier may be any of five types of multipliers, i.e. 1/3, 1/2, 1, 2 and 3, for example. To determine the optimum basic multiplier, the tempo revision unit 224 first calculates an average beat probability after revising the beat positions by each basic multiplier. However, in case of the basic multiplier being 1, an average beat probability is calculated for a case where the beat positions are not revised. For example, the average beat probability is computed for each basic multiplier by the tempo revision unit 224 by a method as shown in FIG. 28.

Figure 28:
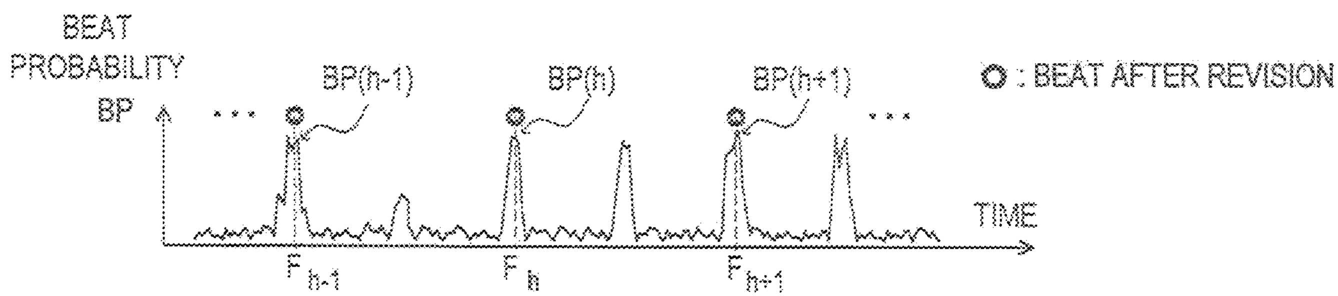
FIG. 28 is an explanatory diagram showing an example of the beat detection method according to the present embodiment.

In FIG. 28, the beat probability computed by the beat probability computation unit 202 is shown with a polygonal line on the time axis. Moreover, frame numbers $F_{h-1}$, $F_h$ and $F_{h+1}$ of three beats revised according to any of the multipliers are shown on the horizontal axis. Here, when the beat probability at the frame number $F_h$ is BP(h), an average beat probability $BP_{AVG}(r)$ of a group F(r) of the beat positions revised according to a multiplier r is given by the following equation (9). Here, m(r) is the number of pieces of frame numbers included in the group F(r).

[Equation 8]

$$BP_{AVG}(r) = \frac{\sum_{F(h)\in F(r)} BP(h)}{m(r)} \tag{9}$$

As described using patterns (C-1) and (C-2) of FIG. 26, there are two types of candidates for the beat positions in case the basic multiplier r is 1/2. In this case, the tempo revision unit 224 calculates the average beat probability $BP_{AVG}(r)$ for each of the two types of candidates for the beat positions, and adopts the beat positions with higher average beat probability $BP_{AVG}(r)$ as the beat positions revised according to the multiplier r=1/2. Similarly, in case the multiplier r is 1/3, there are three types of candidates for the beat positions. Accordingly, the tempo revision unit 224 calculates the average beat probability $BP_{AVG}(r)$ for each of the three types of candidates for the beat positions, and adopts the beat positions with the highest average beat probability $BP_{AVG}(r)$ as the beat positions revised according to the multiplier r=1/3.

After calculating the average beat probability for each basic multiplier, the tempo revision unit 224 computes, based on the estimated tempo and the average beat probability, the likelihood of the revised tempo for each basic multiplier (hereinafter, a tempo likelihood). The tempo likelihood can be expressed by the product of a tempo probability shown by a Gaussian distribution centring around the estimated tempo and the average beat probability. For example, the tempo likelihood as shown in FIG. 29 is computed by the tempo revision unit 224.

Figure 29:
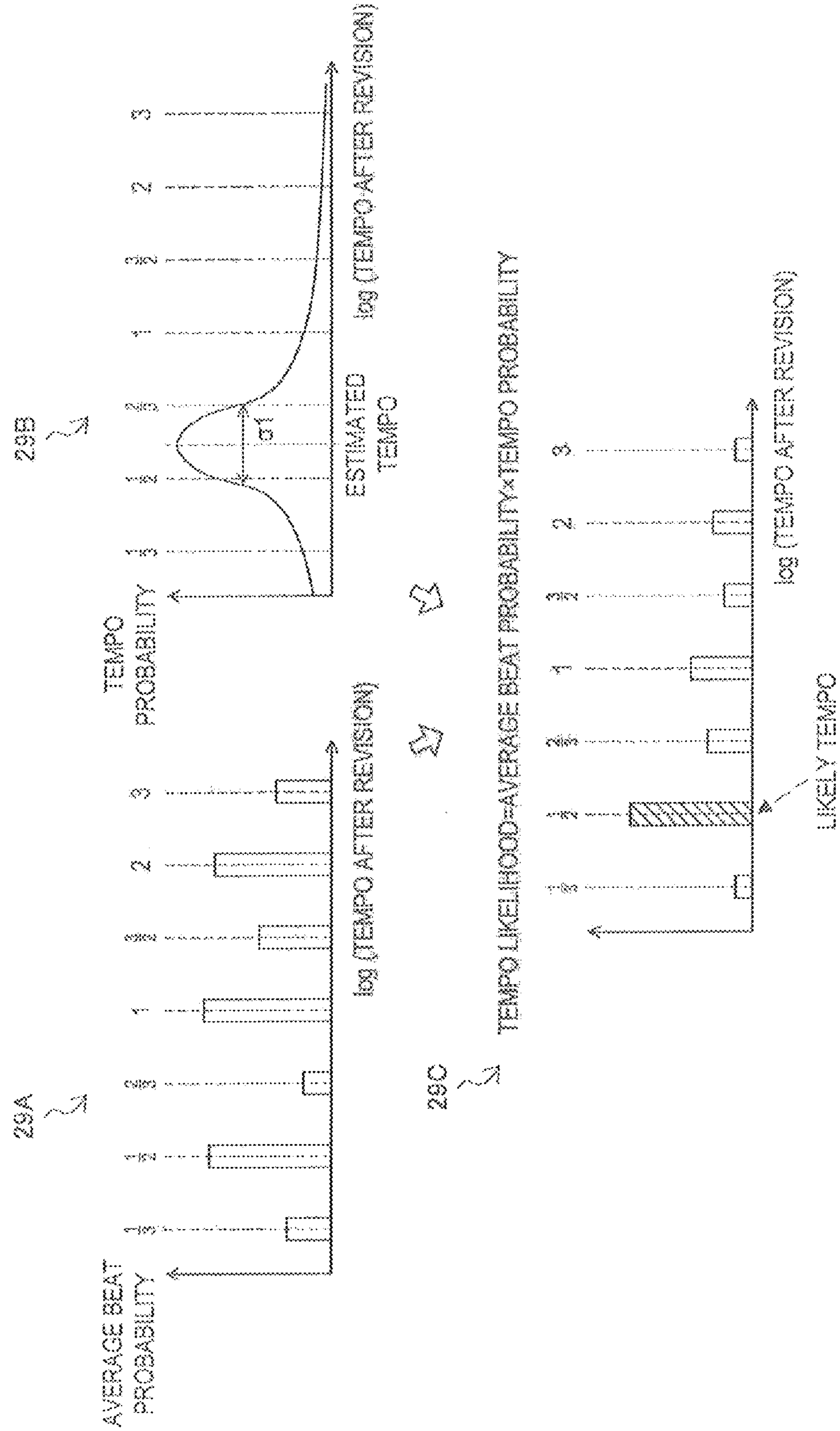
FIG. 29 is an explanatory diagram showing an example of the beat detection method according to the present embodiment.

The average beat probabilities computed by the tempo revision unit 224 for the respective multipliers are shown in FIG. 29(A). Also, FIG. 29(B) shows the tempo probability in the form of a Gaussian distribution that is determined by a specific variance σ1 given in advance and centring around the estimated tempo estimated by the tempo revision unit 224 based on the waveform of the audio signal. Moreover, the horizontal axes of FIGS. 29(A) and (B) represent the logarithm of tempo after the beat positions have been revised according to each multiplier. The tempo revision unit 224 computes the tempo likelihood shown in (C) for each of the basic multipliers by multiplying by each other the average beat probability and the tempo probability. In the example of FIG. 29, although the average beat probabilities are almost the same for when the basic multiplier is 1 and when it is 1/2, the tempo revised to 1/2 times is closer to the estimated tempo (the tempo probability is high). Thus, the computed tempo likelihood is higher for the tempo revised to 1/2 times. The tempo revision unit 224 computes the tempo likelihood in this manner, and determines the basic multiplier producing the highest tempo likelihood as the basic multiplier according to which the revised tempo is the closest to the original tempo of the music piece.

In this manner, by taking the tempo probability which can be obtained from the estimated tempo into account in the determination of a likely tempo, an appropriate tempo can be accurately determined among the candidates, which are tempos in constant multiple relationships and which are hard to discriminate from each other based on the local waveforms of the sound. When the tempo is revised in this manner, the tempo revision unit 224 performs (S3) Repetition of (S2) until Basic Multiplier is 1. Specifically, the calculation of the average beat probability and the computation of the tempo likelihood for each basic multiplier are repeated by the tempo revision unit 224 until the basic multiplier producing the highest tempo likelihood is 1. As a result, even if the tempo before the revision by the tempo revision unit 224 is 1/4 times, 1/6 times, 4 times, 6 times or the like of the original tempo of the music piece, the tempo can be revised by an appropriate multiplier for revision obtained by a combination of the basic multipliers (for example, 1/2 times×1/2 times=1/4 times).

Figure 30:
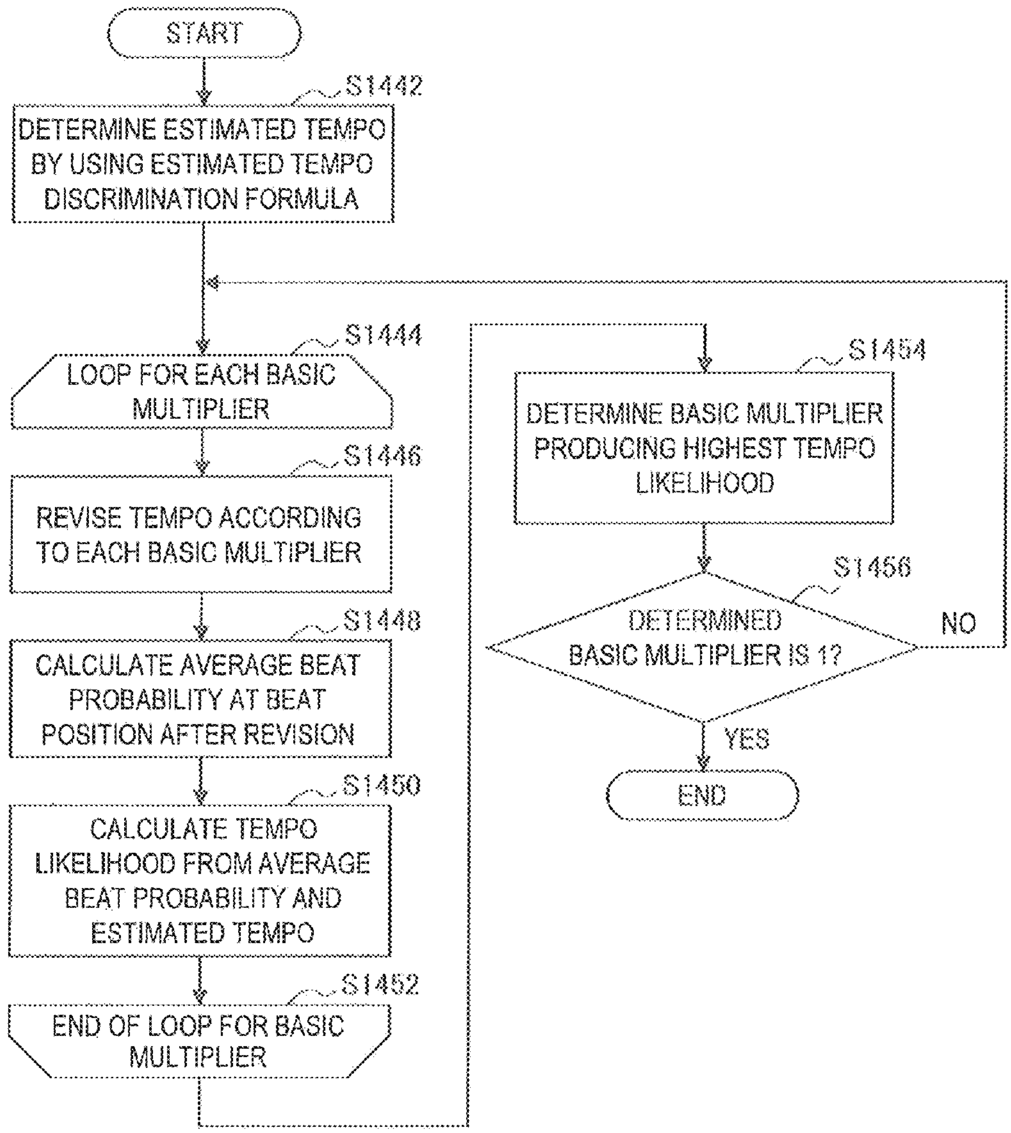
FIG. 30 is an explanatory diagram showing an example of the beat detection method according to the present embodiment.

Here, referring to FIG. 30, a revision process flow of the tempo revision unit 224 will be briefly described. As shown in FIG. 30, first, the tempo revision unit 224 determines an estimated tempo from the audio signal by using an estimated tempo discrimination formula obtained in advance by the feature quantity calculation formula generation apparatus 10 (S1442). Next, the tempo revision unit 224 sequentially executes a loop for a plurality of basic multipliers (such as 1/3, 1/2, or the like) (S1444). Within the loop, the tempo revision unit 224 changes the beat positions according to each basic multiplier and revises the tempo (S1446). Next, the tempo revision unit 224 calculates the average beat probability of the revised beat positions (S1448). Next, the tempo revision unit 224 calculates the tempo likelihood for each basic multiplier based on the average beat probability calculated at S1448 and the estimated tempo determined at S1442 (S1450).

Then, when the loop is over for all the basic multipliers (S1452), the tempo revision unit 224 determines the basic multiplier producing the highest tempo likelihood (S1454). Then, the tempo revision unit 224 decides whether the basic multiplier producing the highest tempo likelihood is 1 (S1456). If the basic multiplier producing the highest tempo likelihood is 1, the tempo revision unit 224 ends the revision process. On the other hand, when the basic multiplier producing the highest tempo likelihood is not 1, the tempo revision unit 224 returns to the process of step S1444. Thereby, a revision of tempo according to any of the basic multipliers is again conducted based on the tempo (beat positions) revised according to the basic multiplier producing the highest tempo likelihood.

Heretofore, the configuration of the beat detection unit 132 has been described. With the above-described processing, a detection result for the beat positions as shown in FIG.

31 is output from the beat detection unit 132. The detection result of the beat detection unit 132 is input to the structure analysis unit 134, and is used for music structure analysis.

(2-4-2. Configuration of Structure Analysis Unit 134)

Figure 32:
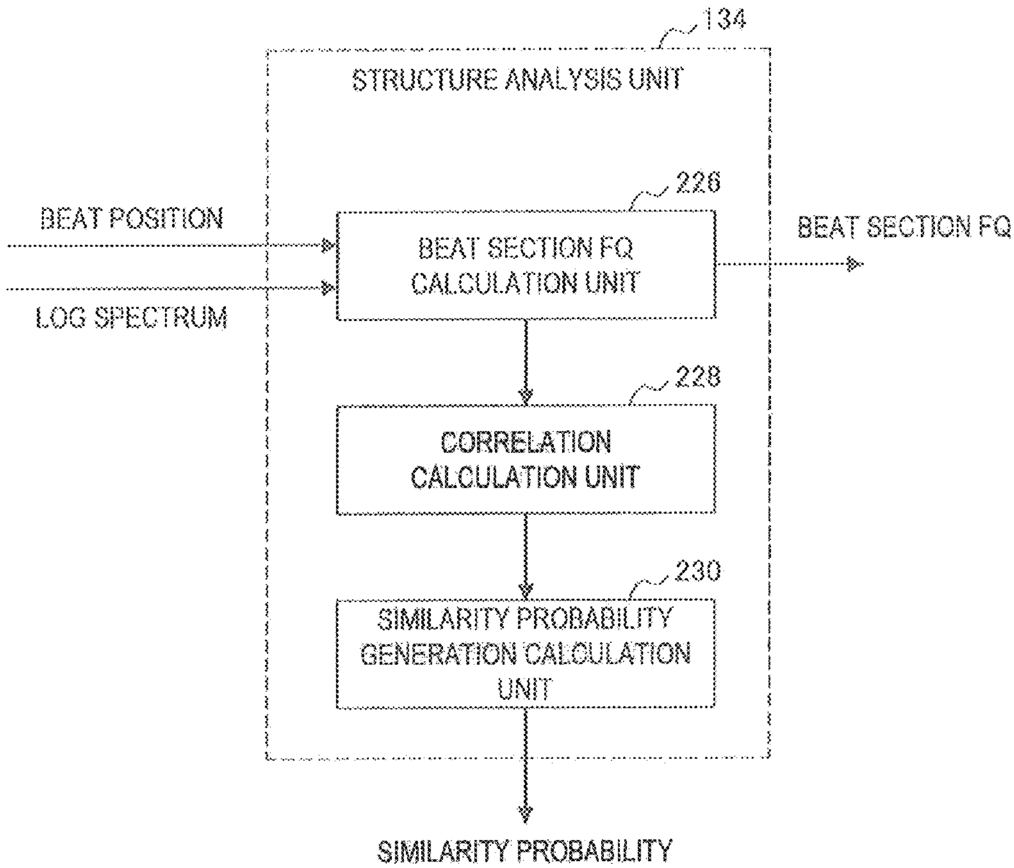
FIG. 32 is an explanatory diagram showing a configuration example of a structure analysis unit according to the present embodiment.

Next, the structure analysis unit 134 will be described. As shown in FIG. 32, the structure analysis unit 134 is input with a log spectrum from the log spectrum analysis unit 108 and beat positions from the beat analysis unit 204. The structure analysis unit 134 calculates similarity probability of sound between beat sections included in the audio signal, based on the log spectrum and the beat positions. As shown in FIG. 32, the structure analysis unit 134 includes a beat section feature quantity calculation unit 226, a correlation calculation unit 228, and a similarity probability generation unit 230.

Figure 33:
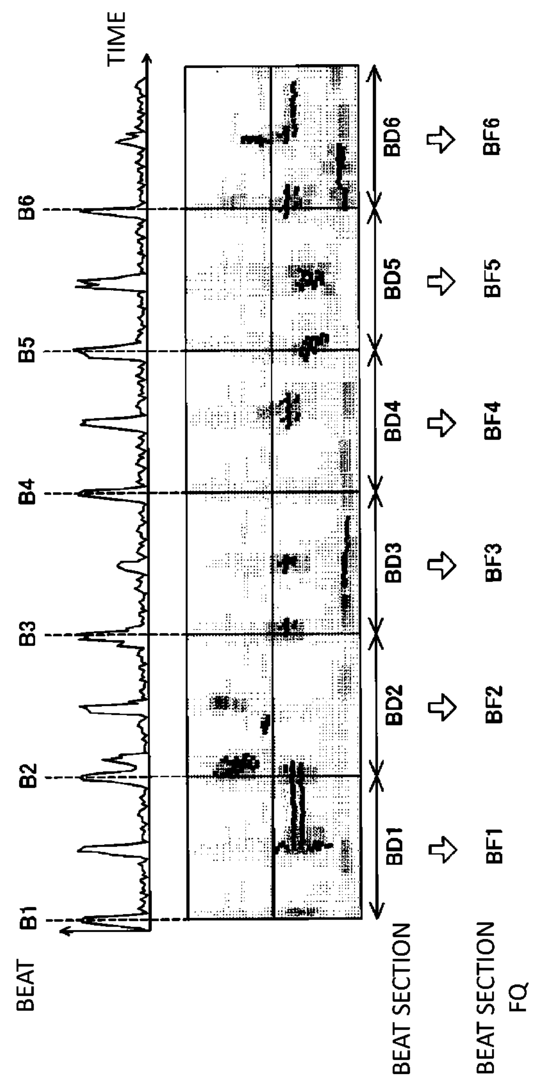
FIG. 33 is an explanatory diagram showing an example of a structure analysis method according to the present embodiment.

The beat section feature quantity calculation unit 226 calculates, with respect to each beat detected by the beat analysis unit 204, a beat section feature quantity representing the feature of a partial log spectrum of a beat section from the beat to the next beat. Here, referring to FIG. 33, a relationship between a beat, a beat section, and a beat section feature quantity will be briefly described. Six beat positions B1 to B6 detected by the beat analysis unit 204 are shown in FIG. 33. In this example, the beat section is a section obtained by dividing the audio signal at the beat positions, and indicates a section from a beat to the next beat. For example, a section BD1 is a beat section from the beat B1 to the beat B2; a section BD2 is a beat section from the beat B2 to the beat B3; and a section BD3 is a beat section from the beat B3 to the beat B4. The beat section feature quantity calculation unit 226 calculates each of beat section feature quantities BF1 to BF6 from a partial log spectrum corresponding to each of the beat sections BD1 to BD6.

Figure 34:
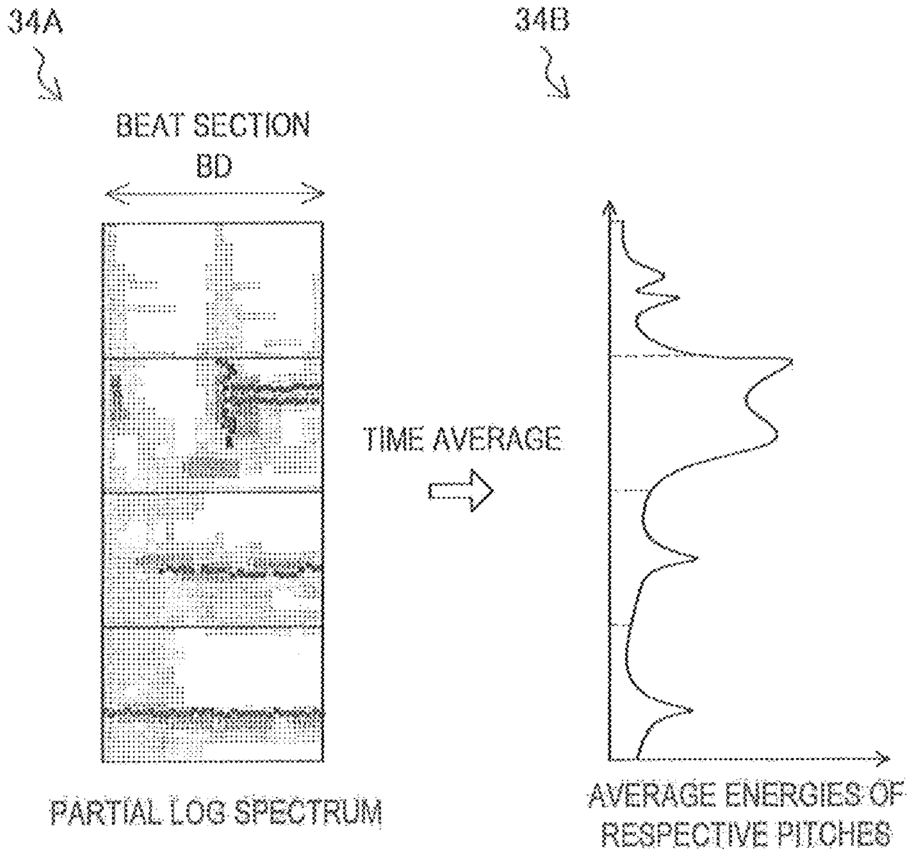
FIG. 34 is an explanatory diagram showing an example of the structure analysis method according to the present embodiment.
Figure 35:
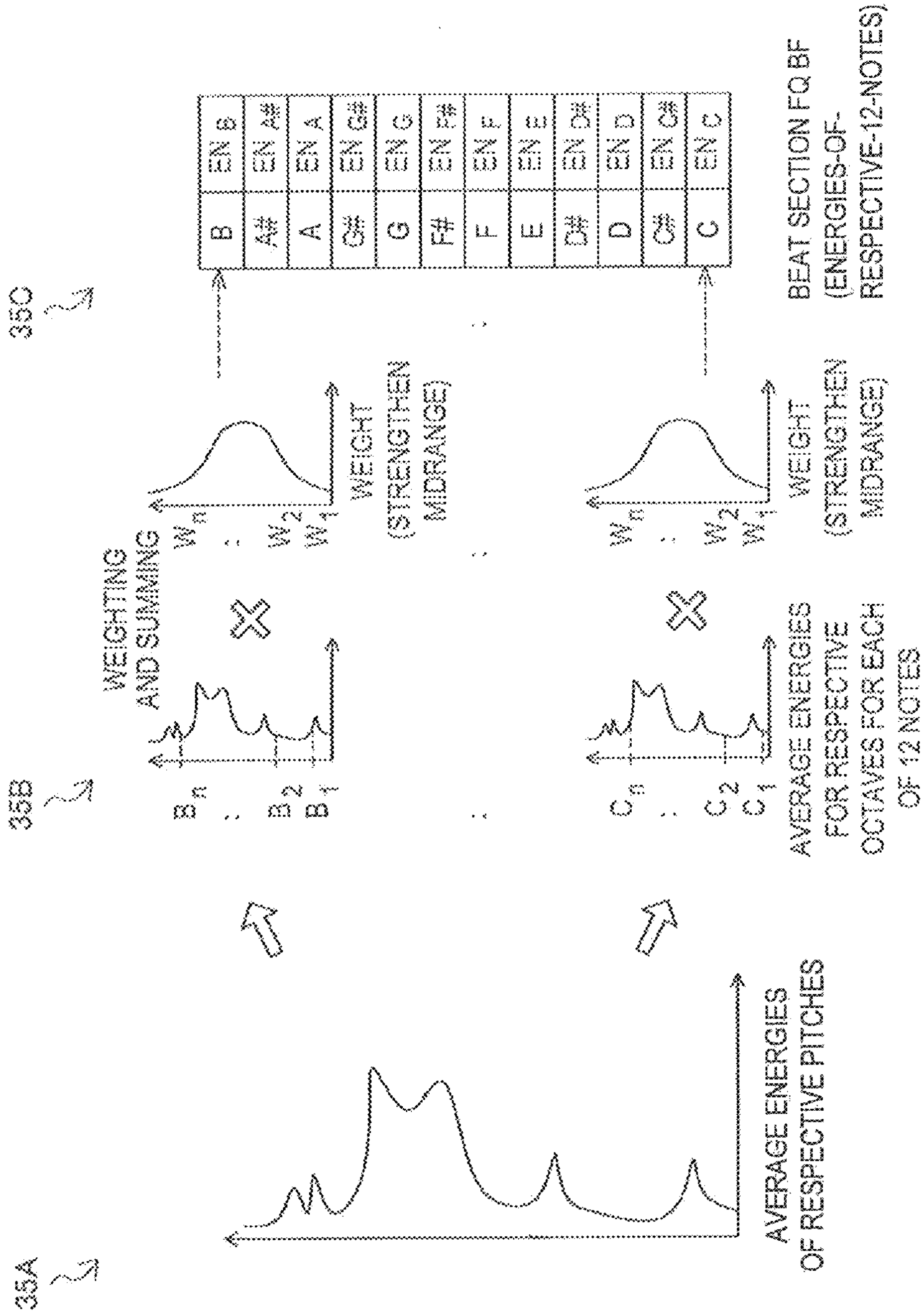
FIG. 35 is an explanatory diagram showing an example of the structure analysis method according to the present embodiment.

The beat section feature quantity calculation unit 226 calculates the beat section feature quantity by methods as shown in FIGS. 34 and 35. In FIG. 34(A), a partial log spectrum of a beat section BD corresponding to a beat cut out by the beat section feature quantity calculation unit 226 is shown. The beat section feature quantity calculation unit 226 time-averages the energies for respective pitches (number of octaves×12 notes) of the partial log spectrum. By this time-averaging, average energies of respective pitches are computed. The levels of the average energies of respective pitches computed by the beat section feature quantity calculation unit 226 are shown in FIG. 34(B).

Next, reference will be made to FIG. 35. The same levels of the average energies of respective pitches as shown in FIG. 34(B) are shown in FIG. 35(A). The beat section feature quantity calculation unit 226 weights and sums, for 12 notes, the values of the average energies of notes bearing the same name in different octaves over several octaves, and computes the energies of respective 12 notes. For example, in the example shown in FIGS. 35(B) and (C), the average energies of notes C ($C_1$, $C_2$, . . . , $C_n$) over n octaves are weighted by using specific weights ($W_1$, $W_2$, . . . , $W_n$) and summed together, and an energy value $En_C$ for the notes C is computed. Furthermore, in the same manner, the average energies of notes B ($B_1$, $B_2$, . . . , $B_n$) over n octaves are weighted by using the specific weights ($W_1$, $W_2$, . . . . $W_n$) and summed together, and an energy value $En_B$ for the notes B is computed. It is likewise for the ten notes (C# to A#) between the note C and the note B. As a result, a 12-dimensional vector having the energy values $EN_C$, $EN_{C\#}$, . . . , $EN_B$ of respective 12 notes as the elements is generated. The beat section feature quantity calculation unit 226 calculates such energies-of-respective-12-notes (a 12-dimensional vector) for each beat as a beat section feature quantity BF, and inputs the same to the correlation calculation unit 228.

The values of weights $W_1$, $W_2$, . . . , $W_n$ for respective octaves used for weighting and summing are preferably larger in the midrange where melody or chord of a common music piece is distinct. This configuration enables the analysis of a music piece structure, reflecting more clearly the feature of the melody or chord.

Figure 36:
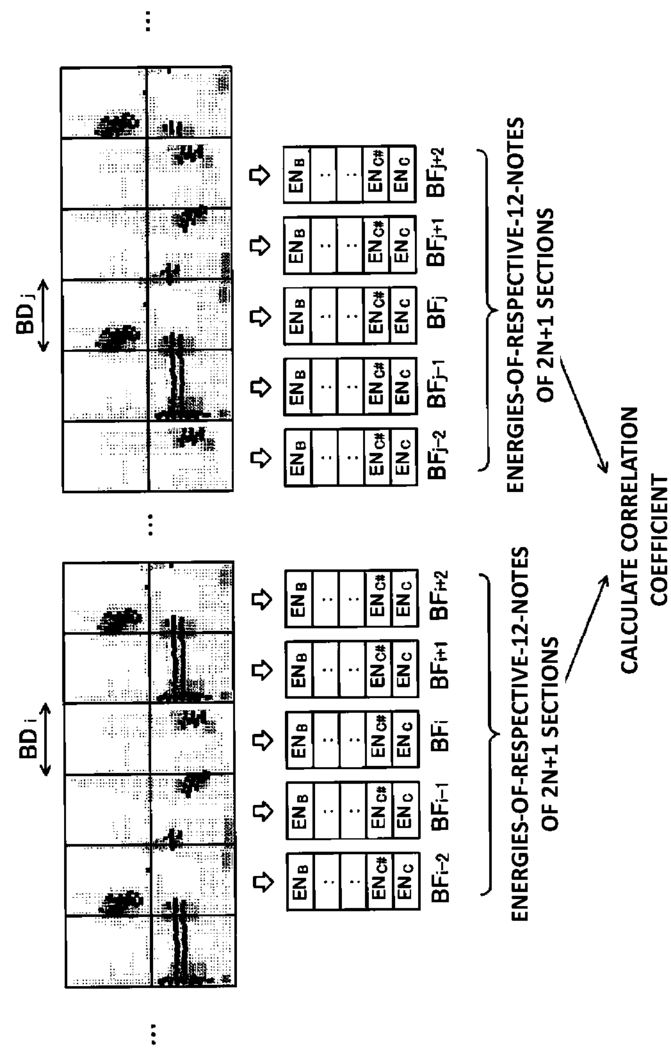
FIG. 36 is an explanatory diagram showing an example of the structure analysis method according to the present embodiment.

The correlation calculation unit 228 calculates, for all the pairs of the beat sections included in the audio signal, the correlation coefficients between the beat sections by using the beat section feature quantity (energies-of-respective-12-notes for each beat section) input from the beat section feature quantity calculation unit 226. For example, the correlation calculation unit 228 calculates the correlation coefficients by a method as shown in FIG. 36. In FIG. 36, a first focused beat section $BD_i$ and a second focused beat section $BD_j$ are shown as an example of a pair of the beat sections, the beat sections being obtained by dividing the log spectrum, for which the correlation coefficient is to be calculated.

For example, to calculate the correlation coefficient between the two focused beat sections, the correlation calculation unit 222 first obtains the energies-of-respective-12-notes of the first focused beat section $BD_i$ and the preceding and following N sections (also referred to as "2N+1 sections") (in the example of FIG. 36, N=2, total 5 sections). Similarly, the correlation calculation unit 228 obtains the energies-of-respective-12-notes of the second focused beat section $BD_j$ and the preceding and following N sections. Then, the correlation calculation unit 228 calculates the correlation coefficient between the obtained energies-of-respective-12-notes of the first focused beat section $BD_i$ and the preceding and following N sections and the obtained energies-of-respective-12-notes of the second focused beat section $BD_j$ and the preceding and following N sections. The correlation calculation unit 228 calculates the correlation coefficient as described for all the pairs of a first focused beat section $BD_i$ and a second focused beat section $BD_j$, and outputs the calculation result to the similarity probability generation unit 230.

Figure 37:
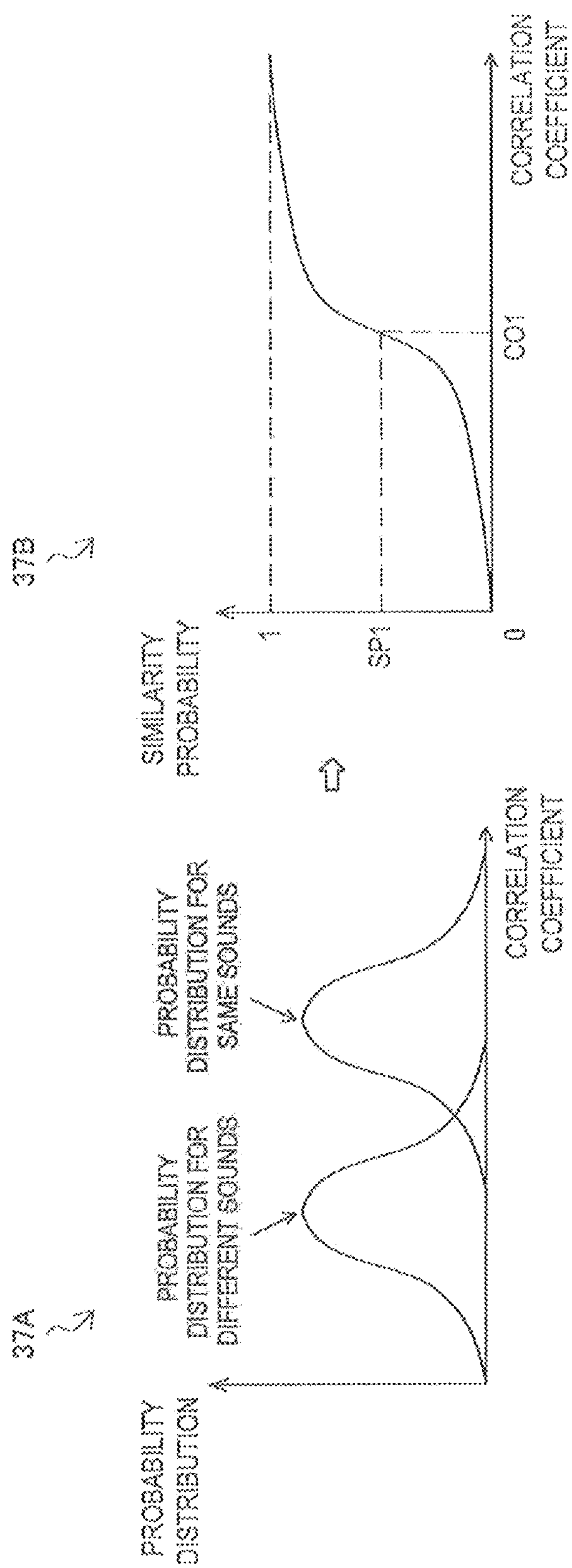
FIG. 37 is an explanatory diagram showing an example of the structure analysis method according to the present embodiment.

The similarity probability generation unit 230 converts the correlation coefficients between the beat sections input from the correlation calculation unit 228 to similarity probabilities by using a conversion curve generated in advance. The similarity probabilities indicate the degree of similarity between the sound contents of the beat sections. A conversion curve used at the time of converting the correlation coefficient to the similarity probability is as shown in FIG. 37, for example.

Two probability distributions obtained in advance are shown in FIG. 37(A). These two probability distributions are a probability distribution of correlation coefficient between beat sections having the same sound contents and a probability distribution of correlation coefficient between beat sections having different sound contents. As can be seen from FIG. 37(A), the probability that the sound contents are the same with each other is lower as the correlation coefficient is lower, and the probability that the sound contents are the same with each other is higher as the correlation coefficient is higher. Thus, a conversion curve as shown in FIG. 37(B) for deriving the similarity probability between the beat sections from the correlation coefficient can be generated in advance. The similarity probability generation unit 230 converts a correlation coefficient CO1 input from the correlation calculation unit 228, for example, to a similarity probability SP1 by using the conversion curve generated in advance in this manner.

Figure 38:
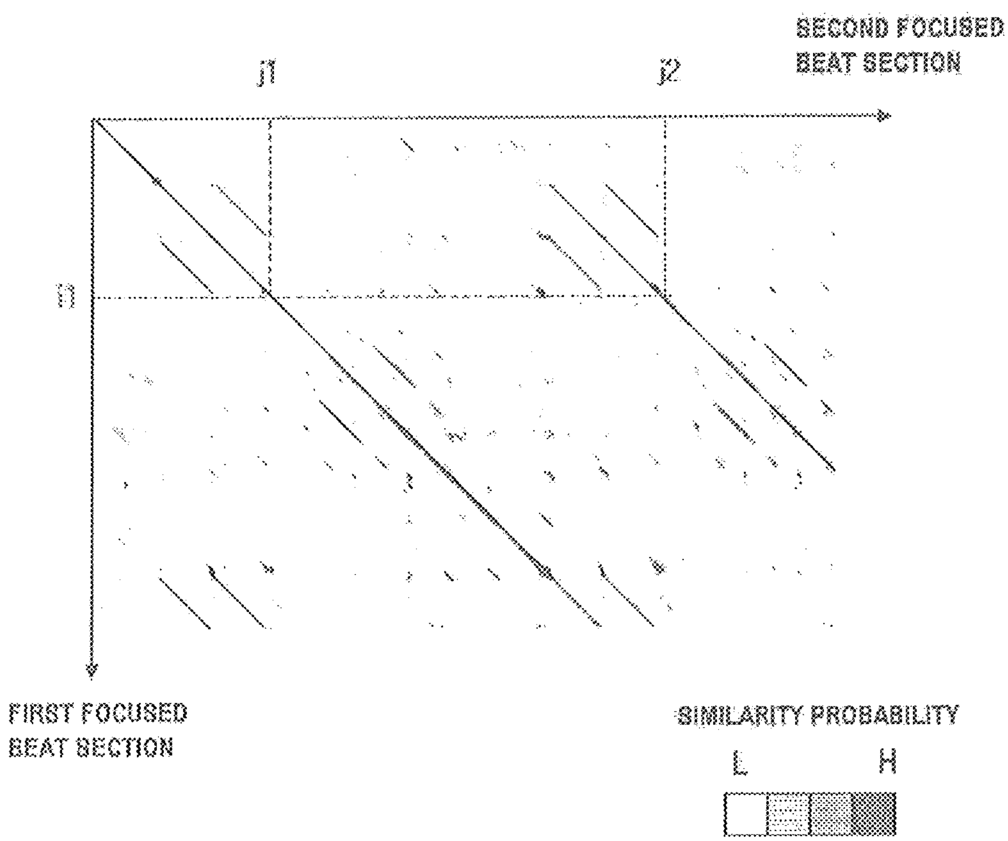
FIG. 38 is an explanatory diagram showing an example of the structure analysis method according to the present embodiment.

The similarity probability which has been converted can be visualized as FIG. 38, for example. The vertical axis of FIG. 38 corresponds to a position in the first focused beat section, and the horizontal axis corresponds to a position in the second focused beat section. Furthermore, the intensity of colours plotted on the two-dimensional plane indicates the degree of similarity probabilities between the first focused beat section and the second focused beat section at the coordinate. For example, the similarity probability between a first focused beat section i1 and a second focused beat section j1, which is substantially the same beat section as the first focused beat section i1, naturally shows a high value, and shows that the beat sections have the same sound contents. When the part of the music piece being played reaches a second focused beat section j2, the similarity probability between the first focused beat section i1 and the second focused beat section j2 again shows a high value. That is, it can be seen that it is highly possible that the sound contents which are approximately the same as that of the first focused beat section i1 are being played in the second focused beat section j2. The similarity probabilities between the beat sections obtained by the structure analysis unit 134 in this manner are input to the bar detection unit 140 and the chord progression detection unit 142 described later.

Moreover, in the present embodiment, since the time averages of the energies in a beat section are used for the calculation of the beat section feature quantity, information relating a temporal change in the log spectrum in the beat section is not taken into consideration for the analysis of a music piece structure by the structure analysis unit 134. That is, even if the same melody is played in two beat sections, being temporally shifted from each other (due to the arrangement by a player, for example), the played contents are decided to be the same as long as the shift occurs only within a beat section.

When the similarity probability between the beat sections is computed in this manner, the structure analysis unit 134 divides the music data in beat sections with high similarity probability and analyses the music structure for each divided section. For example, the technology disclosed in JP-A-2007-156434 can be used for the music structure analysis method. First, the structure analysis unit 134 extracts a specific feature quantity for each divided section. The feature quantity to be extracted here may be the volume of each divided section, information relating to sound sources, balance of frequency, number of instrument sounds, proportion of each instrument sound, or the like, for example. Also, the number of times of appearance or repetition or the like of beat sections with high similarity probability is referred to as the feature quantity for each divided section. Learning processing by a learning algorithm is performed for the feature quantity, and a calculation formula for computing the music structure from the log spectrum of each divided section is generated.

At the time of the learning processing, a partial log spectrum of a refrain portion is provided to the learning algorithm as the evaluation data, and a decision value indicating the refrain portion is provided as the teacher data, for example. Also for an introduction portion, an episode portion, an A melody portion, a B melody portion or the like, a calculation formula for computing the decision value or decision probability for each portion can be obtained by providing the log spectrum of each portion as the evaluation data and the decision value indicating each portion as the teacher data. The structure analysis unit 134 inputs a partial log spectrum to the generated calculation formula and extracts the music structure of each divided section. As a result, an analysis result of the music structure as shown in FIG. 39 is obtained. The analysis result of the music structure obtained in this manner is stored in the metadata storage unit 112. Moreover, in FIG. 39. Intro indicates the introduction portion, and Verse A indicates the A melody portion. Also, Chorus indicates the refrain portion. In the example of FIG. 39, it can be seen that the intro starts at time 0 ms, and the refrain starts at time 72595 ms.

(2-4-3. Chord Probability Detection Unit 136)

Figure 40:
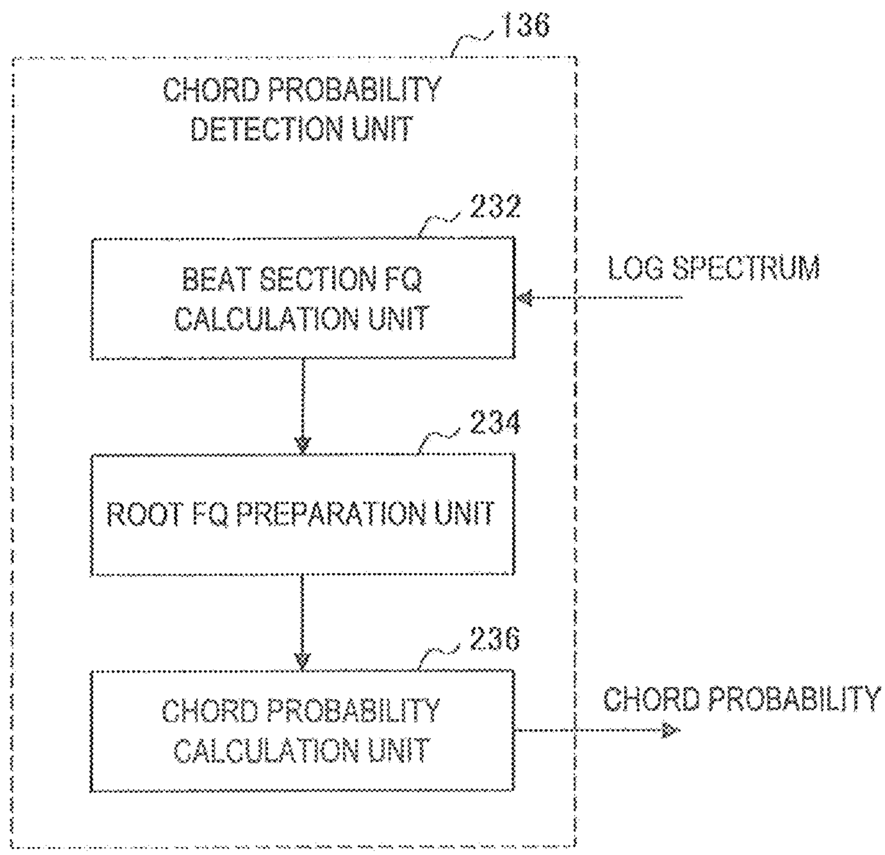
FIG. 40 is an explanatory diagram showing a configuration example of a chord probability detection unit according to the present embodiment.

Next, the chord probability detection unit 136 will be described. The chord probability detection unit 136 computes a probability (hereinafter, chord probability) of each chord being played in the beat section of each beat detected by the beat analysis unit 204. The chord probability computed by the chord probability detection unit 136 is used for the key detection process by the key detection unit 138. Furthermore, as shown in FIG. 40, the chord probability detection unit 136 includes a beat section feature quantity calculation unit 232, a root feature quantity preparation unit 234, and a chord probability calculation unit 236.

As described above, the information on the beat positions detected by the beat detection unit 132 and the log spectrum are input to the chord probability detection unit 136. Thus, the beat section feature quantity calculation unit 232 calculates energies-of-respective-12-notes as beat section feature quantity representing the feature of the audio signal in a beat section, with respect to each beat detected by the beat analysis unit 204. The beat section feature quantity calculation unit 232 calculates the energies-of-respective-12-notes as the beat section feature quantity, and inputs the same to the root feature quantity preparation unit 234. The root feature quantity preparation unit 234 generates root feature quantity to be used for the computation of the chord probability for each beat section based on the energies-of-respective-12-notes input from the beat section feature quantity calculation unit 232. For example, the root feature quantity preparation unit 234 generates the root feature quantity by methods shown in FIGS. 41 and 42.

Figure 41:
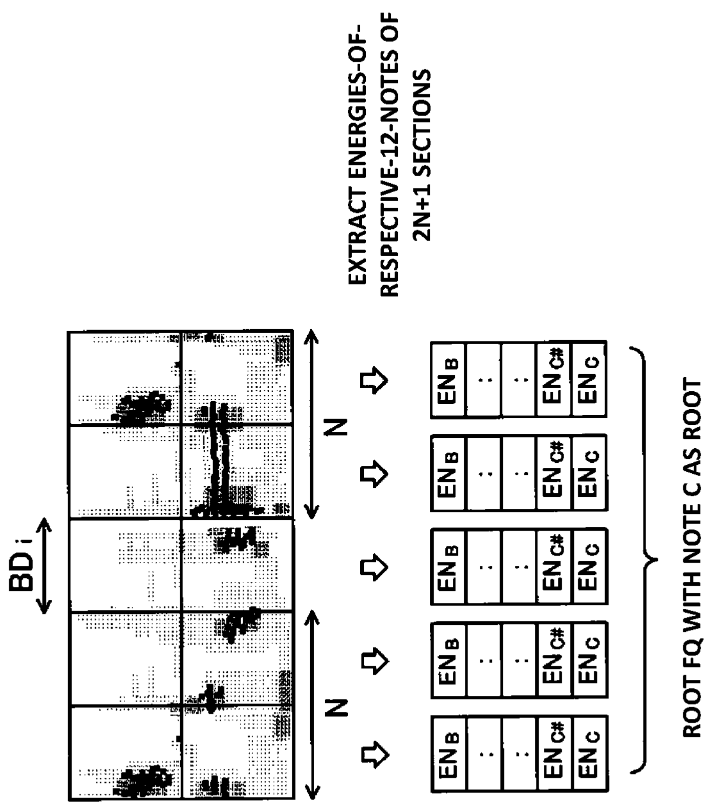
FIG. 41 is an explanatory diagram showing an example of a chord probability detection method according to the present embodiment.
Figure 42:
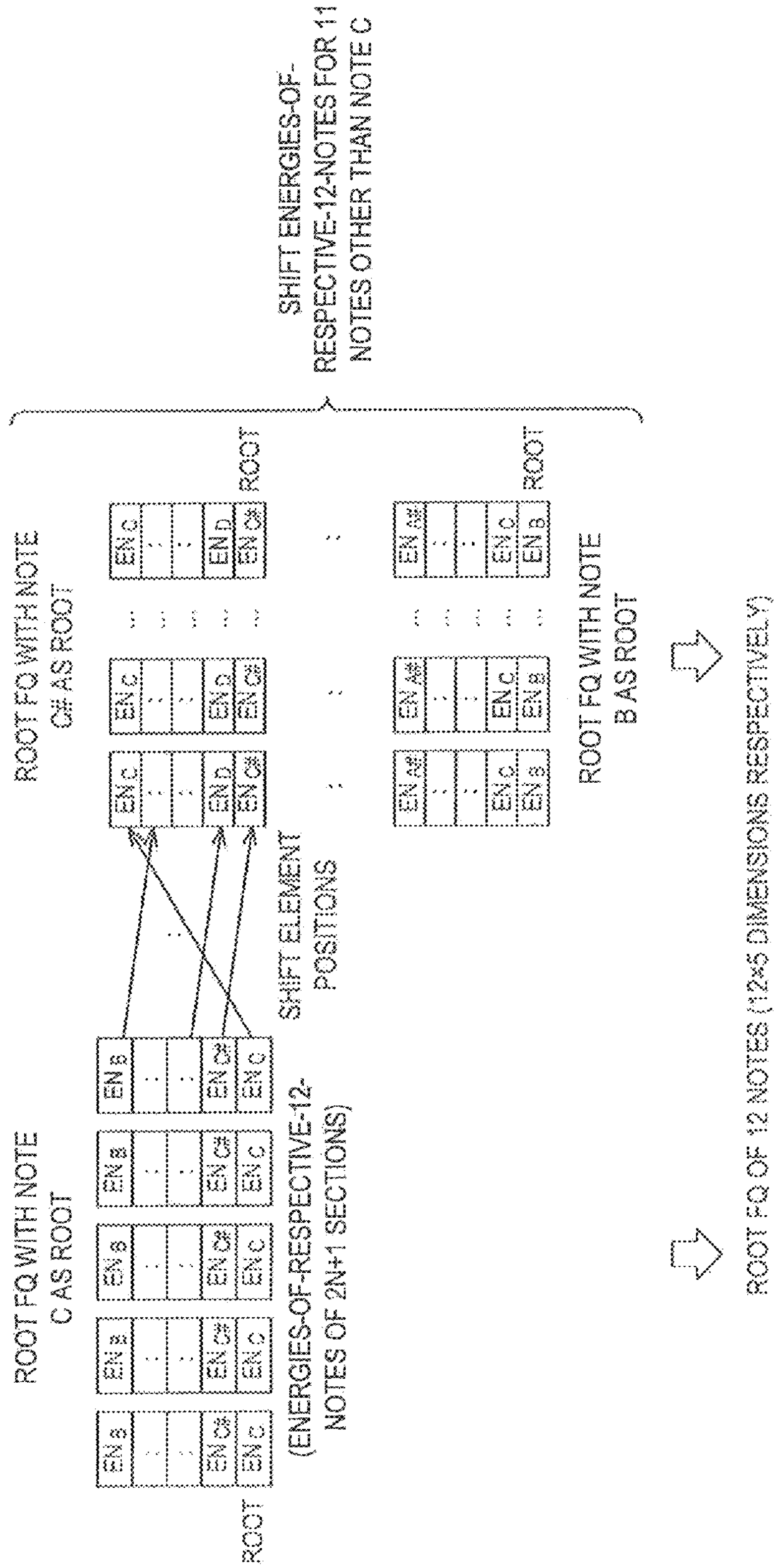
FIG. 42 is an explanatory diagram showing an example of the chord probability detection method according to the present embodiment.

First, the root feature quantity preparation unit 234 extracts, for a focused beat section $BD_i$, the energies-of-respective-12-notes of the focused beat section $BD_i$ and the preceding and following N sections (refer to FIG. 41). The energies-of-respective-12-notes of the focused beat section $BD_i$ and the preceding and following N sections can be considered as a feature quantity with the note C as the root (fundamental note) of the chord. In the example of FIG. 41, since N is 2, a root feature quantity for five sections (12×5 dimensions) having the note C as the root is extracted. Next, the root feature quantity preparation unit 234 generates 11 separate root feature quantities, each for five sections and each having any of note C# to note B as the root, by shifting by a specific number the element positions of the 12 notes of the root feature quantity for five sections having the note C as the root (refer to FIG. 41). Moreover, the number of shifts by which the element position are shifted is 1 for a case where the note C# is the root, 2 for a case where the note D is the root, . . . , and 11 for a case where the note Bis the root. As a result, the root feature quantities (12×5-dimensional, respectively), each having one of the 12 notes from the note C to the note B as the root, are generated for the respective 12 notes by the root feature quantity preparation unit 234.

The root feature quantity preparation unit 234 performs the root feature quantity generation process as described above for all the beat sections, and prepares a root feature quantity used for the computation of the chord probability for each section. Moreover, in the examples of FIGS. 41 and 42, a feature quantity prepared for one beat section is a 12×5×12-dimensional vector. The root feature quantities generated by the root feature quantity preparation unit 234 are input to the chord probability calculation unit 236. The chord probability calculation unit 236 computes, for each beat section, a probability (chord probability) of each chord being played, by using the root feature quantities input from the root feature quantity preparation unit 234. "Each chord" here means each of the chords distinguished based on the root (C, C#, D, . . . ), the number of constituent notes (a triad, a 7th chord, a 9th chord), the tonality (major/minor), or the like, for example. A chord probability formula learnt in advance by a logistic regression analysis can be used for the computation of the chord probability, for example.

Figure 43:
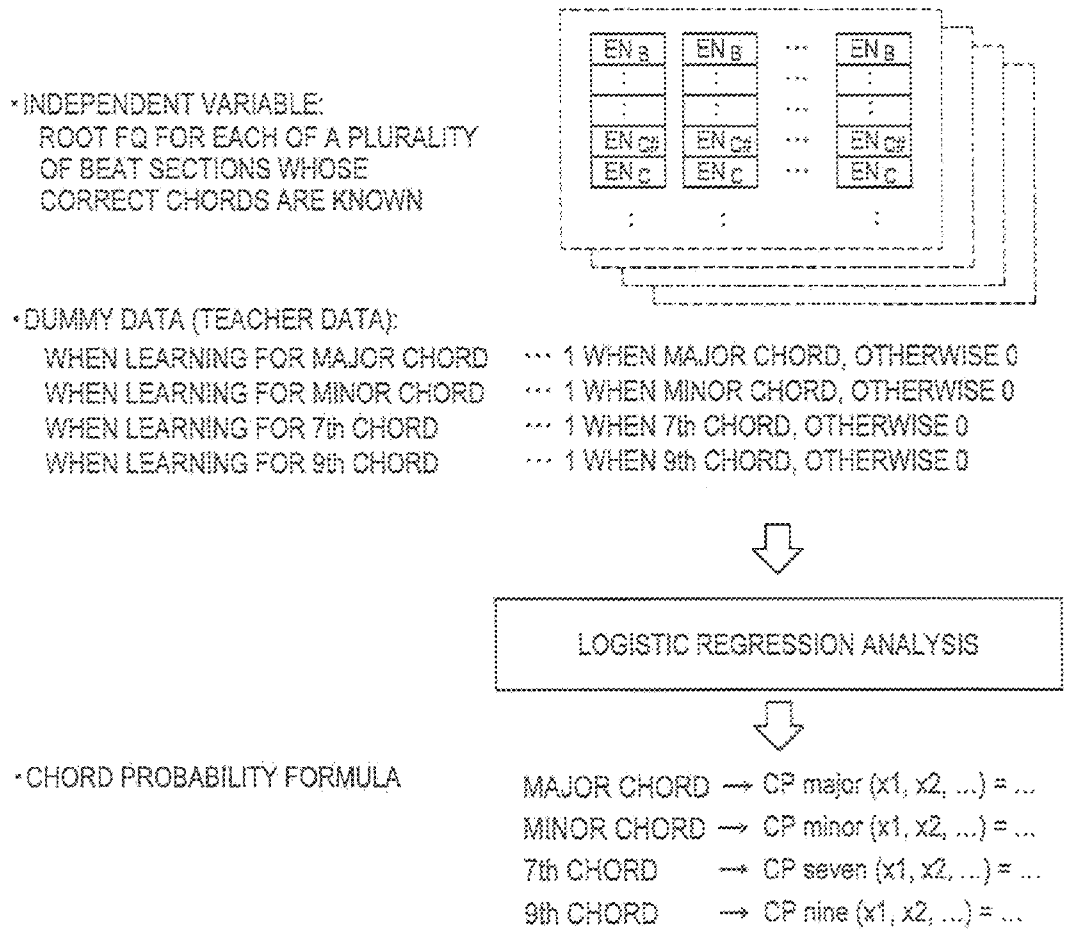
FIG. 43 is an explanatory diagram showing an example of the chord probability detection method according to the present embodiment.

For example, the chord probability calculation unit 236 generates the chord probability formula to be used for the calculation of the chord probability by a method shown in FIG. 43. The learning of the chord probability formula is performed for each type of chord. That is, a learning process described below is performed for each of a chord probability formula for a major chord, a chord probability formula for a minor chord, a chord probability formula for a 7th chord and a chord probability formula for a 9th chord, for example.

First, a plurality of root feature quantities (for example, 12×5×12-dimensional vectors described by using FIG. 42), each for a beat section whose correct chord is known, are provided as independent variables for the logistic regression analysis. Furthermore, dummy data for predicting the generation probability by the logistic regression analysis is provided for each of the root feature quantity for each beat section. For example, when learning the chord probability formula for a major chord, the value of the dummy data will be a true value (1) if a known chord is a major chord, and a false value (0) for any other case. On the other hand, when learning the chord probability formula for a minor chord, the value of the dummy data will be a true value (1) if a known chord is a minor chord, and a false value (0) for any other case. The same can be said for the 7th chord and the 9th chord.

Figure 44:
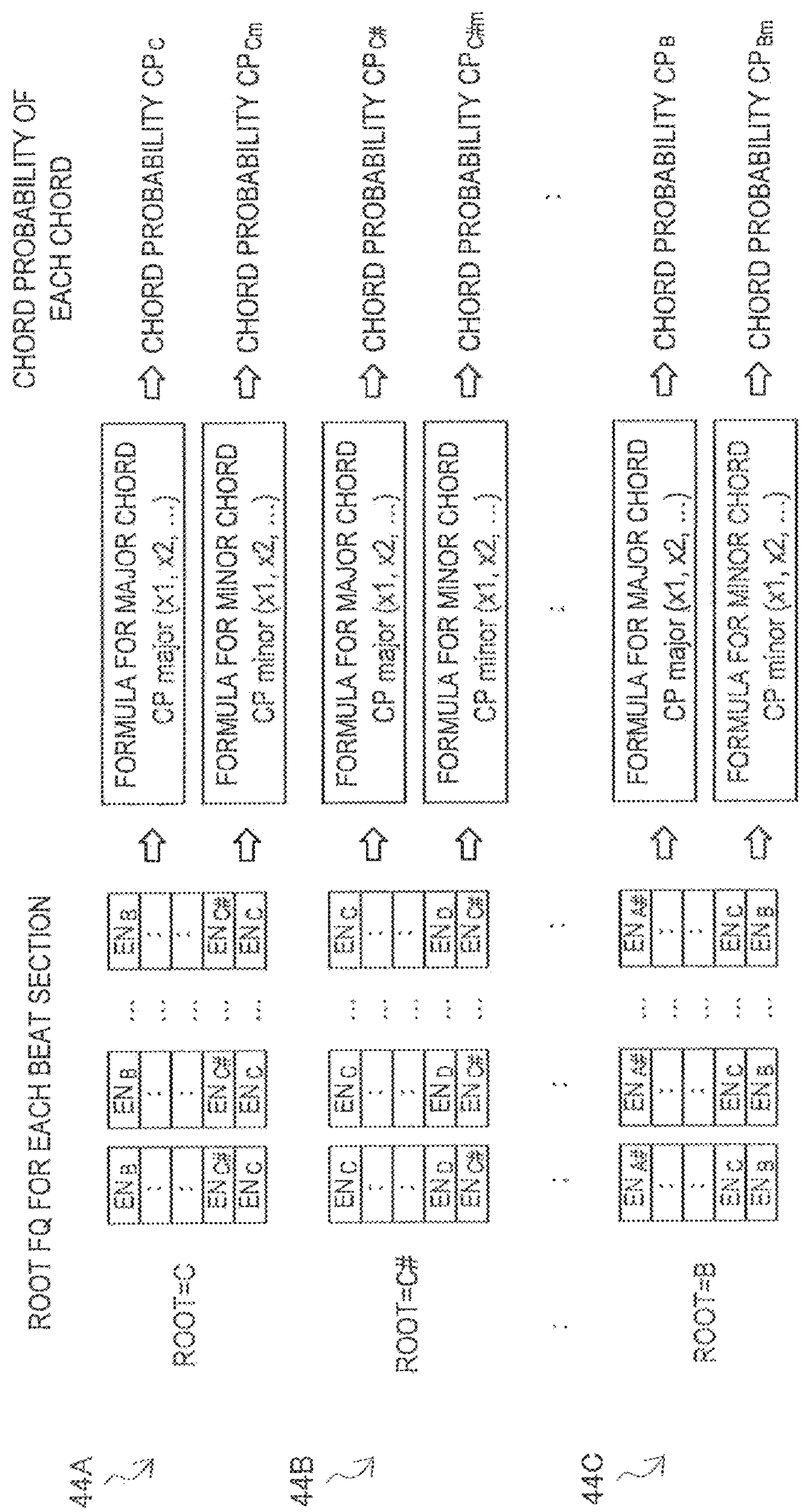
FIG. 44 is an explanatory diagram showing an example of the chord probability detection method according to the present embodiment.

By performing the logistic regression analysis for a sufficient number of the root feature quantities, each for a beat section, by using the independent variables and the dummy data as described above, chord probability formulae for computing the chord probabilities from the root feature quantity for each beat section are generated. Then, the chord probability calculation unit 236 applies the root feature quantities input from the root feature quantity preparation unit 234 to the generated chord probability formulae, and sequentially computes the chord probabilities for respective types of chords for each beat section. The chord probability calculation process by the chord probability calculation unit 236 is performed by a method as shown in FIG. 44, for example. In FIG. 44(A), a root feature quantity with the note C as the root, among the root feature quantity for each beat section, is shown.

For example, the chord probability calculation unit 236 applies the chord probability formula for a major chord to the root feature quantity with the note C as the root, and calculates a chord probability $CP_C$ of the chord being "C" for each beat section. Furthermore, the chord probability calculation unit 236 applies the chord probability formula for a minor chord to the root feature quantity with the note C as the root, and calculates a chord probability $CP_{Cm}$ of the chord being "Cm" for the beat section. In a similar manner, the chord probability calculation unit 236 applies the chord probability formula for a major chord and the chord probability formula for a minor chord to the root feature quantity with the note C# as the root, and can calculate a chord probability $CP_{C\#}$ for the chord "C#" and a chord probability $CP_{C\#m}$ for the chord "C#m" (B). A chord probability $CP_B$ for the chord "B" and a chord probability $CP_{Bm}$ for the chord "Bin" are calculated in the same manner (C).

Figure 45:
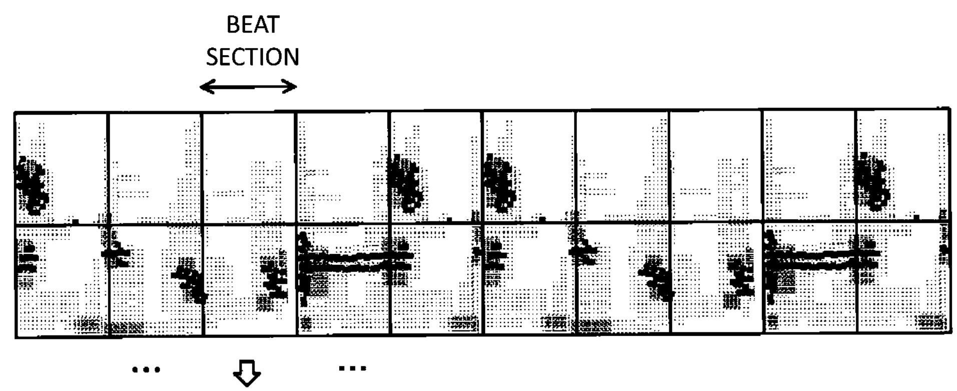
FIG. 45 is an explanatory diagram showing an example of the chord probability detection method according to the present embodiment.

The chord probability as shown in FIG. 45 is computed by the chord probability calculation unit 236 by the above-described method. Referring to FIG. 45, the chord probability is calculated, for a certain beat section, for chords, such as "Maj (major)," "m (minor)," 7 (7th)," and "m7 minor 7th)," for each of the 12 notes from the note C to the note B. According to the example of FIG. 45, the chord probability $CP_C$ is 0.88, the chord probability $CP_{Cm}$ is 0.08, the chord probability $CP_{C7}$ is 0.01, the chord probability $CP_{Cm7}$ is 0.02, and the chord probability $CP_B$ is 0.01. Chord probability values for other types all indicate 0. Moreover, after calculating the chord probability for a plurality of types of chords in the above-described manner, the chord probability calculation unit 236 normalizes the probability values in such a way that the total of the computed probability values becomes 1 per beat section. The calculation and normalization processes for the chord probabilities by the chord probability calculation unit 236 as described above are repeated for all the beat sections included in the audio signal.

The chord probability is computed by the chord probability detection unit 136 by the processes by the beat section feature quantity calculation unit 232, the root feature quantity preparation unit 234 and the chord probability calculation unit 236 as described above. Then, the chord probability computed by the chord probability detection unit 136 is input to the key detection unit 138, (2-4-4. Configuration of Key Detection Unit 138)

Figure 46:
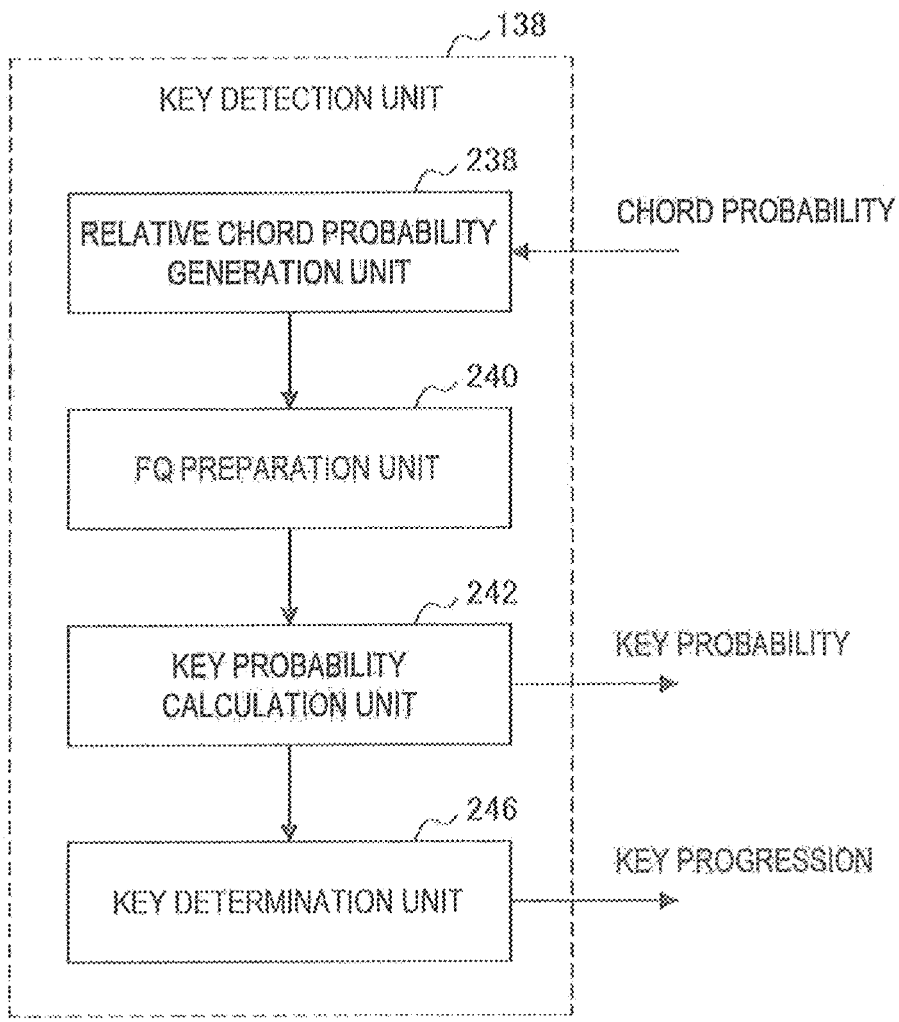
FIG. 46 is an explanatory diagram showing a configuration example of a key detection unit according to the present embodiment.

Next, the configuration of the key detection unit 138 will be described. As described above, the chord probability computed by the chord probability detection unit 136 is input to the key detection unit 138. The key detection unit 138 is means for detecting the key (tonality/basic scale) for each beat section by using the chord probability computed by the chord probability detection unit 136 for each beat section. As shown in FIG. 46, the key detection unit 138 includes a relative chord probability generation unit 238, a feature quantity preparation unit 240, a key probability calculation unit 242, and a key determination unit 246.

Figure 47:
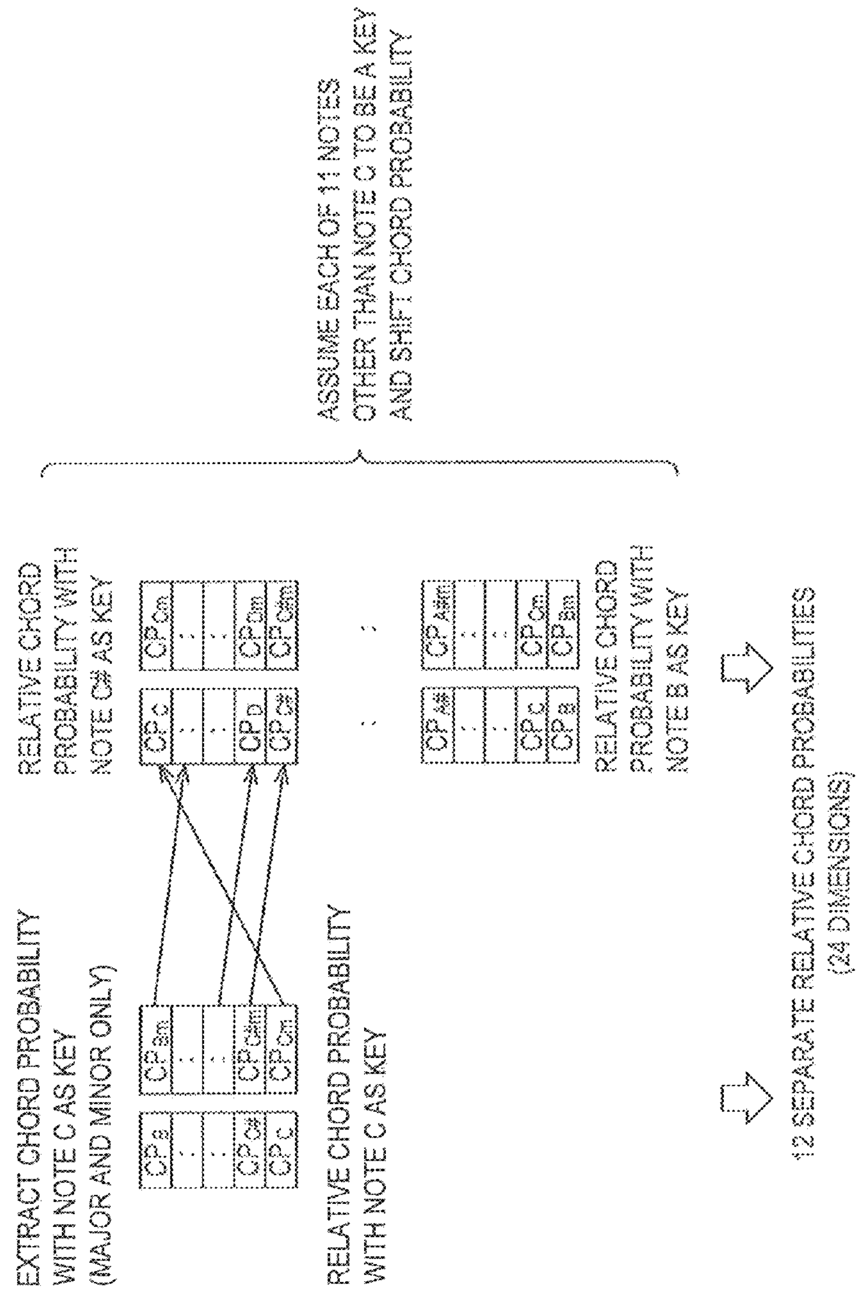
FIG. 47 is an explanatory diagram showing an example of a key detection method according to the present embodiment.

First, the chord probability is input to the relative chord probability generation unit 238 by the chord probability detection unit 136. The relative chord probability generation unit 238 generates a relative chord probability used for the computation of the key probability for each beat section, from the chord probability for each beat section that is input from the chord probability detection unit 136. For example, the relative chord probability generation unit 238 generates the relative chord probability by a method as shown in FIG. 47. First, the relative chord probability generation unit 238 extracts the chord probability relating to the major chord and the minor chord from the chord probability for a certain focused beat section. The chord probability values extracted here are expressed as a vector of total 24 dimensions, i.e. 12 notes for the major chord and 12 notes for the minor chord. Hereunder, the 24-dimensional vector including the chord probability values extracted here will be treated as the relative chord probability with the note C assumed to be the key.

Next, the relative chord probability generation unit 238 shifts, by a specific number, the element positions of the 12 notes of the extracted chord probability values for the major chord and the minor chord. By shifting in this manner, 11 separate relative chord probabilities are generated. Moreover, the number of shifts by which the element positions are shifted is the same as the number of shifts at the time of generation of the root feature quantities as described using FIG. 42. In this manner, 12 separate relative chord probabilities, each assuming one of the 12 notes from the note C to the note B as the key, are generated by the relative chord probability generation unit 238. The relative chord probability generation unit 238 performs the relative chord probability generation process as described for all the beat sections, and inputs the generated relative chord probabilities to the feature quantity preparation unit 240.

The feature quantity preparation unit 240 generates a feature quantity to be used for the computation of the key probability for each beat section. A chord appearance score and a chord transition appearance score for each beat section that are generated from the relative chord probability input to the feature quantity preparation unit 240 from the relative chord probability generation unit 238 are used as the feature quantity to be generated by the feature quantity preparation unit 240.

Figure 48:
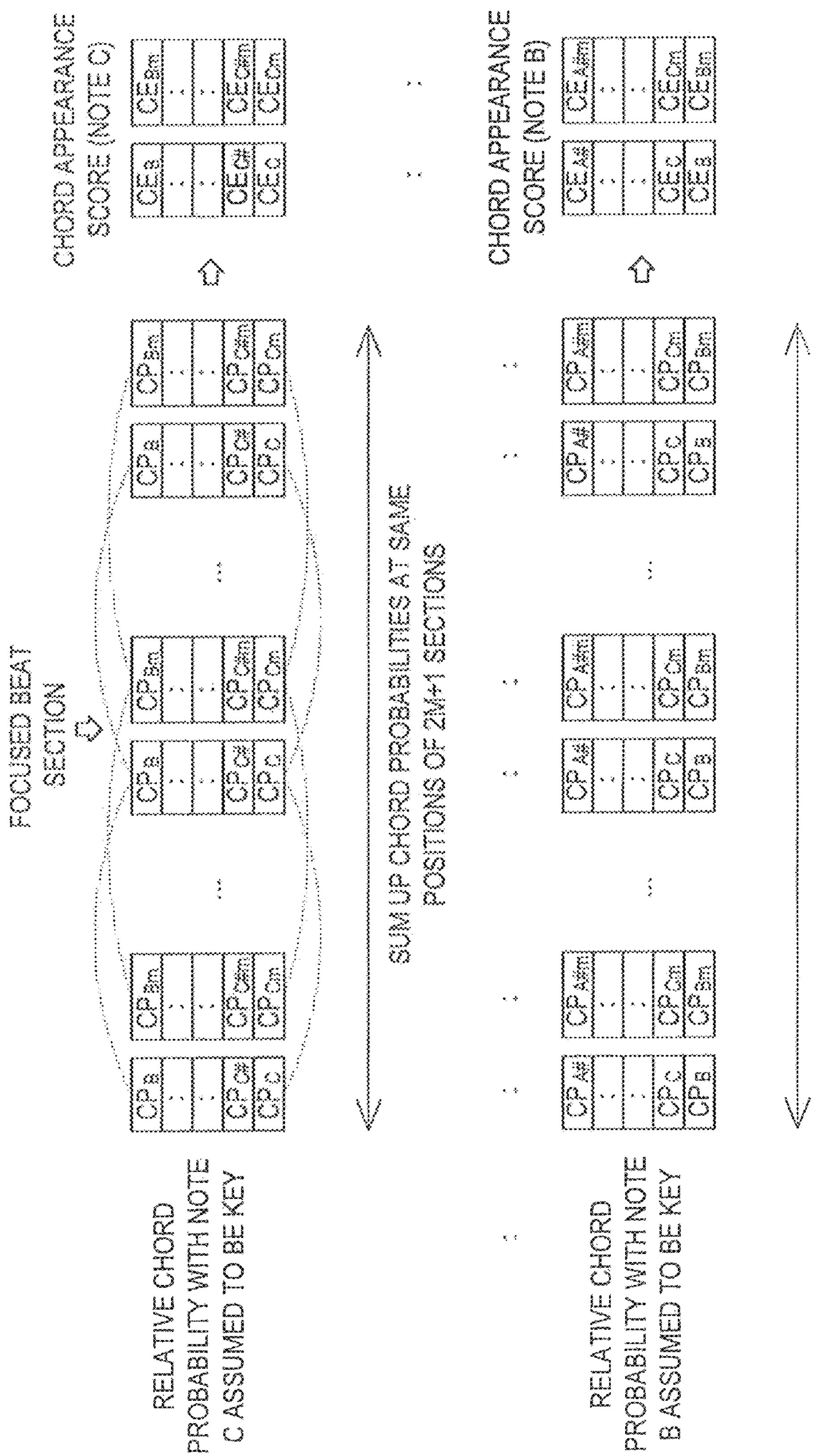
FIG. 48 is an explanatory diagram showing an example of the key detection method according to the present embodiment.

First, the feature quantity preparation unit 240 generates the chord appearance score for each beat section by a method as shown in FIG. 48. First, the feature quantity preparation unit 240 provides relative chord probabilities CP, with the note C assumed to be the key, for the focused beat section and the preceding and following M beat sections. Then, the feature quantity preparation unit 240 sums up, across the focused beat section and the preceding and following 1\4 sections, the probability values of the elements at the same position, the probability values being included in the relative chord probabilities with the note C assumed to be the key. As a result, a chord appearance score ($CE_C$, $CE_{C\#}$, . . . , $CE_{Bm}$) (24-dimensional vector) is obtained, which is in accordance with the appearance probability of each chord, the appearance probability being for the focused beat section and a plurality of beat sections around the focused beat section and assuming the note C to be the key. The feature quantity preparation unit 240 performs the calculation of the chord appearance score as described above for cases each assuming one of the 12 notes from the note C to the note B to be the key. According to this calculation, 12 separate chord appearance scores are obtained for one focused beat section.

Figure 49:
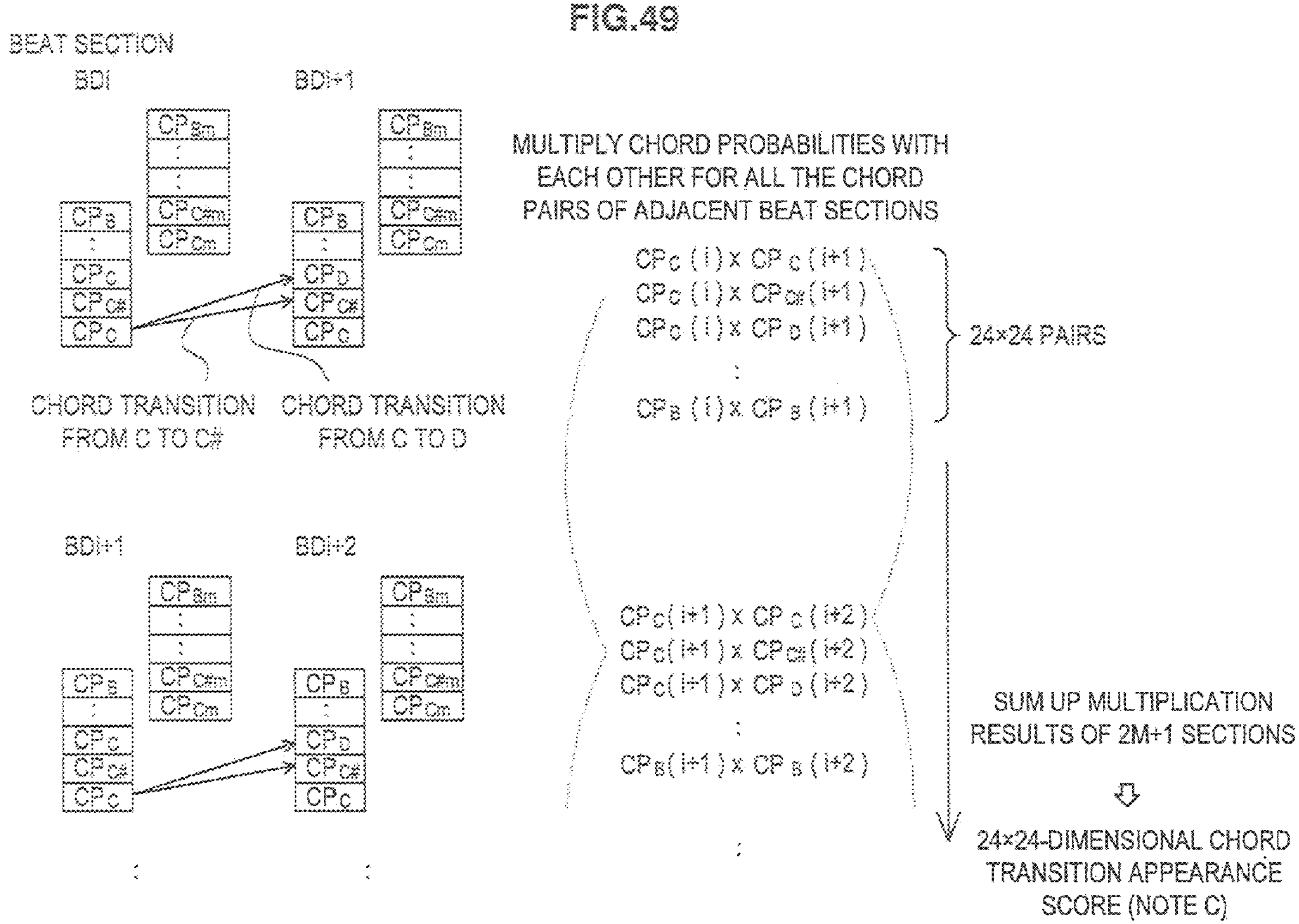
FIG. 49 is an explanatory diagram showing an example of the key detection method according to the present embodiment.

Next, the feature quantity preparation unit 240 generates the chord transition appearance score for each beat section by a method as shown in FIG. 49. First, the feature quantity preparation unit 240 first multiplies with each other the relative chord probabilities before and after the chord transition, the relative chord probabilities assuming the note C to be the key, with respect to all the pairs of chords (all the chord transitions) between a beat section $BD_i$ and an adjacent beat section $BD_{i+1}$. Here, "all the pairs of the chords" means the 24×24 pairs, i.e. "C"→"C," "C"→"C#," "C"→"D," . . . , "B"→"B." Next, the feature quantity preparation unit 240 sums up the multiplication results of the relative chord probabilities before and after the chord transition for over the focused beat section and the preceding and following M sections. As a result, a 24×24-dimensional chord transition appearance score (a 24×24-dimensional vector) is obtained, which is in accordance with the appearance probability of each chord transition, the appearance probability being for the focused beat section and a plurality of beat sections around the focused beat section and assuming the note C to be the key. For example, a chord transition appearance score $CT_{C \to C\#(i)}$ regarding the chord transition from "C" to "C#" for a focused beat section $BD_i$ is given by the following equation (10).

[Equation 9]

$$CT_{C \to C\#}(i) = CP_C(i-M) \cdot CP_{C\#}(i-M+1) + \ldots + CP_C(i+M) \cdot CP_{C\#}(i+M+1) \quad (10)$$

In this manner, the feature quantity preparation unit 240 performs the above-described 24×24 separate calculations for the chord transition appearance score CT for each case assuming one of the 12 notes from the note C to the note B to be the key. According to this calculation, 12 separate chord transition appearance scores are obtained for one focused beat section. Moreover, unlike the chord which is apt to change for each bar, for example, the key of a music piece remains unchanged, in many cases, for a longer period. Thus, the value of M defining the range of relative chord probabilities to be used for the computation of the chord appearance score or the chord transition appearance score is suitably a value which may include a number of bars such as several tens of beats, for example. The feature quantity preparation unit 240 inputs, as the feature quantity for calculating the key probability, the 24-dimensional chord appearance score CE and the 24×24-dimensional chord transition appearance score that are calculated for each beat section to the key probability calculation unit 242.

Figure 50:
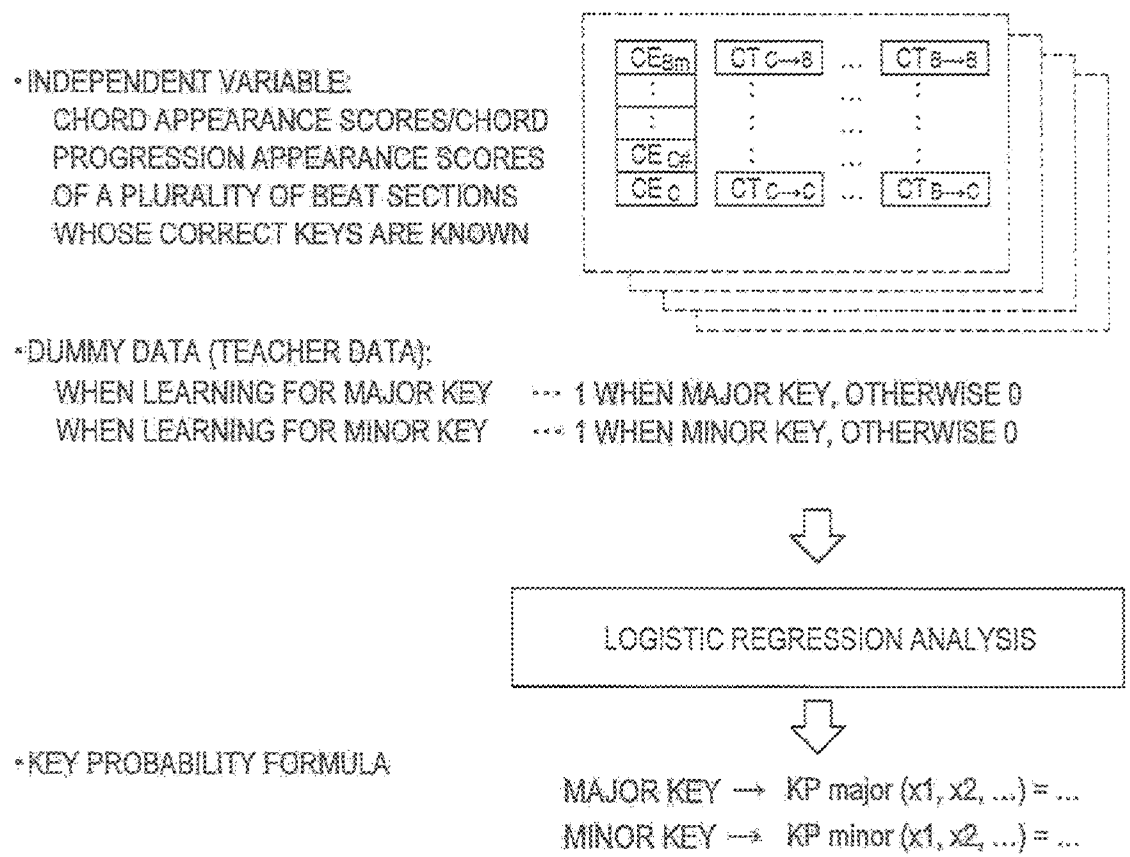
FIG. 50 is an explanatory diagram showing an example of the key detection method according to the present embodiment.

The key probability calculation unit 242 computes, for each beat section, the key probability indicating the probability of each key being played, by using the chord appearance score and the chord transition appearance score input from the feature quantity preparation unit 240. "Each key" means a key distinguished based on, for example, the 12 notes (C, C#, D, . . . ) or the tonality (major/minor). For example, a key probability formula learnt in advance by the logistic regression analysis is used for the calculation of the key probability. For example, the key probability calculation unit 242 generates the key probability formula to be used for the calculation of the key probability by a method as shown in FIG. 50. The learning of the key probability formula is performed independently for the major key and the minor key. Accordingly, a major key probability formula and a minor key probability formula are generated.

As shown in FIG. 50, a plurality of chord appearance scores and chord progression appearance scores for respective beat sections whose correct keys are known are provided as the independent variables in the logistic regression analysis. Next, dummy data for predicting the generation probability by the logistic regression analysis is provided for each of the provided pairs of the chord appearance score and the chord progression appearance score. For example, when learning the major key probability formula, the value of the dummy data will be a true value (1) if a known key is a major key, and a false value (0) for any other case. Also, when learning the minor key probability formula, the value of the dummy data will be a true value (1) if a known key is a minor key, and a false value (0) for any other case.

Figure 51:
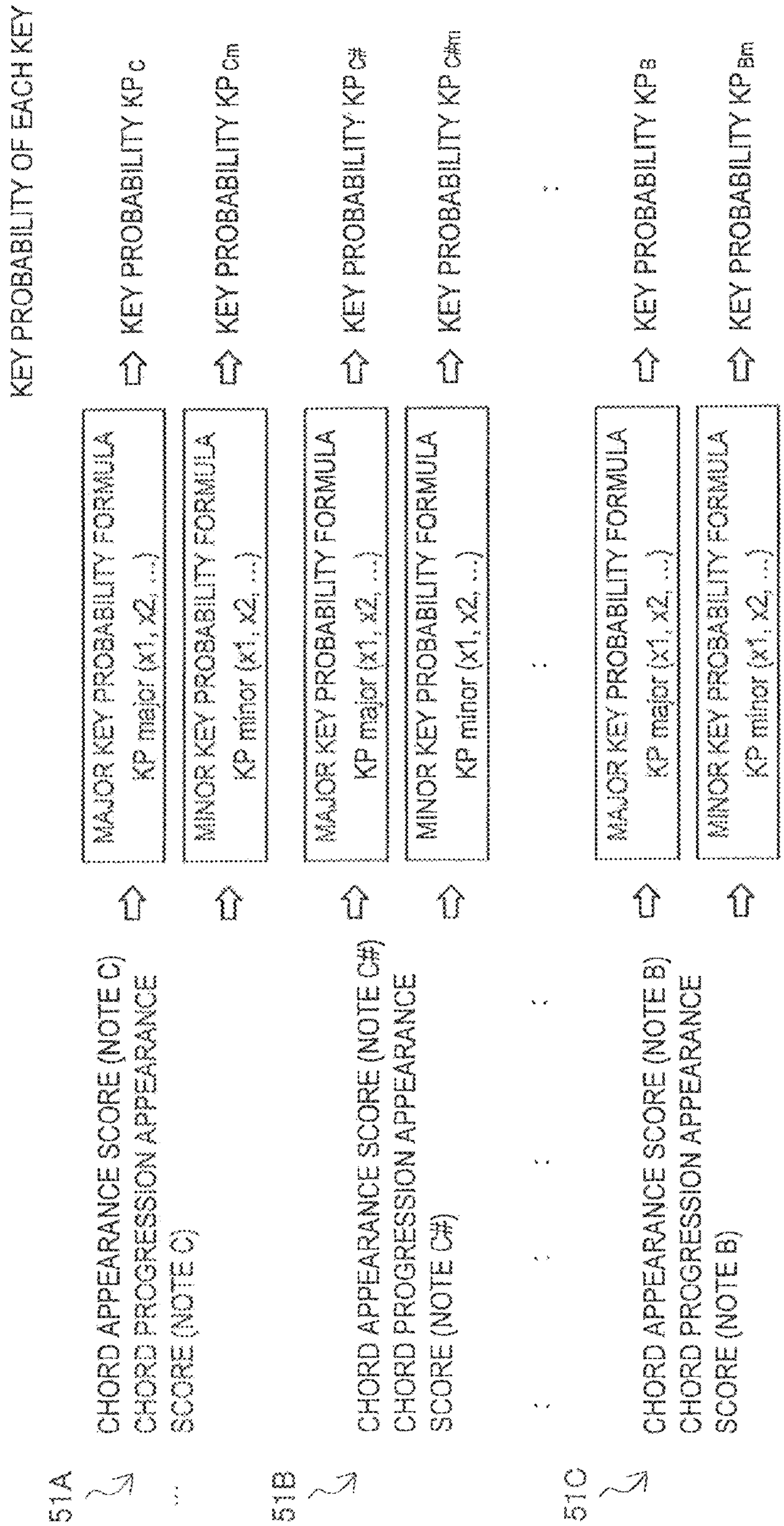
FIG. 51 is an explanatory diagram showing an example of the key detection method according to the present embodiment.

By performing the logistic regression analysis by using a sufficient number of pairs of the independent variable and the dummy data, the key probability formula for computing the probability of the major key or the minor key from a pair of the chord appearance score and the chord progression appearance score for each beat section is generated. The key probability calculation unit 242 applies a pair of the chord appearance score and the chord progression appearance score input from the feature quantity preparation unit 240 to each of the key probability formulae, and sequentially computes the key probabilities for respective keys for each beat section. For example, the key probability is calculated by a method as shown in FIG. 51.

For example, in FIG. 51(A), the key probability calculation unit 242 applies a pair of the chord appearance score and the chord progression appearance score with the note C assumed to be the key to the major key probability formula obtained in advance by learning, and calculates a key probability $KP_C$ of the key being "C" for each beat section. Also, the key probability calculation unit 242 applies the pair of the chord appearance score and the chord progression appearance score with the note C assumed to be the key to the minor key probability formula, and calculates a key probability $KP_{Cm}$ of the key being "Cm" for the corresponding beat section. Similarly, the key probability calculation unit 242 applies a pair of the chord appearance score and the chord progression appearance score with the note C# assumed to be the key to the major key probability formula and the minor key probability formula, and calculates key probabilities $KP_{C\#}$ and $KP_{C\#m}$ (B). The same can be said for the calculation of key probabilities $KP_B$ and $KP_{Bm}$ (C).

Figure 52:
FIG. 52 is an explanatory diagram showing an example of the key detection method according to the present embodiment.

By such calculations, a key probability as shown in FIG. 52 is computed, for example. Referring to FIG. 52, two types of key probabilities, each for "Maj (major)" and "m (minor)," are calculated for a certain beat section for each of the 12 notes from the note C to the note B. According to the example of FIG. 52, the key probability $KP_C$ is 0.90, and the key probability $KP_{Cm}$ is 0.03. Furthermore, key probability values other than the above-described key probability all indicate 0. After calculating the key probability for all the types of keys, the key probability calculation unit 242 normalizes the probability values in such a way that the total of the computed probability values becomes 1 per beat section. The calculation and normalization process by the key probability calculation unit 242 as described above are repeated for all the beat sections included in the audio signal. The key probability for each key computed for each beat section in this manner is input to the key determination unit 246.

Here, the key probability calculation unit 242 calculates a key probability (simple key probability), which does not distinguish between major and minor, from the key probabilities values calculated for the two types of keys, i.e. major and minor, for each of 12 notes from the note C to the note B. For example, the key probability calculation unit 242 calculates the simple key probability by a method as shown in FIG. 53. As shown in FIG. 53(A), for example, key probabilities $KP_C$, $KP_{Cm}$, $KP_A$, and $KP_{Am}$ are calculated by the key probability calculation unit 242 to be 0.90, 0.03, 0.02, and 0.05, respectively, for a certain beat section. Other key probability values all indicate 0. The key probability calculation unit 242 calculates the simple key probability, which does not distinguish between major and minor, by adding up the key probability values of keys in relative key relationship for each of the 12 notes from the note C to the note B. For example, a simple key probability $SKP_C$ is the total of the key probabilities $KP_C$ and $KP_{Am}$, i.e. $SKP_C$=0.90+0.05=0.95. This is because C major (key "C") and A minor (key "Am") are in relative key relationship. The calculation is similarly performed for the simple key probability values for the note C# to the note B. The 12 separate simple key probabilities $SKP_C$ to $SKP_B$ computed by the key probability calculation unit 242 are input to the chord progression detection unit 142.

Figure 54:
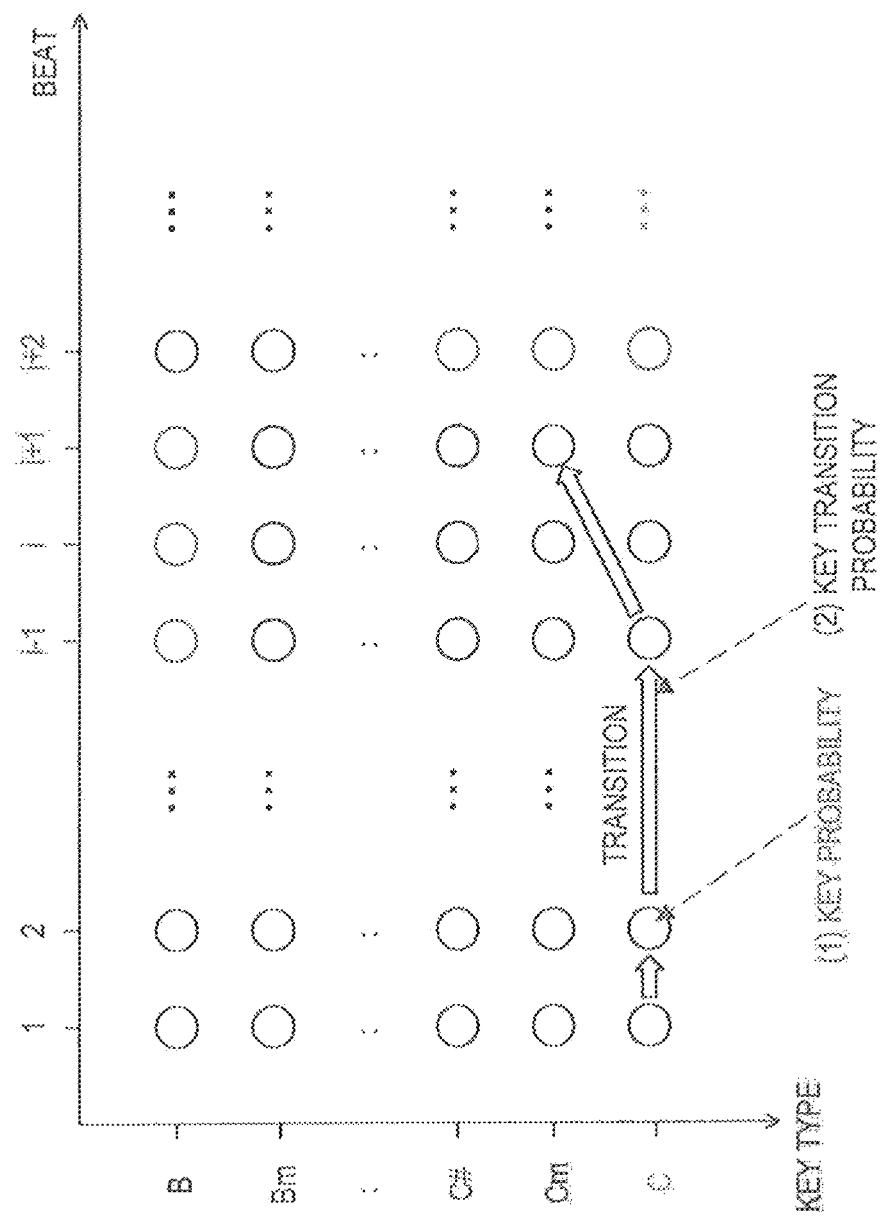
FIG. 54 is an explanatory diagram showing an example of the key detection method according to the present embodiment.

Now, the key determination unit 246 determines a likely key progression by a path search based on the key probability of each key computed by the key probability calculation unit 242 for each beat section. The Viterbi algorithm described above is used as the method of path search by the key determination unit 246, for example. The path search for a Viterbi path is performed by a method as shown in FIG. 54, for example. At this time, beats are arranged sequentially as the time axis (horizontal axis) and the types of keys are arranged as the observation sequence (vertical axis). Accordingly, the key determination unit 246 takes, as the subject node of the path search, each of all the pairs of the beat for which the key probability has been computed by the key probability calculation unit 242 and a type of key.

With regard to the node as described, the key determination unit 246 sequentially selects, along the time axis, any of the nodes, and evaluates a path formed from a series of selected nodes by using two evaluation values, (1) key probability and (2) key transition probability. Moreover, skipping of beat is not allowed at the time of selection of a node by the key determination unit 246. Here, (1) key probability to be used for the evaluation is the key probability that is computed by the key probability calculation unit 242. The key probability is given to each of the node shown in FIG. 54. On the other hand, (2) transition probability is an evaluation value given to a transition between nodes. The key transition probability is defined in advance for each pattern of modulation, based on the occurrence probability of modulation in a music piece whose correct keys are known.

Twelve separate values in accordance with the modulation amounts for a transition are defined as the key transition probability for each of the four patterns of key transitions: from major to major, from major to minor, from minor to major, and from minor to minor. FIG. 55 shows an example of the 12 separate probability values in accordance with the modulation amounts for a key transition from major to major. In the example of FIG. 55, when the key transition probability in relation to a modulation amount $\Delta k$ is $Pr(\Delta k)$, the key transition probability Pr(0) is 0.9987. This indicates that the probability of the key changing in a music piece is very low. On the other hand, the key transition probability Pr(1) is 0.0002. This indicates that the probability of the key being raised by one pitch (or being lowered by 11 pitches) is 0.02%. Similarly, in the example of FIG. 55, Pr(2), Pr(3), Pr(4), Pr(5), Pr(7), Pr(8), Pr(9) and Pr(10) are respectively 0.0001. Also, Pr(6) and Pr(11) are respectively 0.0000. The 12 separate probability values in accordance with the modulation amounts are respectively defined also for each of the transition patterns: from major to minor, from minor to major, and from minor to minor.

Figure 56:
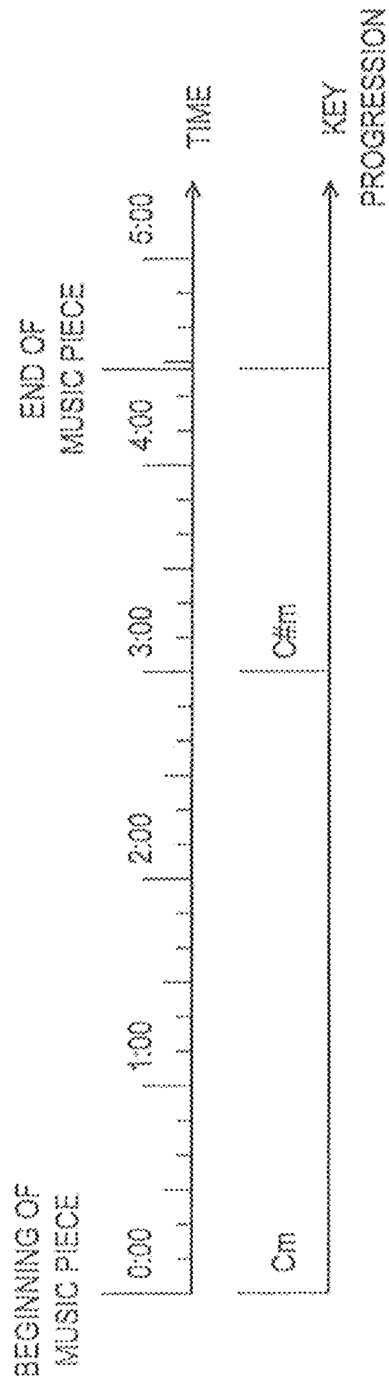
FIG. 56 is an explanatory diagram showing an example of the key detection method according to the present embodiment.

The key determination unit 246 sequentially multiplies with each other (1) key probability of each node included in a path and (2) key transition probability given to a transition between nodes, with respect to each path representing the key progression. Then, the key determination unit 246 determines the path for which the multiplication result as the path evaluation value is the largest as the optimum path representing a likely key progression. For example, a key progression as shown in FIG. 56 is determined by the key determination unit 246. In FIG. 56, an example of a key progression of a music piece determined by the key determination unit 246 is shown under the time scale from the beginning of the music piece to the end. In this example, the key of the music piece is "Cm" for three minutes from the beginning of the music piece. Then, the key of the music piece changes to "C#m" and the key remains the same until the end of the music piece. The key progression determined by the processing by the relative chord probability generation unit 238, the feature quantity preparation unit 240, the key probability calculation unit 242 and the key determination unit 246 in this manner is input to the bar detection unit 140.

(2-4-5. Configuration of Bar Detection Unit 140)

Figure 57:
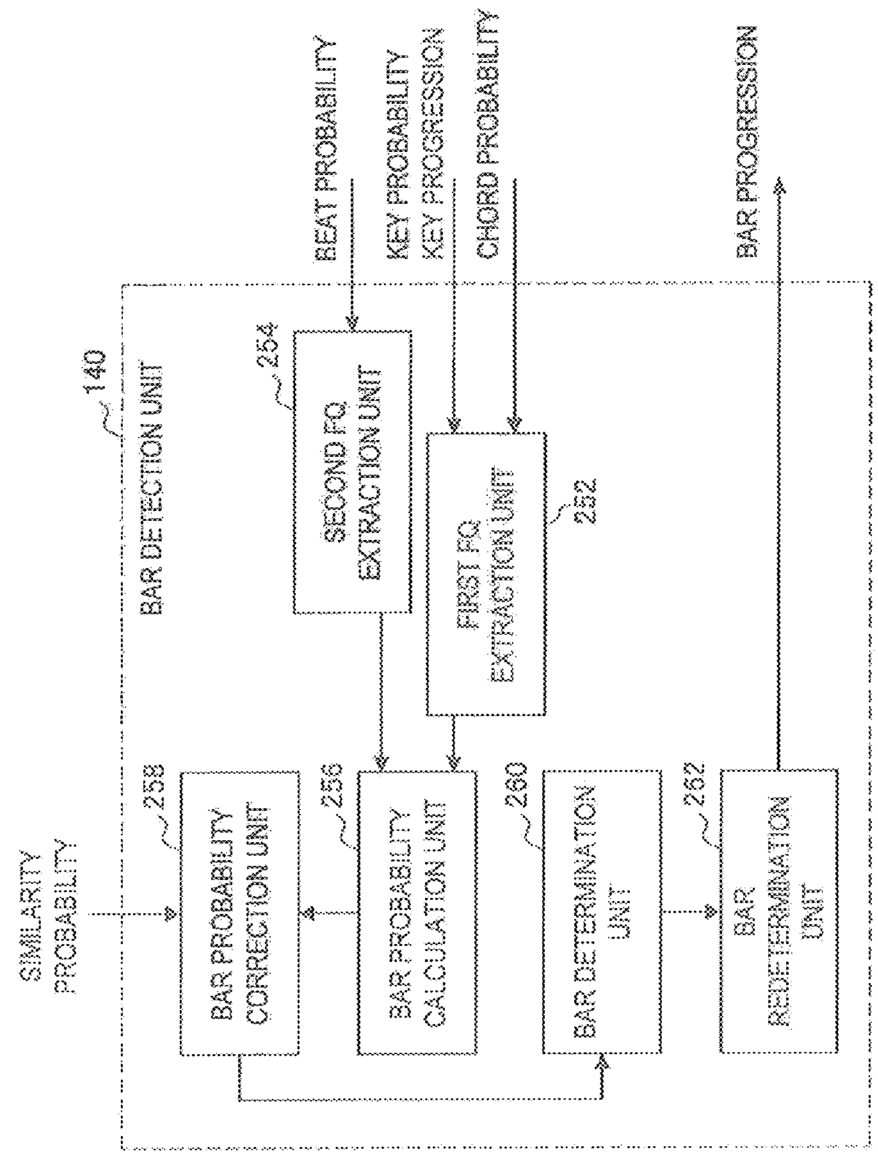
FIG. 57 is an explanatory diagram showing a configuration example of a bar detection unit according to the present embodiment.

Next, the bar detection unit 140 will be described. The similarity probability computed by the structure analysis unit 134, the beat probability computed by the beat detection unit 132, the key probability and the key progression computed by the key detection unit 138, and the chord probability detected by the chord probability detection unit 136 are input to the bar detection unit 140. The bar detection unit 140 determines a bar progression indicating to which ordinal in which meter each beat in a series of beats corresponds, based on the beat probability, the similarity probability between beat sections, the chord probability for each beat section, the key progression and the key probability for each beat section. As shown in FIG. 57, the bar detection unit 140 includes a first feature quantity extraction unit 252, a second feature quantity extraction unit 254, a bar probability calculation unit 256, a bar probability correction unit 258, a bar determination unit 260, and a bar redetermination unit 262.

Figure 58:
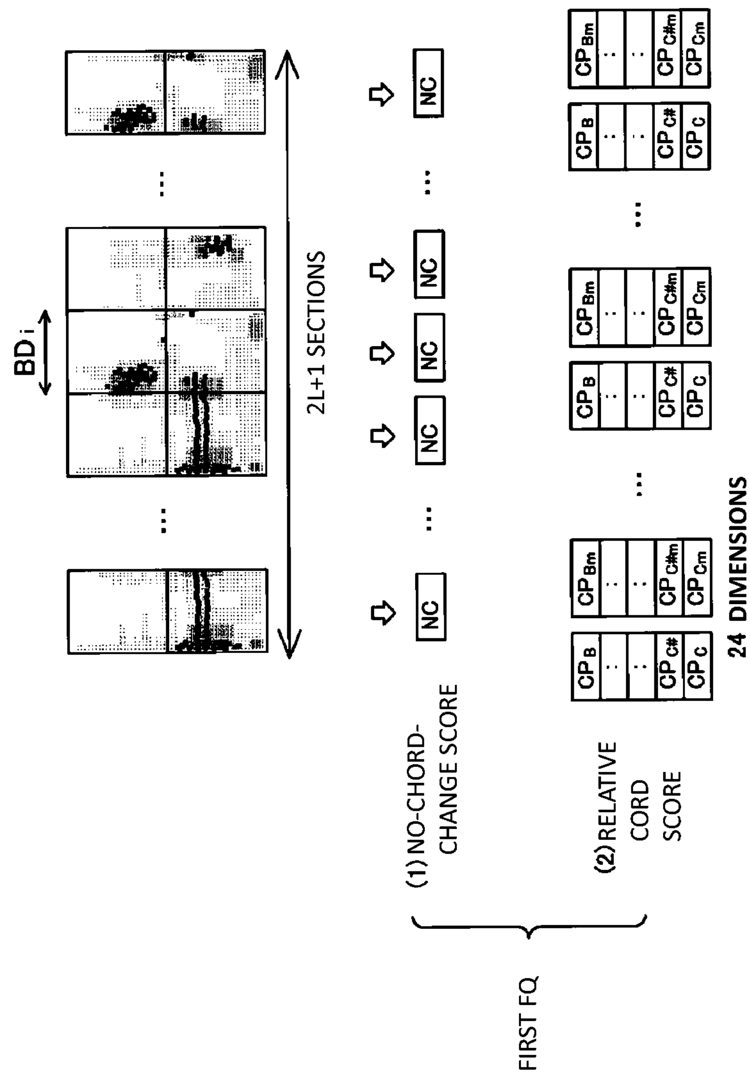
FIG. 58 is an explanatory diagram showing an example of a bar detection method according to the present embodiment.

The first feature quantity extraction unit 252 extracts, for each beat section, a first feature quantity in accordance with the chord probabilities and the key probabilities for the beat section and the preceding, and following L sections as the feature quantity used for the calculation of a bar probability described later. For example, the first feature quantity extraction unit 252 extracts the first feature quantity by a method as shown in FIG. 58. As shown in FIG. 58, the first feature quantity includes (1) no-chord-change score and (2) relative chord score derived from the chord probabilities and the key probabilities for a focused beat section $BD_i$ and the preceding and following L beat sections. Among these, the no-chord-change score is a feature quantity having dimensions equivalent to the number of sections including the focused beat section $BD_i$ and the preceding and following L sections. On the other hand, the relative chord score is a feature quantity having 24 dimensions for each of the focused beat section and the preceding and following L sections. For example, when L is 8, the no-chord-change score is 17-dimensional and the relative chord score is 408-dimensional (17×24 dimensions), and thus the first feature quantity has 425 dimensions in total. Hereunder, the no-chord-change score and the relative chord score will be described.

(1) No-Chord-Change Score

Figure 59:
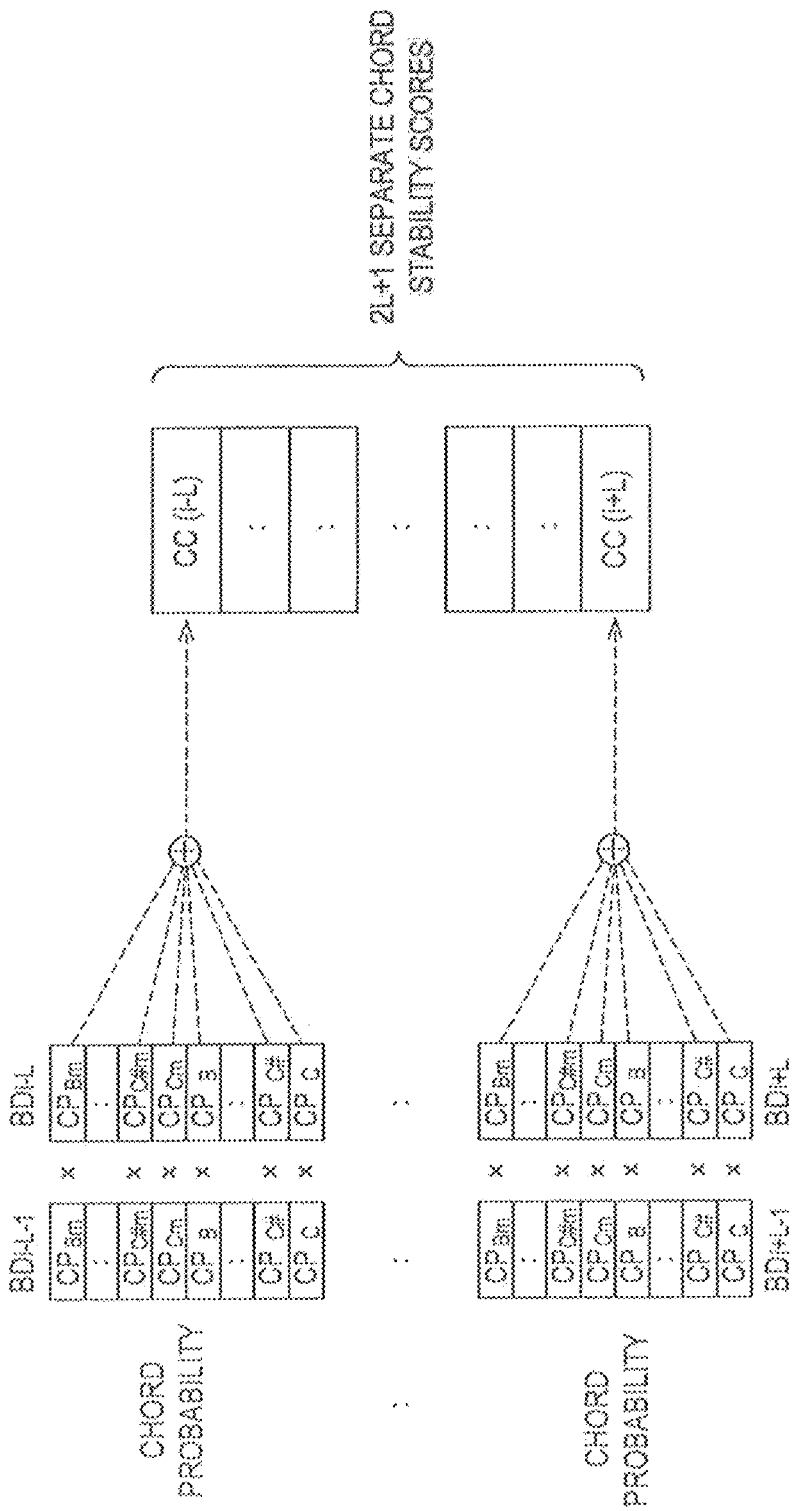
FIG. 59 is an explanatory diagram showing an example of the bar detection method according to the present embodiment.

First, the no-chord-change score will be described. The no-chord-change score is a feature quantity representing the degree of a chord of a music piece not changing over a specific range of sections. The no-chord-change score is obtained by dividing a chord stability score described next by a chord instability score. In the example of FIG. 59, the chord stability score for a beat section $BD_i$ includes elements CC(i−L) to CC(i+IL), each of which is determined for a corresponding section among the beat section $BD_i$ and the preceding and following L sections. Each of the elements is calculated as the total value of the products of the chord probabilities of the chords bearing the same names between a target beat section and the immediately preceding beat section.

For example, by adding up the products of the chord probabilities of the chords bearing the same names among the chord probabilities for a beat section $BD_{i-L-1}$ and a beat section $BD_{i-L}$, a chord stability score CC(i−L) is computed. In a similar manner, by adding up the products of the chord probabilities of the chords bearing the same names among the chord probabilities for a beat section $BD_{i+L-}$and a beat section $BD_{i+L}$, a chord stability score CC(i+L) is computed. The first feature quantity extraction unit 252 performs the calculation as described for over the focused beat section $BD_i$ and the preceding and following L sections, and computes 2L+1 separate chord stability scores.

Figure 60:
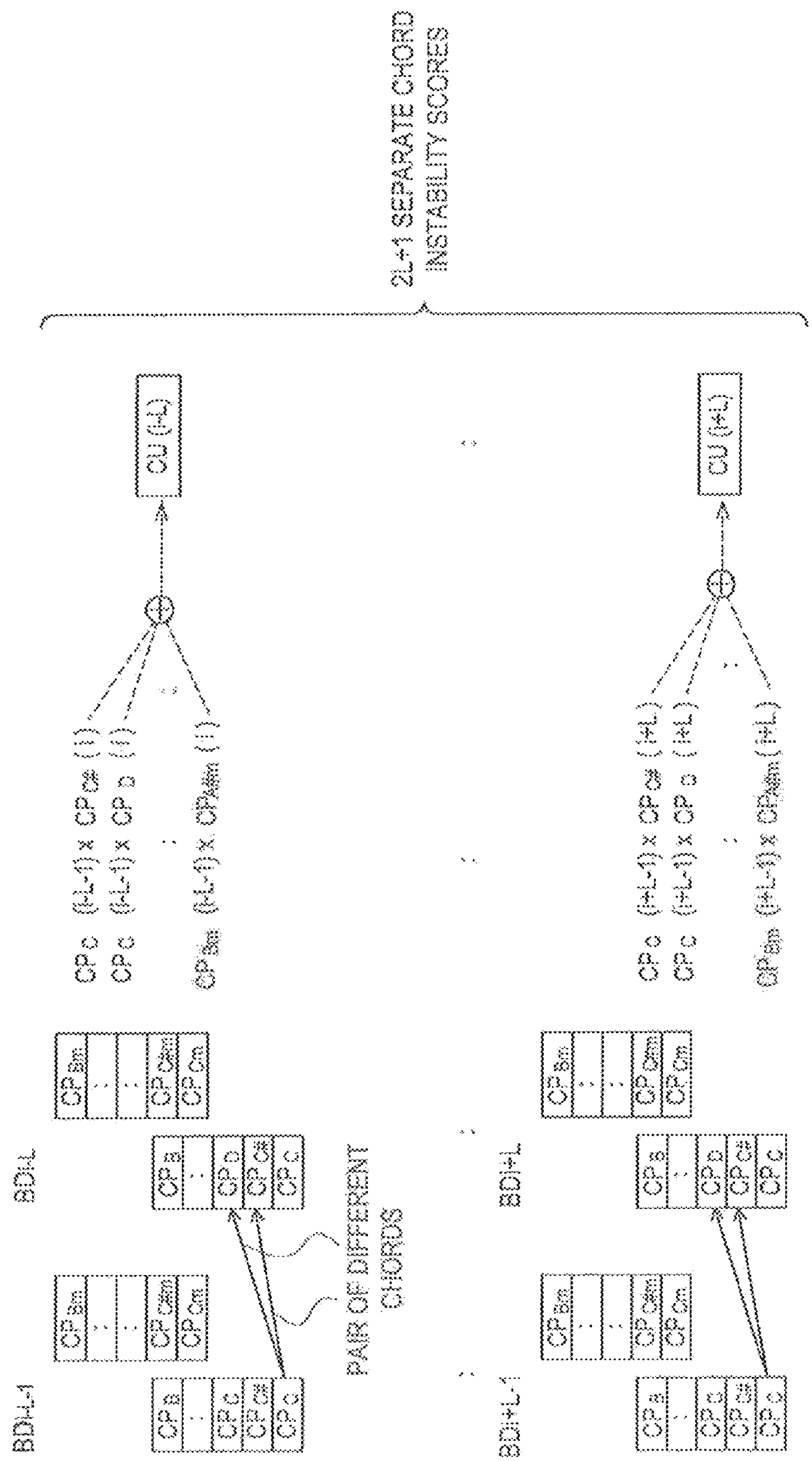
FIG. 60 is an explanatory diagram showing an example of the bar detection method according to the present embodiment.

On the other hand, as shown in FIG. 60, the chord instability score for the beat section $BD_i$ includes elements CU(i−L) to CU(i+L), each of which is determined for a corresponding section among the beat section $BD_i$ and the preceding and following L sections. Each of the elements is calculated as the total value of the products of the chord probabilities of all the pairs of chords bearing different names between a target beat section and the immediately preceding beat section. For example, by adding up the products of the chord probabilities of chords bearing different names among the chord probabilities for the beat section $BD_{i-L-1}$ and the beat section $BD_{i-L}$, a chord instability score CU(i−L) is computed. In a similar manner, by adding up the products of the chord probabilities of chords bearing different names among the chord probabilities for the beat section $BD_{i+L-1}$ and the beat section $BD_{i+L}$, a chord instability score CU(i+L) is computed. The first feature quantity extraction unit 252 performs the calculation as described for over the focused beat section $BD_i$ and the preceding and following L sections, and computes 2L+1 separate beat instability scores.

After computing the beat stability score and the beat instability score, the first feature quantity extraction unit 252 computes, for the focused beat section $BD_i$, the no-chord-change scores by dividing the chord stability score by the chord instability score for each set of 2L+1 elements. For example, let us assume that the chord stability scores CC are $(CC_{i-L}, \ldots, CC_{i+L})$ and the chord instability scores CU are $(CU_{i-L}, \ldots, CU_{i+L})$ for the focused beat section $BD_i$. In this case, the no-chord-change scores CR are $(CC_{i-L}/C_{i-L}, \ldots, CC_{i+1}/CU_{1+L})$. The no-chord-change score computed in this manner indicates a higher value as the change of chords within a given range around the focused beat section is less. The first feature quantity extraction unit 252 computes, in this manner, the no-chord-change score for all the beat sections included in the audio signal.

(2) Relative Chord Score

Figure 61:
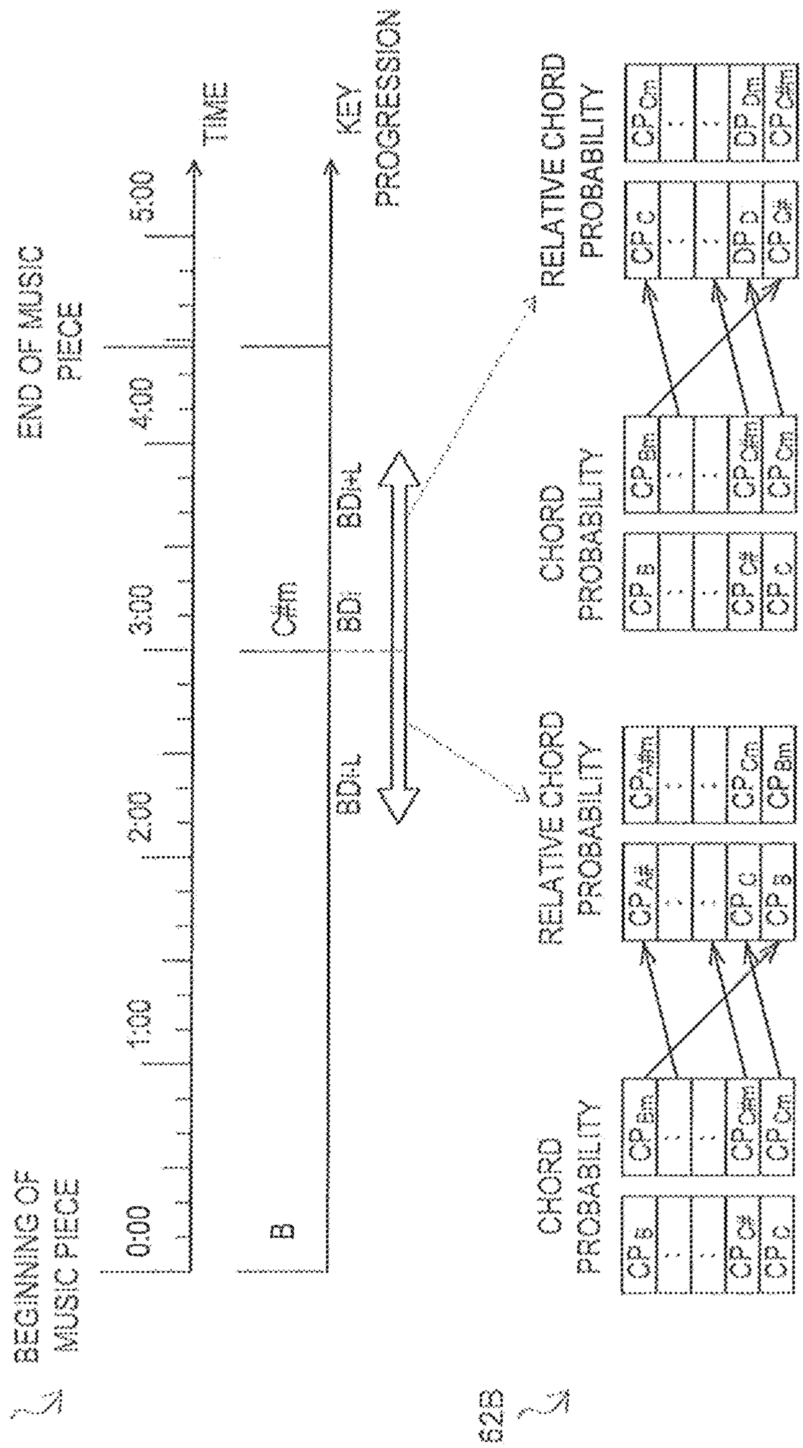
FIG. 61 is an explanatory diagram showing an example of the bar detection method according to the present embodiment.

Next, the relative chord score will be described. The relative chord score is a feature quantity representing the appearance probabilities of chords across sections in a given range and the pattern thereof. The relative chord score is generated by shifting the element positions of the chord probability in accordance with the key progression input from the key detection unit 138. For example, the relative chord score is generated by a method as shown in FIG. 61. An example of the key progression determined by the key detection unit 138 is shown in FIG. 61(A). In this example, the key of the music piece changes from "B" to "C#m" after three minutes from the beginning of the music piece. Furthermore, the position of a focused beat section BD; is also shown, which includes within the preceding and following L sections a time point of change of the key.

At this time, the first feature quantity extraction unit 252 generates, for a beat section whose key is "B," a relative chord probability where the positions of the elements of a 24-dimensional chord probability, including major and minor, of the beat section are shifted so that the chord probability $CP_B$ comes at the beginning. Also, the first feature quantity extraction unit 252 generates, for a beat section whose key is "C#m," a relative chord probability where the positions of the elements of a 24 dimensional chord probability, including major and minor, of the beat section are shifted so that the chord probability $CP_{C\#m}$ comes at the beginning. The first feature quantity extraction unit 252 generates such a relative chord probability for each of the focused beat section and the preceding and following L sections, and outputs a collection of the generated relative chord probabilities ((2L+1)×24-dimensional feature quantity vector) as the relative chord score.

The first feature quantity formed from (1) no-chord-change score and (2) relative chord score described above is output from the first feature quantity extraction unit 252 to the bar probability calculation unit 256. Now, in addition to the first feature quantity, a second feature quantity is also input to the bar probability calculation unit 256. Accordingly, the configuration of the second feature quantity extraction unit 254 will be described.

Figure 62:
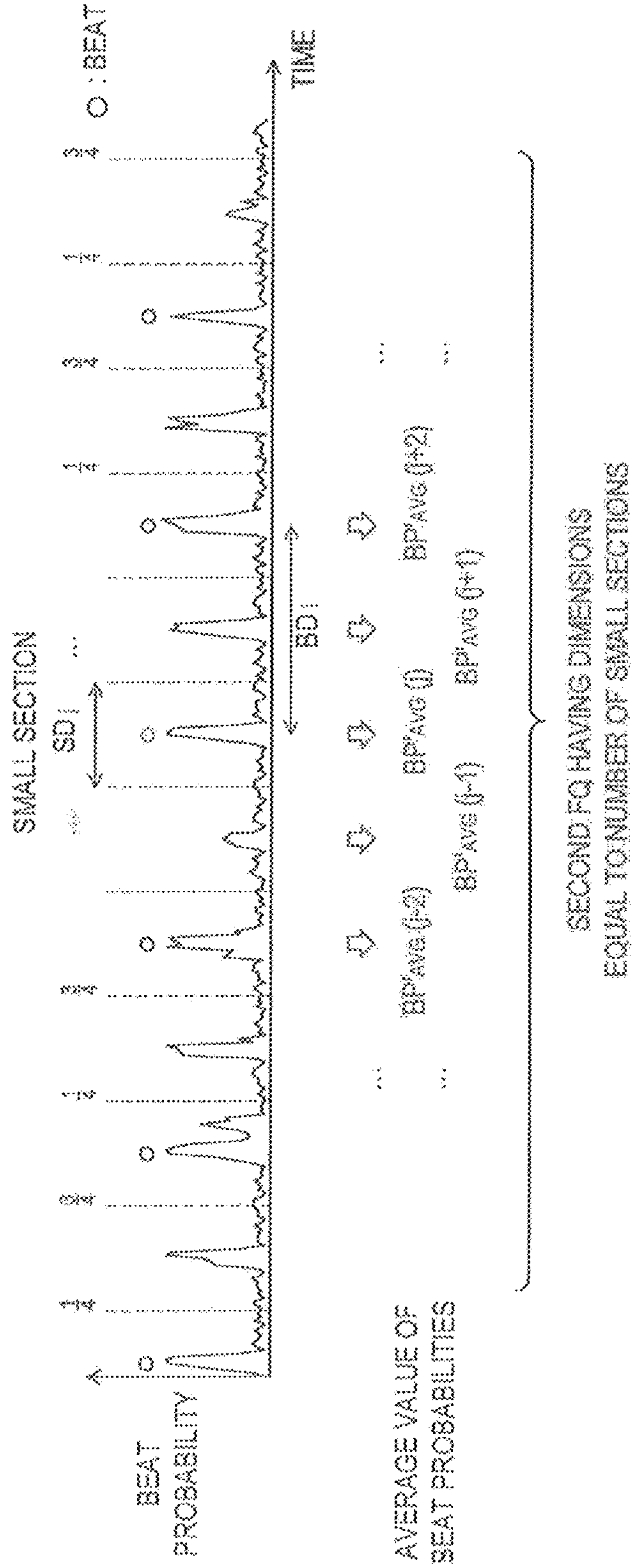
FIG. 62 is an explanatory diagram showing an example of the bar detection method according to the present embodiment.

The second feature quantity extraction unit 254 extracts, for each beat section, a second feature quantity in accordance with the feature of change in the beat probability over the beat section and the preceding and following L sections as the feature quantity used for the calculation of a bar probability described later. For example, the second feature quantity extraction unit 254 extracts the second feature quantity by a method as shown in FIG. 62. The beat probability input from the beat probability computation unit 202 is shown along the time axis in FIG. 62. Furthermore, 6 beats detected by analyzing the beat probability as well as a focused beat section BD; are also shown in the figure. The second feature quantity extraction unit 254 computes, with respect to the beat probability, the average value of the beat probability for each of a small section $SD_j$ having a specific duration and included in a beat section over the focused beat section $BD_i$ and the preceding and following L sections.

For example, as shown in FIG. 62, to detect mainly a meter whose note value (M of N/M meter) is 4, it is preferable that the small sections are divided from each other by lines dividing a beat interval at positions 1/4 and 3/4 of the beat interval. In this case, L×4+1 pieces of the average values of the beat probability will be computed for one focused beat section $BD_i$. Accordingly, the second feature quantity extracted by the second feature quantity extraction unit 254 will have L×4+1 dimensions for each focused beat section. Also, the duration of the small section is 1/2 that of the beat interval. Moreover, to appropriately detect a bar in the music piece, it is desired to analyze the feature of the audio signal over at least several bars. It is therefore preferable that the value of L defining the range of the beat probability used for the extraction of the second feature quantity is 8 beats, for example. When L is 8, the second feature quantity extracted by the second feature quantity extraction unit 254 is 33-dimensional for each focused beat section.

The second feature quantity extracted in this manner is input to the bar probability calculation unit 256 from the second feature quantity extraction unit 254. Thus, the bar probability calculation unit 256 computes the bar probability for each beat by using the first feature quantity and the second feature quantity. The bar probability here means a collection of probabilities of respective beats being the Y-th beat in an X meter. In the subsequent explanation, each ordinal in each meter is made to be the subject of the discrimination, where each meter is any of a 1/4 meter, a 2/4 meter, a 3/4 meter and a 4/4 meter, for example. In this case, there are 10 separate sets of X and Y, namely, (1, 1), (2, 1), (2, 2), (3, 1), (3, 2), (3, 3), (4, 1), (4, 2), (4, 3), and (4, 4). Accordingly, 10 types of bar probabilities are computed.

Figure 63:
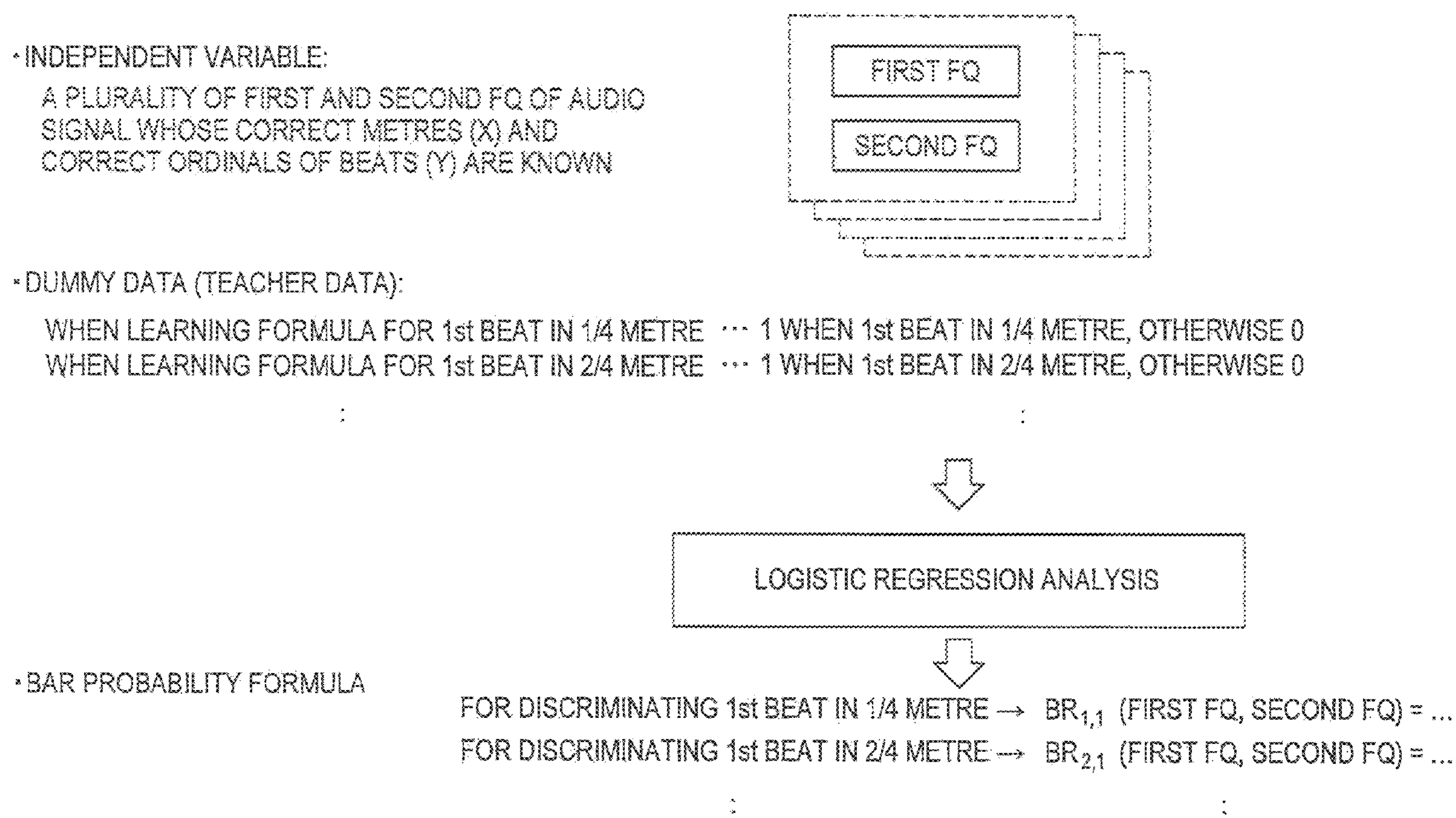
FIG. 63 is an explanatory diagram showing an example of the bar detection method according to the present embodiment.

Moreover, the probability values computed by the bar probability calculation unit 256 are corrected by the bar probability correction unit 258 described later taking into account the structure of the music piece. Accordingly, the probability values computed by the bar probability calculation unit 256 are intermediary data yet to be corrected. A bar probability formula learnt in advance by a logistic regression analysis is used for the computation of the bar probability by the bar probability calculation unit 256, for example. For example, a bar probability formula used for the calculation of the bar probability is generated by a method as shown in FIG. 63. Moreover, a bar probability formula is generated for each type of the bar probability described above. For example, when presuming that the ordinal of each beat in a 1/4 meter, a 2/4 meter, a 3/4 meter and a 4/4 meter is to be discriminated, 10 separate bar probability formulae are to be generated.

First, a plurality of pairs of the first feature quantity and the second feature quantity which are extracted by analyzing the audio signal and whose correct meters (X) and correct ordinals of beats (Y) are known are provided as independent variables for the logistic regression analysis. Next, dummy data for predicting the generation probability for each of the provided pairs of the first feature quantity and the second feature quantity by the logistic regression analysis is provided. For example, when learning a formula for discriminating a first beat in a 1/4 meter to compute the probability of a beat being the first beat in a 1/4 meter, the value of the dummy data will be a true value (1) if the known meter and ordinal are (1, 1), and a false value (0) for any other case. Also, when learning a formula for discriminating a first beat in 2/4 meter to compute the probability of a beat being the first beat in a 2/4 meter, for example, the value of the dummy data will be a true value (1) if the known meter and ordinal are (2, 1), and a false value (0) for any other case. The same can be said for other meters and ordinals.

Figure 64:
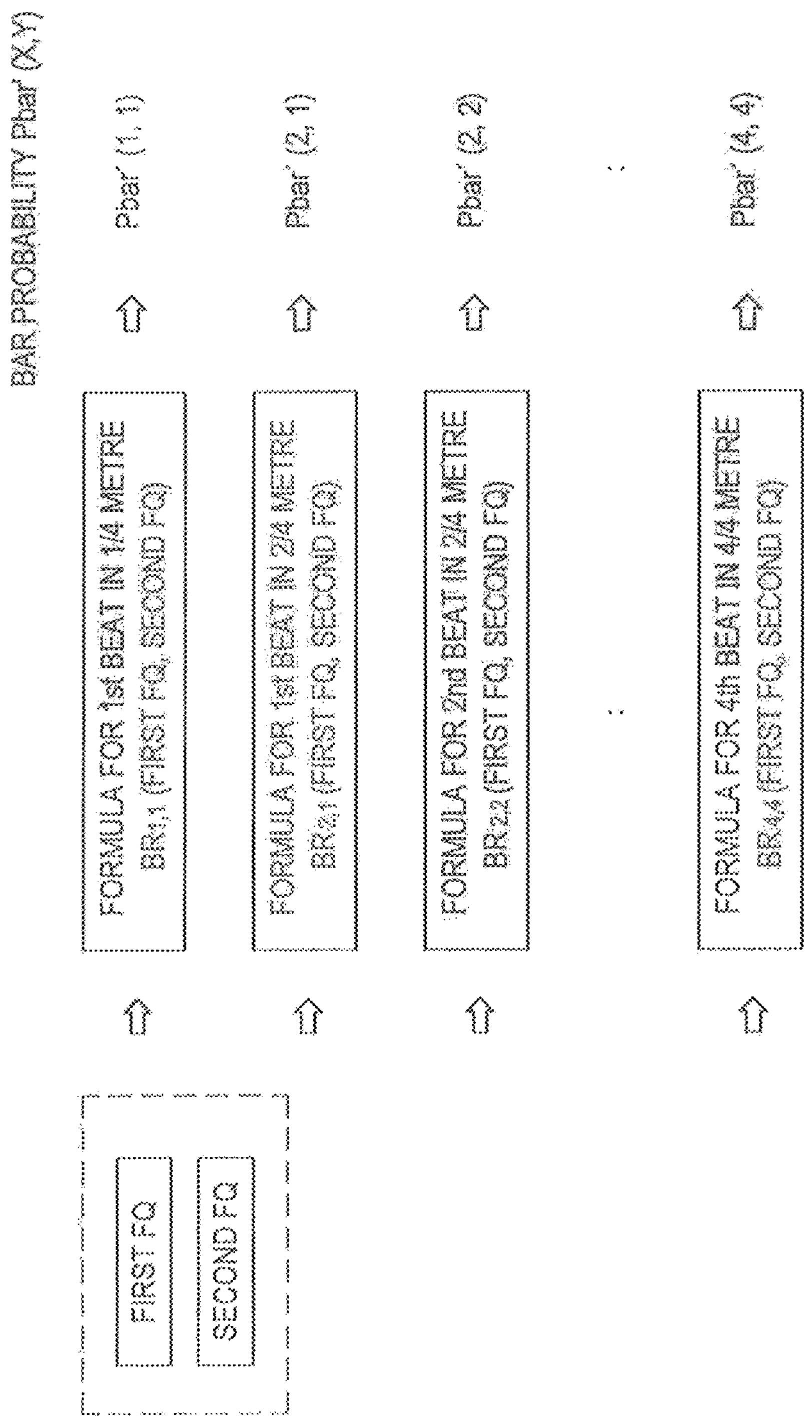
FIG. 64 is an explanatory diagram showing an example of the bar detection method according to the present embodiment.

By performing the logistic regression analysis by using a sufficient number of pairs of the independent variable and the dummy data as described above, 10 types of bar probability formulae for computing the bar probability from a pair of the first feature quantity and the second feature quantity are obtained in advance. Then, the bar probability calculation unit 256 applies the bar probability formula to a pair of the first feature quantity and the second feature quantity input from the first feature quantity extraction unit 252 and the second feature quantity extraction unit 254, and computes the bar probabilities for respective beat sections. For example, the bar probability is computed by a method as shown in FIG. 64. As shown in FIG. 64, the bar probability calculation unit 256 applies the formula for discriminating a first beat in a 1/4 meter obtained in advance to a pair of the first feature quantity and the second feature quantity extracted for a focused beat section, and calculates a bar probability $P_{bar}'(1, 1)$ of a beat being the first beat in a 1/4 meter. Also, the bar probability calculation unit 256 applies the formula for discriminating a first beat in a 2/4 meter obtained in advance to the pair of the first feature quantity and the second feature quantity extracted for the focused beat section, and calculates a bar probability $P_{bar}'(2, 1)$ of a beat being the first beat in a 2/4 meter. The same can be said for other meters and ordinals.

The bar probability calculation unit 256 repeats the calculation of the bar probability for all the beats, and computes the bar probability for each beat. The bar probability computed for each beat by the bar probability calculation unit 256 is input to the bar probability correction unit 258.

The bar probability correction unit 258 corrects the bar probabilities input from the bar probability calculation unit 256, based on the similarity probabilities between beat sections input from the structure analysis unit 134. For example, let us assume that the bar probability of an i-th focused beat being a Y-th beat in an X meter, where the bar probability is yet to be corrected, is $P_{bar}'$ (i, x, y), and the similarity probability between an i-th beat section and a j-th beat section is SP(i, j). In this case, a bar probability after correction $P_{bar}$ (i, x, y) is given by the following equation (11), for example.

[Equation 10]

$$P_{bar}(i, x, y) = \sum_j P'_{bar}(j, x, y) \cdot \left( \frac{SP(i, j)}{\sum_k SP(i, k)} \right) \tag{11}$$

As described above, the bar probability after correction $P_{bar}$ (i, x, y) is a value obtained by weighting and summing the bar probabilities before correction by using normalized similarity probabilities as weights where the similarity probabilities are those between a beat section corresponding to a focused beat and other beat sections. By such a correction of probability values, the bar probabilities of beats of similar sound contents will have closer values compared to the bar probabilities before correction. The bar probabilities for respective beats corrected by the bar probability correction unit 258 are input to the bar determination unit 260.

Figure 65:
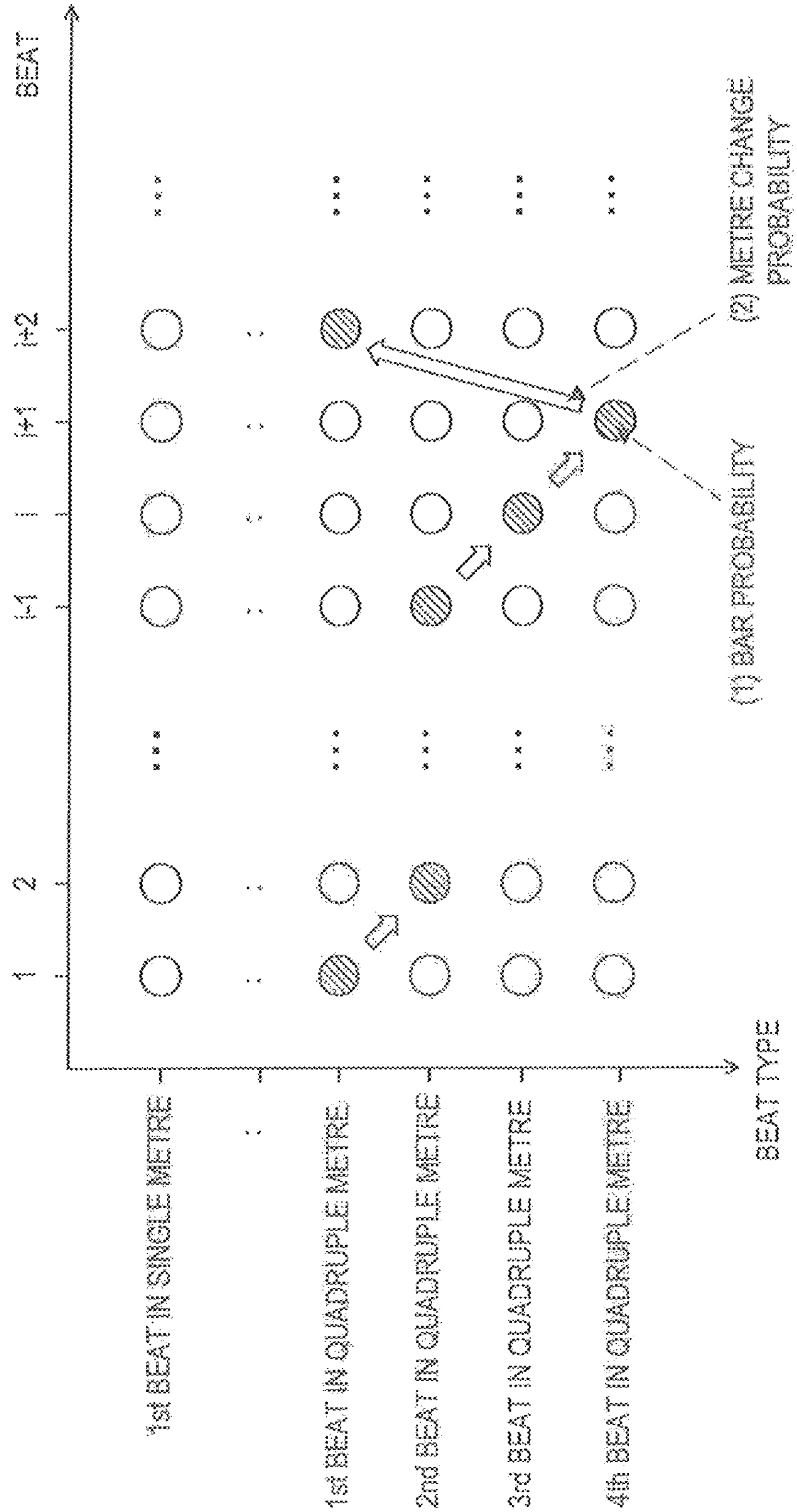
FIG. 65 is an explanatory diagram showing an example of the bar detection method according to the present embodiment.

The bar determination unit 260 determines a likely bar progression by a path search, based on the bar probabilities input from the bar probability correction unit 258, the bar probabilities indicating the probabilities of respective beats being a Y-th beat in an X meter. The Viterbi algorithm is used as the method of path search by the bar determination unit 260, for example. The path search is performed by the bar determination unit 260 by a method as shown in FIG. 65, for example. As shown in FIG. 65, beats are arranged sequentially on the time axis (horizontal axis). Furthermore, the types of beats (Y-th beat in X meter) for which the bar probabilities have been computed are used for the observation sequence (vertical axis). The bar determination unit 260 takes, as the subject node of the path search, each of all the pairs of a beat input from the bar probability correction unit 258 and a type of beat.

With regard to the subject node as described, the bar determination unit 260 sequentially selects, along the time axis, any of the nodes. Then, the bar determination unit 260 evaluates a path formed from a series of selected nodes by using two evaluation values, (1) bar probability and (2) meter change probability. Moreover, at the time of the selection of nodes by the bar determination unit 260, it is preferable that restrictions described below are imposed, for example. As a first restriction, skipping of beat is prohibited. As a second restriction, transition from a meter to another meter in the middle of a bar, such as transition from any of the first to third beats in a quadruple meter or the first or second beat in a triple meter, or transition from a meter to the middle of a bar of another meter is prohibited. As a third restriction, transition whereby the ordinals are out of order, such as from the first beat to the third or fourth beat, or from the second beat to the second or fourth beat, is prohibited.

Now, (1) bar probability, among the evaluation values used for the evaluation of a path by the bar determination unit 260, is the bar probability described above that is computed by correcting the bar probability by the bar probability correction unit 258. The bar probability is given to each of the nodes shown in FIG. 65. On the other hand, (2) meter change probability is an evaluation value given to the transition between nodes. The meter change probability is predefined for each set of a type of beat before change and a type of beat after change by collecting, from a large number of common music pieces, the occurrence probabilities for changes of meters during the progression of bars.

For example, an example of the meter change probability is shown in FIG. 66. In FIG. 66, 16 separate meter change probabilities derived based on four types of meters before change and four types of meters after change are shown. In this example, the meter change probability for a change from a quadruple meter to a single meter is 0.05, the meter change probability from the quadruple meter to a duple meter is 0.03, the meter change probability from the quadruple meter to a triple meter is 0.02, and the meter change probability from the quadruple meter to the quadruple meter (i.e. no change) is 0.90. As in this example, the possibility of the meter changing in the middle of a music piece is generally not high. Furthermore, regarding the single meter or the duple meter, in case the detected position of a bar is shifted from its correct position due to a detection error of the bar, the meter change probability may serve to automatically restore the position of the bar. Thus, the value of the meter change probability between the single meter or the duple meter and another meter is preferably set to be higher than the meter change probability between the triple meter or the quadruple meter and another meter.

The bar determination unit 260 sequentially multiplies with each other (1) bar probability of each node included in a path and (2) meter change probability given to the transition between nodes, with respect to each path representing the bar progression. Then, the bar determination unit 260 determines the path for which the multiplication result as the path evaluation value is the largest as the maximum likelihood path representing a likely bar progression. For example, a bar progression is obtained based on the maximum likelihood path determined by the bar determination unit 260 (refer to FIG. 67). In the example of FIG. 67, the bar progression determined to be the maximum likelihood path by the bar determination unit 260 is shown for the first to eighth beat (see thick-line box). In this example, the type of each beat is, sequentially from the first beat, first beat in quadruple meter, second beat in quadruple meter, third beat in quadruple meter, fourth beat in quadruple meter, first beat in quadruple meter, second beat in quadruple meter, third beat in quadruple meter, and fourth beat in quadruple meter. The bar progression which is determined by the bar determination unit 260 is input to the bar redetermination unit 262.

Now, in a common music piece, it is rare that a triple meter and a quadruple meter are present in a mixed manner for the types of beats. Taking this circumstance into account, the bar redetermination unit 262 first decides whether a triple meter and a quadruple meter are present in a mixed manner for the types of beats appearing in the bar progression input from the bar determination unit 260. In case a triple meter and a quadruple meter are present in a mixed manner for the type of beats, the bar redetermination unit 262 excludes the less frequently appearing meter from the subject of search and searches again for the maximum likelihood path representing the bar progression. According to the path re-search process by the bar redetermination unit 262 as described, recognition errors of bars (types of beats) which might partially occur in a result of the path search can be reduced.

Heretofore, the bar detection unit 140 has been described. The bar progression detected by the bar detection unit 140 is input to the chord progression detection unit 142.

(2-4-6. Configuration of Chord Progression Detection Unit 142)

Figure 68:
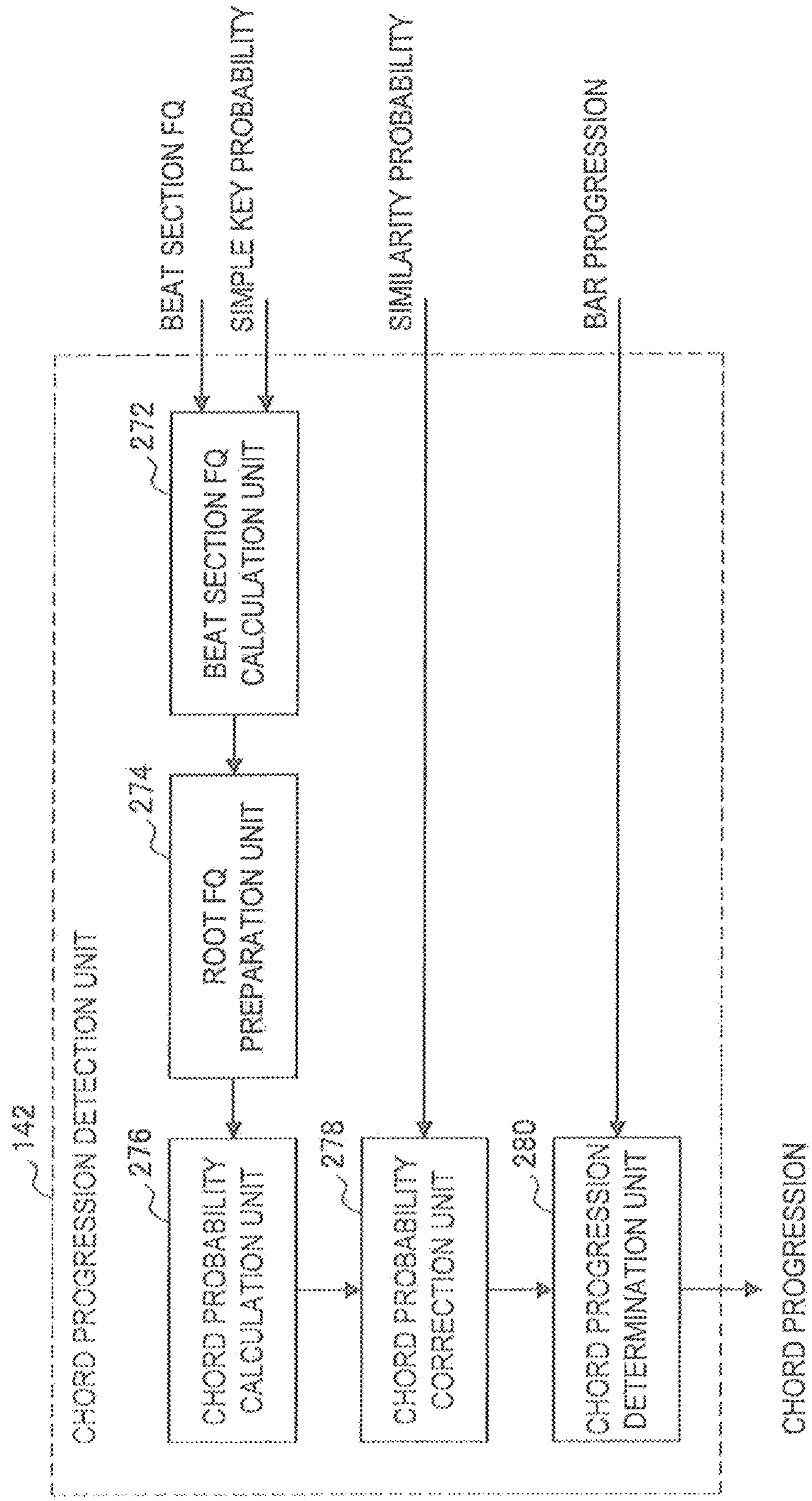
FIG. 68 is an explanatory diagram showing a configuration example of a chord progression detection unit according to the present embodiment.

Next, the chord progression detection unit 142 will be described. The simple key probability for each beat, the similarity probability between beat sections and the bar progression are input to the chord progression detection unit 142. Thus, the chord progression detection unit 142 determines a likely chord progression formed from a series of chords for each beat section based on these input values. As shown in FIG. 68, the chord progression detection unit 142 includes a beat section feature quantity calculation unit 272, a root feature quantity preparation unit 274, a chord probability calculation unit 276, a chord probability correction unit 278, and a chord progression determination unit 280.

As with the beat section feature quantity calculation unit 232 of the chord probability detection unit 136, the beat section feature quantity calculation unit 272 first calculates energies-of-respective-12-notes. However, the beat section feature quantity calculation unit 272 may obtain and use the energies-of-respective-12-notes computed by the beat section feature quantity calculation unit 232 of the chord probability detection unit 136. Next, the beat section feature quantity calculation unit 272 generates an extended beat section feature quantity including the energies-of-respective-12-notes of a focused beat section and the preceding and following N sections as well as the simple key probability input from the key detection unit 138. For example, the beat section feature quantity calculation unit 272 generates the extended beat section feature quantity by a method as shown in FIG. 69.

Figure 69:
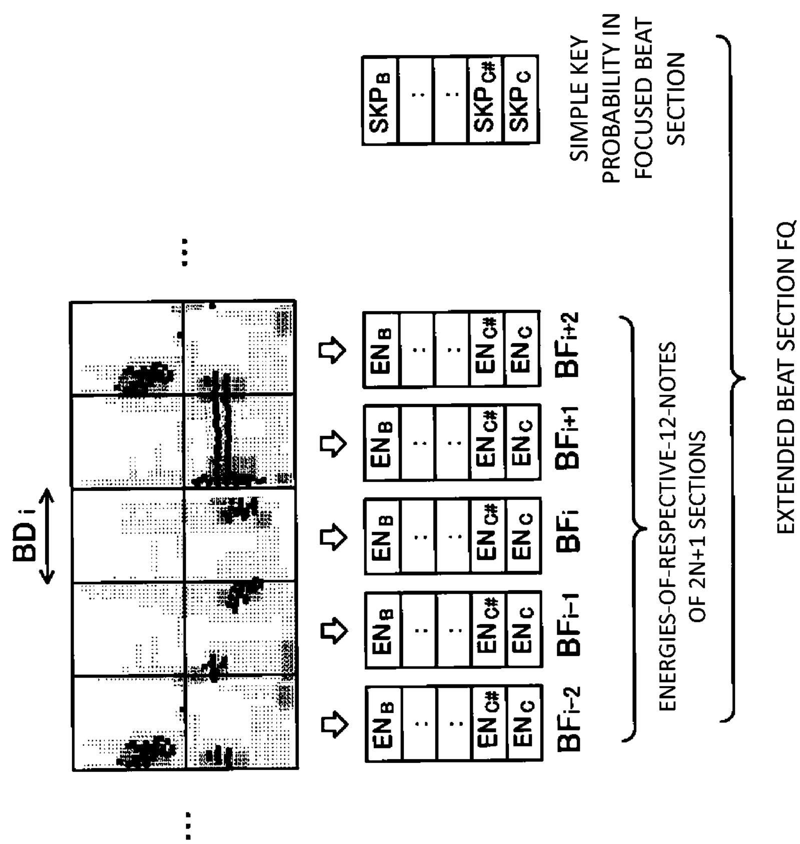
FIG. 69 is an explanatory diagram showing an example of a chord progression detection method according to the present embodiment.

As shown in FIG. 69, the beat section feature quantity calculation unit 272 extracts the energies-of-respective-12-notes, $BF_{i-2}$, $BF_{i-1}$, $BF_i$, $BF_{i+1}$ and $BF_{i+2}$, respectively of a focused beat section $BD_i$ and the preceding and following N sections, for example. "N" here is 2, for example. Also, the simple key probability ($SKP_C$, . . . , $SKP_B$) of the focused beat section $BD_i$ is obtained. The heat section feature quantity calculation unit 272 generates, for all the beat sections, the extended heat section feature quantities including the energies-of-respective-12-notes of a heat section and the preceding and following N sections and the simple key probability, and inputs the same to the root feature quantity preparation unit 274.

Figure 70:
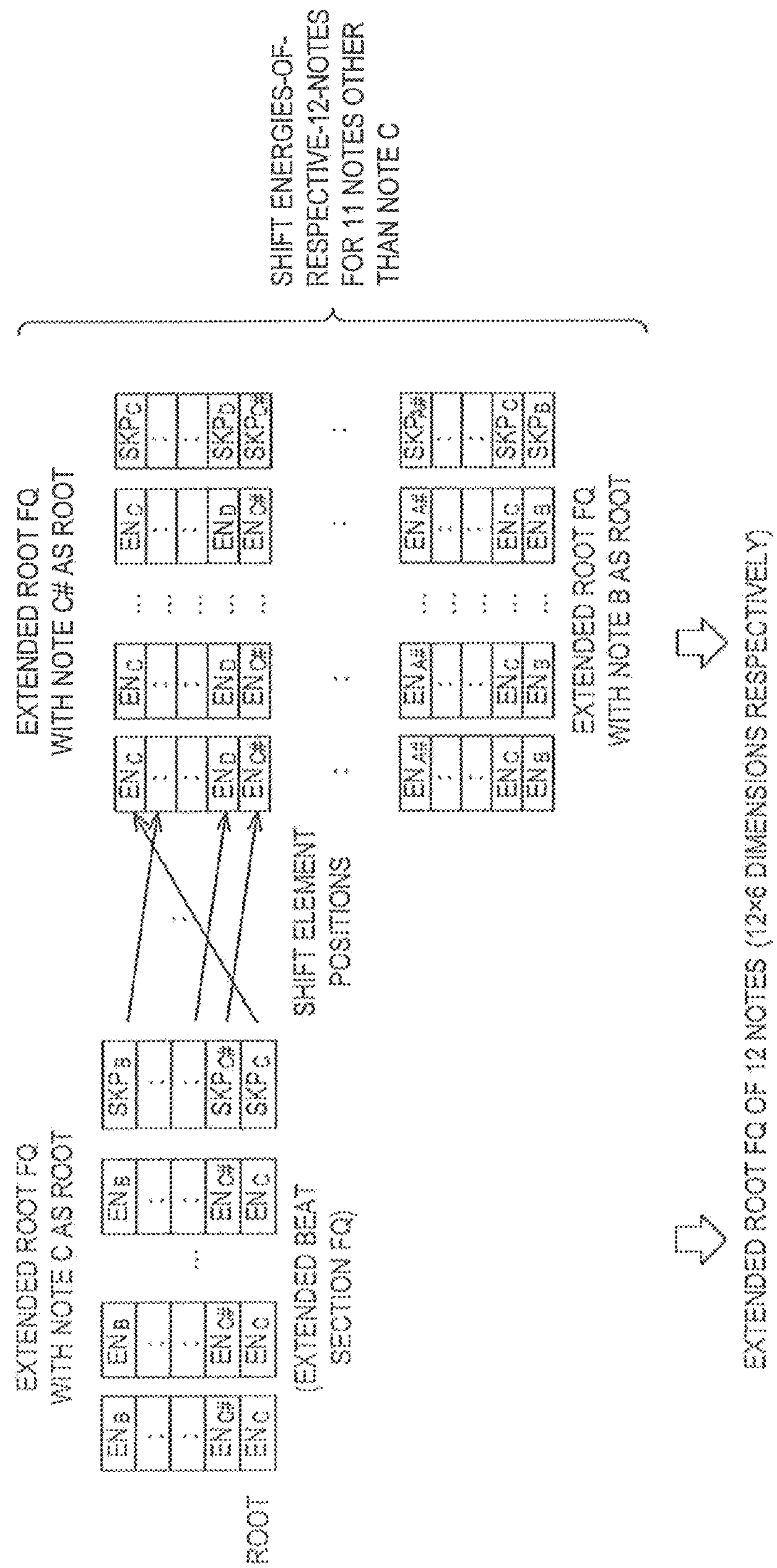
FIG. 70 is an explanatory diagram showing an example of the chord progression detection method according to the present embodiment.

The root feature quantity preparation unit 274 shifts the element positions of the extended root feature quantity input from the beat section feature quantity calculation unit 272, and generates 12 separate extended root feature quantities. For example, the root feature quantity preparation unit 274 generates the extended beat section feature quantities by a method as shown in FIG. 70. As shown in FIG. 70, the root feature quantity preparation unit 274 takes the extended beat section feature quantity input from the beat section feature quantity calculation unit 272 as an extended root feature quantity with the note C as the root. Next, the root feature quantity preparation unit 274 shifts by a specific number the element positions of the 12 notes of the extended root feature quantity having the note C as the root. By this shifting process, 11 separate extended root feature quantities, each having any of the note C# to the note B as the root, are generated. Moreover, the number of shifts by which the element positions are shifted is the same as the number of shifts used by the root feature quantity preparation unit 234 of the chord probability detection unit 136.

The root feature quantity preparation unit 274 performs the extended root feature quantity generation process as described for all the beat sections, and prepares extended root feature quantities to be used for the recalculation of the chord probability for each section. The extended root feature quantities generated by the root feature quantity preparation unit 274 are input to the chord probability calculation unit 276.

The chord probability calculation unit 276 calculates, for each beat section, a chord probability indicating the probability of each chord being played, by using the root feature quantities input from the root feature quantity preparation unit 274. "Each chord" here means each of the chords distinguished by the root (C, C#, D, . . . ), the number of constituent notes (a triad, a 7th chord, a 9th chord), the tonality (major/minor), or the like, for example. An extended chord probability formula obtained by a learning process according to a logistic regression analysis is used for the computation of the chord probability, for example. For example, the extended chord probability formula to be used for the recalculation of the chord probability by the chord probability calculation unit 276 is generated by a method as shown in FIG. 71. Moreover, the learning of the extended chord probability formula is performed for each type of chord as in the case for the chord probability formula. That is, a learning process is performed for each of an extended chord probability formula for a major chord, an extended chord probability formula for a minor chord, an extended chord probability formula for a 7th chord and an extended chord probability formula for a 9th chord, for example.

First, a plurality of extended root feature quantities (for example, 12 separate 12×6-dimensional vectors described by using FIG. 70), respectively for a beat section whose correct chord is known, are provided as independent variables for the logistic regression analysis. Furthermore, dummy data for predicting the generation probability by the logistic regression analysis is provided for each of the extended root feature quantities for respective beat sections. For example, when learning the extended chord probability formula for a major chord, the value of the dummy data will be a true value (1) if a known chord is a major chord, and a false value (0) for any other case. Also, when learning the extended chord probability formula for a minor chord, the value of the dummy data will be a true value (1) if a known chord is a minor chord, and a false value (0) for any other case. The same can be said for the 7th chord and the 9th chord.

Figure 72:
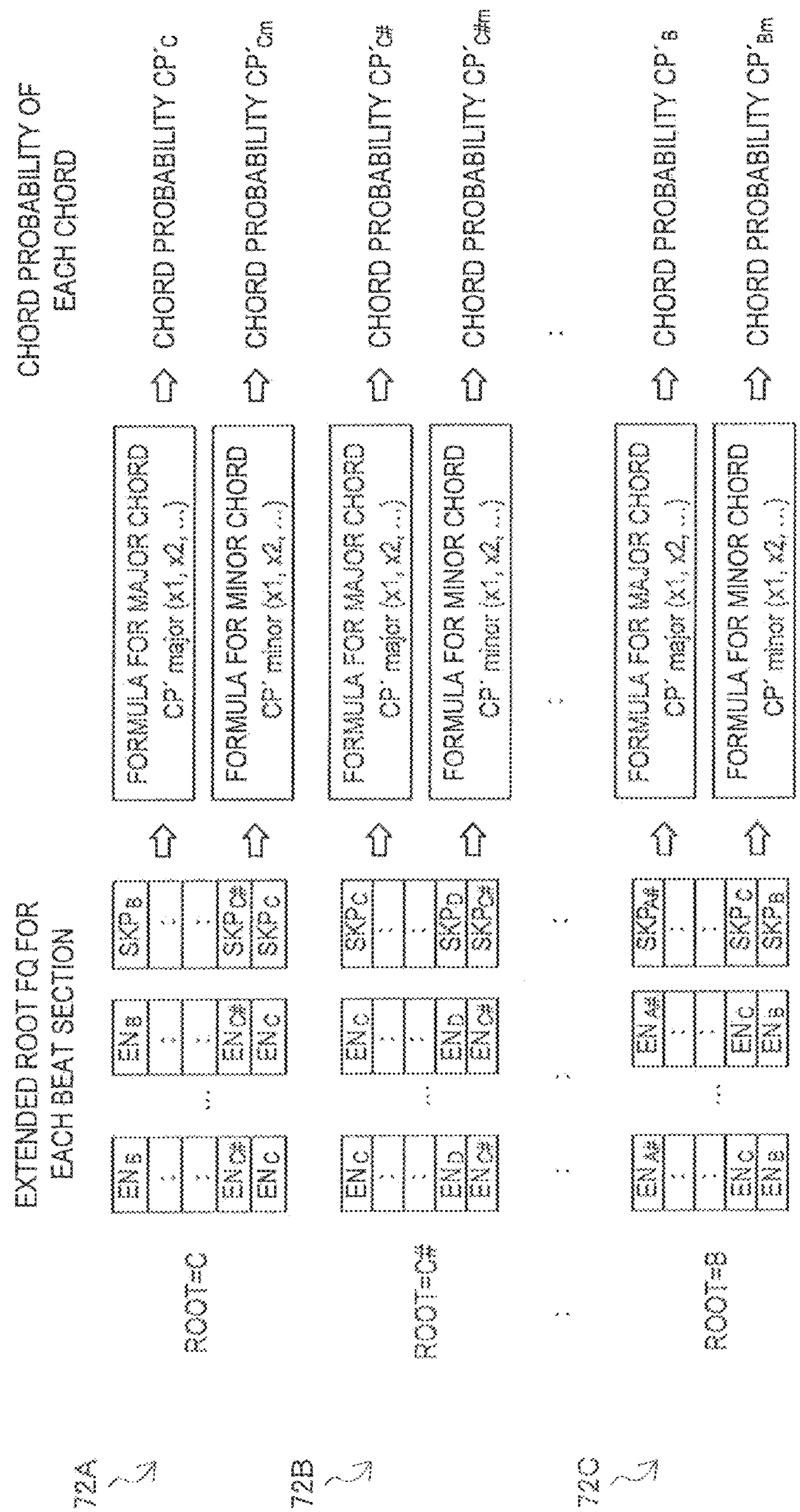
FIG. 72 is an explanatory diagram showing an example of the chord progression detection method according to the present embodiment.

By performing the logistic regression analysis for a sufficient number of the extended root feature quantities, each for a beat section, by using the independent variables and the dummy data as described above, an extended chord probability formula for recalculating each chord probability from the root feature quantity is obtained. When the extended chord probability formula is generated, the chord probability calculation unit 276 applies the extended chord probability formula to the extended root feature quantity input from the extended root feature quantity preparation unit 274, and sequentially computes the chord probabilities for respective beat sections. For example, the chord probability calculation unit 276 recalculates the chord probability by a method as shown in FIG. 72.

In FIG. 72(A), an extended root feature quantity with the note C as the root, among the extended root feature quantities for each beat section, is shown. The chord probability calculation unit 276 applies the extended chord probability formula for a major chord to the extended root feature quantity with the note C as the root, for example, and calculates a chord probability $CP'_C$ of the chord being "C" for the beat section. Furthermore, the chord probability calculation unit 276 applies the extended chord probability formula for a minor chord to the extended root feature quantity with the note C as the root, and recalculates a chord probability $CP'_{Cm}$ of the chord being "Cm" for the heat section. In a similar manner, the chord probability calculation unit 276 applies the extended chord probability formula for a major chord and the extended chord probability formula for a minor chord to the extended root feature quantity with the note C# as the root, and recalculates a chord probability $CP'_{C\#}$ and a chord probability $CP'_{C\#m}$ (B). The same can be said for the recalculation of a chord probability $CP'_{B}$, a chord probability $CP'_{Bm}$ (C), and chord probabilities for other types of chords (including 7th, 9th and the like).

The chord probability calculation unit 276 repeats the recalculation process for the chord probabilities as described above for all the focused beat sections, and outputs the recalculated chord probabilities to the chord probability correction unit 278.

The chord probability correction unit 278 corrects the chord probability recalculated by the chord probability calculation unit 276, based on the similarity probabilities between beat sections input from the structure analysis unit 134. For example, let us assume that the chord probability for a chord X in an i-th focused beat section is $CP'_x(i)$, and the similarity probability between the i-th beat section and a beat section is SP(i, j). Then, a chord probability after correction $CP''_x(i)$ is given by the following equation (12).

[Equation 11]

$$CP''_X(i) = \sum_j CP'_X(j) \cdot \left( \frac{SP(i, j)}{\sum_k SP(i, k)} \right) \quad (12)$$

That is, the chord probability after correction $CP''_x(i)$ is a value obtained by weighting and summing the chord probabilities by using normalized similarity probabilities where each of the similarity probabilities between a beat section corresponding to a focused beat and another beat section is taken as a weight. By such a correction of probability values, the chord probabilities of beat sections with similar sound contents will have closer values compared to before correction. The chord probabilities for respective beat sections corrected by the chord probability correction unit 278 are input to the chord progression determination unit 280.

Figure 73:
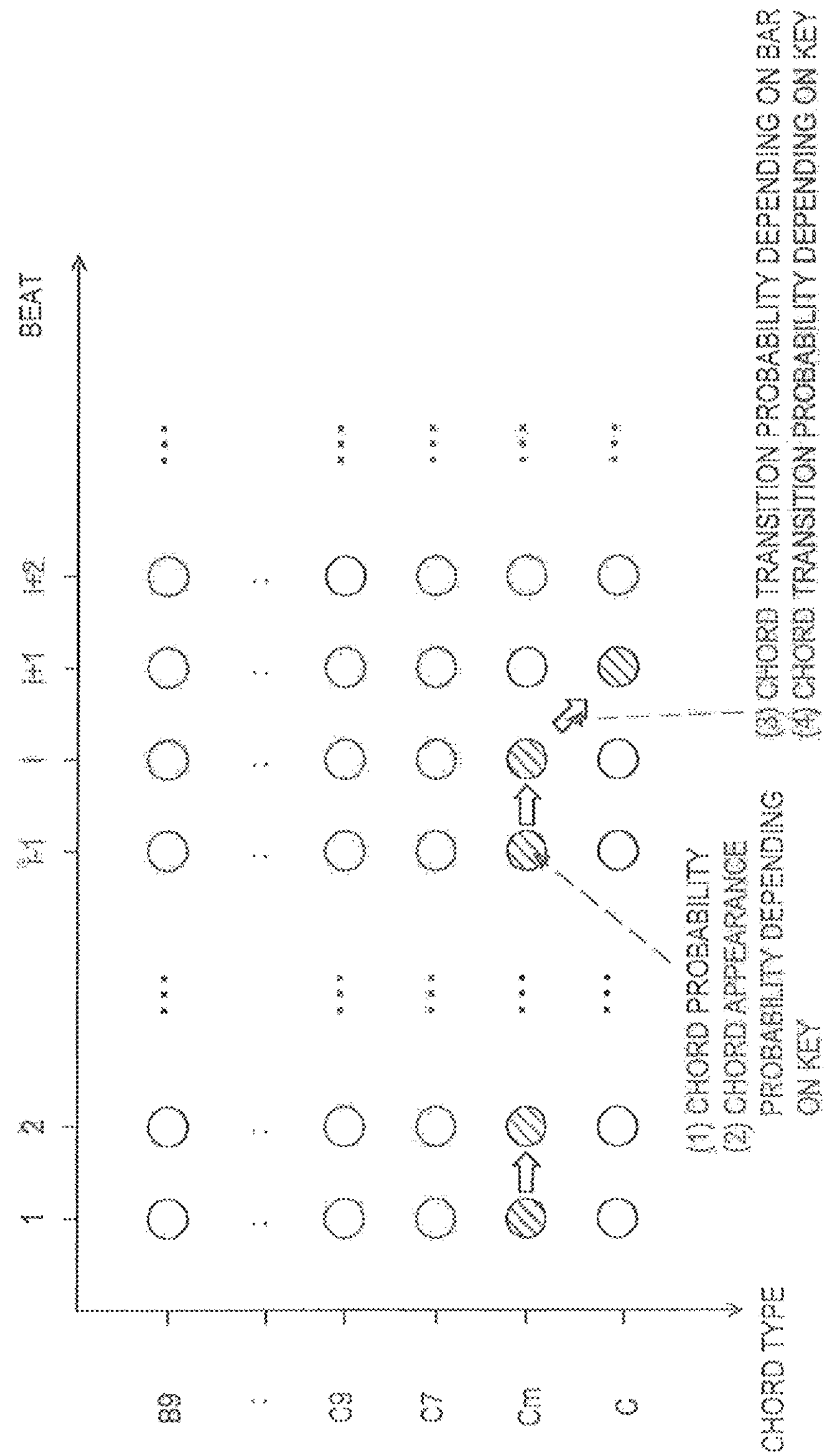
FIG. 73 is an explanatory diagram showing an example of the chord progression detection method according to the present embodiment.

The chord progression determination unit 280 determines a likely chord progression by a path search, based on the chord probabilities for respective beat positions input from the chord probability correction unit 278. The Viterbi algorithm can be used as the method of path search by the chord progression determination unit 280, for example. The path search is performed by a method as shown in FIG. 73, for example. As shown in FIG. 73, beats are arranged sequentially on the time axis (horizontal axis). Furthermore, the types of chords for which the chord probabilities have been computed are used for the observation sequence (vertical axis). That is, the chord progression determination unit 280 takes, as the subject node of the path search, each of all the pairs of a beat section input from the chord probability correction unit 278 and a type of chord.

With regard to the node as described, the chord progression determination unit 280 sequentially selects, along the time axis, any of the nodes. Then, the chord progression determination unit 280 evaluates a path formed from a series of selected nodes by using four evaluation values, (1) chord probability, (2) chord appearance probability depending on the key, (3) chord transition probability depending on the bar, and (4) chord transition probability depending on the key. Moreover, skipping of beat is not allowed at the time of selection of a node by the chord progression determination unit 280.

Among the evaluation values used for the evaluation of a path by the chord progression determination unit 280, (1) chord probability is the chord probability described above corrected by the chord probability correction unit 278. The chord probability is given to each node shown in FIG. 73. Furthermore, (2) chord appearance probability depending on the key is an appearance probability for each chord depending on a key specified for each beat section according to the key progression input from the key detection unit 138. The chord appearance probability depending on the key is predefined by aggregating the appearance probabilities for chords for a large number of music pieces, for each type of key used in the music pieces. Generally, the appearance probability is high for each of chords "C," "F," and "G" in a music piece whose key is C. The chord appearance probability depending on the key is given to each node shown in FIG. 73.

Furthermore, (3) chord transition probability depending on the bar is a transition probability for a chord depending on the type of a beat specified for each beat according to the bar progression input from the bar detection unit 140. The chord transition probability depending on the bar is predefined by aggregating the chord transition probabilities for a number of music pieces, for each pair of the types of adjacent beats in the bar progression of the music pieces. Generally, the probability of a chord changing at the time of change of the bar (beat after the transition is the first beat) or at the time of transition from a second beat to a third beat in a quadruple meter is higher than the probability of a chord changing at the time of other transitions. The chord transition probability depending on the bar is given to the transition between nodes. Furthermore, (4) chord transition probability depending on the key is a transition probability for a chord depending on a key specified for each beat section according to the key progression input from the key detection unit 138. The chord transition probability depending on the key is predefined by aggregating the chord transition probabilities for a large number of music pieces, for each type of key used in the music pieces. The chord transition probability depending on the key is given to the transition between nodes.

Figure 74:
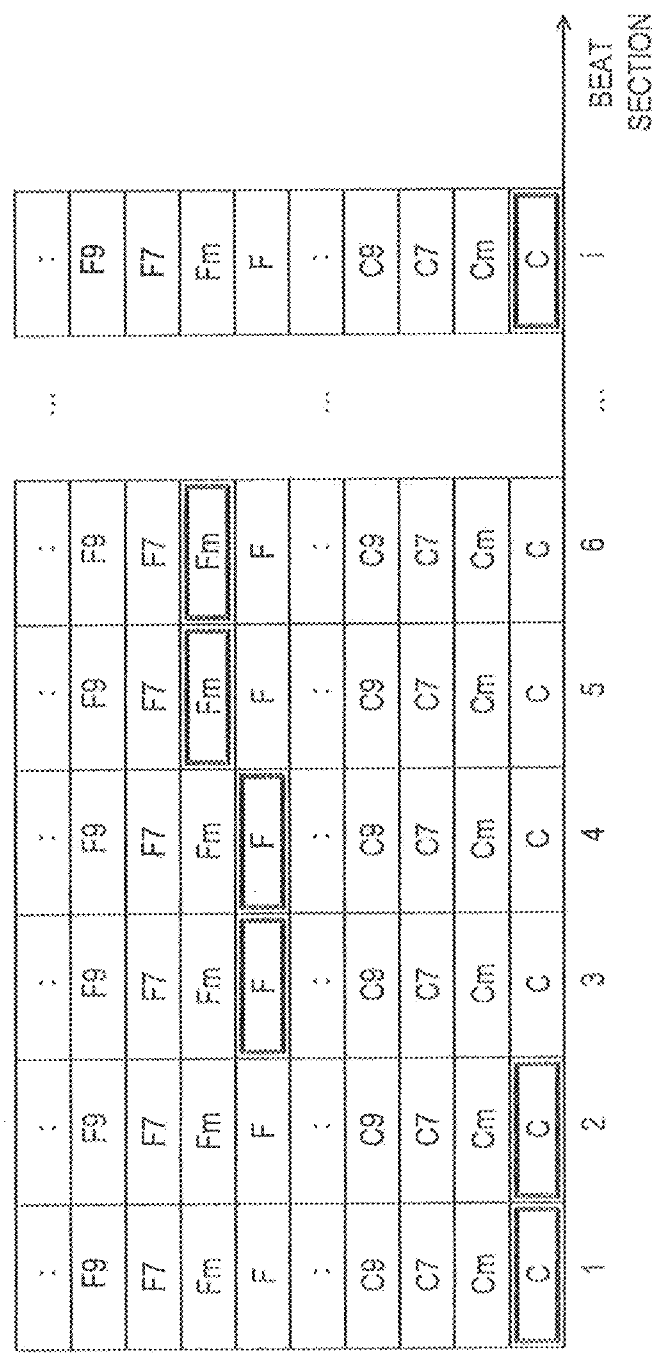
FIG. 74 is an explanatory diagram showing an example of the chord progression detection method according to the present embodiment.

The chord progression determination unit 280 sequentially multiplies with each other the evaluation values of the above-described (1) to (4) for each node included in a path, with respect to each path representing the chord progression described by using FIG. 73. Then, the chord progression determination unit 280 determines the path whose multiplication result as the path evaluation value is the largest as the maximum likelihood path representing a likely chord progression. For example, the chord progression determination unit 280 can obtain a chord progression as shown in FIG. 74 by determining the maximum likelihood path. In the example of FIG. 74, the chord progression determined by the chord progression determination unit 280 to be the maximum likelihood path for first to sixth beat sections and an i-th beat section is shown (see thick-line box). According to this example, the chords of the beat sections are "C," "C" "F" "F," "Fm," "Fm," . . . , "C" sequentially from the first beat section.

Heretofore, the configuration of the chord progression detection unit 142 has been described. As described above, the chord progression is detected from the music data by the processing by the structure analysis unit 134 through the chord progression detection unit 142. The chord progression extracted in this manner is stored in the metadata storage unit 112.

(2-4-7. Configuration of Melody Detection Unit 144)

Figure 75:
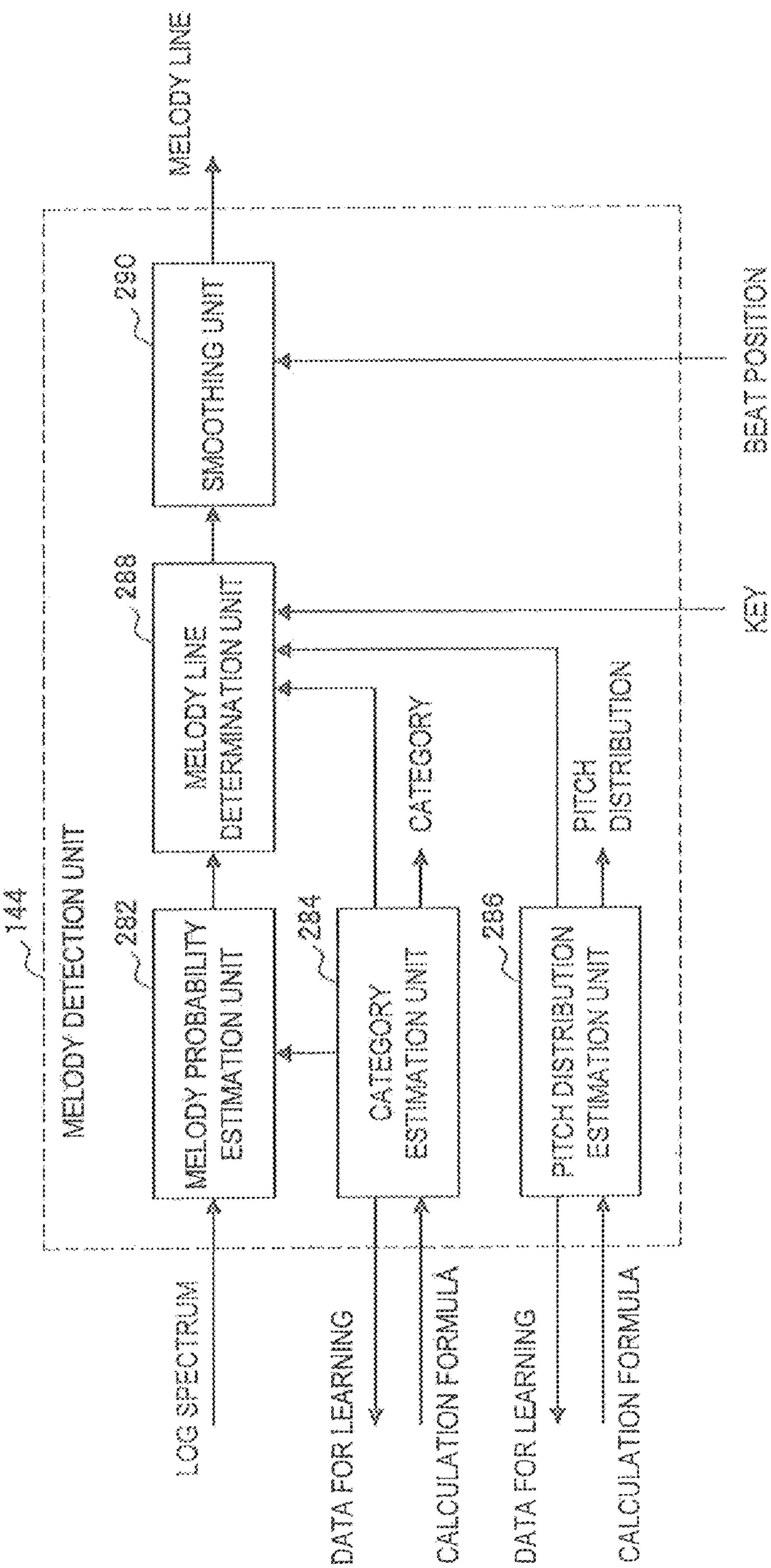
FIG. 75 is an explanatory diagram showing a configuration example of a melody detection unit according to the present embodiment.

Next, the melody detection unit 144 will be described. The melody detection unit 144 is means for detecting a melody line based on the log spectrum of the music data input from the log spectrum analysis unit 108. As shown in FIG. 75, the melody detection unit 144 includes a melody probability estimation unit 282, a category estimation unit 284, a pitch distribution estimation unit 286, a melody line determination unit 288, and a smoothing unit 290. Furthermore, information on the key detected by the key detection unit 138 is input to the melody line determination unit 288. Furthermore, information on the beat positions detected by the beat detection unit 132 is input to the smoothing unit 290. In the following, the configuration of each structural element will be described in detail in the order of the category estimation unit 284, the pitch distribution estimation unit 286, the melody probability estimation unit 282, the melody line determination unit 288, and the smoothing unit 290.

(Category Estimation Unit 284)

Next, the category estimation unit 284 will be described. The category estimation unit 284 is means for estimating, when a signal of a music piece is input, the music category to which the input signal belongs. As described later, by taking into consideration the music category to which each input signal belongs, a detection accuracy can be improved in a melody line detection processing performed later. As shown in FIG. 76, music pieces are categorized, such as “old piece,” “male vocal, loud background (BG),” “male vocal, soft background (BG),” “female vocal, loud background (BG),” for example. For example, “old piece” has a feature that, since the level of technology for the recording devices and the sound facilities at the time of the recording is different from that of the present day, the sound quality is poor or the proportion of the volume in the background is small. With respect to other categories, features as shown in FIG. 76 exist for respective categories. Thus, the input signals are classified based on the feature of each music piece. Moreover, the music categories are not limited to those shown in FIG. 76. For example, more refined categories can also be used based on the voice quality or the like.

Figure 77:
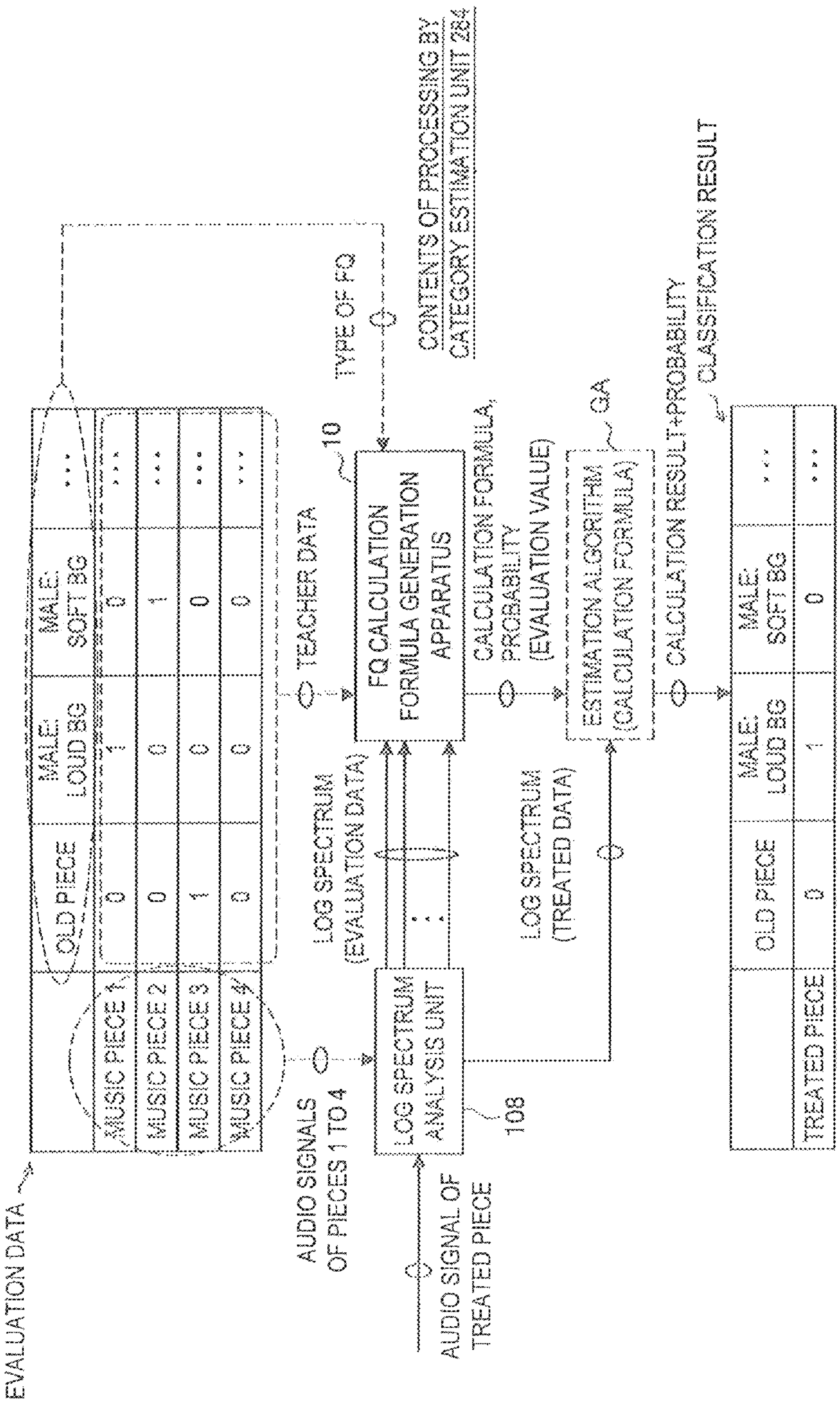
FIG. 77 is an explanatory diagram showing an example of the melody line detection method according to the present embodiment.

The category estimation unit 284 performs processing as shown in FIG. 77 to estimate the music category. First, the category estimation unit 284 has a plurality of audio signals (music piece 1, . . . , music piece 4) for being used as evaluation data converted to log spectra by the log spectrum analysis unit 108. Then, the category estimation unit 284 inputs the log spectra of the plurality of audio signals (music piece 1, . . . , music piece 4) to the feature quantity calculation formula generation apparatus 10 as the evaluation data. Furthermore, the category of each audio signal (music piece 1, . . . , music piece 4) used as the evaluation data is given as a category value (0 or 1) as shown in FIG. 77. The category value 0 indicates non-correspondence, and the category value 1 indicates correspondence. For example, audio signal (music piece 1) does not correspond to the categories “old piece” and “male vocal, soft BG,” and corresponds to “male vocal, loud BG.” The category estimation unit 284 generates an estimation algorithm (calculation formula) for computing the category value as described by using the feature quantity calculation formula generation apparatus 10.

Therefore, the category estimation unit 284 inputs as teacher data the category value of each category at the same time as inputting as the evaluation data the log spectra of the plurality of audio signals (music piece 1, . . . , music piece 4), to the feature quantity calculation formula generation apparatus 10. Accordingly, the log spectra of the audio signals (music piece 1, . . . , music piece 4) as evaluation data and the category value of each category as teacher data are input to the feature quantity calculation formula generation apparatus 10. Moreover, a log spectrum of one music piece is used as the evaluation data corresponding to each audio signal. When the evaluation data and the teacher data as described are input, the feature quantity calculation formula generation apparatus 10 generates for each category a calculation formula GA for computing a category value for each category from the log spectrum of an arbitrary audio signal. At this time, the feature quantity calculation formula generation apparatus 10 simultaneously outputs an evaluation value (probability) output by each calculation formula GA which is finally output.

When the calculation formulae GAs for respective categories are generated by the feature quantity calculation formula generation apparatus 10, the category estimation unit 284 has the audio signal of a music piece actually desired to be classified (hereinafter, treated piece) converted to a log spectrum by the log spectrum analysis unit 108. Then, the category estimation unit 284 inputs the log spectrum of the treated piece to the calculation formulae GAs for respective categories generated by the feature quantity calculation formula generation apparatus 10, and computes the category value for each category for the treated piece. When the category value for each category is computed, the category estimation unit 284 classifies the treated piece into a category with the highest category value. The category estimation unit 284 may also be configured to take the probability by each calculation formula into consideration at the time of classification. In this case, the category estimation unit 284 computes the probability of the treated piece corresponding to each category (hereinafter, correspondence probability) by using the category values computed by the calculation formulae corresponding to respective categories and the probabilities by the calculation formulae. Then, the category estimation unit 284 assigns the treated piece into a category for which the correspondence probability is the highest. As a result, a classification result as illustrated in FIG. 77 is obtained. The classification result obtained in this manner is input to the pitch distribution estimation unit 286, the melody probability estimation unit 282 and the melody line determination unit 288.

(Pitch Distribution Estimation Unit 286)

Figure 78:
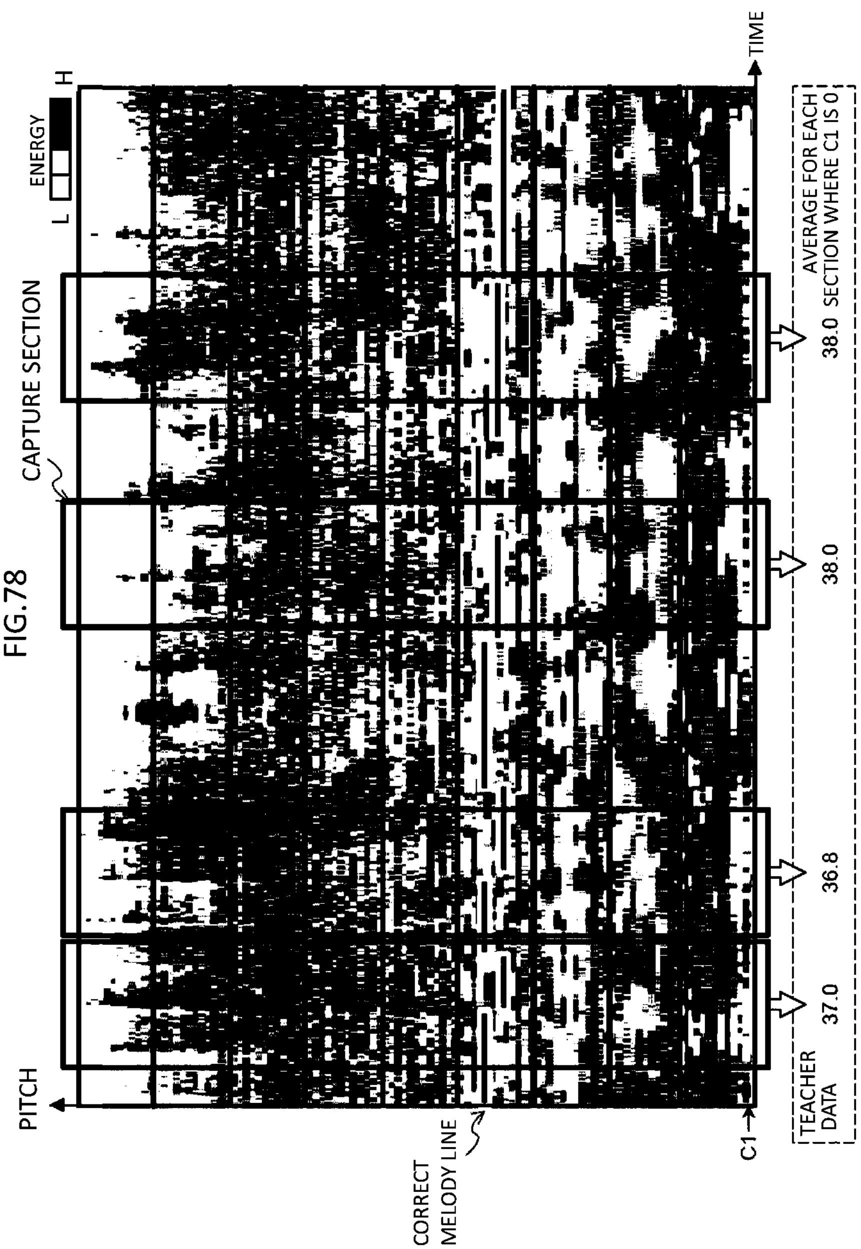
FIG. 78 is an explanatory diagram showing an example of the melody line detection method according to the present embodiment.
Figure 79:
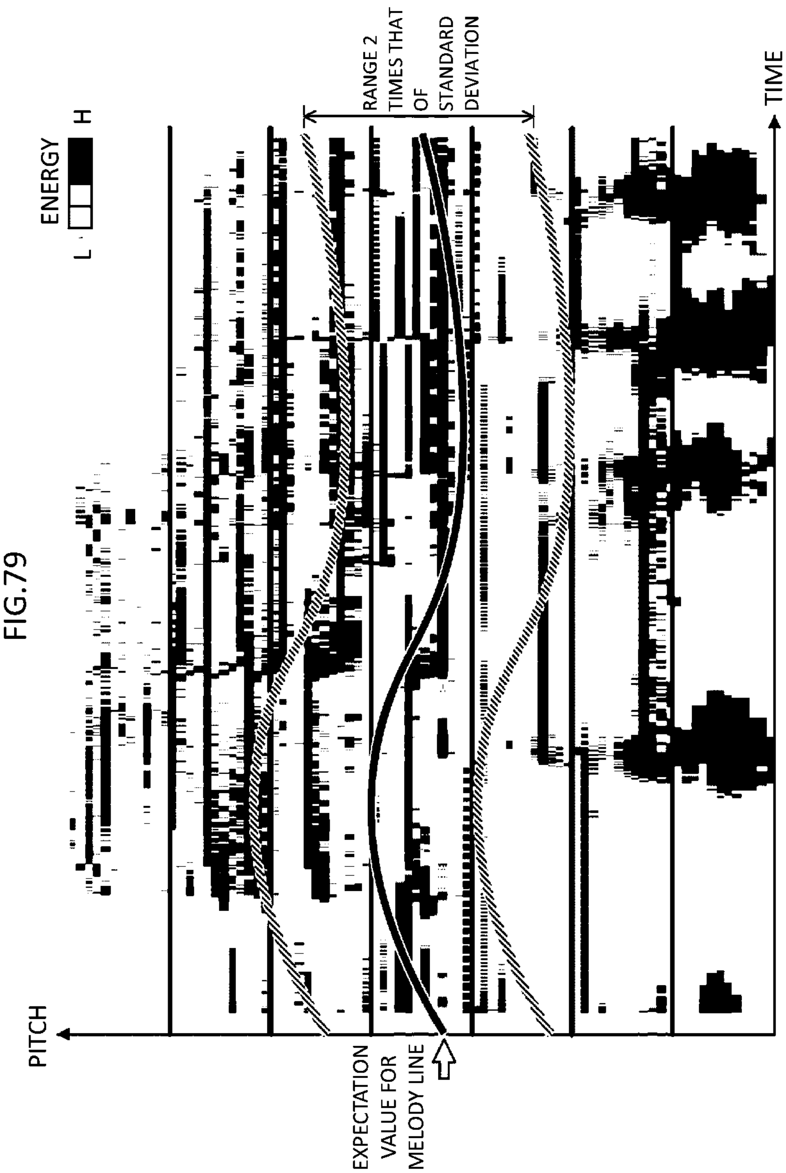
FIG. 79 is an explanatory diagram showing an example of the melody line detection method according to the present embodiment.

Next, referring to FIGS. 78 and 79, the configuration of the pitch distribution estimation unit 286 will be described. The pitch distribution estimation unit 286 is means for automatically estimating the distribution of a melody line. The distribution of a melody line is expressed by an expectation value computed for each section of the melody line changing over time and a standard deviation computed for the whole music piece. To estimate the distribution of the melody line as described from a log spectrum, the pitch distribution estimation unit 286 generates a calculation formula for computing the expectation value for the melody line in each section by using the feature quantity calculation formula generation apparatus 10.

First, as with the category estimation unit 284, the pitch distribution estimation unit 286 inputs, as evaluation data, log spectra of a plurality of audio signals to the feature quantity calculation formula generation apparatus 10. Furthermore, the pitch distribution estimation unit 286 cuts out as teacher data the correct melody line of each audio signal for each section (refer to FIG. 78), and inputs the same to the feature quantity calculation formula generation apparatus 10. When the evaluation data and the teacher data are input in this manner, a calculation formula for computing the expectation value for the melody line in each section is output from the feature quantity calculation formula generation unit 10. Furthermore, the category estimation unit 284 computes, with respect to the log spectrum of each audio signal used as the evaluation data, the errors between output values computed by the calculation formula and the correct melody line, used as the teacher data. Furthermore, the category estimation unit 284 computes the standard deviation of the melody line by approximating the obtained errors by the normal distribution. The range defined by the expectation value and the standard deviation of the melody line computed by the pitch distribution estimation unit 286 is expressed as the graph shown in FIG. 79, for example.

In this manner, the pitch distribution estimation unit 286 generates the calculation formula for estimating, from a section (time segment) of a log spectrum, the melody line in the section, by using the feature quantity calculation formula generation apparatus 10, and estimates the distribution of the melody line by using the calculation formula. At this time, the pitch distribution estimation unit 286 generates the calculation formula for each music category estimated by the category estimation unit 284. Then, the pitch distribution estimation unit 286 cuts out time segments from the log spectrum while gradually shifting time, and inputs the cut out log spectrum to the calculation formula and computes the expectation value and the standard deviation of the melody line. As a result, the estimation value for the melody line is computed for each section of the log spectrum. For example, probability $P(o|W_t)$, which is a probability of the melody being at a pitch o when a partial log spectrum $W_t$ at time t is input, is computed as the estimation value. The estimation value for the melody line computed by the pitch distribution estimation unit 286 in this manner is input to the melody line determination unit 288.

(Melody Probability Estimation Unit 282)

Figure 80:
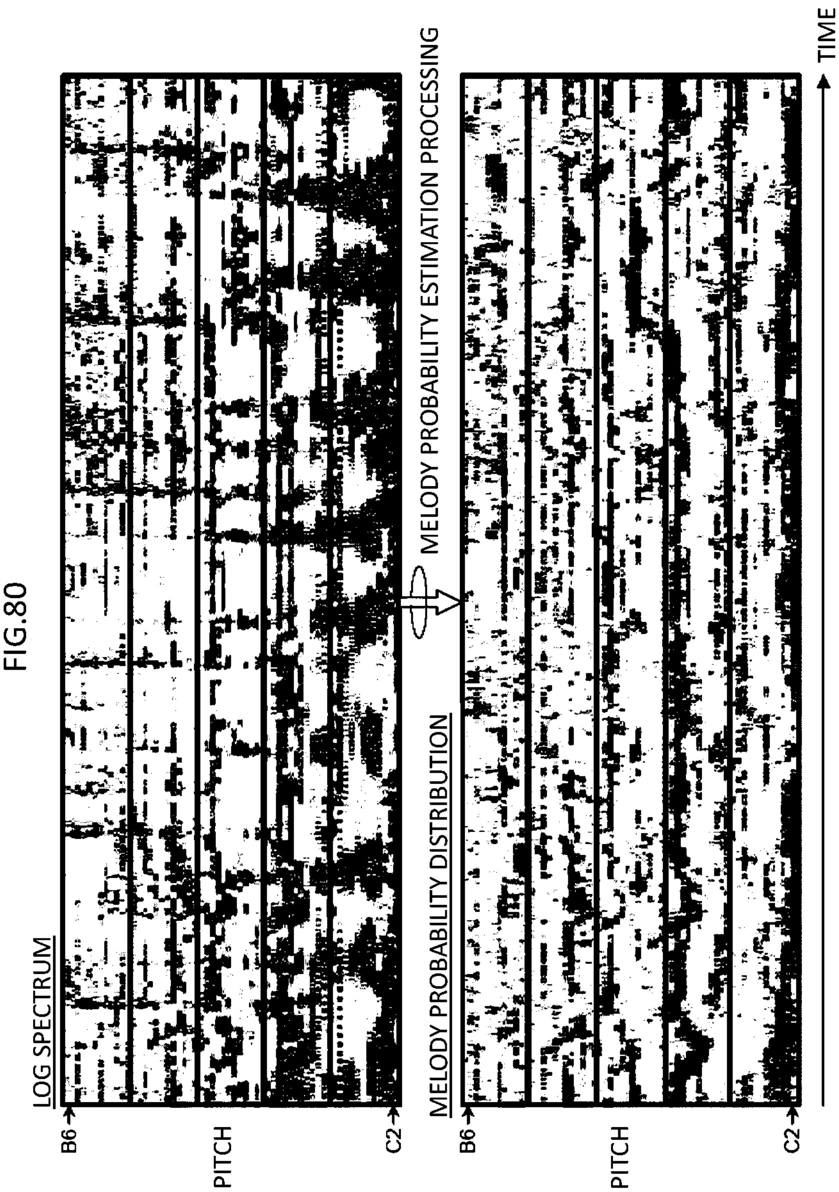
FIG. 80 is an explanatory diagram showing an example of the melody line detection method according to the present embodiment.
Figure 81:
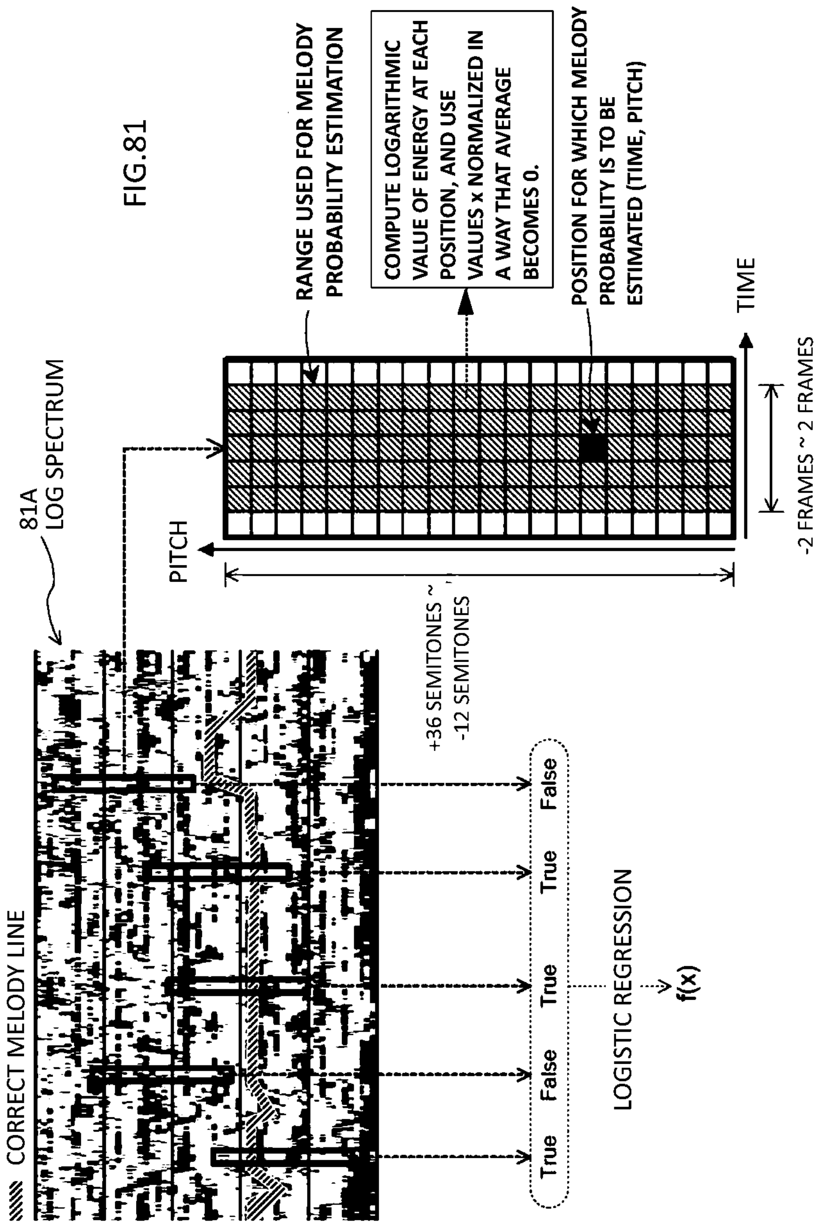
FIG. 81 is an explanatory diagram showing an example of the melody line detection method according to the present embodiment.

Next, referring to FIGS. 80 to 82, the configuration of the melody probability estimation unit 282 will be described. The melody probability estimation unit 282 is means for converting the log spectrum output from the log spectrum analysis unit 108 to a melody probability. For example, the melody probability estimation unit 282 converts the log spectrum shown in FIG. 80(A) to the melody probability distribution shown in FIG. 80(B). That is, the melody probability estimation unit 282 computes the melody probability at each coordinate position in the time-pitch space based on the log spectrum. The melody probability here means the probability of the value of the log spectrum at each coordinate position corresponding to the melody line. First, the melody probability estimation unit 282 performs a logistic regression by using, the log spectrum of music data whose correct melody line is known in advance to estimate the melody probability at each coordinate position. A function f for computing the melody line from the log spectrum is obtained by this logistic regression. Then, the melody probability estimation unit 282 computes the melody probability distribution as shown in FIG. 80(B) by using the obtained function.

Here, referring to FIGS. 81 and 82, a generation method for the above-described function f and a computation method for the melody probability using the function f respectively of the melody probability estimation unit 282 will be described in detail. First, as shown in FIG. 81, in the time-pitch space defining the values for the log spectrum, the melody probability estimation unit 282 takes the coordinate position for which the melody probability is to be estimated (hereinafter, an estimation position) as a reference point and selects a range having a specific size (hereinafter, a reference range). For example, the melody probability estimation unit 282 selects, with each estimation position as a reference point, a reference range having −12 to +36 semitones in the pitch axis direction and −2 to +2 frames in the time axis direction. An example of the reference range selected by the melody probability estimation unit 282 is schematically shown in FIG. 81. In this example, the coordinate position plotted in black is the estimation position and the hatched part around the estimation position is the reference range.

When the reference range is selected for each estimation position in this manner, the melody probability estimation unit 282 computes the logarithmic value of a log spectrum value (energy) corresponding to each coordinate position in the selected reference range. Furthermore, the melody probability estimation unit 282 normalizes the logarithmic values for the respective coordinate positions in such a way that the average value of the logarithmic values computed for the respective coordinate positions within the reference range becomes 0. The logarithmic value x (in the example of FIG. 81, $x=(x_1, \ldots, x_{245})$; 49 pitches×5 frames) after the normalization is used for the generation processing for the function f(x) for estimating the melody probability. The generation processing for the function f(x) is performed by using a plurality of pieces of music data whose correct melody lines are given in advance (hereinafter, music data for learning). First, the melody probability estimation unit 282 uses the log spectra of the music data for learning and computes for each estimation position the logarithmic value x after normalization (hereinafter, normalized logarithmic value x). Furthermore, the melody probability estimation unit 282 decides whether or not the correct melody line is included in each reference range. In the following, in case the correct melody line is included in the reference range, the decision result will be expressed as True; and in case the correct melody line is not included in the reference range, the decision result will be expressed as False.

When the normalized logarithmic values x and the decision results are obtained, the melody probability estimation unit 282 uses these results and generates "a function f(x) for outputting, in case a normalization logarithmic value x is input, a probability of the decision result being True for a reference range corresponding to the normalized logarithmic value x." The melody probability estimation unit 282 can generate the function f(x) by using a logistic regression, for example. The logistic regression is a method for computing a coupling coefficient by a regression analysis, assuming that the log it of the probability of the decision result being True or False can be expressed by a linear coupling of input variables. For example, when expressing the input variable as $x=(x_1, \ldots, x_n)$, the probability of the decision result being True as P(True), and the coupling coefficient as $\beta_0, \ldots, \beta_n$, the logistic regression model is expressed as the following equation (13). When the following equation (13) is modified, the following equation (14) is obtained, and a function f(x) for computing the probability P(true) of the decision result True from the input variable x is obtained.

[Equation 12]

$$\log\left[\frac{P(\text{True})}{1-P(\text{True})}\right] = \beta_0 + \beta_1 x_1 + \ldots + \beta_n x_n \quad (13)$$

-continued $$f(x) = P(\text{True}) = \frac{1}{1+\exp[-(\beta_0+\beta_1 x_1+\ldots+\beta_n x_n)]} \quad (14)$$

The melody probability estimation unit 282 inputs to the above equation (14) the normalized logarithmic value $x=(x_1, \ldots, x_{245})$ and the decision result obtained for each reference range front the music data for learning, and computes the coupling coefficients $\beta_0, \ldots, \beta_{245}$. With the coupling coefficients $\beta_0, \ldots, \beta_{245}$ determined in this manner, the function f(x) for computing from the normalized logarithmic value x the probability P(True) of the decision result being True is obtained. Since the function f(x) is a probability defined in the range of 0.0 to 1.0 and the number of pitches of the correct melody line at one time is 1, the function f(x) is normalized in such a way that the value totaled for the one time becomes 1. Also, the function f(x) is preferably generated for each music category. Thus, the melody probability estimation unit 282 computes the function f(x) for each category by using the music data for learning given for each category.

After generating the function f(x) for each category by such a method, when the log spectrum of treated piece data is input, the melody probability estimation unit 282 selects a function f(x), taking the category input from the category estimation unit 284 for the treated piece data into consideration. For example, in case the treated piece is classified as "old piece," a function f(x) obtained from the music data for learning for "old piece" is selected. Then, the melody probability estimation unit 282 computes the melody probability by the selected function f(x) after having converted the log spectrum value of the treated piece data to a normalized logarithmic value x. When the melody probability is computed by the melody probability estimation unit 282 for each coordinate position in the time-pitch space, the melody probability distribution as shown in FIG. 80(B) is obtained. The melody probability distribution obtained in this manner is input to the melody line determination unit 288.

(Flow of Function f(x) Generation Processing)

Figure 82:
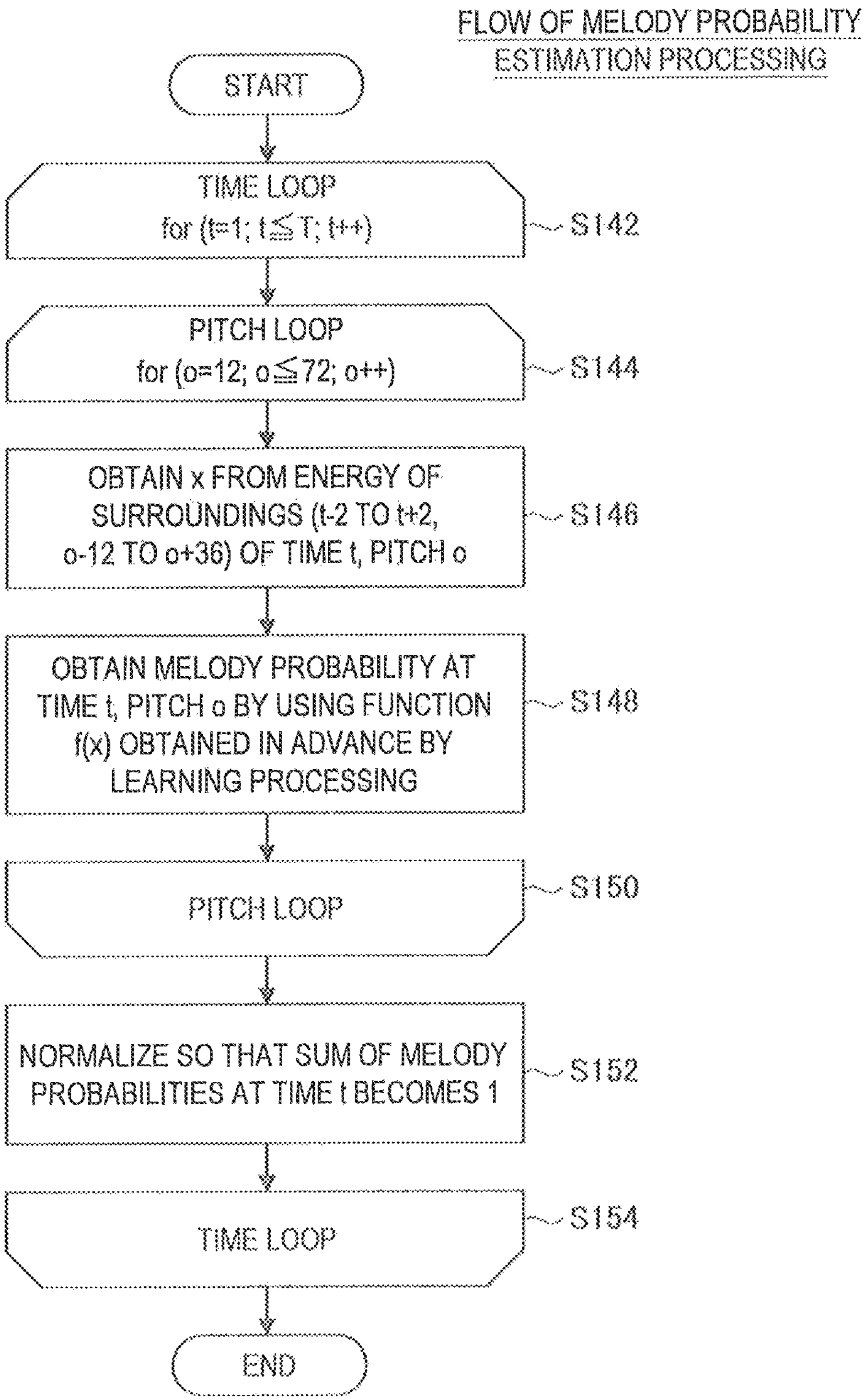
FIG. 82 is an explanatory diagram showing an example of the melody line detection method according to the present embodiment.

Here, referring to FIG. 82, a flow of processing of the function f(x) generation method of the melody probability estimation unit 282 will be briefly described.

As shown in FIG. 82, first, the melody probability estimation unit 282 starts a loop processing for the time axis direction (S142). At this time, a time t (frame number t) indicating the estimation position in the time axis direction is set. Then, the melody probability estimation unit 282 starts a loop processing for the pitch axis direction (S144). At this time, a pitch o indicating the estimation position in the pitch axis direction is set. Then, the melody probability estimation unit 282 obtains the normalized logarithmic values x for the reference range for the estimation position indicated by the time t and the pitch o set in steps S142 and S144 (S146). For example, the surroundings (t−2 to t+2, o−12 to o+36) of the estimation position (t, o) are selected as the reference range, and the normalized logarithmic values $x=\{x(t+\Delta t, o+\Delta o); -2\le\Delta t\le 2, -12\le o\le 36\}$ are computed. Next, the melody probability estimation unit 282 computes the melody probability at the time t and the pitch o by using the function f(x) obtained in advance by a learning process by using the music data for learning (S148).

The melody probability of the estimation position indicated by the time t and the pitch o is estimated by steps S146 and S148. Now, the melody probability estimation unit 282 returns to the process of step S144 (S150), and increments the pitch o of the estimation position by 1 semitone and repeats the processes of steps S146 and S148. The melody probability estimation unit 282 performs the processes of steps S146 and S148 for a specific pitch range (for example, o=12 to 72) by incrementing the pitch o of the estimation position by 1 semitone at a time. After the processes of steps S146 and S148 are performed for the specific pitch range, the melody probability estimation unit 282 proceeds to the process of step S152.

In step S152, the melody probability estimation unit 282 normalizes the melody probabilities at the time t so that the sum of the melody probabilities becomes 1 (S152). That is, with respect to the time t of the estimation position set in step S142, the melody probability for each pitch o is normalized in step S152 in such a way that the sum of the melody probabilities computed for the specific pitch range becomes 1. Then, the melody probability estimation unit 282 returns to the process of step S142 (S154), and repeats the processes of steps S144 to S152 after incrementing the time t of the estimation position by 1 frame. The melody probability estimation unit 282 performs the processes of steps S144 to S152 for a specific time range (for example, t=1 to T) by incrementing the time t of the estimation position by 1 frame at a time. After the processes of steps S144 to S152 are performed for the specific time range, the melody probability estimation unit 282 ends the estimation process for the melody probability.

(Melody Line Determination Unit 288)

Figure 83:
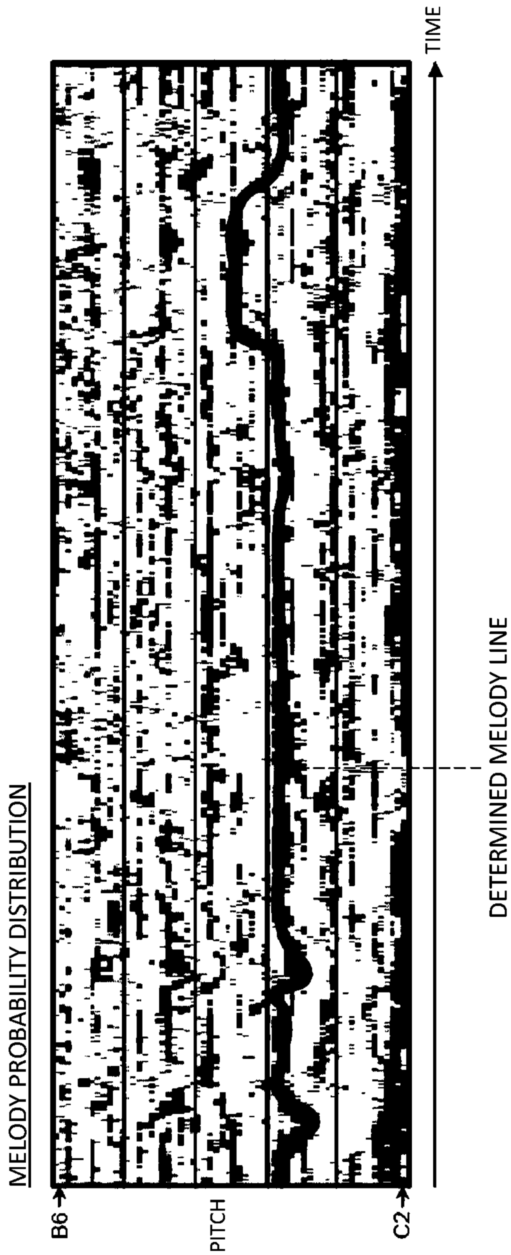
FIG. 83 is an explanatory diagram showing an example of the melody line detection method according to the present embodiment.

Next, referring to FIGS. 83 to 85, the configuration of the melody line determination unit 288 will be described. The melody line determination unit 288 is means for determining a likely melody line based on the melody probability estimated by the melody probability estimation unit 282 and the expectation value, standard deviation and the like of the melody line that are estimated by the pitch distribution estimation unit 286. To determine the likely melody line, the melody line determination unit 288 performs a process of searching for a path with the highest melody probability in the time-pitch space. For the path search to be performed, $P(o|W_t)$ computed by the pitch distribution estimation unit 286 and probabilities $p(\Delta o)$ and $p(n_t|n_{t-1})$ shown below are used. As already described, the probability $P(o|W_t)$ is the probability of the melody being at a pitch o at a certain time t.

First, the melody line determination unit 288 computes the rate of appearance of pitch transition whose change amount Δo at the correct melody line of each music data. After computing the appearance rate of each pitch transition Δo for a number of pieces of music data, the melody line determination unit 288 computes, for each pitch transition Δo, the average value and the standard deviation for the appearance rate for all the pieces of music data. Then, by using the average value and the standard deviation for the appearance rate relating to each pitch transition Δ that are computed in the manner described above, the melody line determination unit 288 approximates the probabilities $p(\Delta o)$ by a Gaussian distribution having the average value and the standard deviation.

Next, explanation will be given on the probability $p(n_t|n_{t-1})$. The probability $p(n_t|n_{t-1})$ indicates a probability reflecting the transition direction at the time of transition from a pitch $n_{t-1}$ to a pitch $n_t$. The pitch $n_t$ takes any of the values Cdown, C#down, . . . , Bdown, Cup, C#up, . . . , Bup. Here, "down" means that the pitch goes down, and "up" means that the pitch goes up. On the other hand, $n_{t-1}$ does not take the going up or down of the pitch into consideration, and takes any of the values C, C#, . . . , B. For example, the probability p(Dup|C) indicates the probability of the pitch C going up to the pitch D. The probability $(n_t|n_{t-1})$ is used by shifting an actual key (for example, D) to a specific key (for example, C). For example, in case the current key is D and the specific key is C, a probability p(Gdown|E) is referred to for the transition probability of F#→Adown because F# is changed to E and A is changed to G due to the shifting of the keys.

Also for the probability $p(n_t|n_{t-1})$, as in the case of the probability p(Δo), the melody line determination unit 288 computes the rate of appearance of each pitch transition $n_{t-1}\rightarrow n_t$ in the correct melody line of each music data. After computing the appearance rate for each pitch transition $n_{t-1}\rightarrow n_t$ for a number of pieces of music data, the melody line determination unit 288 computes, for each pitch transition $n_{t-1}\rightarrow n_t$, the average value and the standard deviation for the appearance rate for all the pieces of music data. Then, by using the average value and the standard deviation for the appearance rate relating to each pitch transition $n_{t-1}\rightarrow n_t$ that are computed in the manner described above, the melody line determination unit 288 approximates the probabilities $p(n_t|n_{t-1})$ by a Gaussian distribution having the average value and the standard deviation.

Figure 84:
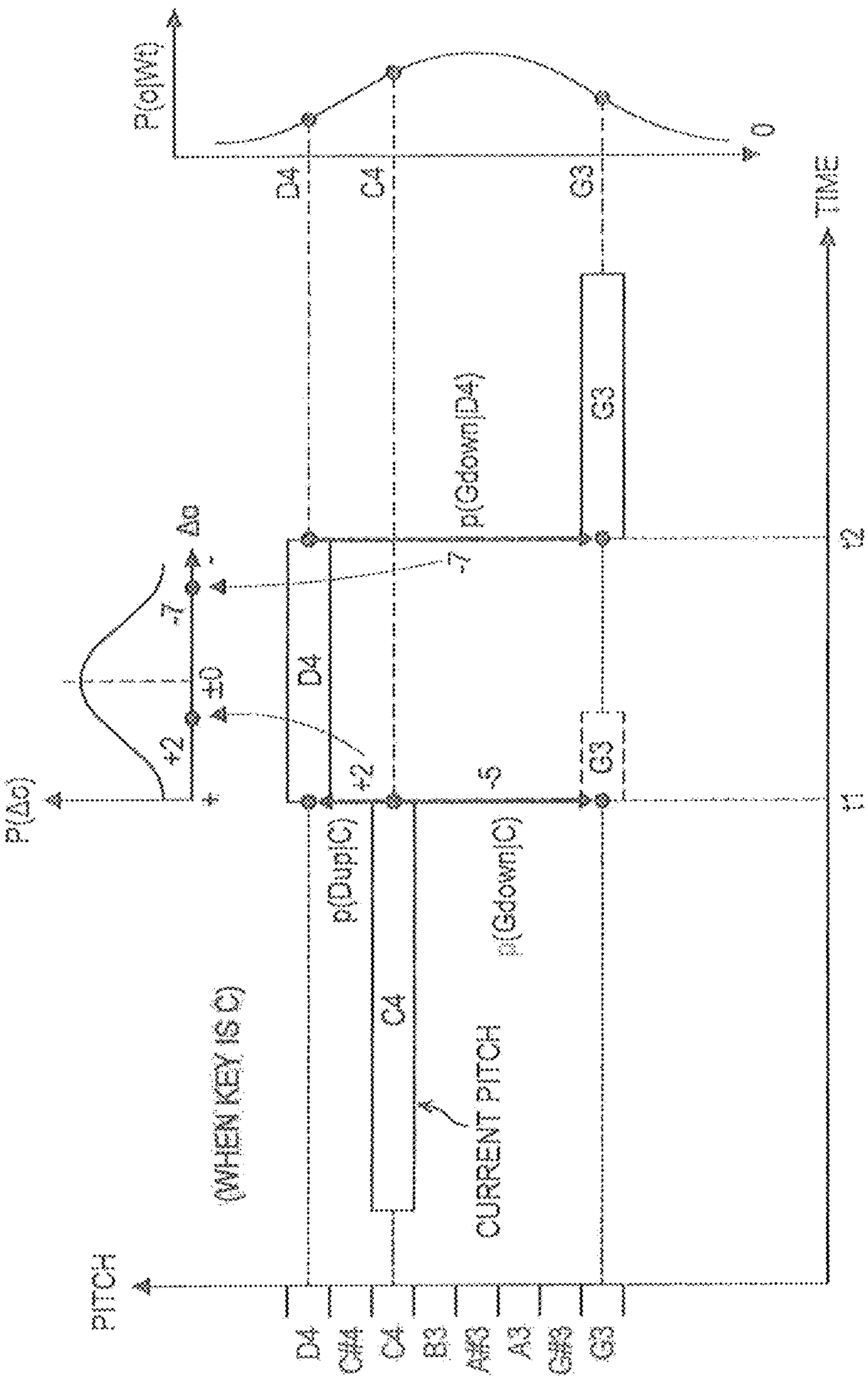
FIG. 84 is an explanatory diagram showing an example of the melody line detection method according to the present embodiment.
Figure 85:
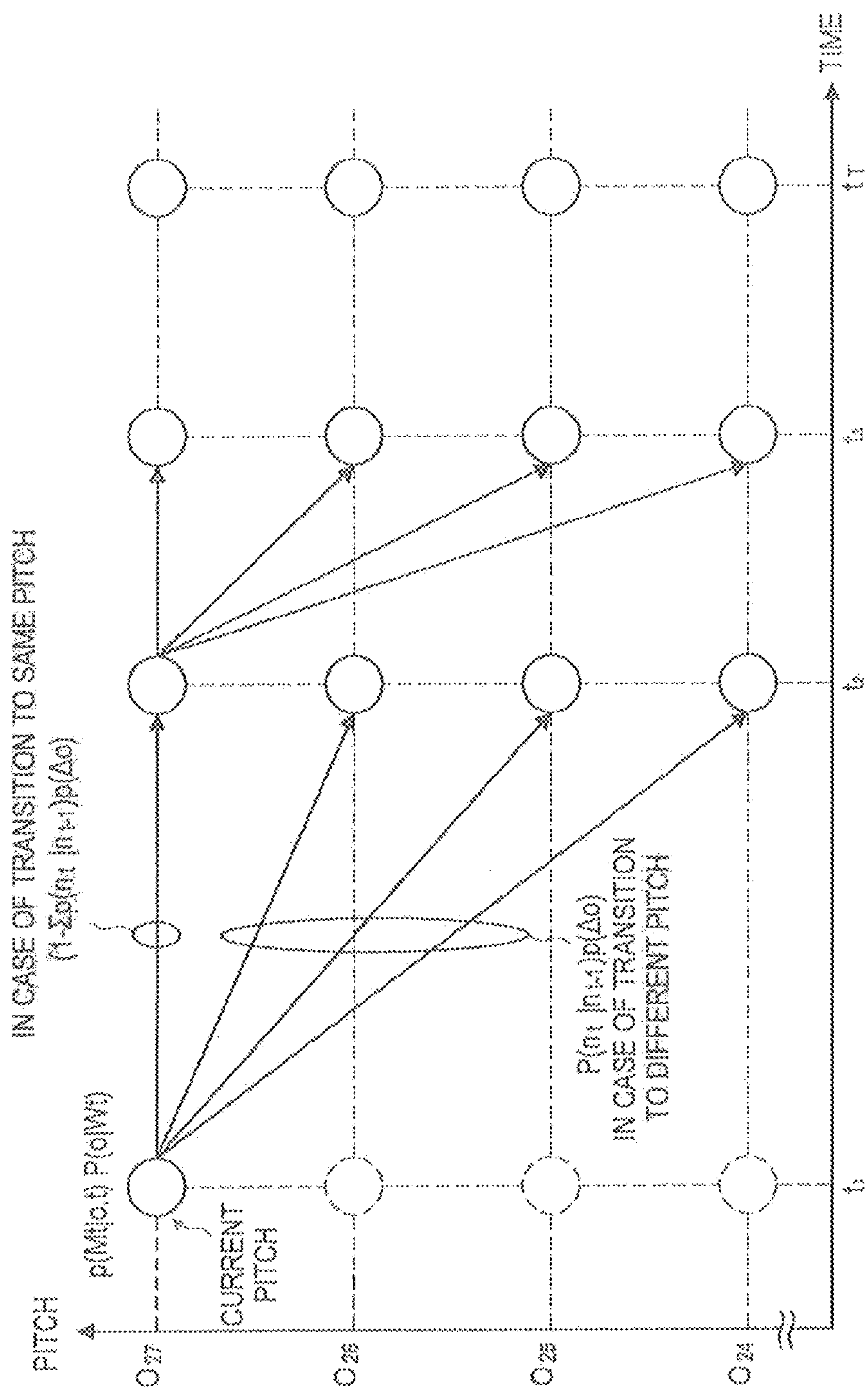
FIG. 85 is an explanatory diagram showing an example of the melody line detection method according to the present embodiment.

These probabilities are conceptually shown in FIG. 84. In the example of FIG. 84, the current pitch of the melody line is C4. In case of transition of pitch of the melody line at time $t_1$, the probabilities p(Δo) and $p(n_t|n_{t-1})$ are referred to. For example, in case of transition from pitch C4 to pitch D4, the difference between the pitches is 1-2 semitones. Also, in the example of FIG. 84, the transition is to a higher pitch in the same octave. Accordingly, probability p(Δo=+2) and probability p(Dup|C) are referred to. On the other hand, in case of transition from pitch C4 to pitch G3, the difference between the pitches is −5 semitones. Also, in the example of FIG. 84, the transition is to a lower pitch in the lower octave. Accordingly, probability p(Δo=−2) and probability p(Gdown|C) are referred to. Similarly, in case of transition of melody to pitch D4 at time $t_1$ and then to pitch G3 at time $t_2$, probability p(Δo=−7) and probability p(Gdown|D) are referred to. Furthermore, as the probability of each of pitches C4, D4 and G3, probability $P(o|W_t)$ is referred to.

The melody line is determined by using the probabilities $P(o|W_t)$, p(Δo) and $p(n_t|n_{t-1})$ obtained in the above-described manner. However, to use the probability $p(n_t|n_{t-1})$, the key of music data for which the melody line is to be estimated becomes necessary. As described above, the key is given by the key detection unit 138. Accordingly, the melody line determination unit 288 performs melody line determination processing described later by using the key given by the key detection unit 138

The melody line determination unit 288 determines the melody line by using a Viterbi search. The Viterbi search itself is a well-known path search method based on hidden Markov model. In addition to the probabilities $P(o|W_t)$, p(Δo) and $p(n_t|n_{t-1})$, the melody probability estimated by the melody probability estimation unit 282 for each estimation position is used for the Viterbi search by the melody line determination unit 288. In the following, the melody probability at time t and pitch o will be expressed as p(Mt|o,t). Using these probabilities, probability P(o,t) of the pitch o at a certain time point t being the melody is expressed as the following equation (15). Probability P(t+Δt,o|t,o) of transition from the pitch o to the same pitch o is expressed as the following equation (16). Furthermore, probability P(t+Δt,o+Δo|t,o) of transition from the pitch o to a different pitch o+Δo is expressed as the following equation (17),

[Equation 13]

$$P(o,t)=p(Mt|o,t)P(o|W_t) \tag{15}$$

$$P(o,t+\Delta t|o,t)=(1-\Sigma p(n_t|n_{t-1}))p(\Delta o) \tag{16}$$

$$P(o+\Delta o,t+\Delta t|o,t)=p(n_t|n_{t-1})p(\Delta o) \tag{17}$$

When using these expressions, probability $P(q_1,q_2)$ for a case of shifting from a node $q_1$ (time $t_1$, pitch $o_{27}$) to a node $q_2$ (time $t_2$, pitch $o_{26}$) is expressed as $P(q_1,q_2)=p(n_{t2}|n_{t1})p(\Delta o=-1)p(M1|o_{27},t_1)p(o_{27}|W_{t1})$. A path for which the probability expressed as above is the largest throughout the music piece is extracted as the likely melody line. Here, the melody line determination unit 288 takes the logarithmic value of probability for each Viterbi path as the reference for the path search. For example, sum of logarithmic values such as $\log(p(n_{t2}|n_{t1}))+\log(p(\Delta o=-1))+\log(p(M1|o_{27,t1})+\log(p(o_{27}|W_{t1}))$ will be used for $\log(P)(q_1,q_2))$.

Furthermore, the melody line determination unit 288 may be configured to use as the reference for Viterbi search a summed weighted logarithmic value obtained by performing weighting on respective types of the probabilities, instead of simply using the sum of the logarithmic values as the reference. For example, the melody line determination unit 288 takes as the reference for Viterbi search log(p(Mt|o,t), $b_1$*log(p(o|Wt)) of a passed-through node and $b_2$*log $(p_{nt}|n_{t-1})$ and $b_3$*log(p(Δo)) of transition between passed-through nodes by summing up the same. Here, b1, b2 and b3 are weight parameters given for each type of probability. That is, the melody line determination unit 288 calculates the above-described summed weighted logarithmic value for throughout the music piece and extracts a path for which the summed logarithmic value is the largest. The path extracted by the melody line determination unit 288 is determined to be the melody line.

Moreover, the probabilities and the weight parameters used for the Viterbi search are preferably different depending on the music category estimated by the category estimation unit 284. For example, for the Viterbi search for a melody line of a music piece classified as "old piece," it is preferable that probabilities obtained from a large number of "old pieces" for which the correct melody lines are given in advance and parameters tuned for "old piece" are used. The melody line determined by the melody line determination unit 288 in this manner is input to the smoothing unit 290.

(Smoothing Unit 290)

Next, the configuration of the smoothing unit 290 will be described. The smoothing unit 290 is means for smoothing the melody line determined by the melody line determination unit 288 for each section determined by beats of the music piece. The smoothing unit 290 performs smoothing processing based on the beat positions given by the beat detection unit 132. For example, the smoothing unit 290 performs voting for the melody line for each eighth note, and takes the most frequently appearing pitch as the melody line. A beat section may include a plurality of pitches as the melody line. Therefore, the smoothing unit 290 detects for each beat section the appearance frequencies of pitches determined to be the melody line, and smoothes the pitches of each beat section by the most frequently appearing pitch. The pitch smoothed for each beat section in this manner is stored in the metadata storage unit 112 as the melody line, (2-4-8. Configuration of Bass Detection Unit 146)

Figure 86:
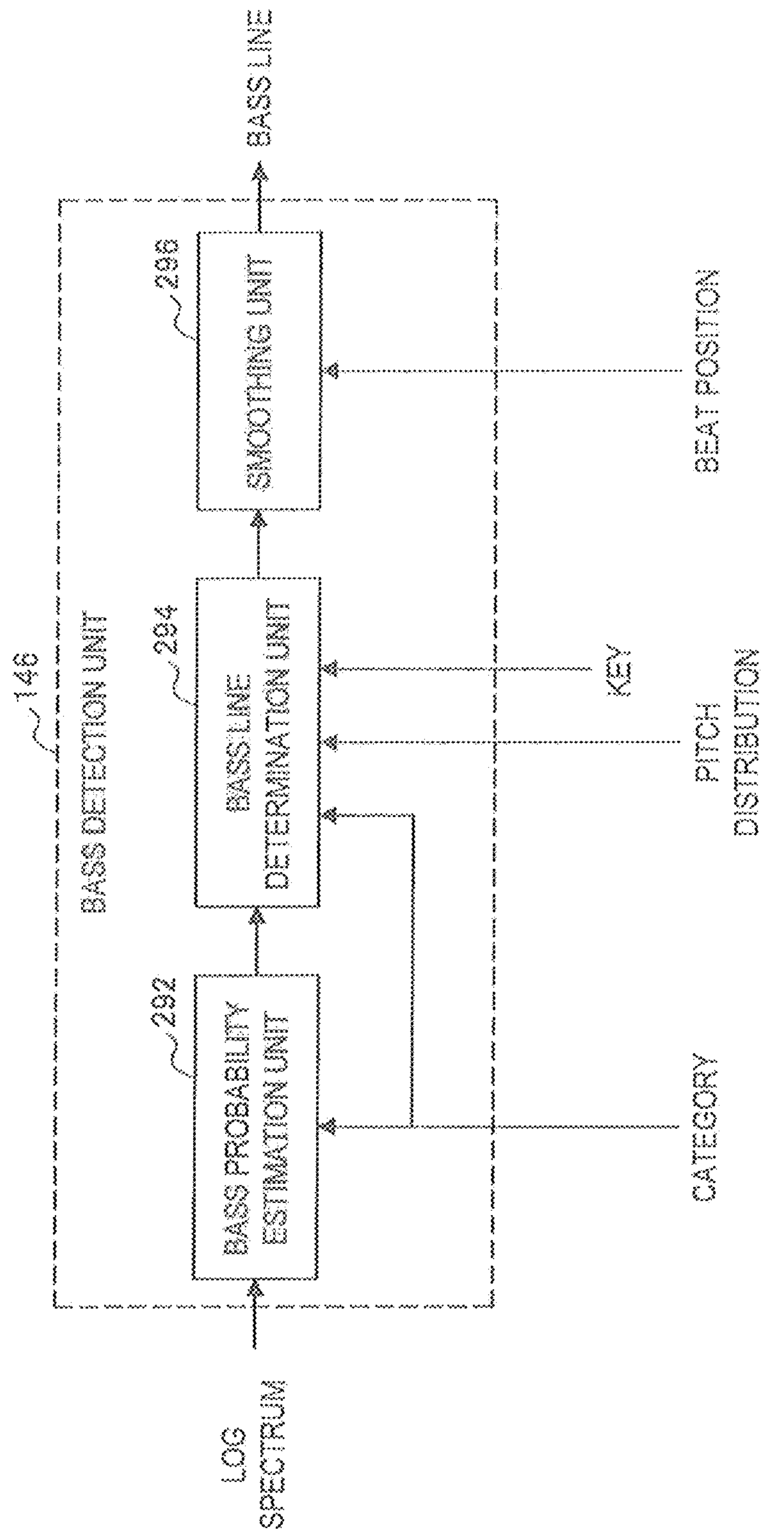
FIG. 86 is an explanatory diagram showing a configuration example of a bass detection unit according to the present embodiment.

Next, the bass detection unit 146 will be described. The bass detection unit 146 is means for detecting a bass line from the music data by a method similar to that of the above-described melody detection unit 144. As shown in FIG. 86, the bass detection unit 146 includes a bass probability estimation unit 292, a bass line determination unit 294 and a smoothing unit 296. Moreover, a category of music data is input to the bass probability estimation unit 292 and the bass line determination unit 294 from the category estimation unit 284. Also, information on pitch distribution is input to the bass line determination unit 294 from the pitch distribution estimation unit 286. Here, the pitch distribution input from the pitch distribution estimation unit 286 is a pitch distribution relating to the bass line. Furthermore, key is input to the bass line determination unit 294 from the key detection unit 138. Also, information on beat positions is input to the smoothing unit 296 from the beat detection unit 132.

(Bass Probability Estimation Unit 292)

First, the bass probability estimation unit 292 will be described. The bass probability estimation unit 292 is means for converting a log spectrum output from the log spectrum analysis unit 108 to a bass probability. The bass probability here indicates a probability of a log spectrum value at each coordinate position being a value for a bass line. First, to estimate the bass probability of each coordinate position, the bass probability estimation unit 292 performs a logistic regression by using a log spectrum of music data whose correct bass line is known in advance. A function f for computing the melody probability from the log spectrum is obtained by the logistic regression. Then, the bass probability estimation unit 292 computes the distribution of the bass probabilities by using the obtained function. Specifically, the processing by the bass probability estimation unit 292 is the same as the processing by the melody probability estimation unit 282 except that the melody probability computation processing is replaced by the bass probability computation processing. Accordingly, a detailed description will be omitted.

(Bass Line Determination Unit 294)

Next, the bass line determination unit 294 will be described. The bass line determination unit 294 is means for determining a likely bass line based on the bass probability estimated by the bass probability estimation unit 292 and the expectation value, standard deviation or the like of the bass line estimated by the pitch distribution estimation unit 286. Moreover, the distribution estimation for the bass line by the pitch distribution estimation unit 286 can be performed in a similar manner as for the melody line by changing the teacher data to be used as the data for learning to that of the bass line. Now, to determine a likely bass line, the bass line determination unit 294 performs a search process for a path with high bass probability in a time-pitch space. The search process performed here is realized by a method substantially the same as the process by the melody line determination unit 288 by changing the melody probability to the bass probability. Thus, a detailed description will be omitted.

(Smoothing Unit 296)

Next, the configuration of the smoothing unit 296 will be described. The smoothing unit 296 is means for smoothing, for each section determined by beats of the music piece, the bass line determined by the bass line determination unit 294. Moreover, the smoothing unit 296 performs the smoothing processing based on the beat positions provided by the beat detection unit 132. For example, the smoothing unit 296 performs voting for the bass line for each eighth note, and takes the most frequently appearing pitch as the bass line. A beat section may include a plurality of pitches as the bass line. Therefore, the smoothing unit 296 detects for each beat section the appearance frequencies of pitches determined to be the bass line, and smoothes the pitches of each beat section by the most frequently appearing pitch. The pitch smoothed for each beat section in this manner is stored in the metadata storage unit 112 as the bass line.

(2-4-9. Configuration of Metadata Detection Unit 148)

Next, the configuration of the metadata detection unit 148 will be described. The metadata detection unit 148 is means for extracting time-series metadata indicating, in specific time unit, one feature quantity of music data, and metadata per music piece indicating, for a music piece, one feature quantity of music data.

The time-series metadata may be, for example, the presence probability of each instrument sound, a probability of each instrument sound being a solo performance (hereinafter, a solo probability), a voice feature of the vocals, or the like. Also, the types of the instrument sounds include, for each section, vocals, guitar, bass, keyboard, drums, strings, brass, chorus and the like. To describe in detail, a snare, a kick, a tom-tom, a hi-hat and a cymbal are included as the drum sound. That is, the presence probability or the solo probability of each type of the instrument sounds as described is extracted as the time-series metadata. Furthermore, as the tune-series metadata relating to the vocals, whether it is a shout or not is extracted as the metadata. On the other hand, the metadata per music piece may be a probability of music data belonging to a specific genre, the presence probability of each instrument sound over a whole music piece, tone of music, or the like. A specific genre may be rock, pops, dance, rap, jazz, classics, or the like, for example. Also, the tone of music may be lively, quiet, or the like.

As an example, a method of computing a presence probability of an instrument sound indicating which instrument is being played at which timing (an example of the time-series metadata) will be described. Moreover, with this method, the metadata detection unit 148 computes the presence probability of each instrument sound for each of the combinations of the sound sources separated by the sound source separation unit 106. First, to estimate the presence probability of an instrument sound, the metadata detection unit 148 generates, by using the feature quantity calculation formula generation apparatus 10 (or other learning algorithm), a calculation formula for computing the presence probability of each instrument sound. Furthermore, the metadata detection unit 148 computes the presence probability of each instrument sound by using the calculation formula generated for each type of the instrument sound.

Figure 87:
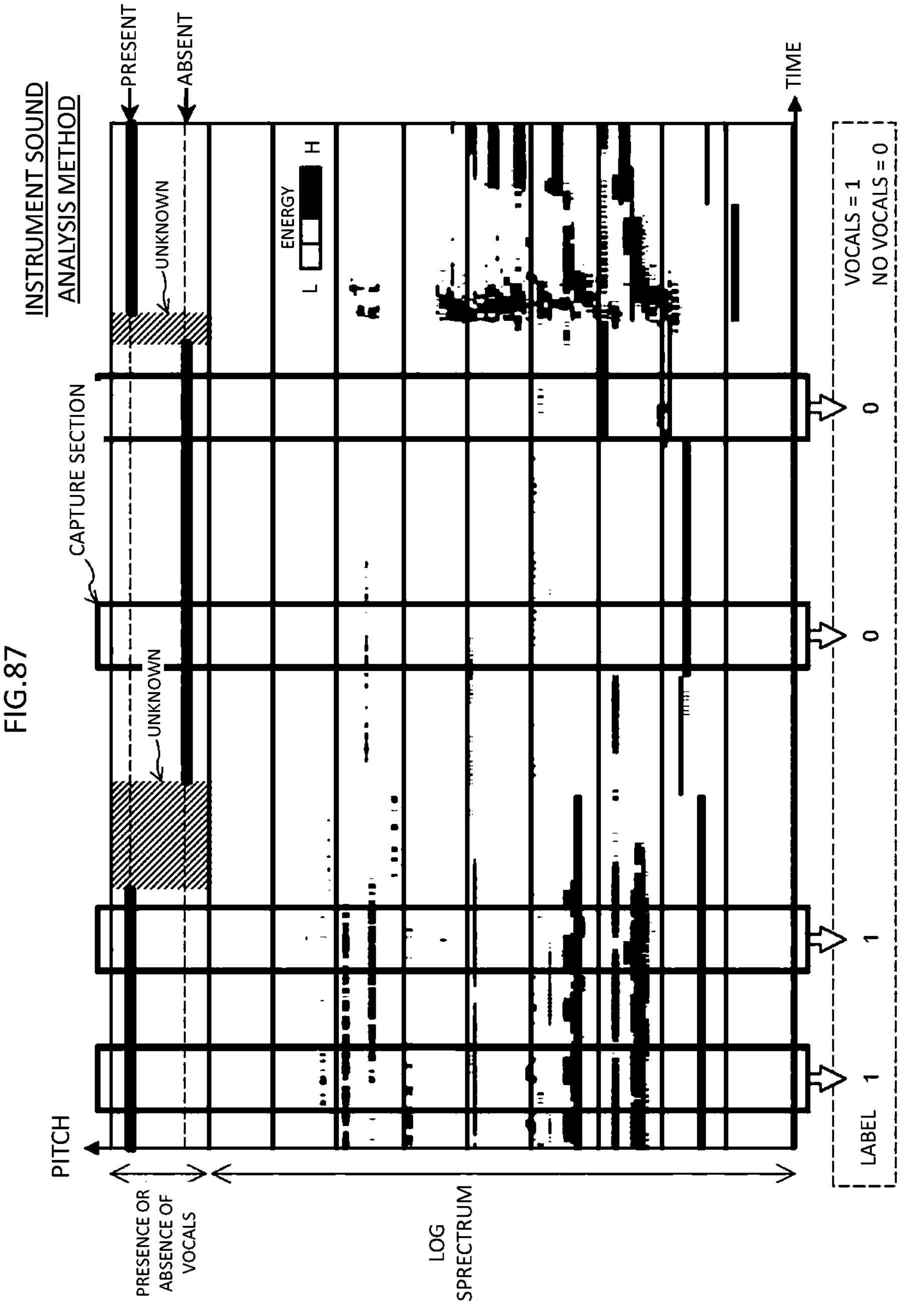
FIG. 87 is an explanatory diagram showing an example of a metadata detection method (music structure analysis method) according to the present embodiment.

To generate a calculation formula for computing the presence probability of an instrument sound, the metadata detection unit 148 prepares a log spectrum labeled in time series in advance. For example, the metadata detection unit 148 captures partial log spectra from the labeled log spectrum in units of specific time (for example, about 1 second) as shown in FIG. 87, and generates a calculation formula for computing the presence probability by using the captured partial log spectra. A log spectrum of music data for which the presence or absence of vocals is known in advance is shown as an example in FIG. 87. When the log spectrum as described is supplied, the metadata detection unit 148 determines capture sections in units of the specific time, refers to the presence or absence of vocals in each capture section, and assigns a label 1 to a section with vocals and assigns a label 0 to a section with no vocals. Moreover, the same can be said for other types of instrument sounds.

Figure 88:
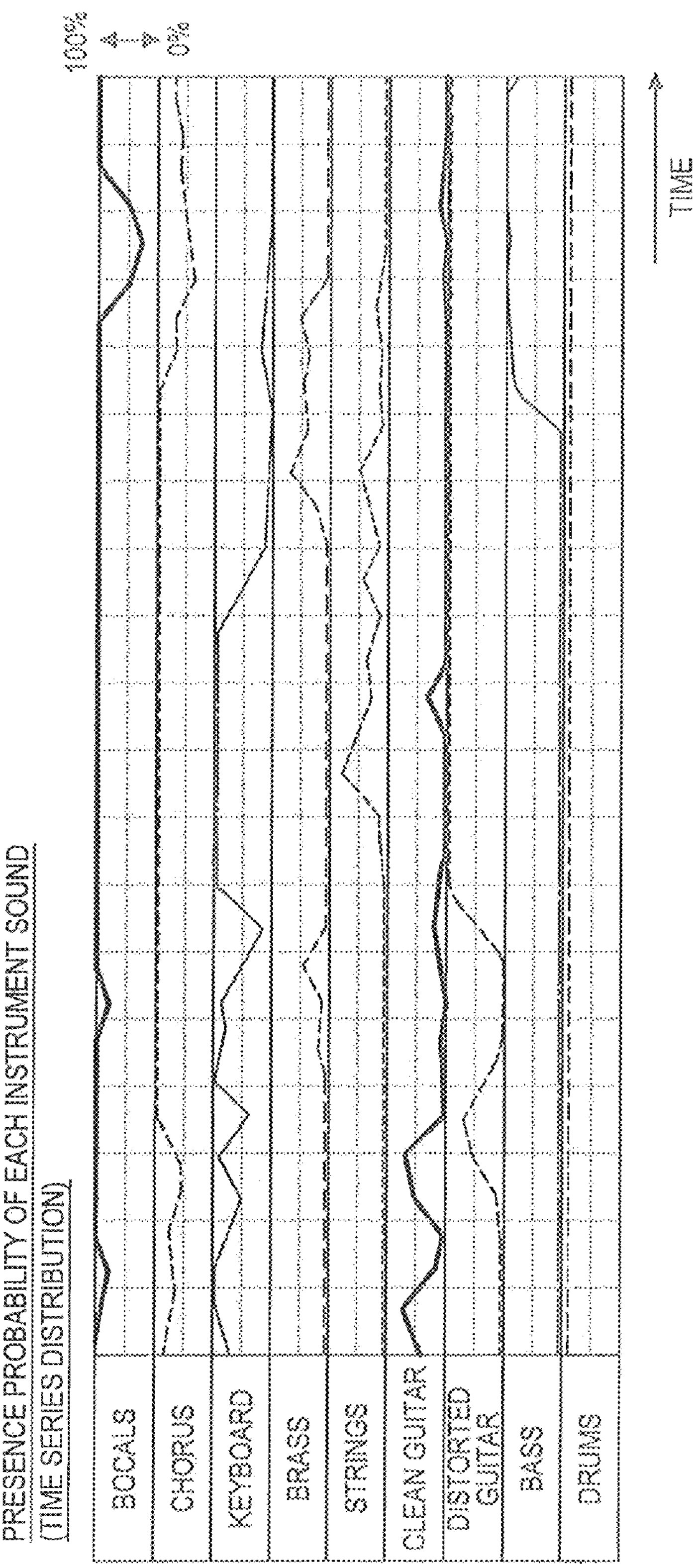
FIG. 88 is an explanatory diagram showing an example of the metadata detection method (music structure analysis method) according to the present embodiment.

The partial log spectra in time series captured in this manner are input to the feature quantity calculation formula generation apparatus 10 as evaluation data. Furthermore, the label for each instrument sound assigned to each partial log spectrum is input to the feature quantity calculation formula generation apparatus 10 as teacher data. By providing the evaluation data and the teacher data as described, a calculation formula can be obtained which outputs, when a partial log spectrum of a treated piece is input, whether or not each instrument sound is included in the capture section corresponding to the input partial log spectrum. Accordingly, the metadata detection unit 148 inputs the partial log spectrum to calculation formulae corresponding to various types of instrument sounds while shifting the time axis little by little, and converts the output values to probability values according to a probability distribution computed at the time of learning processing by the feature quantity calculation formula generation apparatus 10. Then, the metadata detection unit 148 stores, as the time-series metadata, the probability values computed in time series. A presence probability of each instrument sound as shown in FIG. 88, for example, is computed by the processing by the metadata detection unit 148 as described above.

Although the description has been made for the example of the computation method for the presence probability of vocals, the same can be said for the computation method for the presence probability of other instrument sound and other time-series metadata. Furthermore, as for the metadata per music piece, the metadata per music piece may be computed by generating a calculation formula for computing, with a log spectrum of a whole music piece as input, the metadata per music piece and by using the calculation formula. For example, to generate a calculation formula for computing the tone of music, it is only necessary to input, along with a plurality of log spectra of music data whose tones are known as the evaluation data, decision values indicating the tone of music as the teacher data. By using a calculation formula generated from these inputs by the learning processing by the feature quantity calculation formula generation apparatus 10 and by inputting a log spectrum of a whole music piece to the calculation formula, the tone of music of the music piece is computed as the metadata per music piece. Of course, the same can be said for a case of computing the genre of a music piece as the metadata per music piece. The metadata per music piece computed in this manner is stored in the metadata storage unit 112.

Heretofore, the functions of the structural elements relating to the music analysis method among the structural elements of the information processing apparatus 100 have been described. As described above, various types of metadata relating to music data are stored in the metadata storage unit 112 by the analysis processing by the music analysis unit 110. Thus, in the following, a method of realistically visualizing music data by using various types of metadata stored in the metadata storage unit 112 will be described. Structural elements relating to the visualization method are the visualization parameter determination unit 114 and the visualization unit 116. In the following, the functions of these structural elements will be described.

(2-5. Configuration of Visualization Parameter Determination Unit 114)

First, the configuration of the visualization parameter determination unit 114 will be described. The visualization parameter determination unit 114 is means for determining parameters for controlling an object based on the various types of metadata stored in the metadata storage unit 112. Moreover, the object may be a character appearing in a performance scene realised as a CG image, a robot externally connected to the information processing apparatus 100, or the like. In the following, as an example, a method of reflecting various types of metadata stored in the metadata storage unit 112 on the performance scene realised as a CG image will be described.

(2-5-1. Outline of Visualization Parameter Determination Method)

First, referring to FIG. 89, a flow of a series of processes by the visualization parameter determination unit 114 will be described. The flow chart shown in FIG. 89 shows an overall flow of the processing by the visualization parameter determination unit 114.

Figure 89:
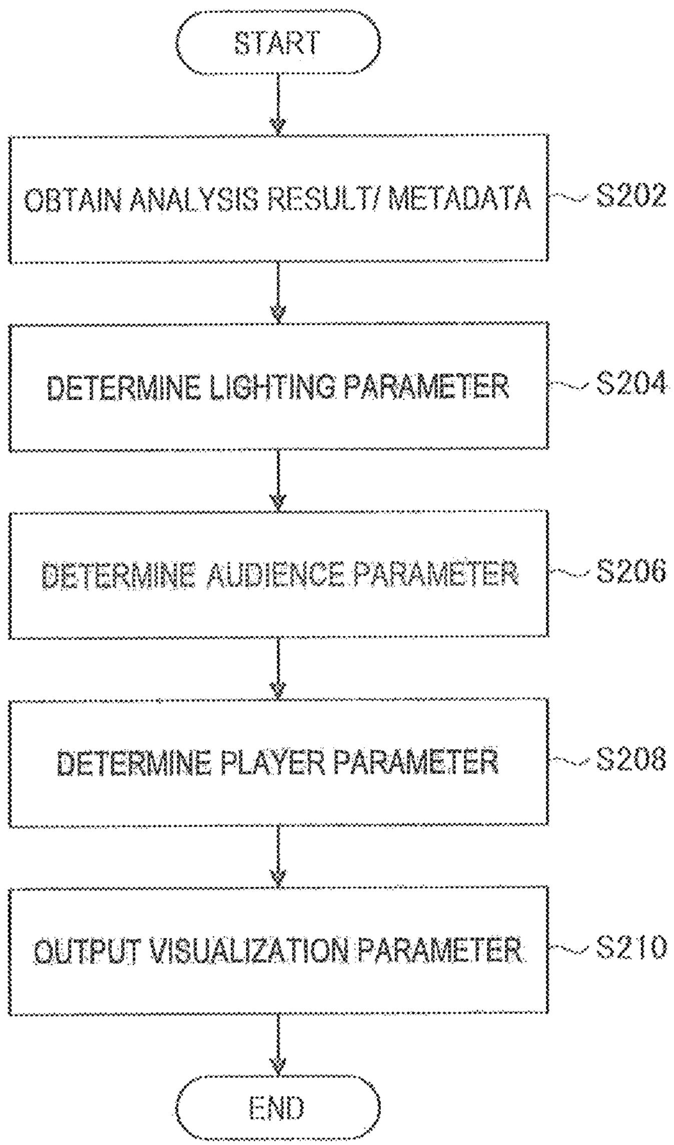
FIG. 89 is an explanatory diagram showing an example of a visualization parameter determination method according to the present embodiment.

As shown in FIG. 89, first, the visualization parameter determination unit 114 acquires from the metadata storage unit 112 the metadata obtained as a result of the analysis processing by the music analysis unit 110 (S202). For example, beats, key, chord progression, melody line, bass line, presence probability and solo probability of each instrument sound, tone and genre of music, music structure, or the like, is acquired. Then, the visualization parameter determination unit 114 determines a lighting parameter for controlling the lighting such as stage lights and spotlights based on a current time and the metadata (S204). Then, the visualization parameter determination unit 114 determines an audience parameter for controlling the movement of objects resembling the audience (hereinafter, audience objects) (S206). Next, the visualization parameter determination unit 114 determines a player parameter for controlling the movement of an object resembling a player (hereinafter, a player object) (S208). Then, the visualization parameter determination unit 114 outputs, as the visualization parameter, the lighting parameter, the audience parameter and the player parameter to the visualization unit 116 (S210), and ends a series of the visualization parameter determination processes. In the following, the process of each step will be described in detail.

(2-5-2. Details of Visualization Parameter Determination Method)

In the following, the visualization parameter determination method will be described in detail.

(Configuration of Performance Scene by CG Image)

Figure 90:
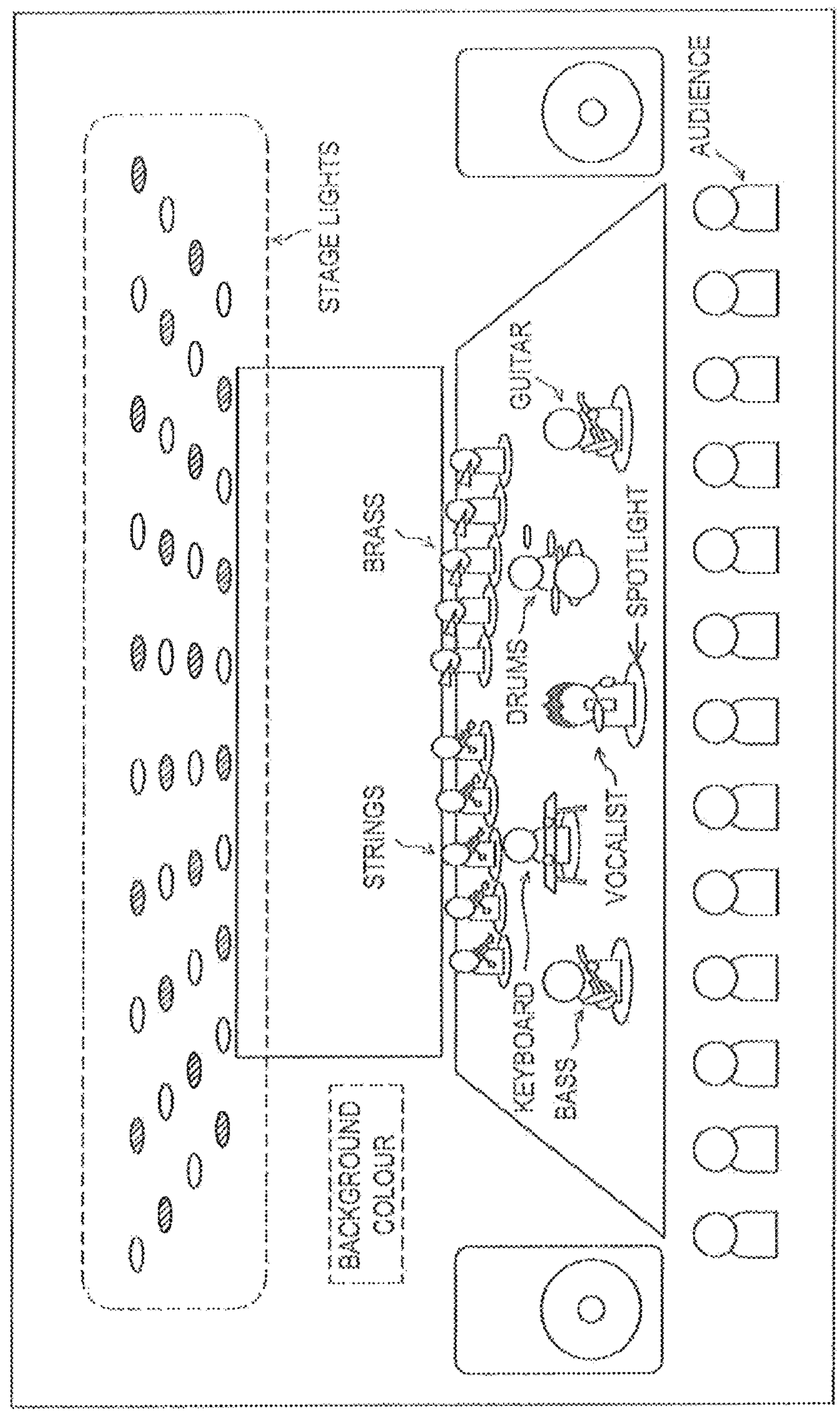
FIG. 90 is an explanatory diagram showing an example of the visualization parameter determination method according to the present embodiment.

First, referring to FIG. 90, an example of the performance scene (CG image) realized by the visualization unit 116 based on the visualization parameter determined by the visualization parameter determination unit 114 will be described. FIG. 90 shows an example of the performance scene realized by the visualization unit 116. The CG image includes player objects whose parts are vocals, guitar, bass, keyboard, drums, strings and brass, respectively. Also, the audience objects are arranged in front of the stage. Furthermore, stage lights and spotlights are provided for the lighting. In the following, determination methods for parameters used for controlling target objects will be described, where the target objects are the movement of the player objects and the audience objects, lighting, and a background colour. Of course, the application range of the present embodiment is not limited to such, and the operation of speakers can be expressed by using metadata or another image may be displayed in the back, for example, (Lighting Parameter Determination Method)

Figure 95:
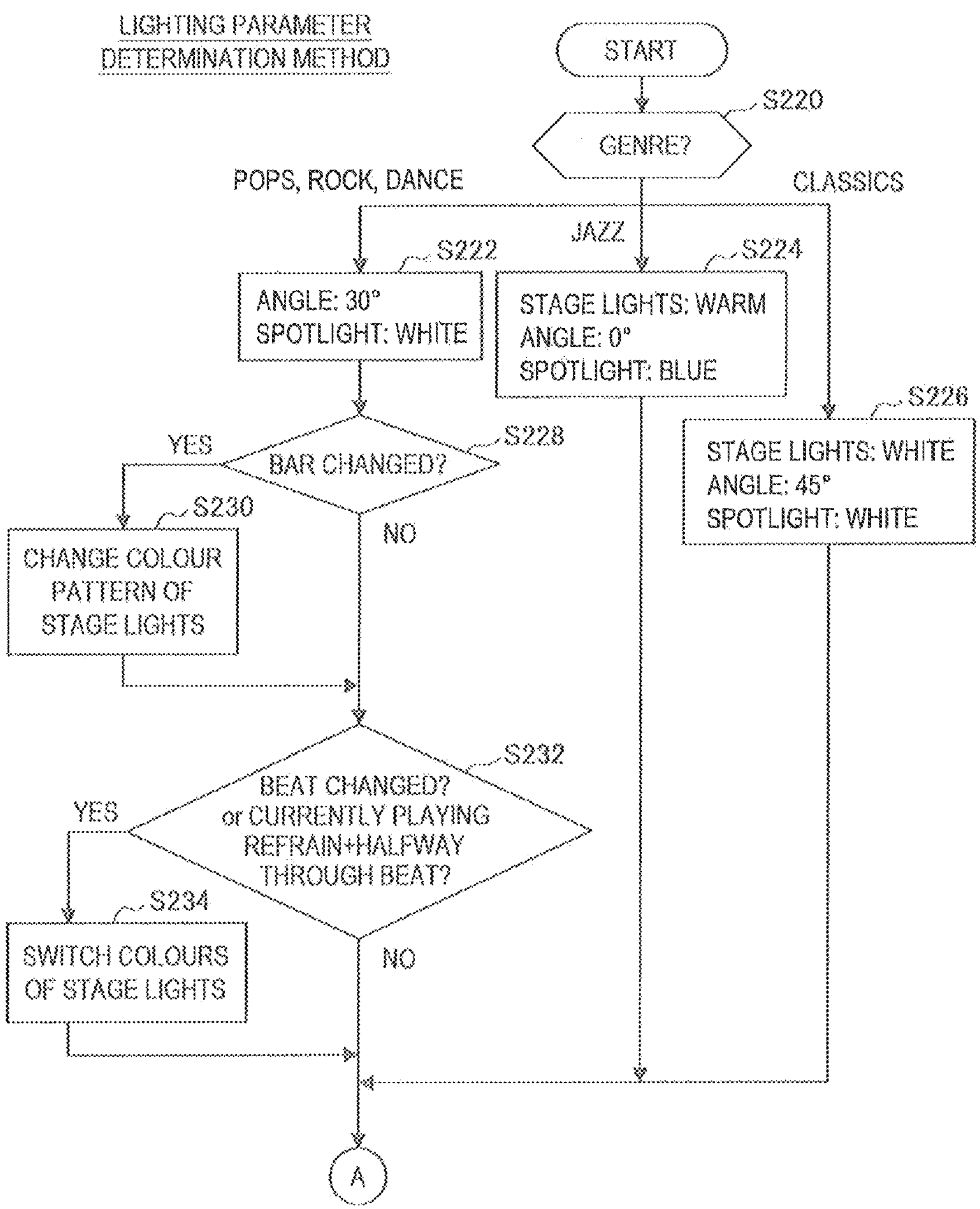
FIG. 95 is an explanatory diagram showing an example of the visualization parameter determination method according to the present embodiment.
Figure 96:
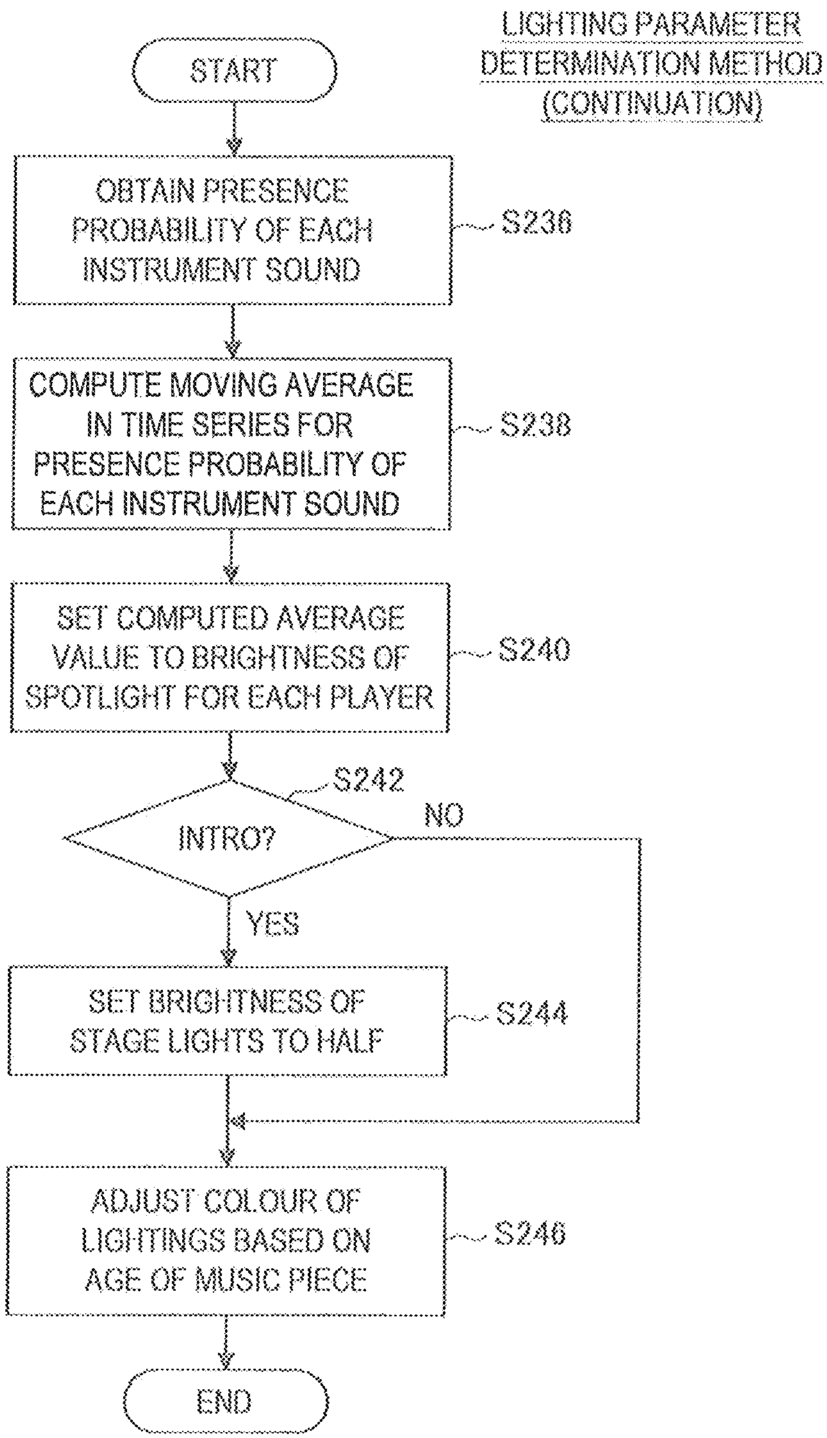
FIG. 96 is an explanatory diagram showing an example of the visualization parameter determination method according to the present embodiment.

First, referring to FIGS. 91 to 96, a lighting parameter determination method will be described. FIG. 91 is an explanatory diagram showing an example of basic settings for the lighting parameter. FIG. 92 is an explanatory diagram showing an example of settings for the lighting parameter relating to the background colour. FIG. 93 is an example of settings for the lighting parameter relating to the stage lights and the spotlights. FIG. 94 is an explanatory diagram showing an example of detailed settings for the lighting parameter for the stage lights. FIGS. 95 and 96 are explanatory diagrams showing flows relating to the lighting parameter determination processing.

First, reference will be made to FIG. 91. As shown in FIG. 91, the visualization parameter determination unit 114 sets, as the lighting parameter, the colour and the brightness of the background colour, the colour, the brightness and the angle of each stage light, and the colour and the brightness of each spotlight. For example, the colours are expressed in RGB indicating each density of red (R), green (G) and blue (B) using values from 0 to 255. Also, the brightness is expressed by values from 0 to 100% with a specific brightness as reference. Furthermore, the angle is 0 degrees when the light is turned towards the stage and 90 degrees when it is turned towards the audience. Moreover, as shown in FIG. 90, a plurality of stage lights and spotlights are provided. For example, the spotlight is provided for each player object. Accordingly, the lighting parameter may be set for each light or may be set for a specific group including a plurality of lights. The lighting parameter determined by the visualization parameter determination unit 114 is input to the visualization unit 116, and is reflected in real-time on the CG image during the reproduction of music data.

Next, reference will be made to FIG. 92. As shown in FIG. 92, the visualization parameter determination unit 114 may change the background colour according to a current time. For example, when the current time is daytime, the visualization parameter determination unit 114 sets the background colour to blue and the brightness of the background colour to 100%. Also, when the current time is evening, the visualization parameter determination unit 114 sets the background colour to orange and the brightness of the background colour to 10%. Furthermore, when the current time is nighttime, the visualization parameter determination unit 114 sets the background colour to black and the brightness to 0%. By changing the background colour according to the current time, the time in the world of the CG image and the real world coincides and the reality can be enhanced. Moreover, the visualization parameter determination unit 114 may use intermediate colours and intermediate brightness so that the background colours are changed smoothly between daytime, evening and nighttime in sync with the passage of current time.

Next, reference will be made to FIG. 93. As shown in FIG. 93, the visualization parameter determination unit 114 determines the visualization parameters for the stage lights and the spotlights for each genre based on the metadata indicating the genre of the music data among the metadata stored in the metadata storage unit 112. Moreover, when processing is to be branched according to genre, the processing is set to be branched to a genre with the highest probability among the probabilities of respective genres detected as the metadata per music piece by the metadata detection unit 148. For example, when there are five branches, i.e. pops, rock, dance, jazz and classics, and the probabilities are respectively 80%, 70%, 90%, 20% and 0%, the processing is branched to dance for which the probability is the highest.

For example, when the genre of music data is rock, the visualization parameter determination unit 114 changes the colour of the stage lights with every bar. At this time, the visualization parameter determination unit 114 determines the timing of changing the colour based on the information on bars detected by the bar detection unit 140 among the metadata stored in the metadata storage unit 112. Also, the visualization parameter determination unit 114 changes the colour change pattern of the stage lights with every quarter note. At this time, the visualization parameter determination unit 114 determines the switching timing of the colour change pattern based on the information on beats detected by the beat detection unit 132 among the metadata stored in the metadata storage unit 112. Furthermore, the visualization parameter determination unit 114 sets the angle of the stage lights to 30 degrees. Also, the visualization parameter determination unit 114 sets the colour of the spotlights to white.

As another example, when the genre of music data is jazz, the visualization parameter determination unit 114 sets the colour of the stage lights to warm colour. However, the visualization parameter determination unit 114 does not change the brightness pattern of the stage lights. Furthermore, the visualization parameter determination unit 114 sets the angle of the stage lights to 0 degrees. Also, the visualization parameter determination unit 114 sets the colour of the spotlights to blue. As further another example, when the genre of music data is classics, the visualization parameter determination unit 114 sets the colour of the stage lights to white. However, the visualization parameter determination unit 114 does not change the brightness pattern of the stage lights. Furthermore, the visualization parameter determination unit 114 sets the angle of the stage lights to 45 degrees. Also, the visualization parameter determination unit 114 sets the colour of the spotlights to white. Moreover, when the genre is rock or dance, the stage lights are changed in sync with the beats.

Next, reference will be made to FIG. 94. As described above, when the genre of music data is rock, the visualization parameter determination unit 114 changes the colour of the stage lights with every bar. At this time, the visualization parameter determination unit 114 changes the colours according to a specific pattern as shown in FIG. 94. For example, in case of a colour change pattern of pattern no. 1, the visualization parameter determination unit 114 switches the colour of the stage lights between red and green. Also, in case of a colour change pattern of pattern no. 2, the visualization parameter determination unit 14 switches the colour of the stage lights between purple and white. Furthermore, in case of a colour change pattern of pattern no. 3, the visualization parameter determination unit 114 switches the colour of the stage lights between light blue and green. Furthermore, in case of a colour change pattern of pattern no. 4, the visualization parameter determination unit 114 switches the colour of the stage lights between yellow and white.

Next, referring to FIGS. 95 and 96, a flow of a series of processes relating to the lighting parameter determination method will be described. First, FIG. 95 will be referred to. As shown in FIG. 95, first, the visualization parameter determination unit 114 decides the genre of a music piece being played based on the metadata indicating the genre stored in the metadata storage unit 112 (S220). When the genre is any of pops, rock and dance, the visualization parameter determination unit 114 proceeds to the process of step S222. Also, when the genre is jazz, the visualization parameter determination unit 1114 proceeds to the process of step S224. Furthermore, when the genre is classics, the visualization parameter determination unit 114 proceeds to the process of step S226.

In step S222, the visualization parameter determination unit 114 sets the angle of the stage lights to 30 degrees and the colour of the spotlights to white (S222), and proceeds to the step of S228. Furthermore, in step S224, the visualization parameter determination unit 114 sets the colour of the stage lights to warm colour and the angle to 0 degrees, sets the colour of the spotlights to blue (S224), and proceeds to the process of step S236 (FIG. 96). Furthermore, in step S226, the visualization parameter determination unit 114 sets the colour of the stage lights to white and the angle to 45 degrees, sets the colour of the spotlights to white (S226), and proceeds to the process of step S236 (FIG. 96).

In step S228, the visualization parameter determination unit 114 decides the presence or absence of bar change based on the metadata indicating the position of bars stored in the metadata storage unit 112 (S228). When there is a bar change, the visualization parameter determination unit 114 proceeds to the process of step S230. On the other hand, when there is no bar change, the visualization parameter determination unit 114 proceeds to the process of step S232. In step S230, the colour pattern of the stage lights is change by the visualization parameter determination unit 114 according to the table shown in FIG. 94 (S230). Moreover, the pattern number is incremented every time the bar changes. However, after the last pattern number (4), the pattern number returns to the first pattern number (1).

In step S232, first, the visualization parameter determination unit 114 refers to the metadata indicating the beat positions and the metadata indicating the music structure that are stored in the metadata storage unit 112. Then, the visualization parameter determination unit 114 decides whether the beat has changed, and whether the refrain portion is currently being reproduced and the portion being reproduced is halfway through the beat (S232). In case the beat has changed, or the refrain portion is currently being reproduced and the portion being reproduced is halfway through the beat, the visualization parameter determination unit 114 proceeds to the process of step S234. On the contrary, in other cases, the visualization parameter determination unit 114 proceeds to the process of step S236 (FIG. 96). In step S234, the colours of the stage lights are switched (S234). That is, the colours are switched at the refrain portion at a time interval of half the beat. Moreover, the colours of the stage lights are arranged alternately as shown in FIG. 90, and the colours are switched alternately.

Reference will be made to FIG. 96. In step S236, the visualization parameter determination unit 114 acquires the metadata indicating the presence probability of each instrument sound from the metadata storage unit 112 (S236). Then, the visualization parameter determination unit 114 computes a moving average in time series for the presence probability of each instrument sound (S238). Next, the visualization parameter determination unit 114 sets the average value computed for each instrument sound in step S238 to the brightness of the spotlight for the player of the corresponding instrument (S240). Next, the visualization parameter determination unit 114 refers to the metadata indicating the music structure stored in the metadata storage unit 112, and decides whether it is the introduction (S242). In case of introduction, the visualization parameter determination unit 114 proceeds to the process of step S244. On the other hand, in case it is not introduction, the visualization parameter determination unit 114 proceeds to the process of step S246.

In step S244, the visualization parameter determination unit 114 sets the brightness of the stage lights to half (S244). In step S246, the visualization parameter determination unit 114 acquires the metadata indicating the age of the music piece from the metadata storage unit 112, and adjusts the colour of the lighting according to the age indicated by the metadata (S246). For example, when the age is old (for example, 100 years ago), the colour is monochrome; when the age is somewhat old (for example, 50 years ago), the colour is adjusted to sepia; and when the age is new, the colour is adjusted to vivid. The lighting parameter is determined by the series of processes as described above.

(Audience Parameter Determination Method)

Figure 98:
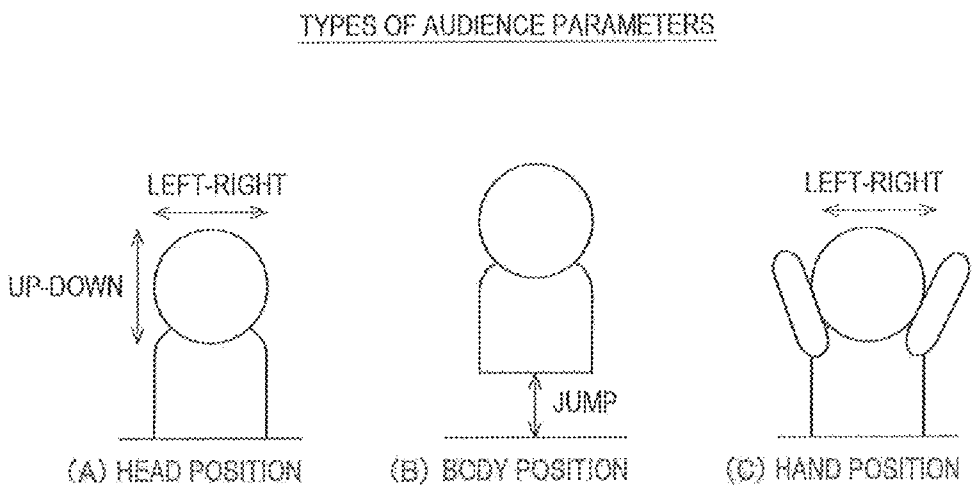
FIG. 98 is an explanatory diagram showing an example of the visualization parameter determination method according to the present embodiment.
Figure 99:
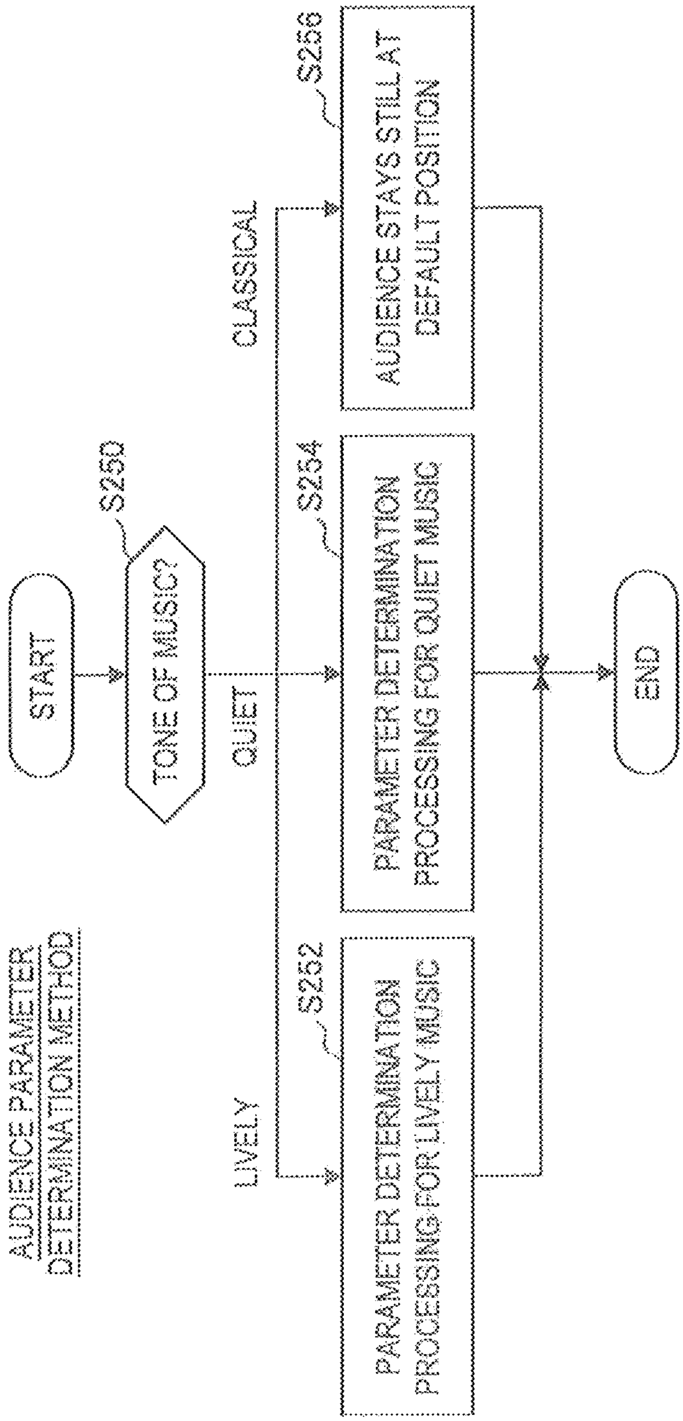
FIG. 99 is an explanatory diagram showing an example of the visualization parameter determination method according to the present embodiment.
Figure 100:
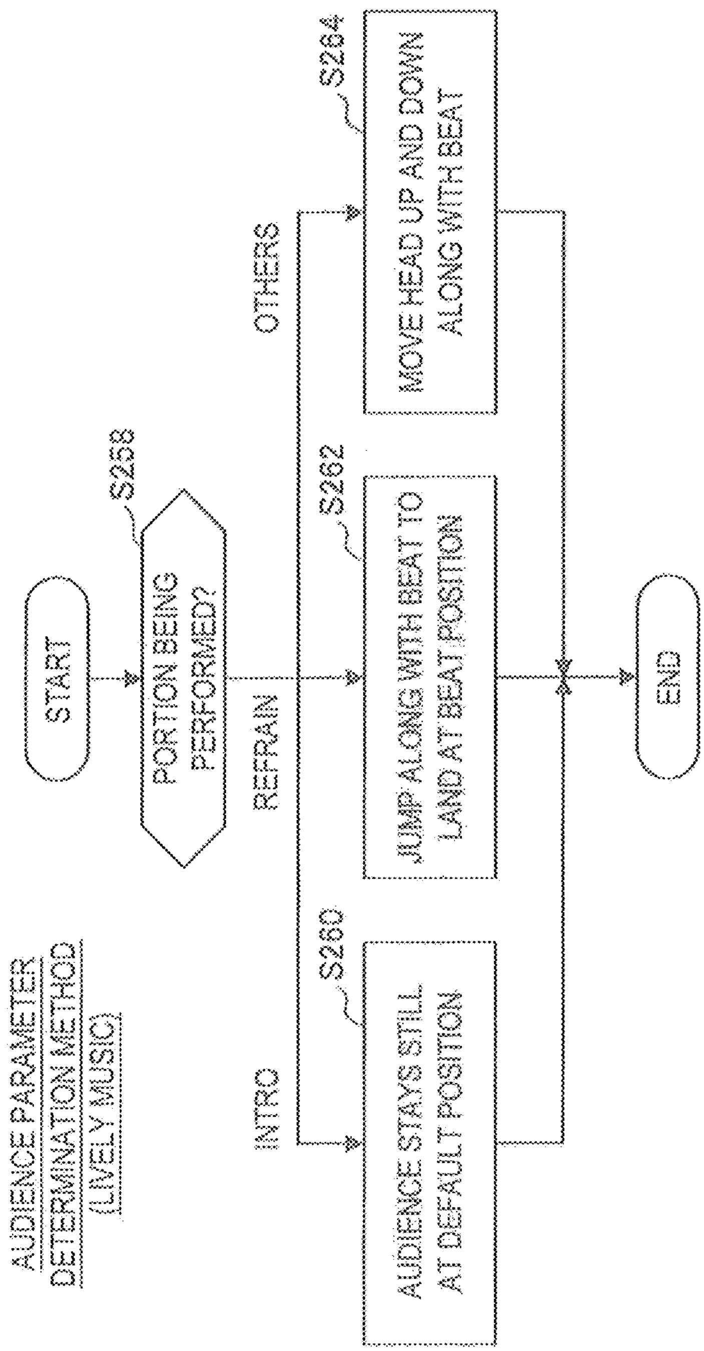
FIG. 100 is an explanatory diagram showing an example of the visualization parameter determination method according to the present embodiment.
Figure 101:
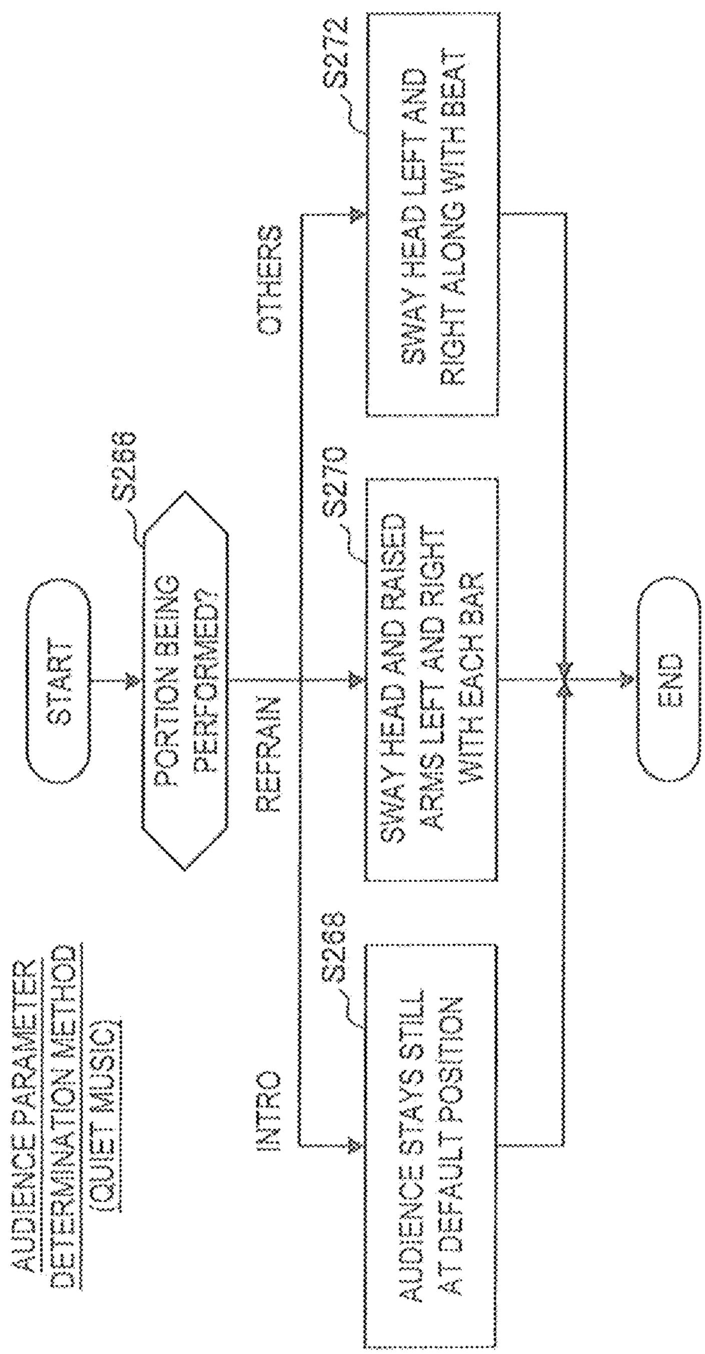
FIG. 101 is an explanatory diagram showing an example of the visualization parameter determination method according to the present embodiment.

Next, referring to FIGS. 97 to 101, the audience parameter determination method will be described, FIG. 97 is an explanatory showing an example of settings for the audience parameter. FIG. 98 is an explanatory diagram showing examples of the types of the audience parameters. FIG. 99 is an explanatory diagram showing an overall flow of the processing relating to the audience parameter determination method. FIG. 100 is an explanatory diagram showing a flow of processing relating to the audience parameter determination method for a case where lively music is being played. FIG. 101 is an explanatory diagram showing a flow of processing relating to the audience parameter determination method for a case where quiet music is being played.

First, reference will be made to Ha 97. As shown in FIG. 97, the audience parameter is set according to the tone of music. For example, when the tone of music is lively, the audience parameter is set such that the audience objects stay still at the introduction portion, jump along with the beat at the refrain portion, and move only the heads up and down at other portions. Also, when the tone of music is quiet, the audience parameter is set such that the audience objects stay still at the introduction portion, sway raised arms left and right with each bar at the refrain portion, and move only the heads left and right at other portions. Furthermore, when the tone of music is classical, the audience parameter is set such that the audience objects stay still all the time.

The movements of the audience objects based on the above-described example of settings for the audience parameter are shown in FIG. 98. FIG. 98(A) shows the movement of the head among the movable parts of the audience object controlled by the audience parameter. The head of the audience object can be moved up and down or left and right. As described above, when the tone of music is lively, the head of the audience object is controlled to move up and down. Also, when the tone of music is quiet, the head of the audience object is controlled to move left and right. Furthermore, when the tone of music is classical, the head of the audience object stays still.

FIG. 98(B) shows the movement of the position of the body (entire position) among the movable parts of the audience object controlled by the audience parameter. The entire position of the audience object is capable of moving up and down (jump). As described above, when the tone of music is lively, the audience object is controlled to jump along with the beats at the refrain portion. Also, when the tone of music is quiet or classical, the audience object does not jump. FIG. 98(C) shows the movement of the arms among the movable parts of the audience object controlled by the audience parameter. The arms of the audience object can be raised or lowered as well as being swayed left and right. As described above, when the tone of music is lively or classical, the audience object is controlled to have the arms lowered. Also, when the tone of music is quiet, the audience object raises the arms at the refrain portion and sways the arms left and right with each bar.

Next, reference will be made to FIG. 99. As shown in FIG. 99, first, the visualization parameter determination unit 114 acquires the metadata indicating the tone of music stored in the metadata storage unit 112, and decides the tone of music based on the metadata (S250). When the tone of music is lively, the visualization parameter determination unit 114 proceeds to the process of step S252. Also, when the tone of music is quiet, the visualization parameter determination unit 114 proceeds to the process of step S254. Furthermore, when the tone of music is classical, the visualization parameter determination unit 114 proceeds to the process of step S256.

In step S252, parameter determination processing for lively music is performed by the visualization parameter determination unit 114 (S252). In step S254, parameter determination processing for quiet music is performed by the visualization parameter determination unit 114 (S254). In step S256, parameter determination processing for classical music is performed by the visualization parameter determination unit 114 (S256). When the parameter determination processing of any of the steps S252, S254 and S256 is performed, a series of processes relating to the audience parameter determination method is ended.

Next, referring to FIG. 100, the parameter determination processing for lively music (S252) will be described. As shown in FIG. 100, first, the visualization parameter determination unit 114 acquires the metadata indicating the music structure stored in the metadata storage unit 112, and decides the music structure based on the metadata (S258). When the music structure is of the introduction, the visualization parameter determination unit 114 proceeds to the process of step S260. Also, when the music structure is of the refrain portion, the visualization parameter determination unit 114 proceeds to the process of step S262. Furthermore, when the music structure is of other portions, the visualization parameter determination unit 114 proceeds to the process of step S264.

In step S260, the audience object is controlled by the visualization parameter determination unit 114 to stay still at the default position (S260). In step S262, the audience object is controlled by the visualization parameter determination unit 114 to jump along with the beat at such a timing that the audience object lands at the beat position (S262). At this time, the visualization parameter determination unit 114 determines the timing of jumping based on the metadata indicating the beat positions stored in the metadata storage unit 112. In step S264, the movement is controlled in such a way that the head of the audience object moves up and down along with the beat (S264). At this time, the visualization parameter determination unit 114 determines the timing of moving the head up and down based on the metadata indicating the beat positions stored in the metadata storage unit 112. When the processing by any one of steps S260, S262 and S264 is performed, the audience parameter determination processing relating to lively music is ended.

Next, referring to FIG. 101, the parameter determination processing for quiet music (S254) will be described. As shown in FIG. 101, first, the visualization parameter determination unit 112, acquires the metadata indicating the music structure stored in the metadata storage unit 112, and decides the music structure based on the metadata (S266). When the music structure is of the introduction portion, the visualization parameter determination unit 114 proceeds to the process of step S268. Also, when the music structure is of the refrain portion, the visualization parameter determination unit 114 proceeds to the process of step S270. Furthermore, when the music structure is of other portions, the visualization parameter determination unit 114 proceeds to the process of step S272.

In step S268, the audience object is controlled by the visualization parameter determination unit 114 to stay still at the default position (S268). In step S270, the movement of the audience object is controlled by the visualization parameter determination unit 114 such that the head and raised arms are swayed left and right with each bar (S270). At this time, the visualization parameter determination unit 114 determines the timing of swaying of the head and arms based on the metadata indicating the beat positions stored in the metadata storage unit 112. In step S272, the movement is controlled by the visualization parameter determination unit 114 such that the head of the audience object is swayed left and right along with the beat (S272). At this time, the visualization parameter determination unit 114 determines the timing of left-and-right swaying of the head based on the metadata indicating the beat positions stored in the metadata storage unit 112. When the processes of any one of steps S268, S270 and S272 is performed, the audience parameter determination processing relating to quiet music is ended.

(Player Parameter Determination Method)

Next, referring to FIGS. 102 to 127, a player parameter determination method will be described. As the player parameter, there is a player parameter which is set for each type of the player object and there is a player parameter which is set regardless of the type. The player parameter which is set regardless of the type of the player object includes switching between display/non-display of the player object, colour of the clothing, and the like, for example.

The switching between the display/non-display of the player object is performed based on the presence probability of each instrument sound. The presence probability of each instrument sound to be used for the switching is the presence probability of each instrument sound computed as the metadata per music piece. For example, a player object corresponding to an instrument sound with low presence probability over the entire music piece is set to non-display (refer to FIG. 102(C)). Furthermore, the clothing of the player object is set based on the genre of music. For example, when the genre is classics or jazz, the clothing of the player object is set to be a black suit, a tuxedo or the like. On the other hand, when the genre is rock, the clothing of the player object is set to, for example, a T-shirt of a colour determined for each type of the player object, in case the season is autumn or winter.

The player parameter determination method different for each type of the player object will be described in detail in the following. However, in the present embodiment, description will be made only on the player objects for seven types of instruments, i.e. vocals, guitar, bass, keyboard, drums, strings and brass. Of course, the application range of the technology according to the present embodiment is not limited to the above, and player parameter for player object for other instrument can also be determined in the similar manner.

(Vocals)

Figure 102:
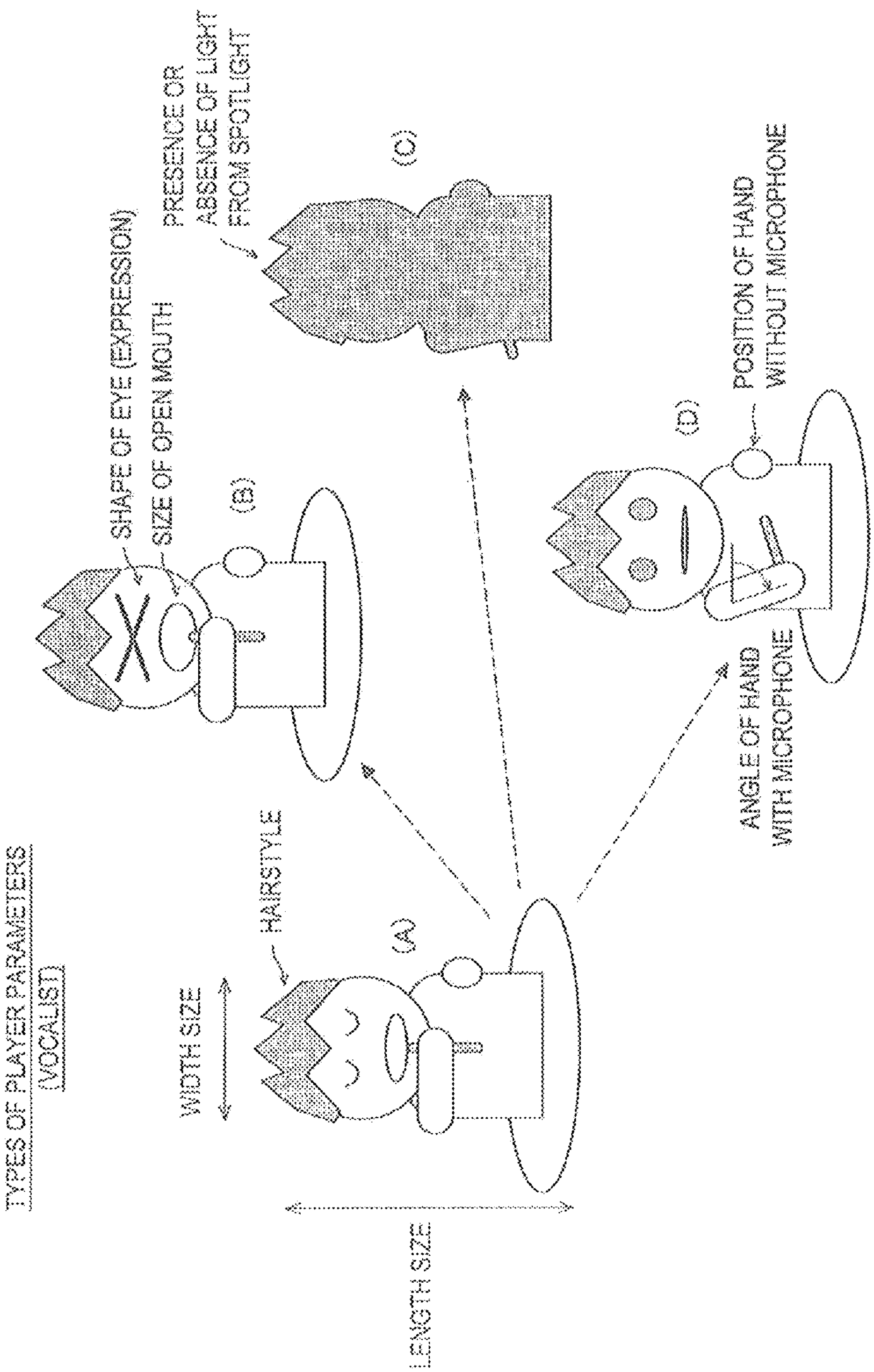
FIG. 102 is an explanatory diagram showing an example of the visualization parameter determination method according to the present embodiment.
Figure 103:
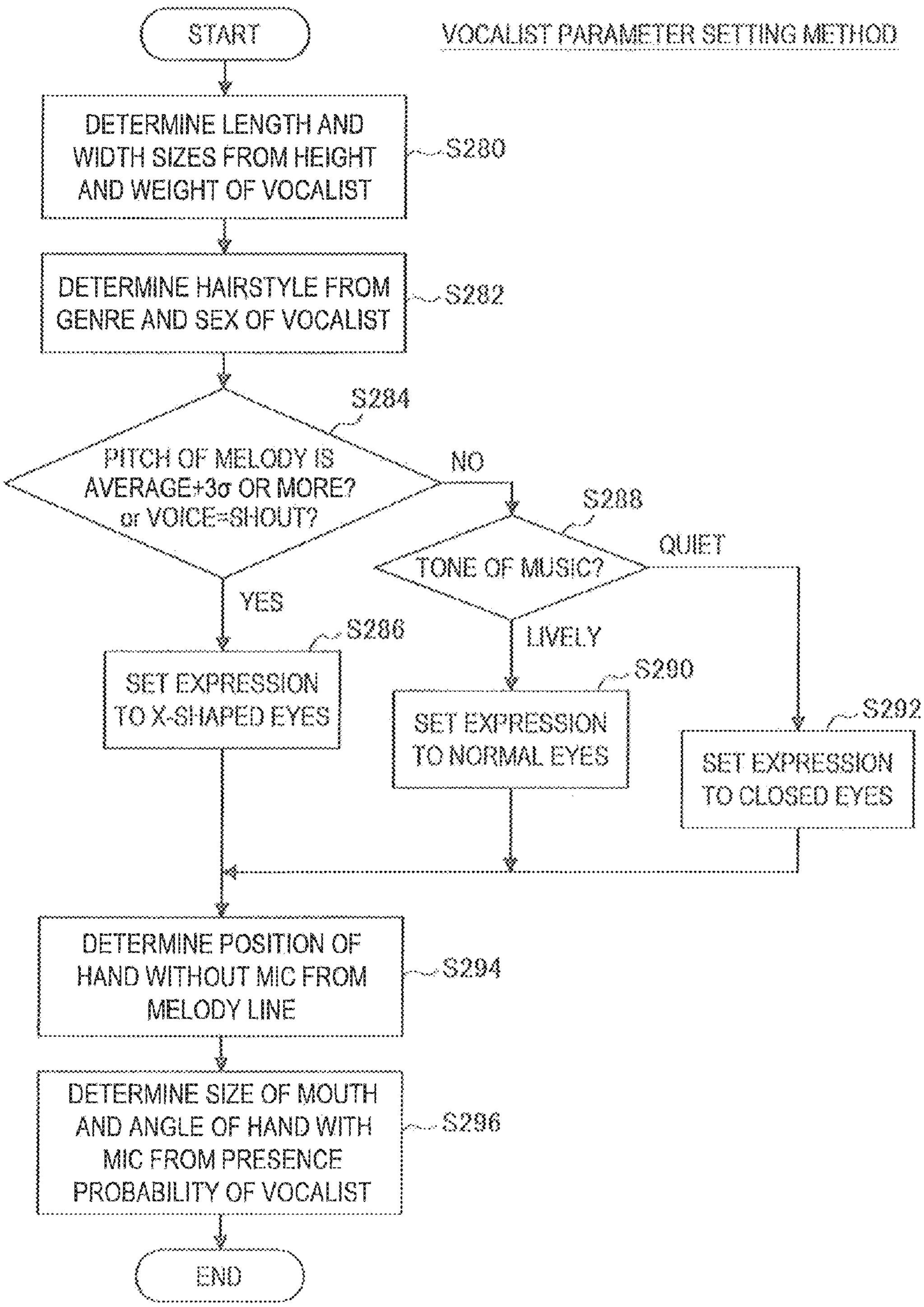
FIG. 103 is an explanatory diagram showing an example of the visualization parameter determination method according to the present embodiment.

First, referring to FIGS. 102 and 103, a player parameter determination method to be applied to a player object for vocals will be described. FIG. 102 is an explanatory diagram showing types of object parameters for vocals. FIG. 103 is an explanatory diagram showing a processing flow relating to the player parameter determination method relating to the vocals.

First, reference will be made to FIG. 102. As shown in FIG. 102, the player parameter relating to the vocals includes length and width sizes, hairstyle, size of the open mouth, angle of hand holding the microphone, position of hand not holding the microphone, shape of the eye (expression) and the like of the player object. The length and width sizes of the player object are determined based on the height, weight or the like of the vocalist detected as the metadata per music piece by the metadata detection unit 148.

For example, the visualization parameter determination unit 114 determines the length size of the player object for vocals based on the metadata indicating the height of the vocalist stored in the metadata storage unit 112. Then, the visualization parameter determination unit 114 determines the width size of the player object for vocals based on the metadata indicating the height and weight of the vocalist stored in the metadata storage unit 112. By reflecting information relating to the physical feature of the vocalist estimated from the waveform of the music data on the player object in this manner, each music piece will be visually different, preventing the user from being bored.

Also, the hairstyle of the player object is determined based on the sex of the vocalist and the genre of the music that are detected by the metadata detection unit 148. For example, when the vocalist is estimated to be a female, the player object for vocals is set to have long hair. Also, when the vocalist is estimated to be a male and the genre of the music is estimated to be rock, the player object for vocals is set to have hair standing on end. Furthermore, when the genre is rap, the hair is set to be short.

Furthermore, the size of the open mouth and the angle of the hand holding the microphone for the player object are determined base on a vocals presence probability. For example, when the vocals presence probability is high, the mouth is set to open wide. Also, the higher the vocals presence probability, the nearer to the mouth the microphone is set to be. Furthermore, the position (level) of the hand not holding the microphone is determined based on the melody line. For example, when the pitch of the melody is high, the position of the hand not holding the microphone is set to be high. On the contrary, when the pitch of the melody is low, the position of the hand not holding the microphone is set to be low. Moreover, when it is determined to be during the solo performance of another instrument, the position of the hand not holding the microphone is fixed.

Furthermore, the shape of the eyes is set based on the metadata indicating the tone of music stored in the metadata storage unit 112, and in case of lively music, it is set to be normal. On the other hand, in case of quiet music, the eyes are set to be closed. Furthermore, the visualization parameter determination unit 114 makes the shape of the eyes an X shape based on the information on the melody line detected by the melody detection unit 144. For example, the visualization parameter determination unit 114 computes the average pitch of the melody and the standard deviation of the pitch for a whole music piece, and when the pitch of the current melody is higher than average_pitch+3×standard_deviation or when the voice is shout, the visualization parameter determination unit 114 makes the eyes a cross.

Here, referring to FIG. 103, a flow of player parameter determination processing relating to the player object for vocals will be described. As shown in FIG. 103, first, the visualization parameter determination unit 114 determines the length and width sizes of the player object based on the height and weight of the vocalist (S280). At this time, the metadata indicating the height and weight of the vocalist stored in the metadata storage unit 112 will be referred to. Next, the visualization parameter determination unit 114 determines the hairstyle of the player object for vocals based on the genre of the music and the sex of the vocalist (S282). At this time, the metadata indicating the genre of the music and the metadata indicating the sex of the vocalist that are stored in the metadata storage unit 112 are referred to.

Next, the visualization parameter determination unit 114 determines, based on the information on the melody line stored in the metadata storage unit 112, whether the pitch of the current melody is average+3σ or more, or whether the voice of the vocalist is a shout. The average is the average pitch of the melody line over a whole music piece. Also, σ is a standard deviation of the pitch of the melody line over a whole music piece. When the pitch of the melody is average+3σ or more, or when the voice of the vocalist is a shout, the visualization parameter determination unit 114 proceeds to the process of step S286. On the other hand, when the pitch of the current melody does not meet the above-described conditions, the visualization parameter determination unit 114 proceeds to the process of step S288.

In step S286, the eyes of the player object for vocals are set to an X-shape by the visualization parameter determination unit 114 (S286). On the other hand, in step S288, the visualization parameter determination unit 114 refers to the metadata indicating the tone of music stored in the metadata storage unit 112 and decides the tone of the music (S288). In case of lively music, the visualization parameter determination unit 114 proceeds to the process of step S290. On the other hand, in case of quiet music, the visualization parameter determination unit 114 proceeds to the process of step S292. In step S290, the eyes of the player object for vocals are set to normal eyes by the visualization parameter determination unit 114 (S290). In step S292, the eyes of the player object for vocals are set to closed eyes by the visualization parameter determination unit 114 (S292).

When the processing by any one of steps S286, S290 and S292 is complete, the visualization parameter determination unit 114 proceeds to the process of step S294. In step S294, the visualization parameter determination unit 114 reads out information on the melody line from the metadata storage unit 112 and determines the position of the hand not holding the microphone based on the information on the melody line (S294). Then, the visualization parameter determination unit 114 refers to the vocals presence probability stored in the metadata storage unit 112 and determines the size of the open mouth and the angle of the hand holding the microphone for the player object base on the presence probability (S296). When the process of step S296 is over, the visualization parameter determination unit 114 ends the player parameter determination processing relating to the vocalist.

(Guitar)

Figure 106:
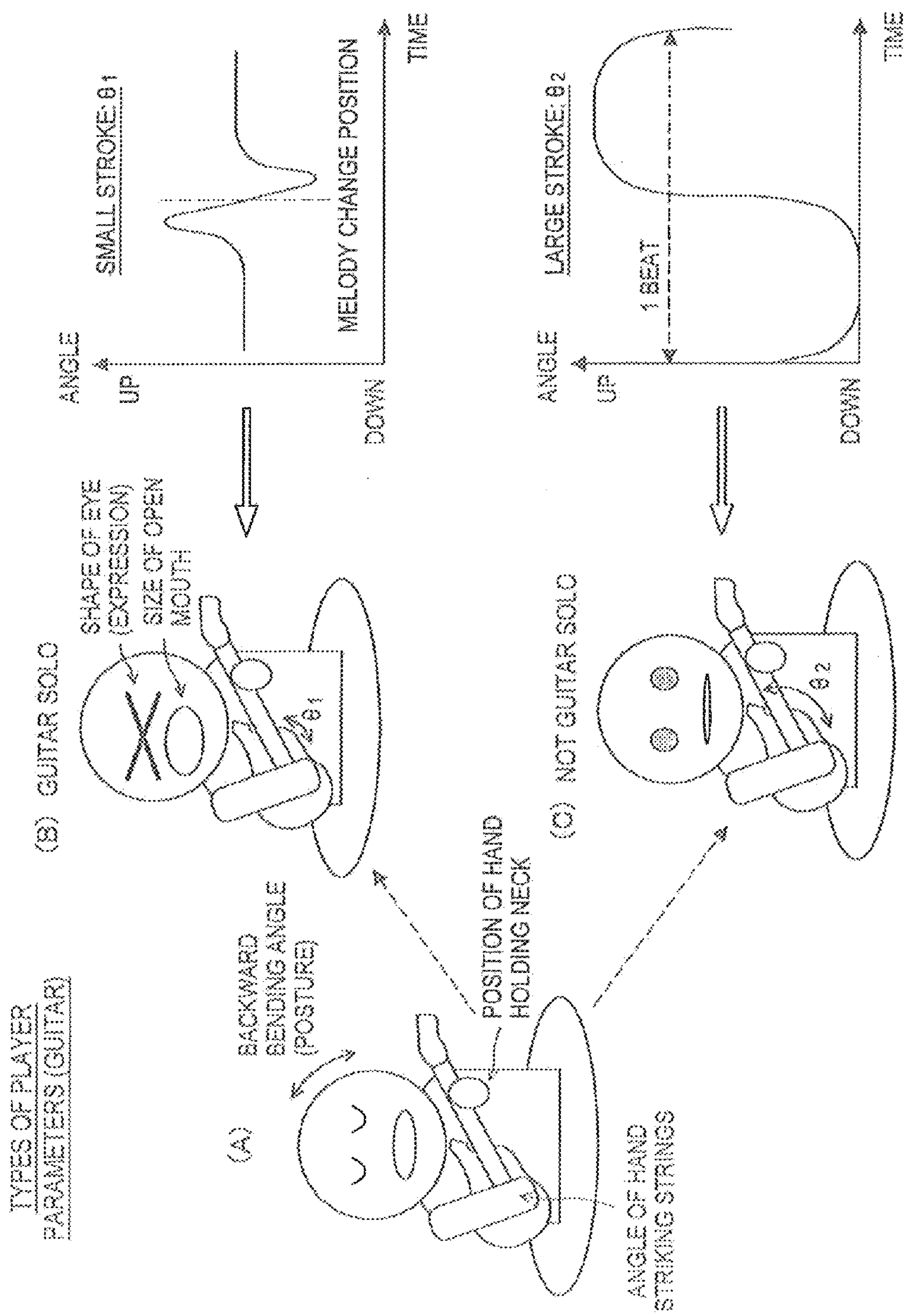
FIG. 106 is an explanatory diagram showing an example of the visualization parameter determination method according to the present embodiment.
Figure 107:
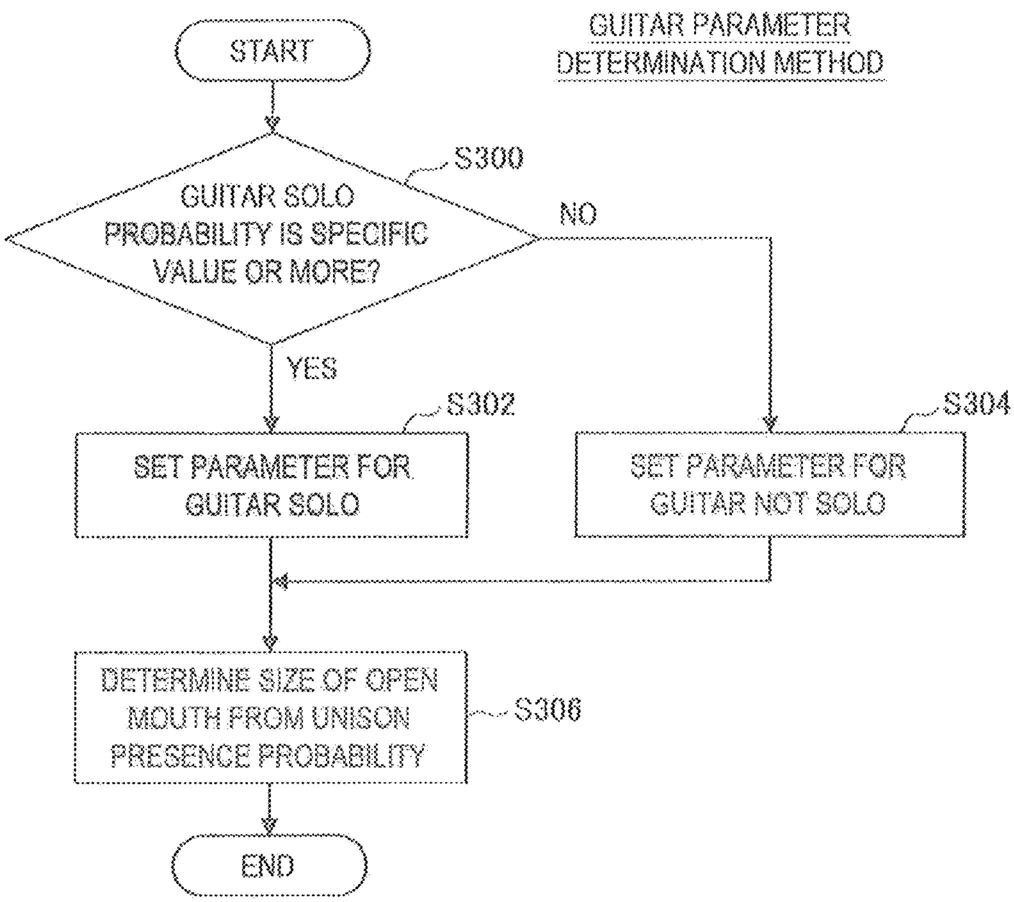
FIG. 107 is an explanatory diagram showing an example of the visualization parameter determination method according to the present embodiment.
Figure 108:
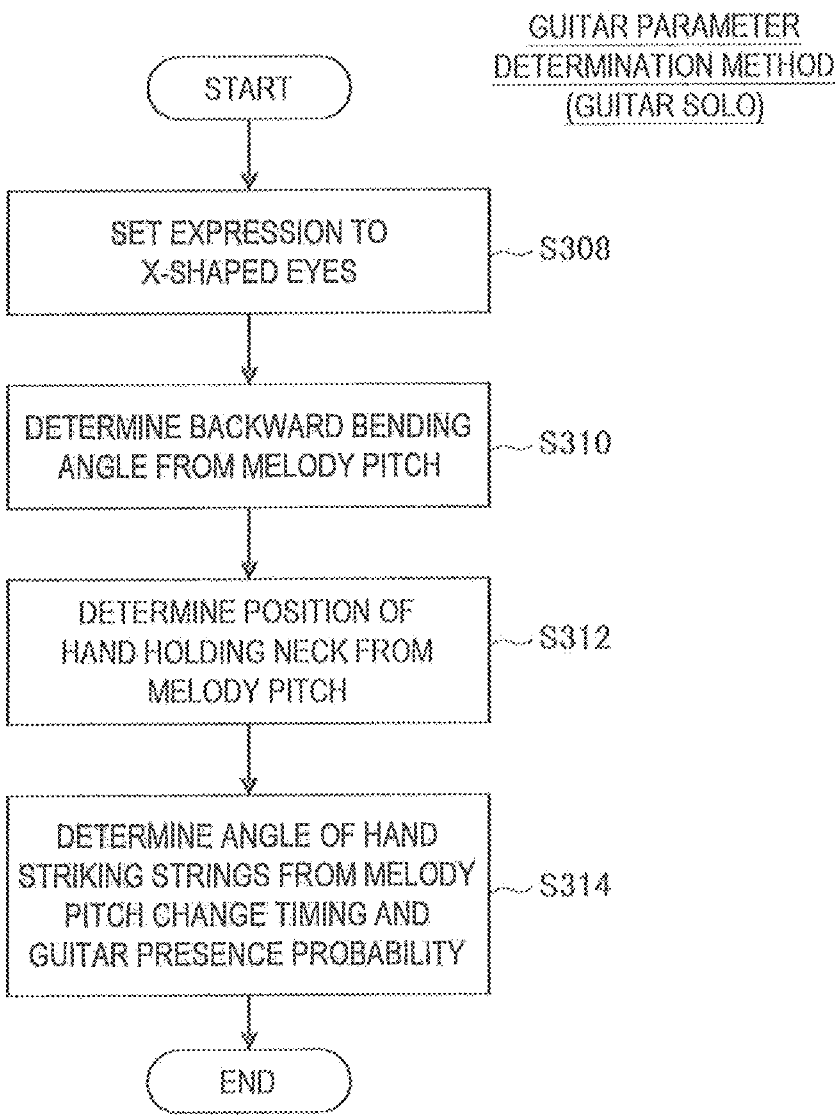
FIG. 108 is an explanatory diagram showing an example of the visualization parameter determination method according to the present embodiment.
Figure 109:
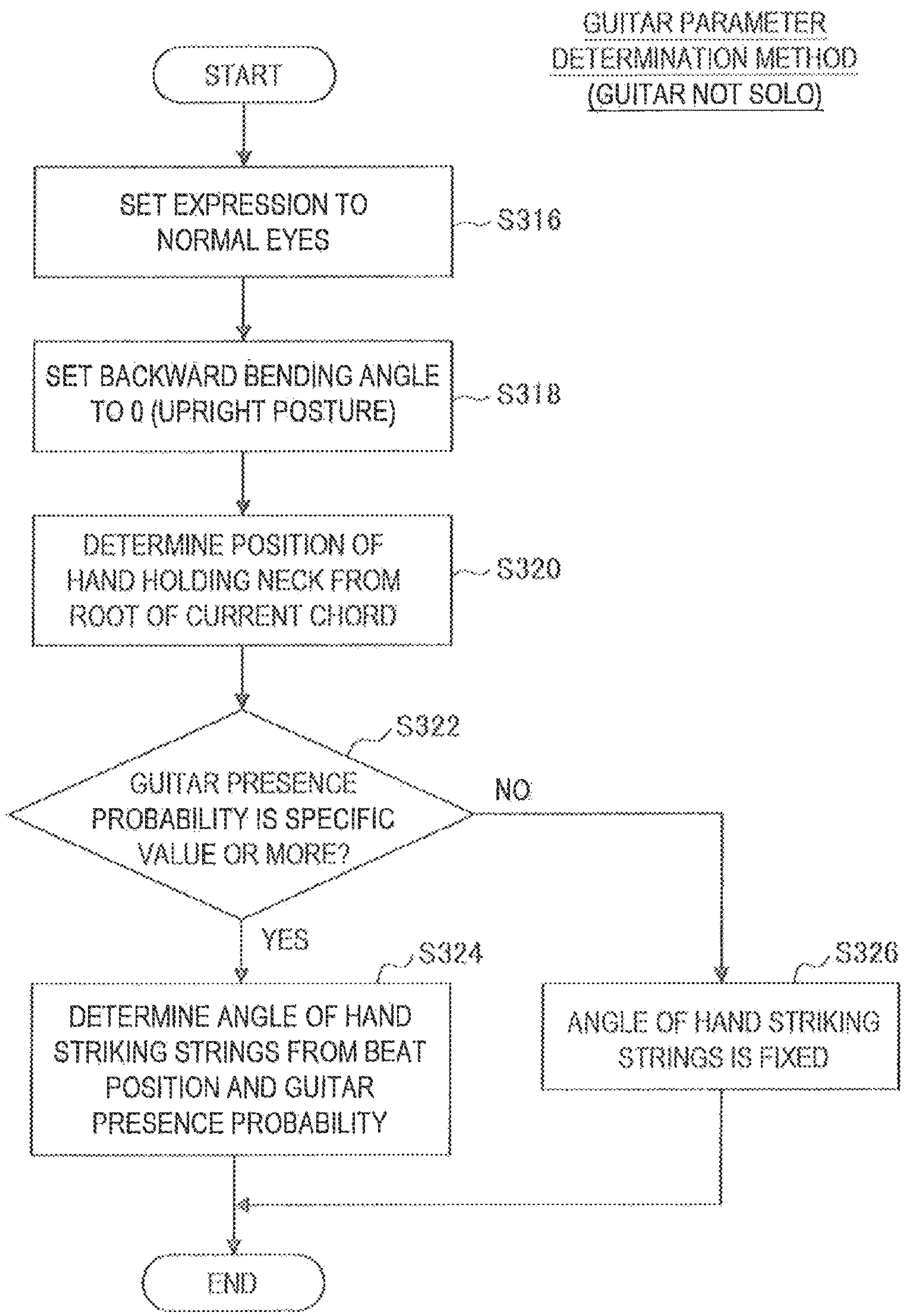
FIG. 109 is an explanatory diagram showing an example of the visualization parameter determination method according to the present embodiment.

Next, referring to FIGS. 104 to 109, a player parameter determination method to be applied to the player object for guitar will be described. FIG. 104 is an explanatory diagram showing an example of player parameter settings set for a case of guitar solo. FIG. 105 is an explanatory diagram showing an example of player parameter settings set for a case of guitar not solo. FIG. 106 is an explanatory diagram showing types of player parameters to be applied to the player object for guitar. FIG. 107 is an explanatory diagram showing an overall processing flow relating to the player parameter determination method for guitar. FIG. 108 is an explanatory diagram showing a flow of processing relating to the player parameter determination method for guitar for a case of guitar being solo. FIG. 109 is an explanatory diagram showing a flow of processing relating to the player parameter determination method for guitar for a case of guitar not being solo.

First, as shown in FIG. 106, the player parameter relating to guitar includes angle of hand striking strings, position of hand holding the neck, shape of eyes (expression), backward bending angle (posture), and size of open mouth. The player parameter for guitar indicating the size of open mouth is determined based on a unison presence probability which is time-series data. Also, the player parameter for guitar indicating the backward bending angle is determined based on the melody line in case the guitar is solo. For example, the higher the pitch of the melody line, the larger the player parameter indicating the backward bending angle is set to be. On the other hand, in case the guitar is not solo, the player parameter is set so that the backward bending angle is 0 (upright posture). The decision of the guitar being solo or not is performed based on whether or not a guitar solo probability is a certain level or more.

Furthermore, the player parameter for guitar indicating the shape of eyes (expression) is set such that the eyes become an X-shape when the guitar is solo, and is set such that the eyes are normal eyes in other case. The player parameter indicating the position of hand holding the neck is set based on the pitch of the melody line in case the guitar is solo, and is set based on the chord name in case the guitar is not solo. For example, in case of a guitar solo, the position of the hand holding the neck is determined based on the example of the player parameter settings shown in FIG. 104.

For example, when the melody is between E2 and G#2, the player parameter is set such that the position of the hand is on the first string, and is nearest to the headstock in case of E2 and gets nearer to the body as the note gets closer to G#2. Similarly, when the melody is between A2 and C#3, the player parameter is set such that the position of the hand is on the second string, and is nearest to the headstock in case of A2 and gets nearer to the body as the note gets closer to C#3. When the melody is between D3 and F#3, the player parameter is set such that the position of the hand is on the third string, and is nearest to the headstock in case of D3 and gets nearer to the body as the note gets closer to F#3. When the melody is between G03 and A#3, the player parameter is set such that the position of the hand is on the fourth string, and is nearest to the headstock in case of G3 and gets nearer to the body as the note gets closer to A#3. When the melody is between B3 and D#4, the player parameter is set such that the position of the hand is on the fifth string, and is nearest to the headstock in case of B3 and gets nearer to the body as the note gets closer to D#4. When the melody is higher than E4, the player parameter is set such that the position of the hand is on the sixth string, and is nearest to the headstock in case of E4 and gets nearer to the body as the note gets higher.

On the other hand, in case the guitar is not solo, the position of the hand holding the neck is determined based on the example of the player parameter settings shown in FIG. 105. As shown in FIG. 105, in case the guitar is not solo, the position of the hand holding the neck is determined based on the root note of a chord stored in the metadata storage unit 112. The example of FIG. 105 may show the position for a case assuming that a chord is played at a position nearest to the headstock. For example, when the root note of a chord is any of E, F#, G and G#, the position of the hand holding the neck is set to be nearest to the headstock in case of E and to get nearer to the body as the note gets closer to G#. Similarly, when the root note of a chord is any of A, A#, B, C, C#, and D#, the position of the hand holding the neck is set to be nearest to the headstock in case of A and to get nearer as the note gets closer to D#.

Furthermore, as shown in FIG. 106, in case of a guitar solo, the angle of the hand striking the strings is set so as to strike the strings at the exact timing of change of the melody line. At this time, angle change range $\theta_1$ is set to be small. On the other hand, in case the guitar is not solo, the angle of the hand striking the strings is set so that the hand moves back and forth with every beat. Also, angle change range $\theta_2$ is set to be large. The higher a guitar presence probability, the larger the change range is set to be.

Here, referring to FIGS. 107 to 109, the player parameter determination method relating to guitar will be described.

First, referring to FIG. 107, an overall flow of player parameter determination processing relating to guitar will be described. As shown in FIG. 107, first, the visualization parameter determination unit 114 determines whether or not a guitar solo probability is a specific value set in advance or more (S300). When the guitar solo probability is the specific value or more, the visualization parameter determination unit 114 proceeds to the process of step S302. On the other hand, when the guitar solo probability is less than the specific value, the visualization parameter determination unit 114 proceeds to the process of step S304. In step S302, a parameter setting process for a case of guitar solo is performed by the visualization parameter determination unit 114 (S302). In step S304, a parameter setting process for a case of guitar not being solo is performed by the visualization parameter determination unit 114 (S304). When any of the processes of steps S302 and S304 is performed, the visualization parameter determination unit 114 proceeds to the process of step S306. In step S306, the visualization parameter determination unit 114 refers to a unison presence probability and determines the size of the open mouth of the player object based on the unison presence probability (S306).

Next, referring to FIG. 108, parameter determination processing for a case of guitar solo will be described. As shown in FIG. 108, first, the visualization parameter determination unit 114 sets the expression of the player object for guitar to an X-shaped eye (S308). Next, the visualization parameter determination unit 114 determines the backward bending angle of the player object based on the melody pitch (S310). Then, the visualization parameter determination unit 114 determines the position of the hand holding the neck based on the melody pitch (S312). Then, the visualization parameter determination unit 114 determines the angle of the hand striking the strings based on a melody pitch change timing and the guitar presence probability (S314).

Next, referring to FIG. 109, parameter determination processing for a case of guitar not being solo will be described. As shown in FIG. 109, first, the visualization parameter determination unit 114 sets the expression of the player object for guitar to normal eyes (S316). Next, the visualization parameter determination unit 114 sets the backward bending angle of the player object to 0 (upright posture) (S318). Then, the visualization parameter determination unit 114 determines the position of the hand holding the neck based on the root note of a current chord (S320). Then, the visualization parameter determination unit 114 decides whether or not the guitar presence probability is a specific value set in advance or more (S322).

When the guitar presence probability is a specific value or more, the visualization parameter determination unit. 114 proceeds to the process of step S324. On the other hand, when the guitar presence probability is less than the specific value, the visualization parameter determination unit 114 proceeds to the process of step S326. In step S324, the angle of the hand striking the strings is determined by the visualization parameter determination unit 114 based on beat positions and the guitar presence probability (S324). In step S326, the angle of the hand striking the strings is set by the visualization parameter determination unit 114 to be fixed (S326). When the process of step S324 or S326 is performed, the visualization parameter determination unit 114 ends the player parameter setting process for a case of guitar not being solo.

(Bass)

Figure 110:
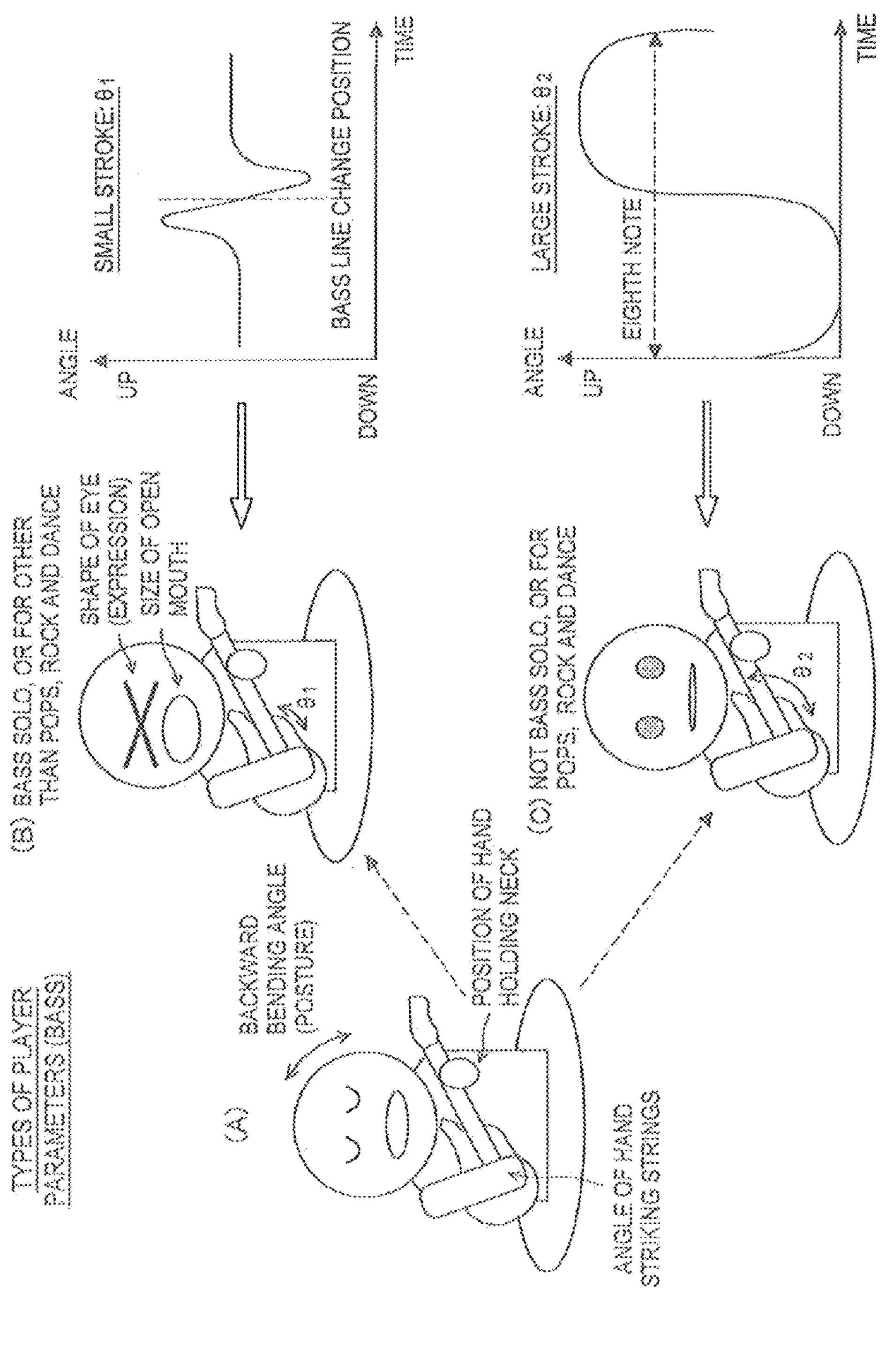
FIG. 110 is an explanatory diagram showing an example of the visualization parameter determination method according to the present embodiment.
Figure 112:
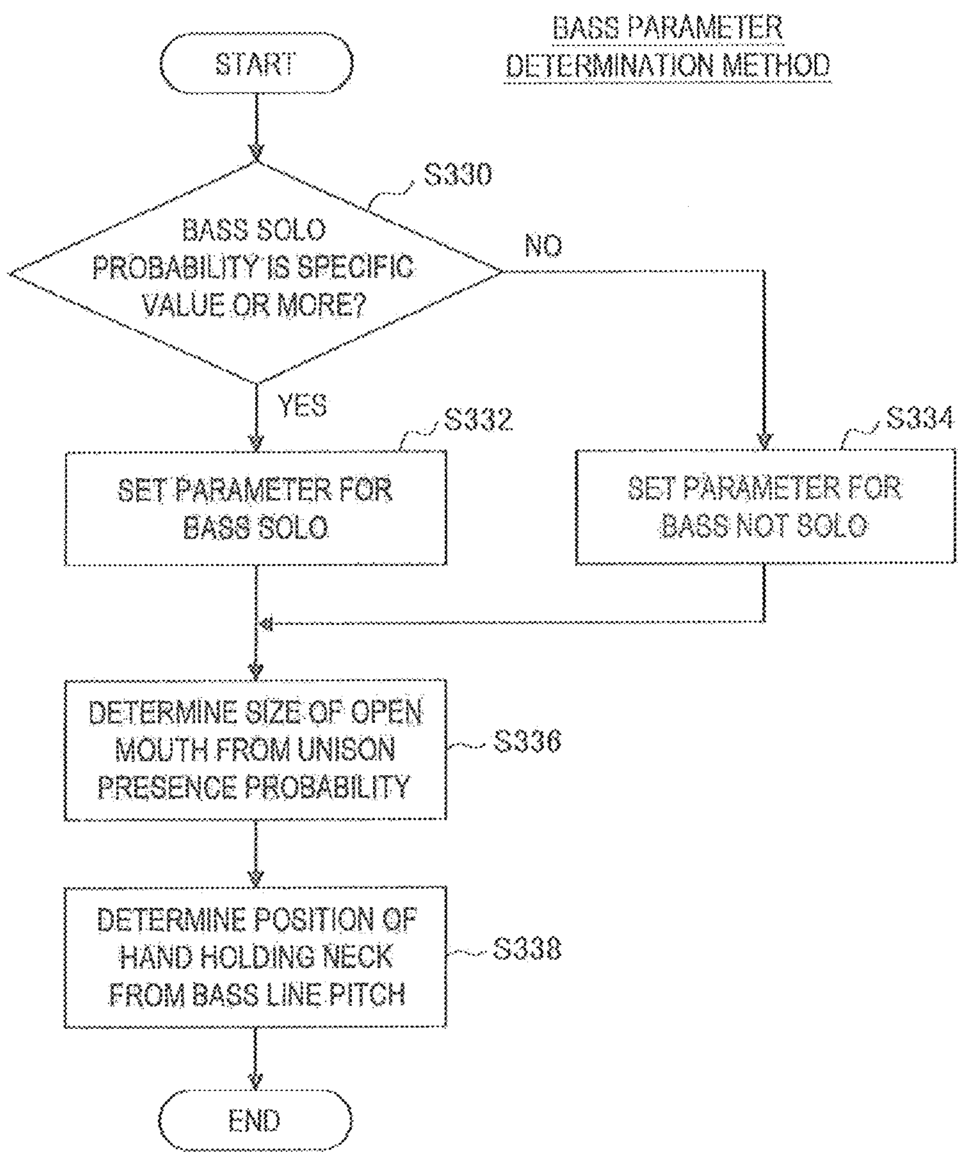
FIG. 112 is an explanatory diagram showing an example of the visualization parameter determination method according to the present embodiment.
Figure 113:
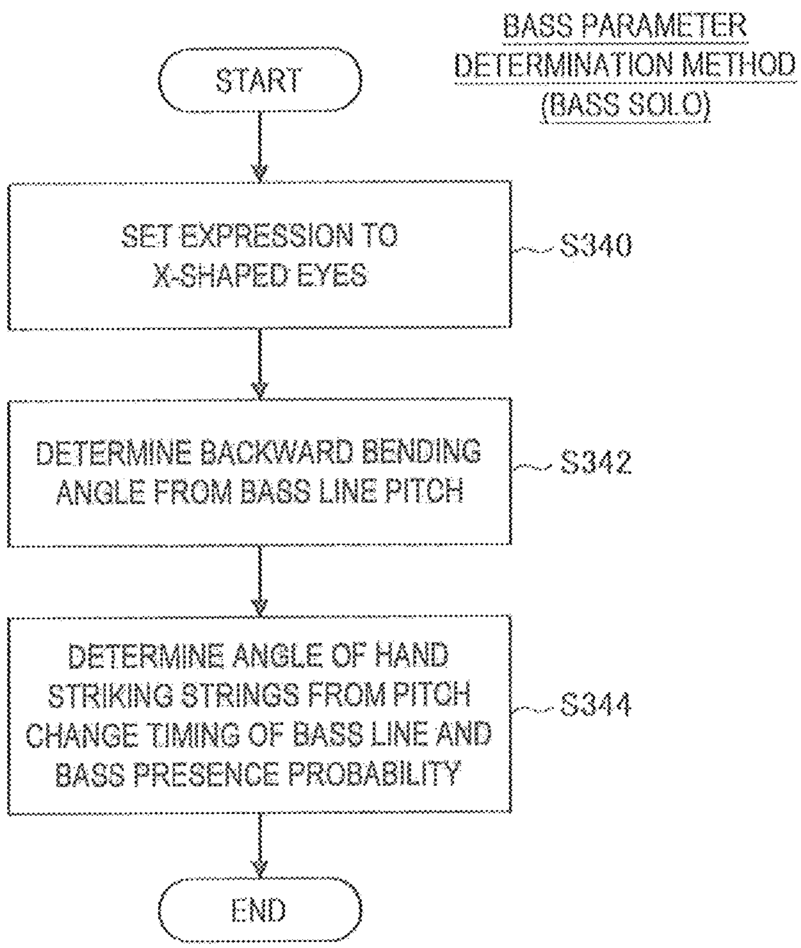
FIG. 113 is an explanatory diagram showing an example of the visualization parameter determination method according to the present embodiment.
Figure 114:
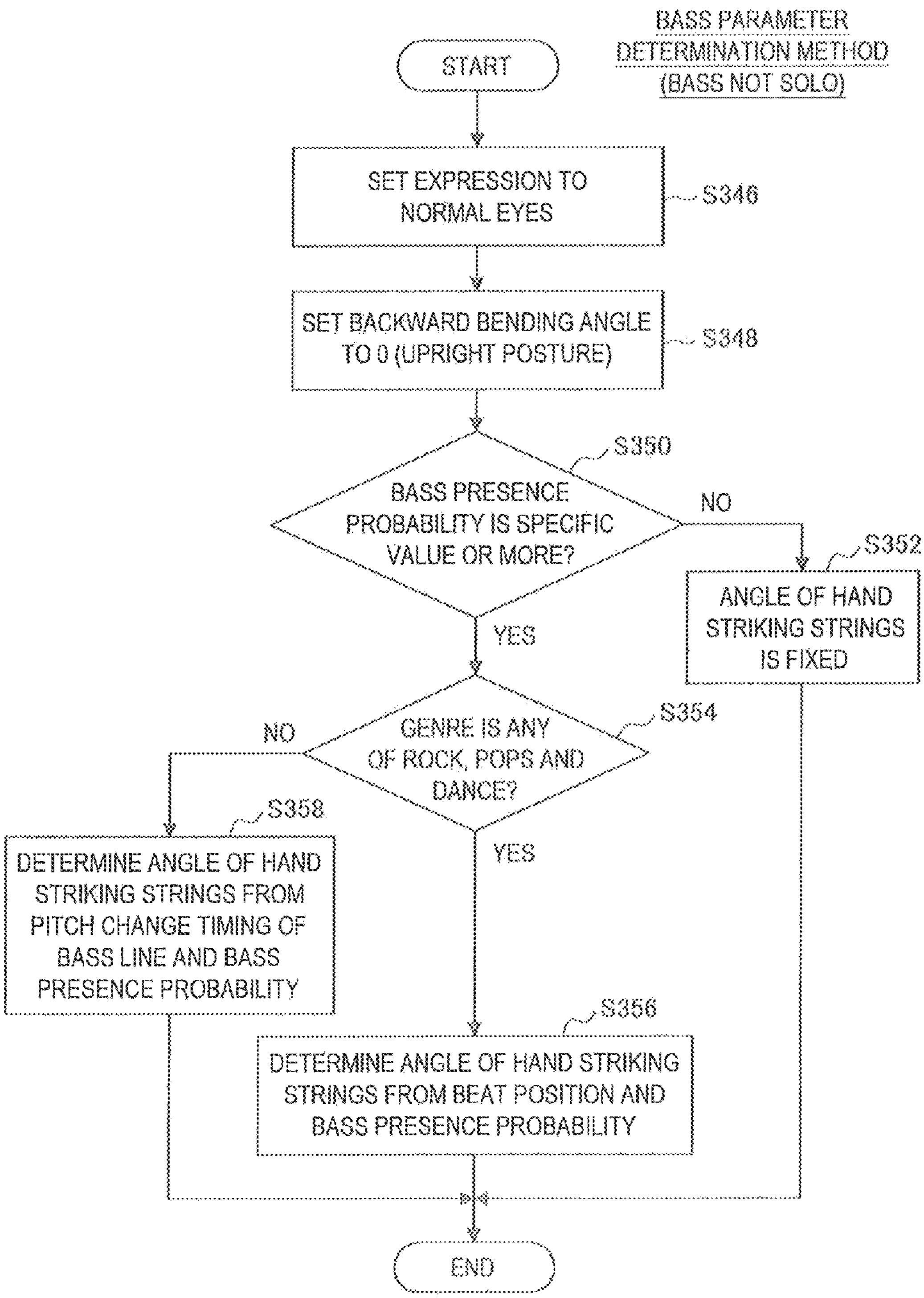
FIG. 114 is an explanatory diagram showing an example of the visualization parameter determination method according to the present embodiment.

Next, referring to FIGS. 110 to 114, a player parameter determination method to be applied to the player object for bass will be described. FIG. 110 is an explanatory diagram showing types of player parameters to be applied to the player object for bass. FIG. 111 is an explanatory diagram showing an example of player parameter settings relating to bass. FIG. 112 is an explanatory diagram showing an overall processing flow relating to the player parameter determination method for bass. FIG. 113 is an explanatory diagram showing a flow of processing relating to the player parameter determination method for bass for a case of bass being solo. FIG. 114 is an explanatory diagram showing a flow of processing relating to the player parameter determination method for bass for a case of bass not being solo.

First, as shown in FIG. 110, the player parameter relating to bass includes angle of hand striking strings, position of hand holding the neck, shape of eyes (expression), backward bending angle (posture), and size of open mouth. The player parameter for bass indicating the size of open mouth is determined based on a unison presence probability which is time-series data. Also, the player parameter for bass indicating the backward bending angle is determined based on the bass line in case the bass is solo. For example, the higher the pitch of the bass line, the larger the player parameter indicating the backward bending angle is set to be. On the other hand, in case the bass is not solo, the player parameter is set so that the backward bending angle is 0 (upright posture). The decision of the bass being solo or not is performed based on whether or not a bass solo probability is a certain level or more.

Furthermore, the player parameter for bass indicating the shape of eyes (expression) is set such that the eyes become an X-shape when the bass is solo, and is set such that the eyes are normal eyes in other case. The player parameter indicating the position of hand holding the neck is set based on the pitch of the bass line. For example, the position of the hand holding the neck is determined based on the example of the player parameter settings shown in FIG. 111.

For example, when the bass line is between E1 and G#1, the player parameter is set such that the position of the hand is on the first string, and is nearest to the headstock in case of E1 and gets nearer to the body as the note gets closer to G#1. Similarly, when the bass line is between A1 and C#2, the player parameter is set such that the position of the hand is on the second string, and is nearest to the headstock in case of A1 and gets nearer to the body as the note gets closer to C#2. When the bass line is between D2 and F#2, the player parameter is set such that the position of the hand is on the third string, and is nearest to the headstock in case of D2 and gets nearer to the body as the note gets closer to F#2. When the bass line is higher than G2, the player parameter is set such that the position of the hand is on the fourth string, and is nearest to the headstock in case of G2 and gets nearer to the body as the note gets higher.

Furthermore, as shown in FIG. 110, in case of a bass solo, the angle of the hand striking the strings is set so as to strike the strings at the exact timing of change of the bass line. At this time, angle change range $\theta_1$ is set to be small. On the other hand, in case the bass is not solo, the angle of the hand striking the strings is set so that the hand moves back and forth with every eighth note. Also, angle change range $\theta_2$ is set to be large. The higher a bass presence probability, the larger the change range is set to be.

Here, referring to FIGS. 112 to 114, the player parameter determination method relating to bass will be described.

First, referring to FIG. 112, an overall flow of player parameter determination processing relating to bass will be described. As shown in FIG. 112, first, the visualization parameter determination unit 114 determines whether or not a bass solo probability is a specific value set in advance or more (S330). When the bass solo probability is the specific value or more, the visualization parameter determination unit 114 proceeds to the process of step S332. On the other hand, when the bass solo probability is less than the specific value, the visualization parameter determination unit 114 proceeds to the process of step S334. In step S332, a parameter setting process for a case of bass solo is performed by the visualization parameter determination unit 114 (S332). In step S334, a parameter setting process for a case of bass not being solo is performed by the visualization parameter determination unit 114 (S334). When any of the processes of steps S332 and S334 is performed, the visualization parameter determination unit 114 proceeds to the process of step S336. In step S336, the visualization parameter determination unit 114 refers to a unison presence probability and determines the size of the open mouth of the player object based on the unison presence probability (S336). Then, the visualization parameter determination unit 114 determines the position of the hand holding the neck based on the pitch of the bass line (S338), and ends the series of processes.

Next, referring to FIG. 113, parameter determination processing for a case of bass solo will be described. As shown in FIG. 113, first, the visualization parameter determination unit 114 sets the expression of the player object for bass to an X-shaped eye (S340). Next, the visualization parameter determination unit 114 determines the backward bending angle of the player object based on the pitch of the bass line (S342). Then, the visualization parameter determination unit 114 determines the angle of the hand striking the strings based on a bass pitch change timing and the bass presence probability (S344).

Next, referring to FIG. 114, parameter determination processing for a case of bass not being solo will be described. As shown in FIG. 114, first, the visualization parameter determination unit 114 sets the expression of the player object for bass to normal eyes (S346). Next, the visualization parameter determination unit 114 sets the backward bending angle of the player object to 0 (upright posture) (S348). Then, the visualization parameter determination unit 114 decides whether or not the bass presence probability is a specific value set in advance or more (S350). When the bass presence probability is a specific value or more, the visualization parameter determination unit 114 proceeds to the process of step S354. On the other hand, when the bass presence probability is less than the specific value, the visualization parameter determination unit 114 proceeds to the process of step S352.

In step S354, the visualization parameter determination unit 114 decides whether the genre is any of rock, pops and dance (S354). When the genre is any of rock, pops and dance, the visualization parameter determination unit 114 proceeds to the process of step S356. On the other hand, when the genre is neither of rock, pops and dance, the visualization parameter determination unit 114 proceeds to the process of step S358. In step S356, the angle of the hand striking the strings is determined by the visualization parameter determination unit 114 based on beat positions and the bass presence probability (S356).

In step S358, the visualization parameter determination unit 114 determines the angle of the hand striking the strings based on a bass pitch change timing and the bass presence probability (S358). Furthermore, in step S352, the angle of the hand striking the strings is set by the visualization parameter determination unit 114 to be fixed (S352). When any of the processes of steps S352, S356 and S358 is performed, the visualization parameter determination unit 114 ends the player parameter determination process for a case of bass not being solo.

(Keyboard, Drums)

Figure 115:
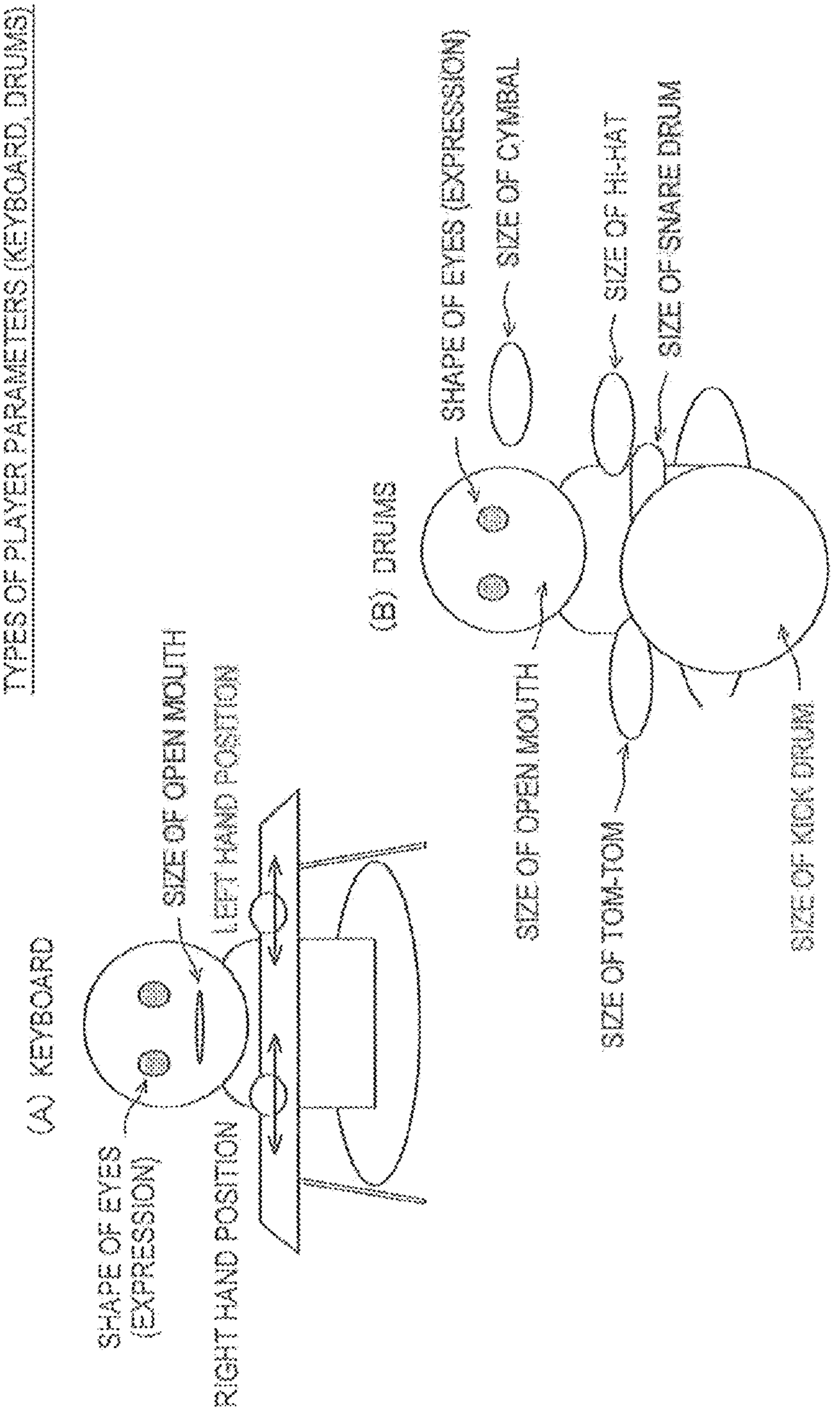
FIG. 115 is an explanatory diagram showing an example of the visualization parameter determination method according to the present embodiment.
Figure 116:
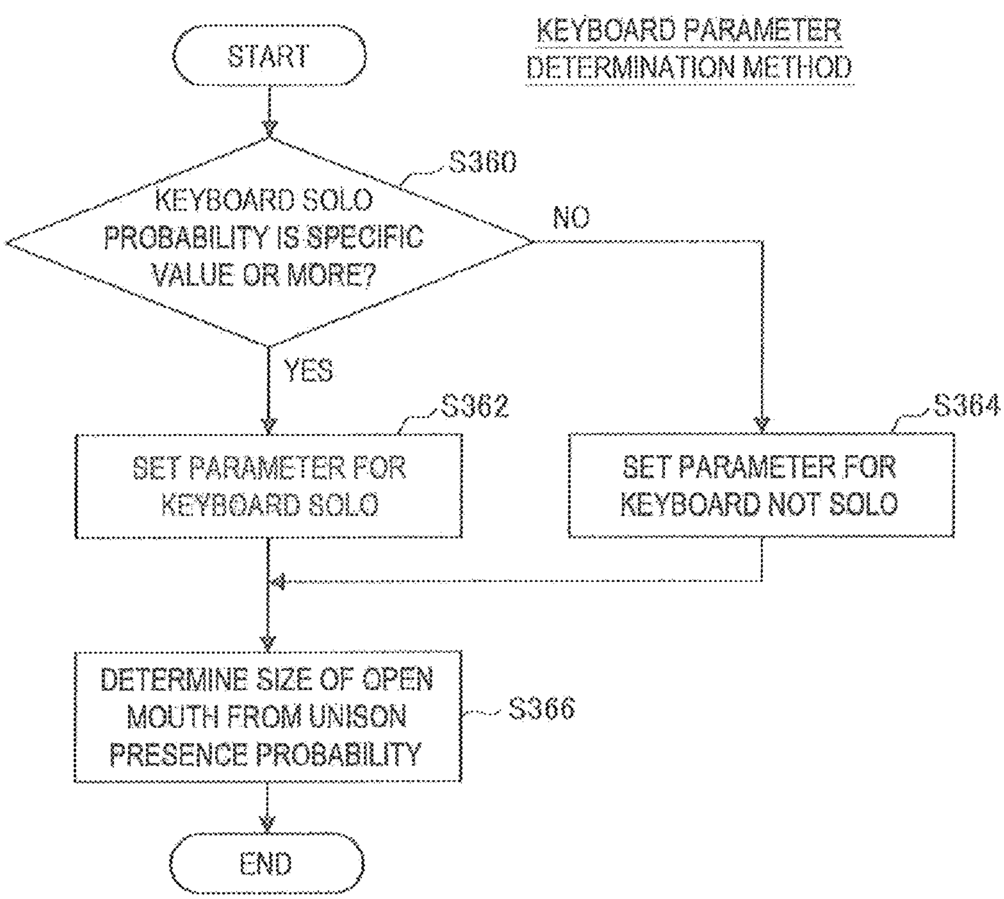
FIG. 116 is an explanatory diagram showing an example of the visualization parameter determination method according to the present embodiment.
Figure 117:
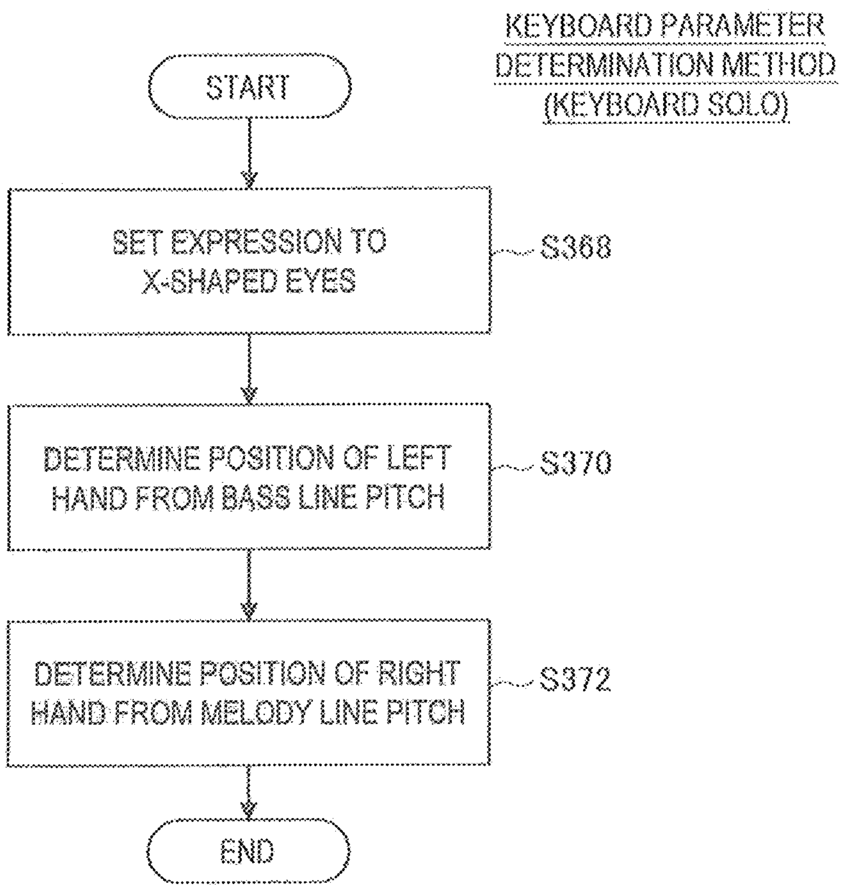
FIG. 117 is an explanatory diagram showing an example of the visualization parameter determination method according to the present embodiment.
Figure 118:
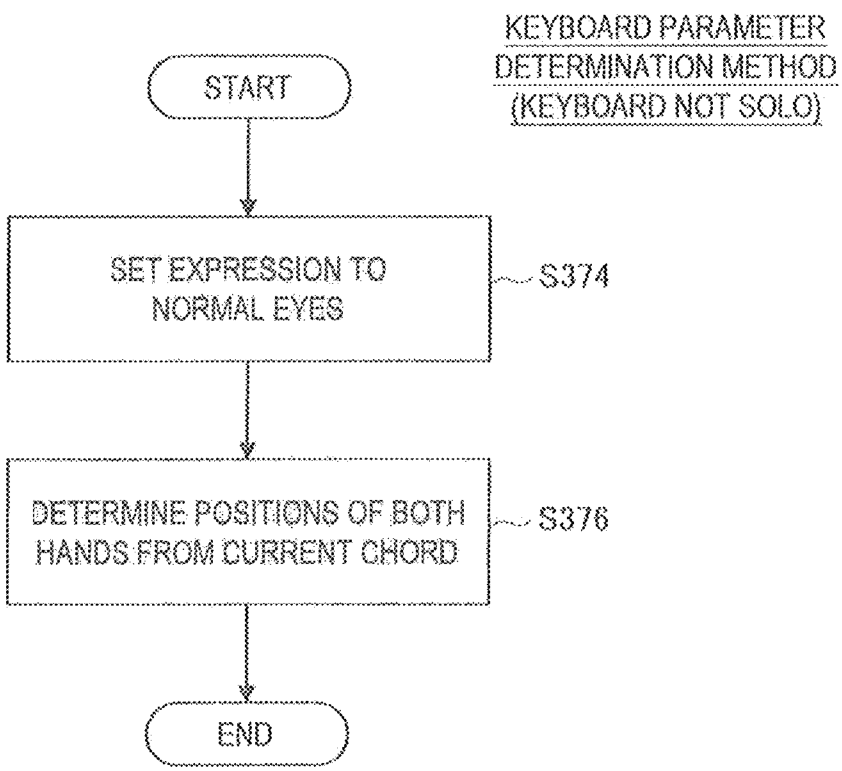
FIG. 118 is an explanatory diagram showing an example of the visualization parameter determination method according to the present embodiment.
Figure 119:
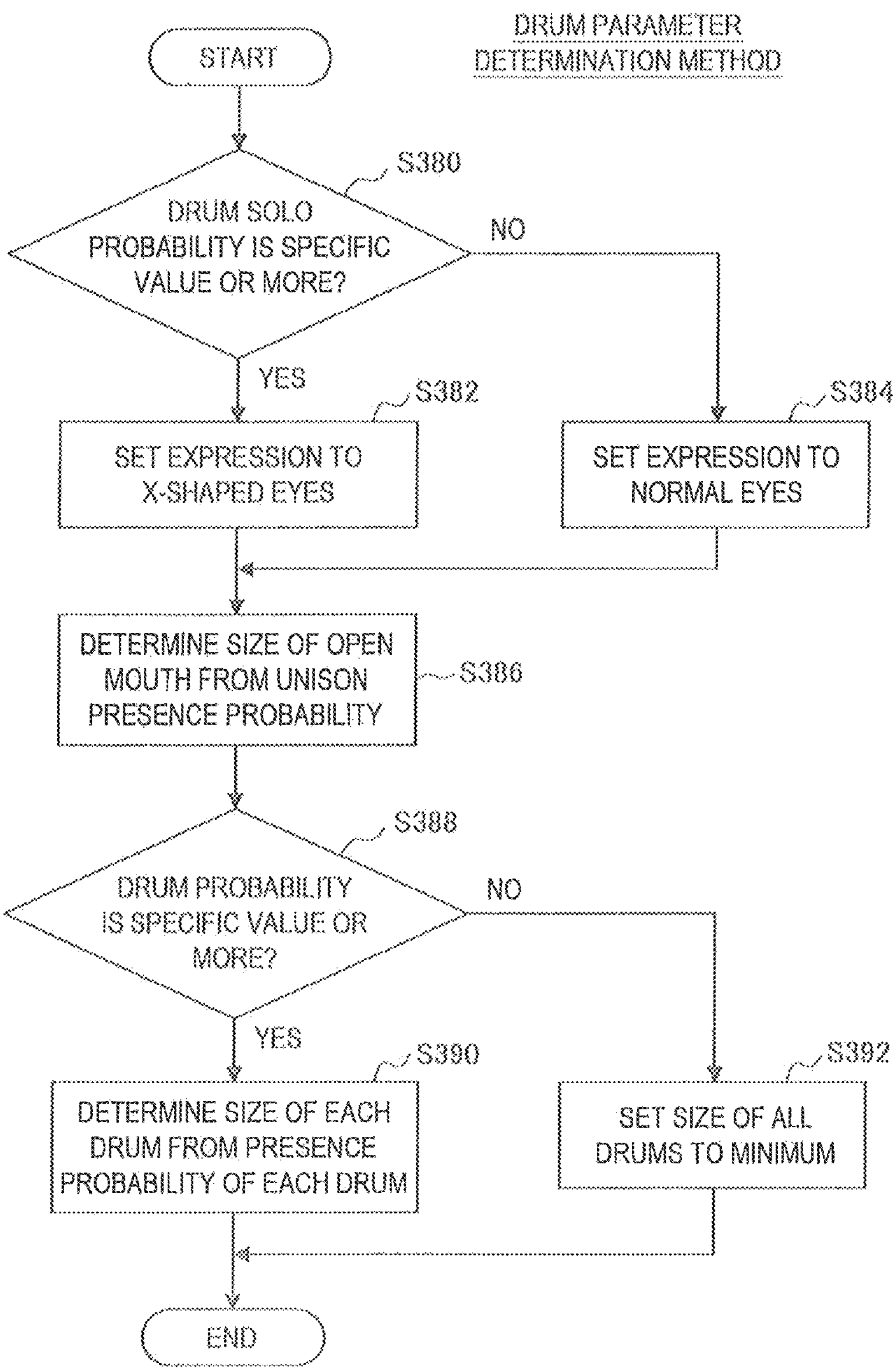
FIG. 119 is an explanatory diagram showing an example of the visualization parameter determination method according to the present embodiment.

Next, referring to FIGS. 115 to 119, player parameter determination methods to be applied to the player objects for keyboard and drums will be described. FIG. 115 is an explanatory diagram showing types of player parameters to be applied to the player objects for keyboard and drums. FIG. 116 is an explanatory diagram showing an overall processing flow relating to the player parameter determination method for keyboard. FIG. 117 is an explanatory diagram showing a flow of processing relating to the player parameter determination method for keyboard in case the keyboard is solo. FIG. 118 is an explanatory diagram showing a flow of processing relating to the player parameter determination method for keyboard in case the keyboard is not solo. FIG. 119 is an explanatory diagram showing a flow of processing relating to the player parameter determination method for drums.

First, the player parameter for keyboard will be described. As shown in FIG. 115, the player parameter relating to keyboard includes the positions of left and right hands, shape of eyes (expression), and size of open mouth. The player parameter for keyboard indicating the size of open mouth is determined based on a unison presence probability which is time-series data. Furthermore, the player parameter for keyboard indicating the shape of eyes (expression) is set such that the eyes become an X-shape when the keyboard is solo, and is set such that the eyes are normal eyes in other case. The player parameters indicating the positions of the right hand and the left hand are set based on the pitches of the melody line and the bass line. For example, the player parameters indicating the positions of hands are set such that the higher the pitches, the more to the right the hands are, and the lower the pitches, the more to the left the hands are. However, in case the keyboard is not solo, the positions of the hands are set to predetermined positions based on a current chord.

Here, referring to FIGS. 116 to 118, the player parameter determination method relating to keyboard will be described.

First, referring to FIG. 116, an overall flow of player parameter determination processing relating to keyboard will be described. As shown in FIG. 116, first, the visualization parameter determination unit 114 determines whether or not a keyboard solo probability is a specific value set in advance or more (S360). When the keyboard solo probability is the specific value or more, the visualization parameter determination unit 114 proceeds to the process of step S362. On the other hand, when the keyboard solo probability is less than the specific value, the visualization parameter determination unit 114 proceeds to the process of step S364.

In step S362, a parameter setting process for a case of keyboard solo is performed by the visualization parameter determination unit 114 (S362). In step S364, a parameter setting process for a case of keyboard not being solo is performed by the visualization parameter determination unit 114 (S364). When any of the processes of steps S362 and S364 is performed, the visualization parameter determination unit 114 proceeds to the process of step S366. In step S366, the visualization parameter determination unit 114 refers to a unison presence probability and determines the size of the open mouth of the player object based on the unison presence probability (S366).

Next, referring to FIG. 117, parameter determination processing for a case of keyboard solo will be described. As shown in FIG. 117, first, the visualization parameter determination unit 114 sets the expression of the player object for keyboard to an X-shaped eye (S368). Next, the visualization parameter determination unit 114 determines the position of the left hand of the player object based on the pitch of the bass line (S370). Then, the visualization parameter determination unit 114 determines the position of the right hand of the player object based on the pitch of the melody line (S372).

Next, referring to FIG. 118, parameter determination processing for a case of keyboard not being solo will be described. As shown in FIG. 118, first, the visualization parameter determination unit 114 sets the expression of the player object for keyboard to normal eyes (S374). Next, the visualization parameter determination unit 114 determines the positions of both hands based on a current chord (S376). When the process of step S376 is performed, the visualization parameter determination unit 114 ends the player parameter setting process for a case of keyboard not being solo.

Next, the player parameter for drums will be described. As shown in FIG. 115, the player parameter relating to drums includes shape of eyes (expression), size of open mouth, and sizes of hi-hat, cymbal, snare drum, kick drum and tom-tom. The player parameter for drums indicating the size of open mouth is determined based on a unison presence probability which is time-series data. Furthermore, the player parameter for drums indicating the shape of eyes (expression) is set such that the eyes become an X-shape when the drums are solo, and is set such that the eyes are normal eyes in other case. The sizes of hi-hat, cymbal, snare drum, kick drum and tom-tom are determined based on a drums presence probability computed as time-series metadata.

Here, referring to FIG. 119, the player parameter determination method relating to drums will be described. As shown in FIG. 119, first, the visualization parameter determination unit 114 determines whether or not a drums solo probability is a specific value set in advance or more (S380). When the drums solo probability is the specific value or more, the visualization parameter determination unit 114 proceeds to the process of step S382. On the other hand, when the drums solo probability is less than the specific value, the visualization parameter determination unit 114 proceeds to the process of step S384. In step S382, the visualization parameter determination unit 114 sets the expression of the player object for drums to an X-shaped eye (S382). In step S384, the visualization parameter determination unit 114 sets the expression of the player object for drums to normal eyes (S384).

When any of the processes of steps S382 and S384 is performed, the visualization parameter determination unit 114 proceeds to the process of step S386. In step S386, the visualization parameter determination unit 114 refers to a unison presence probability and determines the size of the open mouth of the player object based on the unison presence probability (S386). Then, the visualization parameter determination unit 114 decides whether or not a drums probability is a specific value set in advance or more (S388). When the drums probability is the specific value or more, the visualization parameter determination unit 114 proceeds to the process of step S390. On the other hand, when the drums probability is less than the specific value, the visualization parameter determination unit 114 proceeds to the process of step S392.

In step S390, the size of each drum is determined by the visualization parameter determination unit 114 based on a presence probability of each drum (S390). In step S392, the sizes of all the drums are set to minimum by the visualization parameter determination unit 114 (S392). When any of the processes of steps S390 and S392 is performed, the visualization parameter determination unit 114 ends the player parameter setting process relating to drums.

(Strings)

Figure 120:
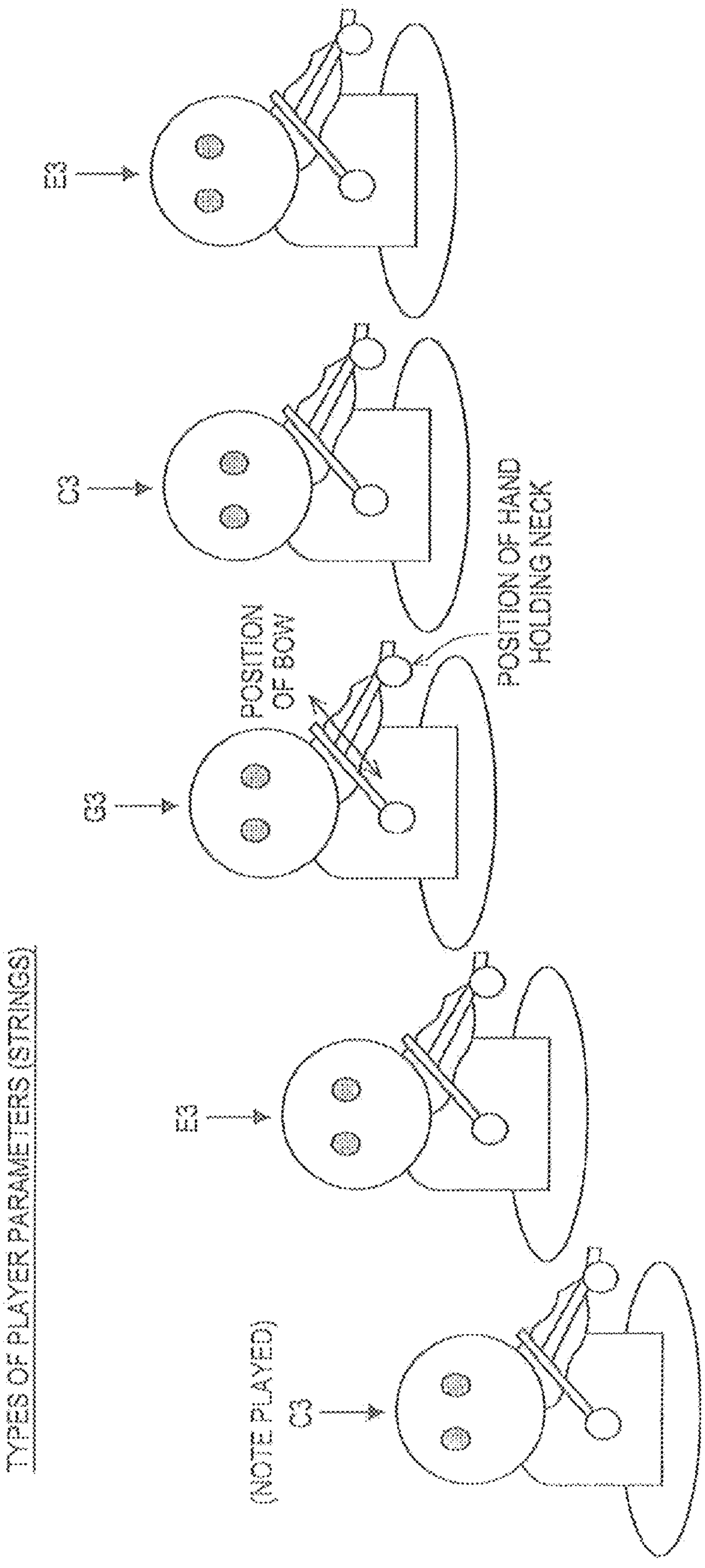
Figure 122:
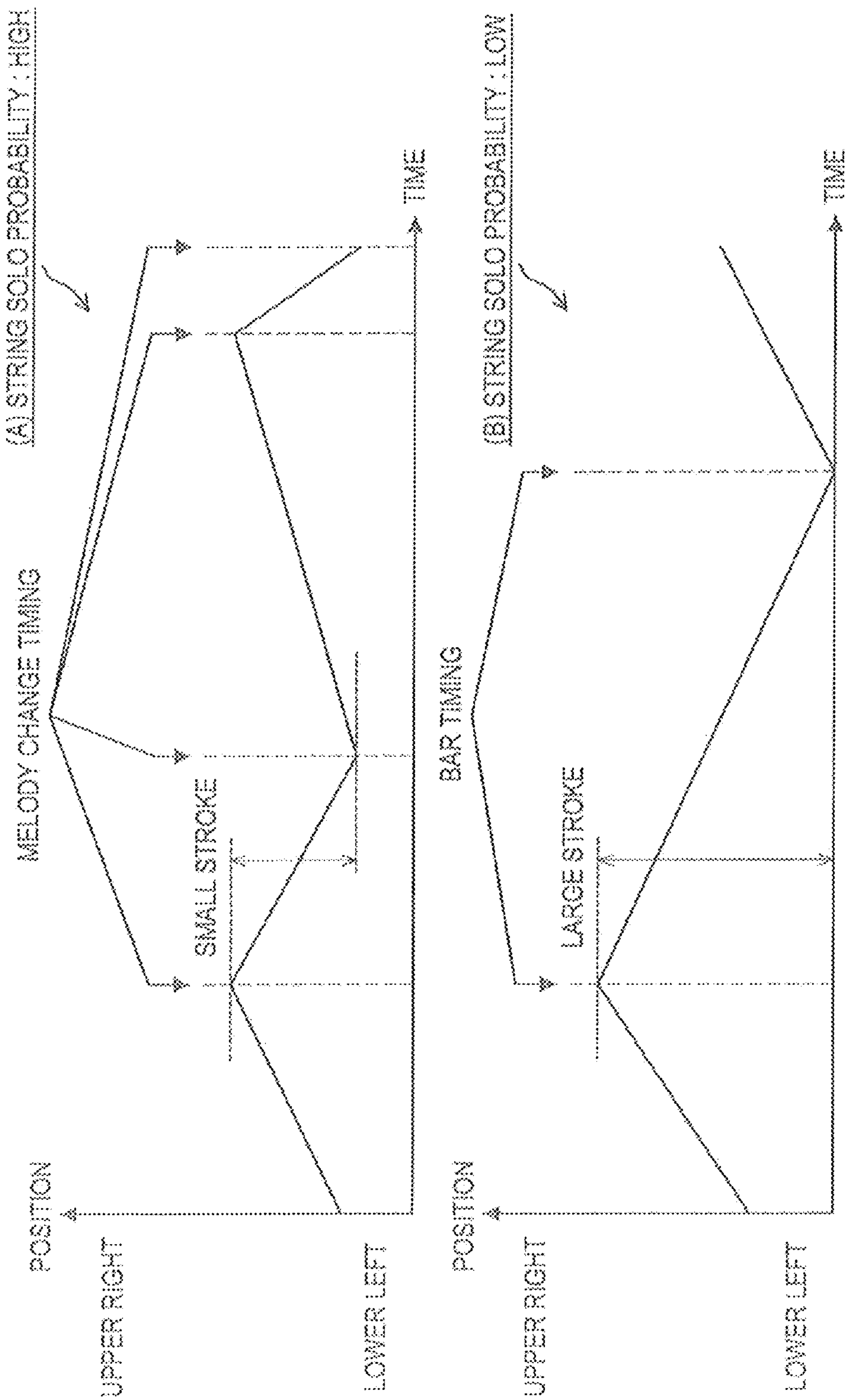
Figure 123:
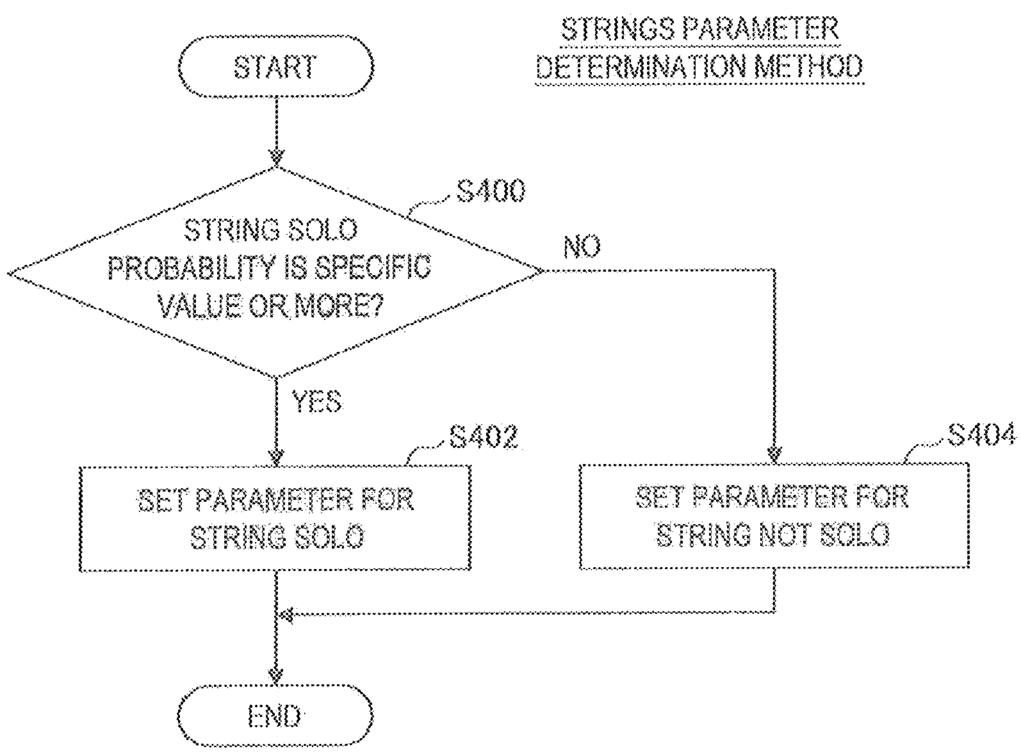
Figure 124:
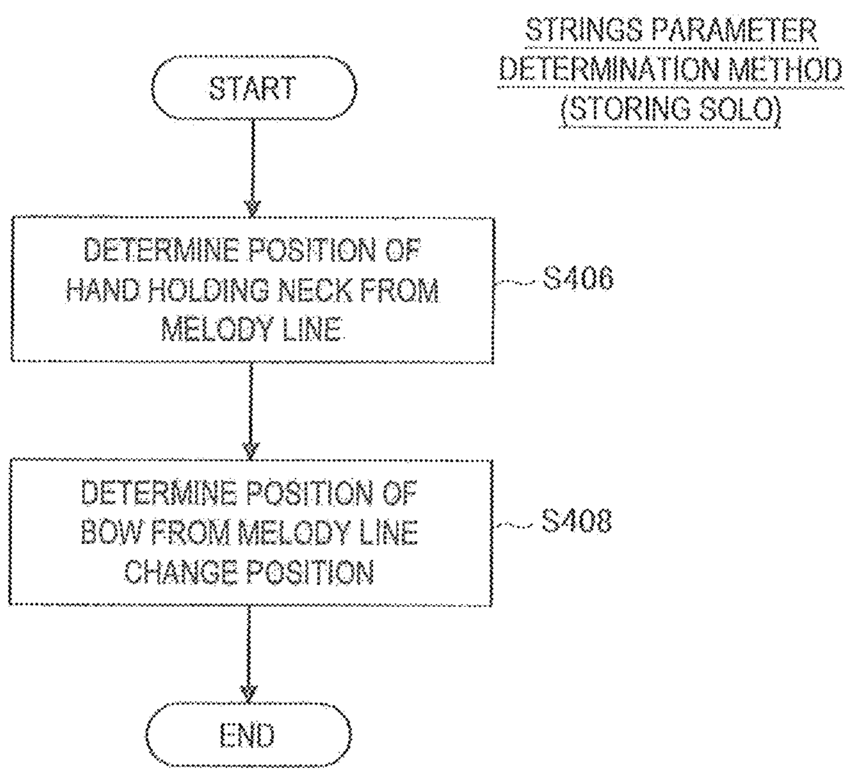
Figure 125:
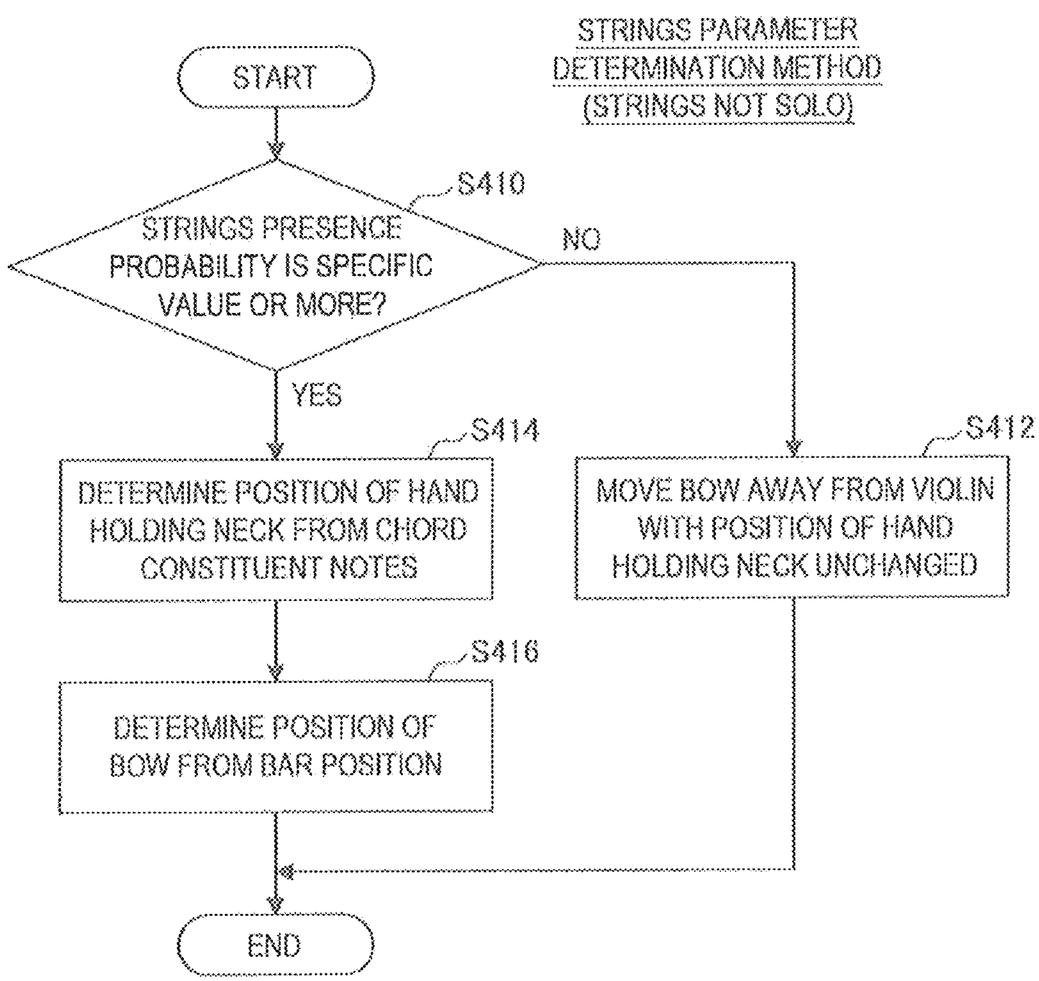

Next, referring to FIGS. 120 to 125, a player parameter determination method to be applied to the player objects for strings will be described. FIG. 120 is an explanatory diagram showing types of player parameters to be applied to the player objects for strings. FIG. 121 is an explanatory diagram showing an example of player parameter settings relating to strings. FIG. 122 is an explanatory diagram showing width of a stroke and moving timing of a bow, which are different for when the strings are solo and when the strings are not solo. FIG. 123 is an explanatory diagram showing an overall processing flow relating to the player parameter determination method for strings. FIG. 124 is an explanatory diagram showing a flow of processing relating to the player parameter determination method for strings for a case of strings being solo, FIG. 125 is an explanatory diagram showing a flow of processing relating to the player parameter determination method for strings for a case of strings not being solo.

First, as shown in FIG. 120, the player parameter relating to strings includes position of a bow and position of the hand holding the neck. In case of strings solo, the player parameter indicating the position of a bow is determined based on a melody change timing. For example, as shown in FIG. 122(A), the player parameter indicating the position of how is determined such that the bow moves to the tip at the melody change timing. In case of a strings solo, the stroke is set to be small. Furthermore, the player parameter indicating the position of the hand holding the neck is set based on the melody line. For example, the position of the hand holding the neck is determined based on the example of the player parameter settings as shown in FIG. 121.

For example, when the melody line is between G2 and C#2, the player parameter is set such that the position of the hand is on the first string, and is nearest to the headstock in case of G2 and gets nearer to the body as the note gets closer to C#2. Similarly, when the melody line is between D3 and G#3, the player parameter is set such that the position of the hand is on the second string, and is nearest to the headstock in case of D3 and gets nearer to the body as the note gets closer to G#3. When the melody line is between A3 and D#4, the player parameter is set such that the position of the hand is on the third string, and is nearest to the headstock in case of A3 and gets nearer to the body as the note gets closer to D#4. When the melody line is higher than E4, the player parameter is set such that the position of the hand is on the fourth string, and is nearest to the headstock in case of E4 and gets nearer to the body as the note gets higher.

In case of strings not being solo, the player parameter (common to all the string players) indicating the position of the bow is determined to move to the tip with every bar at a bar timing. In case of strings not being solo, the stroke is set to be rather large. Furthermore, the position of the hand holding the neck is determined based on chord constituent notes. As shown in FIG. 120, a plurality of player objects is arranged for the string section. For example, the player object on the far left handles the root of a chord. Also, the player objects that are, for example, second and third from the left respectively handle the second and third constituent notes. Five string players are shown in the example of FIG. 120, and if the chord constituent notes are less than five, two players will be handling one of the constituent notes together. Moreover, which notes are included as the chord constituent notes is stored in a table in advance.

Here, referring to FIGS. 123 to 125, the player parameter determination method relating to strings will be described.

First, referring to FIG. 123, an overall flow of player parameter determination processing relating to strings will be described. As shown in FIG. 123, first, the visualization parameter determination unit 114 determines whether or not a strings solo probability is a specific value set in advance or more (S400). When the strings solo probability is the specific value or more, the visualization parameter determination unit 114 proceeds to the process of step S402. On the other hand, when the strings solo probability is less than the specific value, the visualization parameter determination unit 114 proceeds to the process of step S404. In step S402, a parameter setting process for a case of strings solo is performed by the visualization parameter determination unit 114 (S402). In step S404, a parameter setting process for a case of strings not solo is performed by the visualization parameter determination unit 114 (S404). When any of the processes of steps S402 and S404 is performed, the visualization parameter determination unit 114 ends the series of processes.

Next, referring to FIG. 124, parameter determination processing for a case of strings solo will be described. As shown in FIG. 124, first, the visualization parameter determination unit 114 determines the position of the hand holding the neck based on the melody line (S406). Then, the visualization parameter determination unit 114 determines the position of the bow base on the melody line change position (S408).

Next, referring to FIG. 125, parameter determination processing for a case of strings not being solo will be described. As shown in FIG. 125, first, the visualization parameter determination unit 114 decides whether or not a strings presence probability is a specific value set in advance or more (S410). When the strings presence probability is a specific value or more, the visualization parameter determination unit 114 proceeds to the process of step S414. On the other hand, when the strings presence probability is less than the specific value, the visualization parameter determination unit 114 proceeds to the process of step S412.

In step S414, the position of the hand holding the neck is determined by the visualization parameter determination unit 114 based on the chord constituent note (S414). Next, the position of the bow is determined by the visualization parameter determination unit 114 based on the position of the bar (S416). On the other hand, in step S412, the visualization parameter determination unit 114 sets the position of the hand holding the neck to remain unchanged and sets the bow to move away from the violin (S412). When any of the processes of steps S412 and S416 is performed, the visualization parameter determination unit 114 ends the player parameter determination process for a case of strings not being solo.

(Brass)

Figure 126:
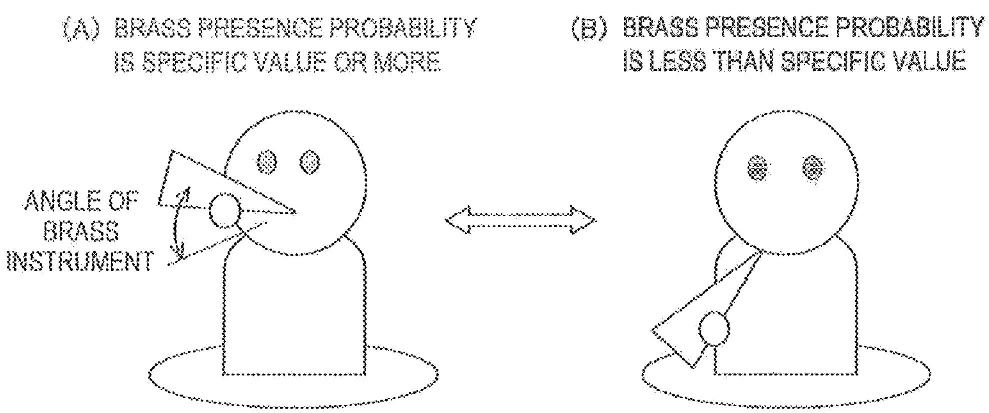
Figure 127:
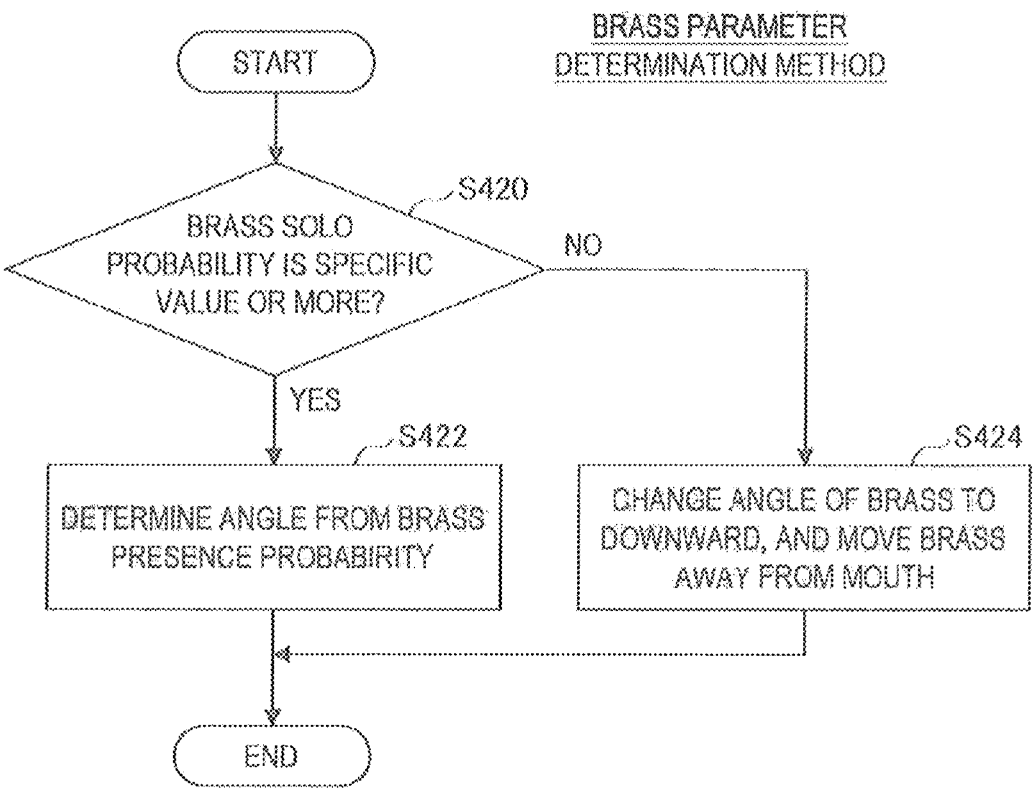

Next, referring to FIGS. 126 and 127, a player parameter determination method to be applied to the player object for brass will be described. FIG. 126 is an explanatory diagram showing types of player parameters to be applied to the player object for brass. FIG. 127 is an explanatory diagram showing a flow of processing relating to the player parameter determination method for brass.

First, as shown in FIG. 126, the player parameter relating to brass is configured only from an angle parameter for a brass instrument. The angle parameter for a brass instrument is set such that the higher a brass presence probability is, the more upward the brass instrument looks, and the lower the brass presence probability is, the more downward the brass instrument looks. Furthermore, when the brass presence probability is less than a specific value, it is set such that the angle of the brass instrument looks downward and is moved away from the mouth.

As shown in FIG. 127, first, the visualization parameter determination unit 114 determines whether or not a brass solo probability is a specific value set in advance or more (S420). When the brass solo probability is the specific value or more, the visualization parameter determination unit 114 proceeds to the process of step S422. On the other hand, when the brass solo probability is less than the specific value, the visualization parameter determination unit 114 proceeds to the process of step S424. In step S422, the angle parameter for a brass instrument is determined by the visualization parameter determination unit 114 based on the brass presence probability (S422). On the other hand, in step S424, the visualization parameter determination unit 114 sets the angle parameter such that the brass instrument looks downward and is moved away from the mouth (S424). When any of the processes of steps S422 and S424 is performed, the visualization parameter determination unit 114 ends the series of processes.

Heretofore, the visualization parameter determination methods have been described. The visualization parameters determined in this manner are input to the visualization unit 116 and are used for visualization processing for a music piece.

(2-6. Hardware Configuration (Information Processing Apparatus 100))

Figure 128:
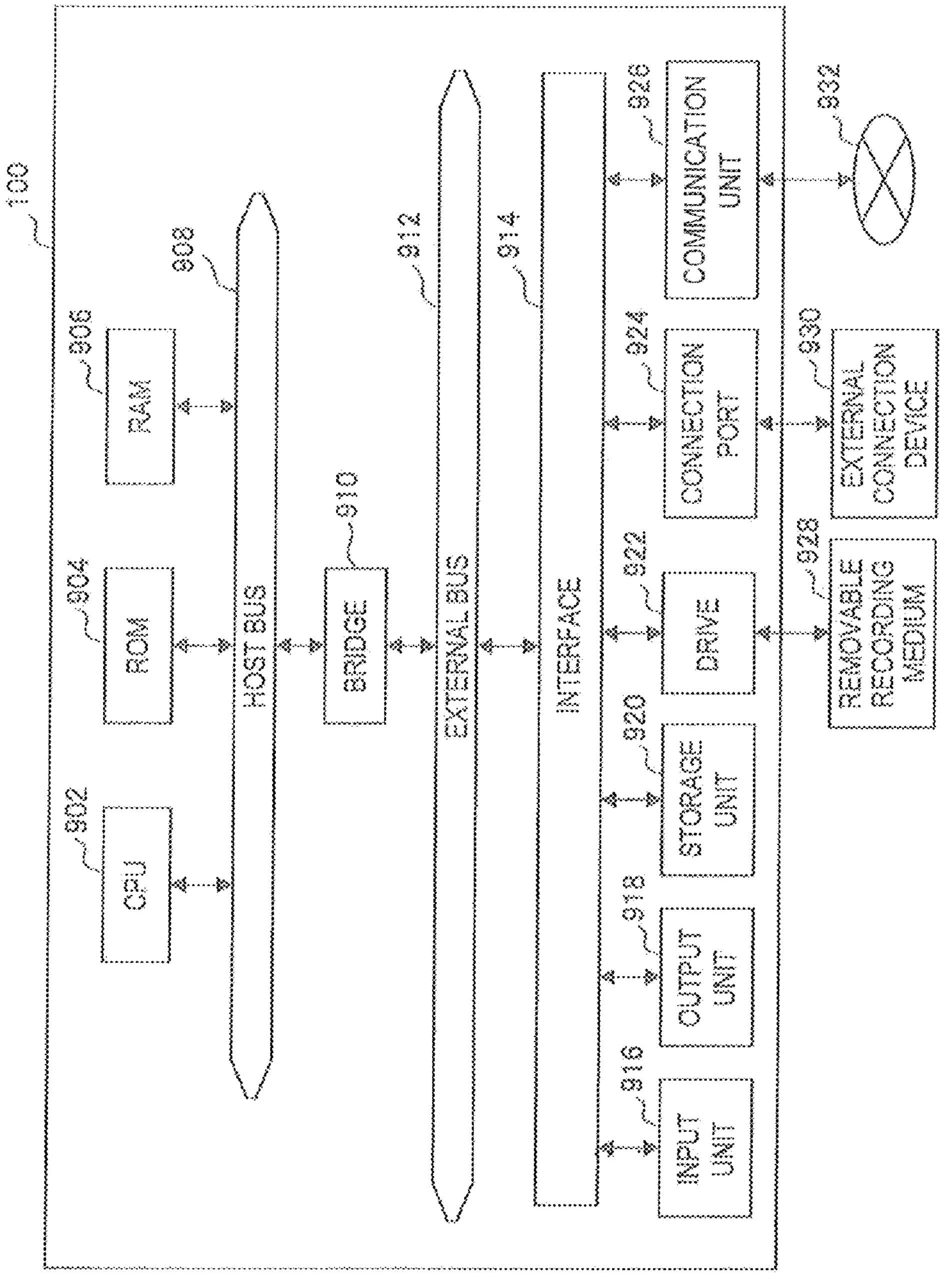

The function of each structural element of the above-described apparatus can be realized by a hardware configuration shown in FIG. 128 and by using a computer program for realizing the above-described function, for example. FIG. 128 is an explanatory diagram showing a hardware configuration of an information processing apparatus capable of realizing the function of each structural element of the above-described apparatus. The mode of the information processing apparatus is arbitrary, and includes modes such as a mobile information terminal such as a personal computer, a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 128, the information processing apparatus 100 includes a CPU 902, a ROM 904, a RAM 906, a host bus 908, a bridge 910, an external bus 912, and an interface 914. Furthermore, the information processing apparatus 10 includes an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation of the structural elements or some of the structural elements on the basis of various programs recorded on the ROM 904, the RAM 906, the storage unit 920, or a removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These structural elements are connected to each other by, for example, the host bus 908 which can perform high-speed data transmission. The host bus 908 is connected to the external bus 912 whose data transmission speed is relatively low through the bridge 910, for example.

The input unit 916 is, for example, operation means such as a mouse, a keyboard, a touch panel, a button, a switch, or a lever. The input unit 916 may be remote control means (so-called remote control) that can transmit a control signal by using an infrared ray or other radio waves. The input unit 916 includes an input control circuit or the like to transmit information input by using the above-described operation means to the CPU 902 as an input signal.

The output unit 918 is, for example, a display device such as a CRT, an LCD, a PDP, or an ELD. Also, the output unit 918 is a device such an audio output device such as a speaker or headphones, a printer, a mobile phone, or a facsimile that can visually or auditorily notify a user of acquired information. The storage unit 920 is a device to store various data, and includes, for example, a magnetic storage device such as an HDD, a semiconductor storage device, an optical storage device, or a magneto-optical storage device. Moreover, the CRT is an abbreviation for Cathode Ray Tube. Also, the LCD is an abbreviation for Liquid Crystal Display. Furthermore, the PDP is an abbreviation for Plasma Display Panel. Furthermore, the ELI) is an abbreviation for Electro-Luminescence Display. Furthermore, the HDD is an abbreviation for Hard Disk Drive.

The drive 922 is a device that reads information recorded on the removal recording medium 928 such as a magnetic disk, an optical disk, a magneto-optical disk, or a semiconductor memory or writes information in the removal recording medium 928. The removal recording medium 928 is, for example, a DVD medium, a Blue-ray medium, or an HD-DVD medium. Furthermore, the removable recording medium 923 is, for example, a compact flash (CE; CompactFlash) (registered trademark), a memory stick, or an SD memory card. As a matter of course, the removal recording medium 928 may be, for example, an IC card on which a non-contact IC chip is mounted. Moreover, the SD is an abbreviation for Secure Digital. Also, the IC is an abbreviation for integrated Circuit.

The connection port 924 is a port such as an USB port, an IEEE1394 port, a SCSI, an RS-232C port, or a port for connecting an external connection device 930 such as an optical audio terminal. The external connection device 930 is, for example, a printer, a mobile music player, a digital camera, a digital video camera, or an IC recorder. Moreover, the USB is an abbreviation for Universal Serial Bus. Also, the SCSI is an abbreviation for Small Computer System interface.

The communication unit 926 is a communication device to be connected to a network 932. The communication unit 926 is, for example, a communication card for a wired or wireless LAN, Bluetooth (registered trademark), or WUSB, an optical communication router, an ADSL router, or various communication modems. The network 932 connected to the communication unit 926 includes a wire-connected or wirelessly connected network. The network 932 is, for example, the Internet, a home use LAN, infrared communication, visible light communication, broadcasting, or satellite communication. Moreover, the LAN is an abbreviation for Local Area Network. Also, the WUSB is an abbreviation for Wireless USB. Furthermore, the ADSL is an abbreviation for Asymmetric Digital Subscriber Line.

(2-7. Conclusion)

Lastly, the functional configuration of the information processing apparatus of the present embodiment, and the effects obtained by the functional configuration will be briefly described.

First, the functional configuration of the information processing apparatus according to the present embodiment can be described as follows. The information processing apparatus includes a metadata extraction unit and a parameter determination unit having configurations as described below. The metadata extraction unit is for analyzing an audio signal in which a plurality of instrument sounds are present in a mixed manner and for extracting, as a feature quantity of the audio signal, metadata changing along with passing of a playing time. As a method for extracting the feature quantity of the audio signal, a feature quantity estimation method based on a learning algorithm can be used, for example. For example, the metadata extraction unit described above uses a plurality of audio signals provided with desired feature quantities, captures the data of each audio signal in unit of specific time, and provides the captured data to the learning algorithm as evaluation data. At the same time, the metadata extraction unit described above provides the feature quantity of each evaluation data to the learning algorithm as teacher data. Then, a calculation formula for computing a desired feature quantity from input data of an arbitrary audio signal based on the learning algorithm can be obtained. Accordingly, the metadata extraction unit described above computes a desired feature quantity by inputting, to the calculation formula obtained by the learning algorithm, data of an audio signal which is an analysis target. At this time, the metadata extraction unit described above selects metadata changing in time series for the feature quantity and acquires a calculation formula, and extracts the feature quantity changing in time series by using the calculation formula. As described above, by adopting the feature quantity extraction method using the learning algorithm, a feature quantity is extracted from only the waveform of an audio signal. Now, the player parameter determination unit is for determining, based on the metadata extracted by the metadata extraction unit, a player parameter for controlling a movement of a player object corresponding to each instrument sound. As described above, metadata changing in time series is obtained by the metadata extraction unit. Thus, a CG image or a robot (player object) can be moved according to the metadata, and music expressed by audio signal can be visualized. The player parameter determination unit described above determines a parameter used for the visualization process. With this configuration, music can be visualized by using only the waveform of an audio signal. Particularly, by using time series metadata corresponding to the change in each instrument sound and by moving a player object for each instrument, music can be visualized more realistically. The effect is hard to realize by using a feature quantity obtained by simply frequency-analyzing the waveform of an audio signal.

For example, the metadata extraction unit extracts, as the metadata, one or more pieces of data selected from among a group formed from a beat of the audio signal, a chord progression, a music structure, a melody line, a bass line, a presence probability of each instrument sound, a solo probability of each instrument sound and a voice feature of vocals. As described above, by using the learning algorithm, various feature quantities can be extracted from the waveform of an audio signal. Particularly, by using metadata changing in time series and the above-described metadata having features of each instrument sound, music can be visualized in such a way that makes it seem like an object is actually playing the music.

Furthermore, the metadata extraction unit can extract, as the metadata, one or more pieces of data selected from among a group formed from a genre of music to which the audio signal belongs, age of the music to which the audio signal belongs, information of the audio signal relating to a player, types of the instrument sounds included in the audio signal and tone of music of the audio signal. Accordingly, by dramatizing the performance scene or by arranging the appearance or gesture of the player object, reality can be enhanced. For example, the player parameter determination unit may be configured to determine, in case information on height and weight of a player is extracted as the information relating to the player, a player parameter indicating a size of the player object based on the information on height and weight. Furthermore, in case information on a sex of the player is extracted as the information relating to the player, a player parameter indicating a hairstyle and clothing of the player object may be determined based on the information on a sex. Moreover, it should be noted that these arrangements are also performed based on the information obtained from the waveform of an audio signal.

Furthermore, the information processing apparatus may further include a lighting parameter determination unit for determining, based on the metadata extracted by the metadata extraction unit, a lighting parameter for controlling lighting on a stage on which the player object is placed. In this case, the lighting parameter determination unit determines the lighting parameter so that the lighting changes in sync with the beat detected by the metadata extraction unit. Furthermore, the lighting parameter determination unit may be configured to determine, based on the presence probability of each instrument sound extracted by the metadata extraction unit, a lighting parameter indicating a brightness of a spotlight shining on the player object corresponding to the each instrument sound. The lighting parameter determination unit may be configured to refer to the music structure extracted by the metadata extraction unit, and to determine the lighting parameter so that the lighting changes according to a type of a structure of music being played. Furthermore, the lighting parameter determination unit may be configured to determine the lighting parameter so that a colour of the lighting changes based on the age of the music extracted by the metadata extraction unit. As described, by using a method of changing the lighting by using the metadata extracted from the waveform of an audio signal to present the stage on which a player object is placed, the performance scene can be more realistic. For example, by using an audio signal of a recorded live, the actual performance scene can be reproduced, providing a new entertainment to a user.

Furthermore, the information processing apparatus may further include an audience parameter determination unit for determining, based on the metadata extracted by the metadata extraction unit, an audience parameter for controlling a movement of audience objects placed in audience seats provided in a location different from the stage. In this case, the audience parameter determination unit determines the audience parameter so that the movement of the audience objects changes in sync with the beat detected by the metadata extraction unit. Furthermore, the audience parameter determination unit may be configured to refer to the music structure extracted by the metadata extraction unit, and to determine the audience parameter so that the movement of the audience objects changes according to a type of a structure of music being played. In case of including the audience object in the performance scene, the movement of the audience can also be controlled based on the metadata. In reality, the behaviours of audience in concert is different depending on the type of the music. Based on this fact, the reality of the performance scene can be enhanced by controlling the movement of the audience objects based on the types or the like obtained from the waveform of an audio signal.

Furthermore, the player parameter determination unit may be configured to determine, based on the solo probability of each instrument sound extracted by the metadata extraction unit, a player parameter indicating a posture and an expression of the player object corresponding to the each instrument sound. Also, the player parameter determination unit may be configured to determine, based on the presence probability of each instrument sound extracted by the metadata extraction unit, a player parameter indicating a moving extent of a playing hand of the player object corresponding to the each instrument sound. Also, the player parameter determination unit may be configured to determine, based on the presence probability of vocals extracted by the metadata extraction unit, a player parameter indicating a size of an open mouth of the player object corresponding to the vocals or a distance between a hand holding a microphone and the mouth, in this manner, the type of parameter to be controlled differs for each player.

For example, the player parameter determination unit determines, based on a difference between an average pitch of the melody line extracted by the metadata and a pitch of the melody line for each frame or based on the voice feature of vocals extracted by the metadata extraction unit, a player parameter indicating a movement of an expression of the player object corresponding to the vocals. Furthermore, the player parameter determination unit determines, based on the melody line extracted by the metadata extraction unit, a player parameter indicating a movement of a hand not holding a microphone, the hand being of the player object corresponding to the vocals. In case of a vocalist, a realistic movement is realized by using the player parameter control method as described above.

Furthermore, the player parameter determination unit determines, based on the chord progression extracted by the metadata extraction unit, a player parameter indicating a position of a hand of the player object, the player parameter corresponding to one or more sections selected from among a group formed from a guitar, a keyboard and strings. The player parameter determination unit determines, based on the bass line extracted by the metadata extraction unit, a position of a hand holding a neck, the hand being of the player object corresponding to a bass. Regarding the players other than the vocalist, realistic movements are realized by using the player parameter control method as described above.

Furthermore, the player object may be an externally connected robot or a player image realized by computer graphics. In this case, the information processing apparatus further includes an object control unit for controlling a movement of the externally connected robot by using the player parameter determined by the player parameter determination unit or for controlling a movement of the player image by using the player parameter determined by the player parameter determination unit. Of course, the technology according to the present embodiment is not limited to such, and the movement of a player object can be controlled with regard to anything that can be visualized, by using any expression method, (Remarks)

The above-described music analysis unit 110 is an example of the metadata extraction unit. The above-described visualization parameter determination unit 114 is an example of the player parameter determination unit, the lighting parameter determination unit or the audience parameter determination unit. The above-described visualization unit 116 is an example of the object control unit.

It should be understood by those skilled in the art that various modifications, combinations, sub-combinations and alterations may occur depending on design requirements and other factors insofar as they are within the scope of the appended claims or the equivalents thereof.

For example, when visualizing music by using a CG image, the presentation effects for a performance scene can also be enhanced by the visual effects as described below.

(1) First, a method of enhancing the presentation effects by devising the camerawork for the CG can be conceived. For example, when a solo player is detected, a presentation method of zooming and displaying the solo player can be conceived. This presentation method is realized by using the solo probability obtained by the music analysis unit 110. Also, a display method can be conceived according to which a plurality of virtual cameras are provided and the cameras are switched according to the bar progression. The display method is realized by using the bar progression obtained by the music analysis unit 110. As described, by automatically determining the camerawork for the CG based on the metadata obtained by the music analysis unit 110, realistic visual effects based on the waveform of music data can be provided to a user.

(2) Furthermore, a stage presentation can be realized by using various types of metadata obtained by the music analysis unit 110. For example, when quiet music is being played, a stage presentation of emitting smoke during the refrain portion is possible. On the contrary, when lively music is being played, a stage presentation of detonating something just before the refrain portion is possible. Metadata indicating the music structure and the tone of music obtained by the music analysis unit 110 are used for such stage presentation. As described, by automatically determining the stage presentation for the CG based on the metadata obtained by the music analysis unit 110, realistic visual effects based on the waveform of music data can be provided to a user.

(3) In the description of the embodiments above, descriptions have been made with vocals, guitar, bass, keyboard, drums, strings and brass as examples. However, the types of instruments can be detected more finely by using the configuration of the music analysis unit 110 already described. For example, a bass can be detected to be a wood bass, an electric bass or a synth bass. Also, drums can be detected to be acoustic drums or electric drums. Furthermore, the applause or cheer of the audience can also be detected from the waveform of music data. Accordingly, the CG itself of the player object or the instrument the player object is holding can also be changed according to the detected type of an instrument by detecting the types of instruments more finely. Furthermore, the audience can be made to applause according to the detected applause sound, or the audience can be moved as if they are shouting according to the detected cheer.

(4) As described above, the music analysis unit 110 can perform a music analysis on the waveform of each channel separated by the sound source separation unit 106. Accordingly, by using the music analysis unit 110 and analyzing the waveform of each channel, it becomes possible to detect in which channel each instrument sound is included. Thus, a configuration is also possible according to which the position of a player object is changed based on the presence probability of each instrument sound detected for each channel. For example, in case a high guitar presence probability is detected in the signal waveform in the left channel, the position of the player object for guitar is shifted to the left. In this manner, by automatically determining the positions and the movements of various objects based on the metadata obtained by the music analysis unit 110, realistic visual effects based on the waveform of music data can be provided to a user.

The present application contains subject matter related to that disclosed in Japanese Priority Patent Application JP2008-311514 filed in the Japan Patent Office on Dec. 5, 2008, the entire content of which is hereby incorporated by reference.

What is claimed is:

1. An information processing apparatus, comprising:

a signal determining unit configured to determine signal data, wherein the signal data comprises a plurality of signals present in a mixed manner;

a log spectrum analysis unit configured to output a log spectrum of the signal data, wherein the log spectrum represents an intensity distribution of the signal data for each pitch;

a metadata extracting unit configured to analyze the signal data and extract, as a feature quantity of the signal data, metadata that changes along with passage of time of play of a music based on the log spectrum;

a determining unit configured to determine one or more object parameters and one or more audience parameters based on the extracted metadata; and a switching unit configured to switch between one or more objects based on the one or more object parameters in a time sequence, wherein the one or more audience parameters control movement of audience objects placed in audience seats provided in a location different from a stage, wherein the one or more audience parameters comprise at least a music structure extracted from the metadata to determine the movement of the audience objects based on a type of a structure of the music being played.

2. The information processing apparatus according to claim 1, wherein the one or more object parameters are associated with switch between display of the one or more objects and non-display of the one or more objects, wherein the switch is performed based on a calculated presence probability of a signal of the plurality of signals.

3. The information processing apparatus according to claim 1, wherein at least one of the one or more objects is an externally connected robot or an object image realized by computer graphics, and the information processing apparatus further comprises an object control unit configured to control a movement of the externally connected robot based on the one or more object parameters determined by the determining unit or to control a movement of the object image based on the one or more object parameters.

4. The information processing apparatus of claim 1, wherein the one or more audience parameters determine changes in synchronicity of the movement of the audience objects with a beat determined by the metadata.

5. The information processing apparatus of claim 1, wherein the metadata comprises one or more pieces of data, wherein the one or more pieces of data comprises a beat of the signal data, a chord progression, the music structure, a melody line, a bass line, a presence probability of each signal of the plurality of signals, a solo probability of each signal of the plurality of signals, or a voice feature of vocals.

6. An information processing method, comprising:

analyzing signal data comprising a plurality of signals present in a mixed manner;

obtaining a log spectrum of the signal data, wherein the log spectrum represents an intensity distribution of the signal data for each pitch;

extracting, as a feature quantity of the signal data, metadata that changes along with passage of playing time of a music based on the log spectrum;

determining, based on the extracted metadata, one or more object parameters for controlling movement of one or more objects corresponding to the plurality of signals and one or more audience parameters for controlling movement of audience objects placed in audience seats provided in a location different from a stage; and switching between the one or more objects based on the one or more object parameters in a time sequence, wherein the one or more audience parameters comprise at least a music structure extracted from the metadata to determine the movement of the audience objects according to a type of a structure of the music being played.

7. The information processing method of claim 6, wherein the metadata comprises one or more pieces of data, wherein the one or more pieces of data comprises a beat of the signal data, a chord progression, the music structure, a melody line, a bass line, a presence probability of each signal of the plurality of signals, a solo probability of each signal of the plurality of signals, or a voice feature of vocals.

8. The information processing method of claim 7, wherein based on the solo probability of each signal of the plurality of signals, one of the one or more object parameters indicates a posture and an expression of an object of the one or more objects corresponding to the each signal.

9. The information processing method of claim 7, wherein based on the presence probability of each signal of the plurality of signals, one of the one or more object parameters indicates a moving extent of a playing hand of an object of the one or more objects corresponding to the each signal.

10. The information processing method of claim 7, wherein based on a presence probability of the vocals, one of the one or more object parameters indicates a size of an open mouth of an object of the one or more objects corresponding to the vocals or a distance between a hand holding a microphone and the mouth.

11. The information processing method of claim 10, wherein based on a difference between an average pitch of the melody line and a pitch of the melody line for each frame, or based on the voice feature of the vocals, one of the one or more object parameters indicates a movement of an expression of an object of the one or more objects corresponding to the vocals.

12. The information processing method of claim 7, wherein based on the melody line, one of the one or more object parameters indicates a movement of a hand other than a hand holding a microphone, the hand being of an object of the one or more objects corresponding to the vocals.

13. The information processing method of claim 7, wherein based on the chord progression, one of the one or more object parameters indicates a position of a hand of an object of the one or more objects, wherein the one or more object parameters correspond to one or more sections selected from a guitar, a keyboard or strings.

14. The information processing method of claim 7, wherein based on the bass line, one of the one or more object parameters indicates a position of a hand holding a neck, the hand being of an object of the one or more objects corresponding to a bass.

15. A non-transitory computer-readable medium having stored thereon a set of computer-executable instructions for causing a computer to perform an operation, comprising:

analyzing signal data comprising a plurality of signals present in a mixed manner;

obtaining a log spectrum of the signal data, wherein the log spectrum represents an intensity distribution of the signal data for each pitch;

extracting, as a feature quantity of signal data, metadata that changes along with passage of playing time of a music based on the log spectrum;

determining, based on the extracted metadata, one or more object parameters for controlling movement of one or more objects corresponding to the plurality of signals and one or more audience parameters for controlling movement of audience objects placed in audience seats provided in a location different from a stage; and switching between the one or more objects based on the one or more object parameters in a time sequence, wherein the one or more audience parameters comprise at least a music structure extracted from the metadata to determine the movement of the audience objects according to a type of a structure of the music being played.

16. The non-transitory computer-readable medium of claim 15, wherein the metadata comprises one or more pieces of data, wherein the one or more pieces of data comprises a genre of the music to which the signal data belongs, an age of the music to which the signal data belongs, information about the signal data relating to an object of the one or more objects, types of the plurality of signals included in the signal data, and tone of the music of the signal data.

17. The non-transitory computer-readable medium of claim 16, further comprising:

determining, in an event information on height and weight of the object is extracted as the information relating to the object, one of the one or more object parameters indicating a size of the object based on the information on the height and the weight, and determining, in an event information on a gender of the object is extracted as the information relating to the object, one of the one or more object parameters indicating a hairstyle and clothing of the object based on the information on the gender.

18. The non-transitory computer-readable medium of claim 16, further comprising:

determining a lighting parameter, based on the extracted metadata, for controlling lighting on the stage on which the object is placed, wherein the lighting parameter is determined such that the lighting on the stage changes synchronously with a beat detected by the extracted metadata.

19. The non-transitory computer-readable medium of claim 18, wherein the lighting parameter, based on a presence probability of each signal of the plurality of signals, indicates a brightness of a spotlight shining on the object corresponding to each signal.

20. The non-transitory computer-readable medium of claim 19, wherein the lighting parameter comprises at least the music structure extracted from the metadata, wherein the lighting parameter determines the lighting changes according to the type of the structure of the music being played.

21. The non-transitory computer-readable medium of claim 20, wherein the lighting parameter determines a color of the lighting changes based on the age of the music extracted from the metadata.

22. The non-transitory computer-readable medium of claim 15, wherein the metadata comprises one or more pieces of data, wherein the one or more pieces of data comprises a beat of the signal data, a chord progression, the music structure, a melody line, a bass line, a presence probability of each signal of the plurality of signals, a solo probability of each signal of the plurality of signals, and a voice feature of vocals.

23. The information processing apparatus of claim 1, wherein the music structure is determined based on the log spectrum of the signal data.

* * * * *